US008606639B1

(12) United States Patent
Sun et al.

(10) Patent No.: US 8,606,639 B1
(45) Date of Patent: Dec. 10, 2013

(54) MANAGING CONSISTENT INTERFACES FOR PURCHASE ORDER BUSINESS OBJECTS ACROSS HETEROGENEOUS SYSTEMS

(75) Inventors: Hua Sun, Eggenstein-Leopoldshafen (DE); Astrid Doeppenschmidt, Muehlhausen (DE); Markus Wolf, Mannheim (DE)

(73) Assignee: SAP AG, Walldorf (DE)

( * ) Notice: Subject to any disclaimer, the term of this patent is extended or adjusted under 35 U.S.C. 154(b) by 1403 days.

(21) Appl. No.: 11/864,871

(22) Filed: Sep. 28, 2007

Related U.S. Application Data

(60) Provisional application No. 60/848,497, filed on Sep. 28, 2006.

(51) Int. Cl.
*G06Q 30/00* (2012.01)

(52) U.S. Cl.
USPC ........................................ 705/26.1; 705/27.1

(58) Field of Classification Search
USPC .................................................... 705/26–27
See application file for complete search history.

(56) References Cited

U.S. PATENT DOCUMENTS

| | | | |
|---|---|---|---|
| 3,223,321 | A | 12/1965 | Baumgartner |
| 5,126,936 | A | 6/1992 | Champion et al. |
| 5,210,686 | A | 5/1993 | Jernigan |
| 5,247,575 | A | 9/1993 | Sprague et al. |
| 5,255,181 | A | 10/1993 | Chapman et al. |
| 5,321,605 | A | 6/1994 | Chapman et al. |
| 5,463,555 | A | 10/1995 | Ward et al. |
| 5,787,237 | A | 7/1998 | Reilly |
| 5,812,897 | A | 9/1998 | Nishio |
| 5,812,987 | A | 9/1998 | Luskin et al. |
| 5,966,695 | A | 10/1999 | Melchione et al. |
| 5,970,465 | A | 10/1999 | Dietrich et al. |
| 5,970,475 | A | 10/1999 | Barnes et al. |
| 5,983,284 | A | 11/1999 | Argade |
| 6,047,264 | A | 4/2000 | Fisher et al. |
| 6,073,137 | A | 6/2000 | Brown et al. |
| 6,092,196 | A | 7/2000 | Reiche |
| 6,104,393 | A | 8/2000 | Santos-Gomez |
| 6,115,690 | A | 9/2000 | Wong |
| 6,125,391 | A | 9/2000 | Meltzer et al. |
| 6,138,118 | A | 10/2000 | Koppstein et al. |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

"Enterprise Application Integration," by Julie Gable, Information Management Journal, Mar./Apr. 2002, 36, pp. 48-52.*

(Continued)

*Primary Examiner* — Matthew Zimmerman
*Assistant Examiner* — Kathleen G Palavecino
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. Specifically, example business objects include PurchaseOrder ERP and PurchaseRequest ERP.

2 Claims, 276 Drawing Sheets

(56) References Cited

U.S. PATENT DOCUMENTS

| | | | |
|---|---|---|---|
| 6,154,732 | A | 11/2000 | Tarbox |
| 6,222,533 | B1 | 4/2001 | Notani et al. |
| 6,226,675 | B1 | 5/2001 | Meltzer et al. |
| 6,229,551 | B1 | 5/2001 | Huang |
| 6,331,972 | B1 | 12/2001 | Harris et al. |
| 6,332,163 | B1 | 12/2001 | Bowman-Amuah |
| 6,424,979 | B1 | 7/2002 | Livingston et al. |
| 6,434,159 | B1 | 8/2002 | Woodward et al. |
| 6,438,594 | B1 | 8/2002 | Bowman-Amuah |
| 6,542,912 | B2 | 4/2003 | Meltzer et al. |
| 6,591,260 | B1 | 7/2003 | Schwarzhoff et al. |
| 6,738,747 | B1 | 5/2004 | Tanaka et al. |
| 6,745,229 | B1 | 6/2004 | Gobin et al. |
| 6,763,353 | B2 | 7/2004 | Li et al. |
| 6,775,647 | B1 | 8/2004 | Evans et al. |
| 6,868,370 | B1 | 3/2005 | Burbridge et al. |
| 6,937,992 | B1 | 8/2005 | Benda et al. |
| 6,970,844 | B1 | 11/2005 | Bierenbaum |
| 7,039,606 | B2 | 5/2006 | Hoffman et al. |
| 7,076,449 | B2 | 7/2006 | Tsunenari et al. |
| 7,131,069 | B1 | 10/2006 | Rush et al. |
| 7,206,768 | B1 * | 4/2007 | deGroeve et al. ............... 705/54 |
| 7,249,157 | B2 | 7/2007 | Stewart et al. |
| 7,269,569 | B2 | 9/2007 | Spira et al. |
| 7,292,965 | B1 | 11/2007 | Mehta et al. |
| 7,321,864 | B1 | 1/2008 | Gendler |
| 7,363,271 | B2 | 4/2008 | Morimoto |
| 7,379,931 | B2 | 5/2008 | Morinville |
| 7,383,990 | B2 | 6/2008 | Veit |
| 7,481,367 | B2 | 1/2009 | Fees et al. |
| 7,509,278 | B2 | 3/2009 | Jones |
| 7,515,697 | B2 | 4/2009 | Eng et al. |
| 7,516,088 | B2 | 4/2009 | Johnson et al. |
| 7,574,383 | B1 | 8/2009 | Parasnis et al. |
| 7,627,504 | B2 | 12/2009 | Brady et al. |
| 7,634,482 | B2 | 12/2009 | Mukherjee et al. |
| 7,788,319 | B2 | 8/2010 | Schmidt et al. |
| 7,805,383 | B2 | 9/2010 | Veit et al. |
| 7,853,491 | B2 | 12/2010 | Wittmer et al. |
| 7,865,426 | B2 | 1/2011 | Volpert |
| 7,873,965 | B2 | 1/2011 | Hayton et al. |
| 2001/0042032 | A1 | 11/2001 | Crawshaw et al. |
| 2002/0013721 | A1 | 1/2002 | Dabbiere et al. |
| 2002/0026394 | A1 | 2/2002 | Savage et al. |
| 2002/0046053 | A1 | 4/2002 | Hare et al. |
| 2002/0052754 | A1 | 5/2002 | Joyce et al. |
| 2002/0087481 | A1 | 7/2002 | Harif |
| 2002/0087483 | A1 | 7/2002 | Harif |
| 2002/0107765 | A1 | 8/2002 | Walker |
| 2002/0112171 | A1 | 8/2002 | Ginter et al. |
| 2002/0138318 | A1 | 9/2002 | Ellis et al. |
| 2002/0147668 | A1 | 10/2002 | Smith et al. |
| 2002/0152104 | A1 | 10/2002 | Ojha et al. |
| 2002/0152145 | A1 | 10/2002 | Wanta et al. |
| 2002/0156693 | A1 | 10/2002 | Stewart et al. |
| 2002/0156930 | A1 | 10/2002 | Velasquez |
| 2002/0157017 | A1 | 10/2002 | Mi et al. |
| 2002/0169657 | A1 | 11/2002 | Singh et al. |
| 2002/0184070 | A1 | 12/2002 | Chen et al. |
| 2002/0186876 | A1 | 12/2002 | Jones et al. |
| 2002/0194045 | A1 | 12/2002 | Shay et al. |
| 2003/0004799 | A1 | 1/2003 | Kish |
| 2003/0069648 | A1 | 4/2003 | Douglas et al. |
| 2003/0086594 | A1 | 5/2003 | Gross |
| 2003/0120502 | A1 | 6/2003 | Robb et al. |
| 2003/0126077 | A1 | 7/2003 | Kantor et al. |
| 2003/0167193 | A1 | 9/2003 | Jones et al. |
| 2003/0171962 | A1 | 9/2003 | Hirth et al. |
| 2003/0172007 | A1 | 9/2003 | Helmolt et al. |
| 2003/0172135 | A1 | 9/2003 | Bobick et al. |
| 2003/0195815 | A1 | 10/2003 | Li et al. |
| 2003/0204452 | A1 | 10/2003 | Wheeler |
| 2003/0208389 | A1 | 11/2003 | Kurihara et al. |
| 2003/0212614 | A1 | 11/2003 | Chu et al. |
| 2003/0220875 | A1 | 11/2003 | Lam et al. |
| 2003/0233295 | A1 | 12/2003 | Tozawa et al. |
| 2003/0236748 | A1 | 12/2003 | Gressel et al. |
| 2004/0024662 | A1 | 2/2004 | Gray et al. |
| 2004/0034577 | A1 | 2/2004 | Van Hoose et al. |
| 2004/0039665 | A1 | 2/2004 | Ouchi |
| 2004/0073510 | A1 | 4/2004 | Logan |
| 2004/0083201 | A1 | 4/2004 | Sholl et al. |
| 2004/0138942 | A1 | 7/2004 | Pearson et al. |
| 2004/0172360 | A1 * | 9/2004 | Mabrey et al. .................. 705/40 |
| 2004/0220910 | A1 | 11/2004 | Zang et al. |
| 2004/0254945 | A1 * | 12/2004 | Schmidt et al. ............... 707/100 |
| 2004/0267714 | A1 | 12/2004 | Frid et al. |
| 2005/0015273 | A1 | 1/2005 | Iyer |
| 2005/0021366 | A1 | 1/2005 | Pool et al. |
| 2005/0033588 | A1 | 2/2005 | Ruiz et al. |
| 2005/0038744 | A1 | 2/2005 | Viijoen |
| 2005/0049903 | A1 | 3/2005 | Raja |
| 2005/0071262 | A1 | 3/2005 | Kobeh et al. |
| 2005/0080640 | A1 | 4/2005 | Bhaskaran et al. |
| 2005/0108085 | A1 | 5/2005 | Dakar et al. |
| 2005/0131947 | A1 | 6/2005 | Laub et al. |
| 2005/0159997 | A1 | 7/2005 | John |
| 2005/0171833 | A1 | 8/2005 | Jost et al. |
| 2005/0182639 | A1 | 8/2005 | Dale |
| 2005/0187797 | A1 | 8/2005 | Johnson |
| 2005/0187866 | A1 | 8/2005 | Lee |
| 2005/0194431 | A1 | 9/2005 | Fees et al. |
| 2005/0194439 | A1 | 9/2005 | Zuerl et al. |
| 2005/0197849 | A1 | 9/2005 | Fotteler et al. |
| 2005/0197851 | A1 | 9/2005 | Veit |
| 2005/0197878 | A1 | 9/2005 | Fotteler et al. |
| 2005/0197881 | A1 | 9/2005 | Fotteler et al. |
| 2005/0197882 | A1 | 9/2005 | Fotteler et al. |
| 2005/0197886 | A1 | 9/2005 | Veit |
| 2005/0197887 | A1 | 9/2005 | Zuerl et al. |
| 2005/0197896 | A1 | 9/2005 | Veit et al. |
| 2005/0197897 | A1 | 9/2005 | Veit et al. |
| 2005/0197898 | A1 | 9/2005 | Veit et al. |
| 2005/0197899 | A1 | 9/2005 | Veit et al. |
| 2005/0197900 | A1 | 9/2005 | Veit |
| 2005/0197901 | A1 | 9/2005 | Veit et al. |
| 2005/0197902 | A1 | 9/2005 | Veit |
| 2005/0197928 | A1 | 9/2005 | Fotteler et al. |
| 2005/0197941 | A1 | 9/2005 | Veit |
| 2005/0210406 | A1 | 9/2005 | Biwer et al. |
| 2005/0216321 | A1 | 9/2005 | Veit |
| 2005/0216371 | A1 | 9/2005 | Fotteler et al. |
| 2005/0222888 | A1 | 10/2005 | Hosoda et al. |
| 2005/0222896 | A1 | 10/2005 | Rhyne et al. |
| 2005/0222945 | A1 | 10/2005 | Pannicke et al. |
| 2005/0234754 | A1 | 10/2005 | Veit |
| 2005/0246240 | A1 * | 11/2005 | Padilla ............................ 705/26 |
| 2005/0256753 | A1 | 11/2005 | Veit et al. |
| 2006/0004934 | A1 | 1/2006 | Guldner et al. |
| 2006/0005098 | A1 | 1/2006 | Lotz et al. |
| 2006/0020515 | A1 | 1/2006 | Lee et al. |
| 2006/0026586 | A1 | 2/2006 | Remmel et al. |
| 2006/0047574 | A1 | 3/2006 | Sundaram et al. |
| 2006/0047598 | A1 | 3/2006 | Hansen |
| 2006/0059005 | A1 | 3/2006 | Horn et al. |
| 2006/0059059 | A1 | 3/2006 | Horn et al. |
| 2006/0059060 | A1 | 3/2006 | Horn et al. |
| 2006/0069598 | A1 | 3/2006 | Schweitzer et al. |
| 2006/0069629 | A1 | 3/2006 | Schweitzer et al. |
| 2006/0069632 | A1 | 3/2006 | Kahn et al. |
| 2006/0074728 | A1 | 4/2006 | Schweitzer et al. |
| 2006/0080338 | A1 | 4/2006 | Seubert et al. |
| 2006/0085336 | A1 | 4/2006 | Seubert et al. |
| 2006/0085412 | A1 | 4/2006 | Johnson et al. |
| 2006/0085450 | A1 | 4/2006 | Seubert et al. |
| 2006/0089885 | A1 * | 4/2006 | Finke et al. ..................... 705/26 |
| 2006/0095373 | A1 * | 5/2006 | Venkatasubramanian et al. ............................... 705/40 |
| 2006/0184435 | A1 | 8/2006 | Mostowfi |
| 2006/0212376 | A1 | 9/2006 | Snyder et al. |
| 2006/0280302 | A1 | 12/2006 | Baumann et al. |
| 2006/0282360 | A1 | 12/2006 | Kahn et al. |
| 2007/0027742 | A1 | 2/2007 | Emuchay et al. |
| 2007/0043583 | A1 | 2/2007 | Davulcu et al. |

(56) References Cited

U.S. PATENT DOCUMENTS

| | | | | |
|---|---|---|---|---|
| 2007/0078799 | A1 | 4/2007 | Huber-Buschbeck et al. | |
| 2007/0124227 | A1 | 5/2007 | Dembo et al. | |
| 2007/0129978 | A1 | 6/2007 | Shirasu et al. | |
| 2007/0150387 | A1 | 6/2007 | Seubert et al. | |
| 2007/0150836 | A1 | 6/2007 | Deggelmann et al. | |
| 2007/0156428 | A1* | 7/2007 | Brecht-Tillinger et al. | 705/1 |
| 2007/0156690 | A1 | 7/2007 | Moser et al. | |
| 2007/0165622 | A1 | 7/2007 | O'Rourke et al. | |
| 2007/0214065 | A1 | 9/2007 | Kahlon et al. | |
| 2007/0225949 | A1 | 9/2007 | Sundararajan et al. | |
| 2007/0226090 | A1 | 9/2007 | Stratton | |
| 2007/0255639 | A1 | 11/2007 | Seifert | |
| 2007/0265860 | A1* | 11/2007 | Herrmann et al. | 705/1 |
| 2007/0265862 | A1* | 11/2007 | Freund et al. | 705/1 |
| 2007/0294159 | A1 | 12/2007 | Cottle | |
| 2008/0005012 | A1 | 1/2008 | Deneef | |
| 2008/0021754 | A1 | 1/2008 | Horn et al. | |
| 2008/0040243 | A1 | 2/2008 | Chang et al. | |
| 2008/0046104 | A1 | 2/2008 | Van Camp et al. | |
| 2008/0046421 | A1 | 2/2008 | Bhatia et al. | |
| 2008/0120129 | A1 | 5/2008 | Seubert et al. | |
| 2008/0120190 | A1 | 5/2008 | Joao et al. | |
| 2008/0120204 | A1 | 5/2008 | Conner et al. | |
| 2008/0133303 | A1 | 6/2008 | Singh et al. | |
| 2008/0154969 | A1 | 6/2008 | DeBie | |
| 2008/0162266 | A1 | 7/2008 | Griessmann et al. | |
| 2008/0196108 | A1 | 8/2008 | Dent et al. | |
| 2008/0215354 | A1* | 9/2008 | Halverson et al. | 705/1 |
| 2008/0243578 | A1 | 10/2008 | Veit | |
| 2008/0288317 | A1 | 11/2008 | Kakar | |
| 2009/0063287 | A1* | 3/2009 | Tribout et al. | 705/26 |
| 2009/0077074 | A1 | 3/2009 | Hosokawa | |
| 2009/0089198 | A1 | 4/2009 | Kroutik | |
| 2009/0192926 | A1 | 7/2009 | Tarapata | |
| 2009/0222360 | A1 | 9/2009 | Schmitt et al. | |
| 2009/0248431 | A1 | 10/2009 | Schoknecht et al. | |
| 2009/0248547 | A1 | 10/2009 | Doenig et al. | |
| 2009/0271245 | A1 | 10/2009 | Joshi et al. | |
| 2009/0326988 | A1 | 12/2009 | Barth et al. | |
| 2010/0014510 | A1 | 1/2010 | Boreli et al. | |
| 2010/0070395 | A1 | 3/2010 | Elkeles et al. | |
| 2010/0106555 | A1 | 4/2010 | Mneimneh et al. | |

FOREIGN PATENT DOCUMENTS

| | | |
|---|---|---|
| CN | 1632806 | 6/2005 |
| CN | 1767537 | 5/2006 |
| CN | 101174957 | 5/2008 |

OTHER PUBLICATIONS

"An XML Model for Use Across Heterogeneous Client-Server Applications," SUvendi Chinnappen-Rimer and Gerhard P. Hancke, IEEE Transactions on Intrumentastion and Measurement, Oct. 2008, vol. 50, No. 10, pp. 2128-2135.*

SAP Structured Entity Relationship Model (SAP-SERM) for R/3 System Release 4.0 Introduction and Index: Dec. 1998; 26 pages.

SAP Structures Entity Relationship Model (SAP-SERM) for R/3 System Release 4.0 (Part 1); Dec. 1998; 5954 pages.

SAP Structured Entity Relationship Model (SAP-SERM) for R/3 System Release 4.0 (Part 2); Dec. 1998; 7838 pages.

Zeneke, Peter; "Engineering a Business PLatform"; SAP AG 2005; Engineering BPP; [Online] previously availible at URL www.sap.com/community/pub/webcast/2006_01_16_Analyst_Summit_Vegas/2006_01_16_Analyst_Summit_Vegas_009.pdf ; 36 pages.

"UML in the .com Enterprise: Modeling CORBA, Components, XML/XMI and Metadata workshop"; http://www.omg.org/news/meetings/workshops/uml_presentations.htm.

Medjahed, Brahim et al; "Business-to-Business Interactions: Issues and Enabling Technologies"; The VLDB Journal; vol. 12, No. 1; Apr. 3, 2003; pp. 59-89.

Medjahed, Brahim et al.; "Composing Web Services on the Semantic Web"; The VLDB Journal; vol. 12, No. 4, Sep. 23, 2003; pp. 333-351.

Born, Marc et al.; "Customizing UML for Component Design"; www.dol-profile.de; UML Workshop, Palm Springs, CA; Nov. 2000.

Kappel, Gerti et al.; "A Framework for Workflow Management Systems Based on Objects, Rules, and Roles"; ACM Computing Surveys; ACM Press; vol. 32; Mar. 2000; 5 pages.

Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.

Microsoft; "Creating an XML Web Service Proxy"; 2001 ; mshelp://ms.msdnqtr.2003apr.1033/cpguide/html/cpguide/html/cpconcreatingwebserviceproxy.htm; 3 pages.

Proceedings of OMG Workshops; http://www.omg.org/news/meetings/workshops/proceedings.htm; pp. 1-3.

Meltzer, Bart et al.; "XML and Electronic Commerce: Enabling the Network Economy"; SIGMOD Record; ACM Press; vol. 27, No. 4; Dec. 1998.

Huhns, Michael N. et al.; "Automating Supply-Chain Mangement"; Jul. 15-19, 2002; pp. 1017-1024.

Soederstroem, Eva; "Standardising the Business Vocabulary of Standards"; SAC, Madrid, Spain; 2002; pp. 1048-1052.

Bastide, Remi et al.; "Formal Specification of Corba Services: Experience and Lessons Learned"; 2000; pp. 105-117.

Glushko, Robert J. et al.; "An XML Framework for Agent-Based E-Commerce"; Communications of the ACM; vol. 42, No. 3; Mar. 1999; pp. 106-114.

Coen-Porisini, Alberto et al.; "A Formal Approach for Designing CORBA-Based Applications"; ACM Transactions on Software Engineering and Methodology; vol. 12, No. 2; Apr. 2003; pp. 107-151.

Yang, J. et al.; "Service Deployment for Virtual Enterprises"; IEEE; 2001; pp. 107-115.

Karp, Alan H.; "E-speak E-xplained"; Communications of the ACM; vol. 46, No. 7; Jul. 2003; pp. 113-118.

Gillibrand, David; "Essential Business Object Design"; Communications of the ACM; vol. 43, No. 2; Feb. 2000; pp. 117-119.

Cole, James et al.; "Extending Support for Contracts in ebXML"; IEEE; 2001; pp. 119-127.

DiNitto, Elisabetta et al.; "Deriving Executable Process Descriptions from UML"; ICSE '02; May 19-25, 2002; pp. 155-165.

Stumptner, Markus et al.; "On the Road to Behavior-Based Integration"; First Asia-Pacific Conferences on Conceptual Modelling Dunedin, New Zealand; Jan. 2004; pp. 15-22.

Gosain, Sanjay et al.; "The Impact of Common E-Business Interfaces"; Communications of the ACM; vol. 46, No. 2; Dec. 2003; pp. 186-195.

Damodaran, Suresh; "B2B Integration over the Internet with XML—RosettaNet Successes and Challenges"; WWW2004; May 17-22, 2004; pp. 188-195.

Schulze, Wolfgang et al.; "Standardising on Workflow-Management—The OMG Workflow Management Facility"; SIGGROUP Bulletin; vol. 19, No. 1; Apr. 1998; pp. 24-30.

Sutherland, Jeff; "Business Objects in Corporate Information Systems"; ACM Computing Surveys; vol. 27, No. 2; Jun. 1995; pp. 274-276.

Arsanjani, Ali; "Developing and Integrating Enterprise Components and Services"; Communications of the ACM; vol. 45, No. 10; Oct. 2002; pp. 31-34.

Kim, Dan Jong et al.; "A Comparison of B2B E-Service Solutions "; Communications of the ACM; vol. 46, No. 12; Dec. 2003; pp. 317-324.

Hasselbring, Wilhelm; "Information System Integration"; Communications of the ACM; vol. 43, No. 6; Jun. 2000; pp. 33-38.

Khosravi, Navid et al.; "An Approach to Building Model Driven Enterprise Systems in Nebras Enterprise Framework"; OOPSLA '02: Comparison of the 17$^{th}$ Annual ACM SIGPLAN Conference on Object-Oriented Programming, Systems, Languages, and Applications; Nov. 4-8, 2002; pp. 32-33.

Hogg, K. et al.; "An Evaluation of Web Services in the Design of a B2B Application"; 27$^{th}$ Australasian Computer Science Conference; Dunedin, New Zealand; 2004; pp. 331-340.

Gruhn, Volker et al.; "Workflow Management Based on Process Model Repositories"; IEEE 1998; pp. 379-388.

(56) References Cited

OTHER PUBLICATIONS

Kim, HyoungDo; "Conceptual.Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Specification"; Communications of the ACM; vol. 45, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirl et al.; "Using UML for Software Process Modeling"; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Moamar, Zakaria et al:; "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anat et al.; "Integrating and Customizing Heterogeneous E-Commerce Applications"; The VLDB Journal; Aug. 2001; pp. 16-38.
Office Action issued in related U.S. Appl. No. 11/145,464 on Jan. 22, 2009; 49 pages.
International Search Report and Written Opinion of the International Searching Authority issued in International Application No. PCT/US2007/011378 on Apr. 30, 2008; 17 pages.
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
"Header", Newton's Telecom Dictionary; 12th Edition, 2004; pp. 389-390).
Office Action issued in U.S. Appl. No. 11/640,422 on May 14, 2010; 12 pages.
Notice of Allowance issued in related U.S. Appl. No. 11/775,821 on Jul. 16, 2010; 4 pages.
Office Action issued in related U.S. Appl. No. 12/060,178 on May 25, 2010; 19 pages.
Office Action issued in related U.S. Appl. No. 12/060,171 on Jul. 1, 2010; 19 pages.
Advisory Action issued in U.S. Appl. No. 11/155,368 on Mar. 31, 2010; 3 pages.
He, Ning et al.; "B2B Contract Implementation Using Windows DNS"; 2001; pp. 71-79.
FSML-Financial Services Markup Language (Jul. 14, 1999) http://xml.coverpages.org/FSML-v1500a.pdf; pp. 1-159.
Webster's Revised Unabridged Dictionary (1913+1828); Def. "merchandise".
Statement in Accordance with the Notice from the European Patent Office dated Oct. 1, 2007 Concerning Business Methods—EPC; Official Journal of the European Patent Office; Munich; Nov. 1, 2007; pp. 592-593.
Lynn, Chris; "Sony Enters Brand Asset Management Market"; The Seybold Report; Analyzing Publishing Technologies; Aug. 4, 2004; <www.Seybold365.com>; 3 pages.
Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Office Action issued in related U.S. Appl. No. 11/775,821 on Jan. 22, 2010; 16 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Office Action issued in related U.S. Appl. No. 11/731,857 on May 15, 2009; 11 pages.
Office Action issued in related U.S. Appl. No. 11/731,857 on Feb. 4, 2010; 22 pages.

(56) References Cited

OTHER PUBLICATIONS

Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/060,178 on Dec. 7, 2009; 6 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 11/145,464 on Aug. 5, 2009; 31 pages.
Office Action issued in related U.S. Appl. No. 11/145,464 on Feb. 5, 2010; 57 pages.
Office Action issued in related U.S. Appl. No. 11/155,368 on May 14, 2009; 6 pages.
Office Action issued in related U.S. Appl. No. 11/155,368 on Dec. 10, 2009; 43 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Communication Pursuant to Article 94(3) EPC issued in related European Application No. 05757432.9 on Jan. 26, 2009; 4 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
Newton's Telecom Dictionary; 18th Edition; 2002; pp. 347, 454.
Notice of Allowance issued in related U.S. Appl. No. 12/147,395 on Oct. 26, 2010; 10 pages.
Office Action issued in related U.S. Appl. No. 12/147,399 on Jan. 26, 2011; 16 pages.
Notice of Allowance issued in related U.S. Appl. No. 11/775,821 on Oct. 22, 2010; 4 pages.
Notice of Allowance issued in related U.S. Appl. No. 11/364,538 on Dec. 13, 2010; 5 pages.
Notice of Allowance issued in related U.S. Appl. No. 11/731,857 on Nov. 29, 2010; 4 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Office Action issued in related U.S. Appl. No. 12/059,971 on Nov. 4, 2010; 20 pages.
Office Action issued in related U.S. Appl. No. 12/060,149 on Aug. 26, 2010; 15 pages.
Notice of Allowance issued in related U.S. Appl. No. 12/060,178 on Dec. 6, 2010; 4 pages.
Office Action issued in related U.S. Appl. No. 12/060,171 on Jan. 26, 2011; 17 pages.
Notice of Allowance issued in related U.S. Appl. No. 11/145,464 on Nov. 1, 2010; 4 pages.
Notice of Allowance issued in U.S. Appl. No. 11/155,368 on Oct. 7, 2010; 4 pages.
Notice of Allowance issued in related U.S. Appl. No. 11/166,065 on Sep. 20, 2010; 6 pages.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
SAP; "BC-Central Maintenance and Transport Objects"; Release 4.6C; Apr. 200; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; 8 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Communication Pursuant to Article 94(3) issued in European Application No. 05757432.9 on Apr. 12, 2011; 5 pages.
Notice of Allowance issued in U.S. Appl. No. 12/147,395 on May 4, 2011; 10 pages.
Notice of Allowance issued in related U.S. Appl. No. 12/147,449 on Apr. 28, 2011; 9 pages.
Office Action issued in related U.S. Appl. No. 12/334,175 on May 27, 2011; 12 pages.
Notice of Allowance issued in related U.S. Appl. No. 11/731,857 on Apr. 11, 2011; 8 pages.
Office Action issued in U.S. Appl. No. 12/147,414 on Apr. 14, 2011; 30 pages.
Office Action issued in U.S. Appl. No. 12/147,378 on Jun. 17, 2011; 10 pages.
Notice of Allowance issued in U.S. Appl. No. 12/323,139 on Mar. 4, 2011; 13 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/059,804 on Apr. 28, 2011; 14 pages.
Office Action issued in related U.S. Appl. No. 12/060,149 on Feb. 4, 2011; 19 pages.
Office Action issued in related U.S. Appl. No. 12/060,192 on Apr. 14, 2011; 18 pages.
Office Action issued in related U.S. Appl. No. 12/060,062 on Jul. 13, 2011; 16 pages.
Office Action issued in related U.S. Appl. No. 12/060,155 on May 10, 2011; 8 pages.
Notice of Allowance issued in related U.S. Appl. No. 11/145,464 on Feb. 23, 2011; 7 pages.
Notice of Allowance issued in U.S. Appl. No. 11/155,368 on Mar. 14, 2011; 7 pages.
Notice of Allowance issued in U.S. Appl. No. 11/166,065 on Mar. 8, 2011; 5 pages.
Office Action issued in related U.S. Appl. No. 11/864,866 on Feb. 3, 2011; 20 pages.
Notice of Allowance issued in related U.S. Appl. No. 11/864,866 on Jul. 22, 2011; 6 pages.
Notice of Allowance issued in related U.S. Appl. No. 11/775,821 on Feb. 4, 2011; 4 pages.
Notice of Allowance issued in related U.S. Appl. No. 11/364,538 on Jul. 26, 2011; 6 pages.

(56) References Cited

OTHER PUBLICATIONS

Office Action issued in U.S. Appl. No. 11/864,811 on Mar. 18, 2011; 10 pages.
Office Action issued in U.S. Appl. No. 11/864,811 on Jul. 26, 2011; 7 pages.
Notice of Allowance issued in related U.S. Appl. No. 11/864,832 on Jul. 7, 2011;11 pages.
Office Action issued in related U.S. Appl. No. 11/864,863 on Jul. 21, 2011; 29 pages.
Notice of Allowance issued in related U.S. Appl. No. 11/803,178 on May 17, 2011; 13 pages.

* cited by examiner

| Package | level1 | level2 | level3 | Cardinality | Datatype Name |
|---|---|---|---|---|---|
| PurchaseOrderBy-IDQueryMessage 39000 | PurchaseOrderBy-IDQueryMessage 39002 | | | | PurchaseOrderByIDQuery-Message 39004 |
| Selection 39006 | | PurchaseOr-derSelection-ByID 39008 | | 1 39010 | |
| | | | PurchaseOrderID 39012 | 1 39014 | PurchaseOrderID 39016 |
| | | | PurchaseOrde-rItemID 39018 | 0..1 39020 | PurchaseOrderItemID 39022 |

FIG. 40-1

| Package | level1 | level2 | level3 | level4 | level5 | level6 | Cardinality | Datatype Name |
|---|---|---|---|---|---|---|---|---|
| PurchaseOrderBy-IDResponseMes-sage 40000 | PurchaseOr derBy-IDRespon-seMessage 40002 | | | | | | | PurchaseOr-derByIDRe-sponseMessage 40004 |
| PurchaseOrder 40006 | | Pur-chaseOrder 40008 | | | | | 0..1 40010 | |
| | | | ID 40012 | | | | 1 40014 | PurchaseOrde-rID 40016 |
| | | | Process-ingType-Code 40018 | | | | 1 40020 | BusinessTrans-actionDocu-mentProcess-ingTypeCode 40022 |
| | | | Can-celledIndi-cator 40024 | | | | 0..1 40026 | Indicator 40028 |

FIG. 40-2

| Package | level1 | level2 | level3 | level4 | level5 | level6 | Cardinality | Datatype Name |
|---|---|---|---|---|---|---|---|---|
| | | | PurchaseOrderDate 40030 | | | | 1 40032 | Date 40034 |
| | | | Creation-Date 40036 | | | | 1 40038 | Date 40040 |
| | | | CreationUserAccountID 40042 | | | | 1 40044 | UserAccoountID 40046 |
| Party 40048 | | | PurchasingOrganisationParty 40050 | | | | 1 40052 | |
| | | | | InternalID 40054 | | | 1 40056 | PartyInternalID 40058 |
| | | | PurchasingGroupParty 40060 | | | | 1 40062 | |

FIG. 40-3

| Package | level1 | level2 | level3 | level4 | level5 | level6 | Cardinality | Datatype Name |
|---|---|---|---|---|---|---|---|---|
| | | | | InternalID 40064 | | | 1 40066 | PartyInternalID 40068 |
| | | | SellerParty 40070 | | | | 1 40072 | |
| | | | | InternalID 40074 | | | 1 40076 | PartyInternalID 40078 |
| | | | BillFrom-Party 40080 | | | | 0..1 40082 | |
| | | | | InternalID 40084 | | | 1 40086 | PartyInternalID 40088 |
| | | | Vendor-Party 40090 | | | | 0..1 40092 | |
| | | | | InternalID 40094 | | | 1 40096 | PartyInternalID 40098 |
| Delivery-Terms 40100 | | | Delivery-Terms 40102 | | | | 0..1 40104 | |

FIG. 40-4

| Package | level1 | level2 | level3 | level4 | level5 | level6 | Cardinality | Datatype Name |
|---|---|---|---|---|---|---|---|---|
| | | | | Incoterms 40106 | | | 0..1 40108 | Incoterms 40110 |
| | | | | | Classifica-tionCode 40112 | | 1 40114 | IncotermsClas-sificationCode 40116 |
| | | | | | TransferLo-cationName 40118 | | 0..1 40120 | IncotermsTrans-ferLocation-Name 40122 |
| PaymentIn-formation 40124 | | | CashDis-countTerms 40126 | | | | 0..1 40128 | CashDiscount-Terms 40130 |
| | | | | Maximum-CashDis-count 40132 | | | 0..1 40134 | CashDiscount 40136 |
| | | | | | DaysValue 40138 | | 0..1 40140 | IntegerValue 40142 |
| | | | | | Percent 40144 | | 1 40146 | Percent 40148 |

FIG. 40-5

| Package | level1 | level2 | level3 | level4 | level5 | level6 | Cardinality | Datatype Name |
|---|---|---|---|---|---|---|---|---|
| | | | | Normal-CashDis-count 40150 | | | 0..1 40152 | CashDiscount 40154 |
| | | | | | DaysValue 40156 | | 1 40158 | IntegerValue 40160 |
| | | | | | Percent 40162 | | 1 40164 | Percent 40166 |
| | | | | FullPay-ment-DueDays-Value 40168 | | | 0..1 40170 | IntegerValue 40172 |
| PriceInfor-mation 40174 | | | Price 40176 | | | | 0..1 40178 | |
| | | | | Tota-lAmount 40180 | | | 0..1 40182 | Amount 40184 |

FIG. 40-6

| Package | level1 | level2 | level3 | level4 | level5 | level6 | Cardinality | Datatype Name |
|---|---|---|---|---|---|---|---|---|
| Item 40186 | | | Item 40188 | | | | 1..N 40190 | |
| | | | | ID 40192 | | | 1 40194 | PurchaseOrde-rItemID 40196 |
| | | | | Process-ingType-Code 40198 | | | 1 40200 | BusinessTrans-actionDocumen-tItemProcess-ingTypeCode 40202 |
| | | | | Can-celledIndi-cator 40204 | | | 0..1 40206 | Indicator 40208 |
| | | | | Quantity 40210 | | | 1 40212 | Quantity 40214 |
| | | | | PlantID 40216 | | | 1 40218 | PlantID 40220 |

FIG. 40-7

| Package | level1 | level2 | level3 | level4 | level5 | level6 | Cardinality | Datatype Name |
|---|---|---|---|---|---|---|---|---|
| | | | | Description 40222 | | | 1 40224 | Short_Description 40226 |
| Party 40228 | | | | Requestor-Party 40230 | | | 0..1 40232 | |
| | | | | | InternalID 40234 | | 1 40236 | PartyInternalID 40238 |
| Location 40240 | | | | Inventory-Managed-Location 40242 | | | 0..1 40244 | |
| | | | | | InternalID 40246 | | 1 40248 | LocationInter-nalID 40250 |
| | | | | ShipToLo-cation 40252 | | | 1 40254 | |

FIG. 40-8

| Package | level1 | level2 | level3 | level4 | level5 | level6 | Cardinality | Datatype Name |
|---|---|---|---|---|---|---|---|---|
| | | | | | InternalID 40256 | | 1 40258 | LocationInternalID 40260 |
| Product-Information 40262 | | | | Product 40264 | | | 0..1 40266 | |
| | | | | | InternalID 40268 | | 0..1 40270 | ProductIntenalID 40272 |
| | | | | | ManufacturerID 40274 | | 0..1 40276 | ProductPartyID 40278 |
| | | | | ProductCategory 40280 | | | 1 40282 | |
| | | | | | InternalID 40284 | | 1 40286 | ProductCategoryInternalID 40288 |

FIG. 40-9

| Package | level1 | level2 | level3 | level4 | level5 | level6 | Cardinality | Datatype Name |
|---|---|---|---|---|---|---|---|---|
| PriceIn-formation 40290 | | | | Price 40292 | | | 0..1 40294 | |
| | | | | | Tota-lAmount 40296 | | 0..1 40298 | Amount 40300 |
| | | | | | NetPrice 40302 | | 0..1 40304 | Price 40306 |
| | | | | | | Amount 40308 | 1 40310 | Amount 40312 |
| | | | | | | BaseQuan-tity 40314 | 1 40316 | Quantity 40318 |
| Delive-ryTerms 40320 | | | | Delivery-Terms 40322 | | | 0..1 40324 | |
| | | | | | Incoterms 40326 | | 0..1 40328 | Incoterms 40330 |

FIG. 40-10

| Package | level1 | level2 | level3 | level4 | level5 | level6 | Cardinality | Datatype Name |
|---|---|---|---|---|---|---|---|---|
| | | | | | | ClassificationCode 40332 | 1 40334 | IncotermsClassificationCode 40336 |
| | | | | | | TransferLocationName 40338 | 0..1 40340 | IncotermsTransferLocationName 40342 |
| | | | | | QuantityTolerance 40344 | | 0..1 40346 | QuantityTolerance 40348 |
| | | | | | | OverPercent 40350 | 0..1 40352 | Percent 40354 |
| | | | | | | OverPercent UnlimitedIndicator 40356 | 0..1 40358 | ValueUnlimitedIndicator 40360 |
| | | | | | | UnderPercent 40362 | 0..1 40364 | Percent 40366 |

FIG. 40-11

| Package | level1 | level2 | level3 | level4 | level5 | level6 | Cardinality | Datatype Name |
|---|---|---|---|---|---|---|---|---|
| Confirmation 40368 | | | | Confirmation 40370 | | | 0..n 40372 | |
| | | | | | ID 40374 | | 1 40376 | PurchaseOrderItemConfirmationID 40378 |
| | | | | | ProcessingTypeCode 40380 | | 1 40382 | BusinessTransactionDocumentProcessingTypeCode 40384 |
| | | | | | Quantity 40386 | | 1 40388 | Quantity 40390 |
| | | | | | DeliveryDateTime 40392 | | 1 40394 | LOCAL_DateTime 40396 |

FIG. 40-12

| Package | level1 | level2 | level3 | level4 | level5 | level6 | Cardinality | Datatype Name |
|---|---|---|---|---|---|---|---|---|
| Business Transaction Document Reference 40398 | | | | SupplierQuoteReference 40400 | | | 0..1 40402 | |
| | | | | | ID 40404 | | 1 40406 | SupplierQuoteID 40408 |
| | | | | | ItemID 40410 | | 1 40412 | SupplierQuoteItemID 40414 |
| | | | | PurchaseContractReference 40416 | | | 0..1 40418 | |

FIG. 40-13

| Package | level1 | level2 | level3 | level4 | level5 | level6 | Cardinality | Datatype Name |
|---|---|---|---|---|---|---|---|---|
| | | | | | ID 40420 | | 1 40422 | PurchaseContractID 40424 |
| | | | | | ItemID 40426 | | 1 40428 | PurchaseContractItemID 40430 |
| ScheduleLine 40432 | | | | ScheduleLine 40434 | | | 0..N 40436 | |
| | | | | | ID 40438 | | 1 40440 | BusinessTransactionDocumentItemScheduleLineID 40442 |
| | | | | | DeliveryDateTime 40444 | | 1 40446 | LOCAL_DateTime 40448 |
| | | | | | Quantity 40450 | | 1 40452 | Quantity 40454 |

FIG. 40-14

| Package | level1 | level2 | level3 | level4 | level5 | level6 | Cardinality | Datatype Name |
|---|---|---|---|---|---|---|---|---|
| | | | | | Pur-chaseRe-questRefer ence 40456 | | 0..1 40458 | |
| | | | | | | ID 40460 | 1 40462 | PurchaseRe-questID 40464 |
| | | | | | | ItemID 40466 | 1 40468 | PurchaseRe-questItemID 40470 |
| Log 40472 | | Log 40474 | | | | | 0..1 40476 | Log 40478 |

FIG. 41-1

| Package | level1 | level2 | level3 | Cardinality | Datatype Name |
|---|---|---|---|---|---|
| PurchaseOrder-BySellerAndProduc-tAndOrganisational-DataQueryMessage 41000 | PurchaseOrderBySellerAndProductAndOr-ganisationalDataQue-ryMessage 41002 | | | | PurchaseOrderBySellerAndProductAndOr-ganisationalDataQue-ryMessage 41004 |
| Selection 41006 | | PurchaseOrderSelection-BySellerAndProductAn-dOrganisationalData 41008 | | 1 41010 | |
| | | | PurchaseOrder-SellerPartyInternalID 41012 | 0..1 41014 | PartyInternalID 41016 |
| | | | PurchaseOrderPur-chasingOrganisa-tionPartyInternalID 41018 | 0..1 41020 | PartyInternalID 41022 |
| | | | PurchaseOrderPur-chasingGroupParty-InternalID 41024 | 0..1 41026 | PartyInternalID 41028 |

FIG. 41-2

| Package | level1 | level2 | level3 | Cardinality | Datatype Name |
|---|---|---|---|---|---|
| | | | PurchaseOrderProc-essingTypeCode 41030 | 0..1 41032 | BusinessTransac-tionDocumentType-Code 41034 |
| | | | PurchaseOrderItem-ProductInternalID 41036 | 0..1 41038 | ProductInternalID 41040 |
| | | | PurchaseOrderItem-ProductCategory-InternalID 41042 | 0..1 41044 | ProductCategory-InternalID 41046 |
| | | | PurchaseOrderItem-Description 41048 | 0..1 41050 | SHORT_Description 41052 |
| | | | PurchaseOrderItem-PlantID 41054 | 0..1 41056 | PlantID 41058 |
| | | | PurchaseOrderItem-ProcessingTypeCode 41060 | 0..1 41062 | BusinessTransac-tionDocumentItem-TypeCode 41064 |

FIG. 41-3

| Package | level1 | level2 | level3 | Cardinality | Datatype Name |
| --- | --- | --- | --- | --- | --- |
| | | | PurchaseOrderItem-RequestorPartyInter-nalID 41066 | 0..1 41068 | PartyInternalID 41070 |
| | | | PurchaseOrderItem-DeliveryPeriod 41072 | 0..1 41074 | UPPEROPEN_LOCAL_DateTimePeriod 41076 |

FIG. 42-1

| Package | level1 | level2 | level3 | level4 | level5 | level6 | Cardinality | Datatype Name |
|---|---|---|---|---|---|---|---|---|
| PurchaseOrderBySellerAndProductAndOrganisationalDataResponseMessage 42000 | PurchaseOrderBySellerAndProductAndOrganisationalDataResponseMessage 42002 | | | | | | | PurchaseOrderBySellerAndProductAndOrganisationalDataResponseMessage 42004 |
| PurchaseOrder 42006 | | PurchaseOrder 42008 | | | | | 0..N 42010 | |
| | | | ID 42012 | | | | 1 42014 | PurchaseOrderID 42016 |

FIG. 42-2

| Package | | | | level1 | level2 | level3 | level4 | level5 | level6 | Cardinality | Datatype Name |
|---|---|---|---|---|---|---|---|---|---|---|---|
| | | | | | | ProcessingTypeCode 42018 | | | | 1 42020 | BusinessTransactionDocumentProcessingTypeCode 42022 |
| | | | | | | CancelledIndicator 42024 | | | | 0..1 42026 | Indicator 42028 |
| | | | | | | PurchaseOrderDate 42030 | | | | 1 42032 | Date 42034 |
| | | | | | | CreationDate 42036 | | | | 1 42038 | Date 42040 |
| | | | | | | CreationUserAccountID 42042 | | | | 1 42044 | UserAccoountID 42046 |

FIG. 42-3

| Package | level1 | level2 | level3 | level4 | level5 | level6 | Cardinality | Datatype Name |
|---|---|---|---|---|---|---|---|---|
| Party 42048 | | | PurchasingOrganisationParty 42050 | | | | 1 42052 | |
| | | | | InternalID 42054 | | | 1 42056 | PartyInternalID 42058 |
| | | | PurchasingGroupParty 42060 | | | | 1 42062 | |
| | | | | InternalID 42064 | | | 1 42066 | PartyInternalID 42068 |
| | | | SellerParty 42070 | | | | 1 42072 | |
| | | | | InternalID 42074 | | | 1 42076 | PartyInternalID 42078 |

FIG. 42-4

| Package | | | | level1 | level2 | level3 | level4 | level5 | level6 | Cardinality | Datatype Name |
|---|---|---|---|---|---|---|---|---|---|---|---|
| | | | | | | Vendor-Party 42080 | | | | 0..1 42082 | |
| | | | | | | | InternalID 42084 | | | 1 42086 | PartyInter-nalID 42088 |
| | | Item 42090 | | | | Item 42092 | | | | 1..N 42094 | |
| | | | | | | | ID 42096 | | | 1 42098 | PurchaseOr-derItemID 42100 |
| | | | | | | | Process-ingType-Code 42102 | | | 1 42104 | Business-Transaction-Documen-tItemProcess-ingTypeCode 42106 |
| | | | | | | | Can-celledIn-dicator 42108 | | | 0..1 42110 | Indicator 42112 |

FIG. 42-5

| Package | | | | level1 | level2 | level3 | level4 | level5 | level6 | Cardinality | Datatype Name |
|---|---|---|---|---|---|---|---|---|---|---|---|
| | | | | | | | Quantity 42114 | | | 1 42116 | Quantity 42118 |
| | | | | | | | PlantID 42120 | | | 1 42122 | PlantID 42124 |
| | | | | | | | Descrip-tion 42126 | | | 1 42128 | Short_Descrip tion 42130 |
| | | | Loca-tion 42132 | | | | Inven-toryMan-agedLo-cation 42134 | | | 0..1 42136 | |
| | | | | | | | | InternalID 42138 | | 1 42140 | LocationInter-nalID 42142 |
| | | | | | | | Ship-ToLoca-tion 42144 | | | 1 42146 | |

FIG. 42-6

| Package | | | | level1 | level2 | level3 | level4 | level5 | level6 | Cardinality | Datatype Name |
|---|---|---|---|---|---|---|---|---|---|---|---|
| | | | | | | | | InternalID 42148 | | 1 42150 | LocationInternalID 42152 |
| | | | ProductInformation 42154 | | | | Product 42156 | | | 0..1 42158 | |
| | | | | | | | | InternalID 42160 | | 1 42162 | ProductIntenalID 42164 |
| | | | | | | | | ManufacturerID 42166 | | 0..1 42168 | Product-PartyID 42170 |
| | | | | | | | ProductCategory 42172 | | | 1 42174 | |
| | | | | | | | | InternalID 42176 | | 1 42178 | ProductCategoryInternalID 42180 |

FIG. 42-7

| Package | | | | level1 | level2 | level3 | level4 | level5 | level6 | Cardinality | Datatype Name |
|---|---|---|---|---|---|---|---|---|---|---|---|
| | | | PriceInformation 42182 | | | | Price 42184 | | | 1 42186 | |
| | | | | | | | | TotalAmount 42188 | | 1 42190 | Amount 42192 |
| | | | | | | | | NetPrice 42194 | | 1 42196 | Price 42198 |
| | | | | | | | | | Amount 42200 | 1 42202 | Amount 42204 |
| | | | | | | | | | BaseQuantity 42206 | 1 42208 | Quantity 42210 |
| | Log 42212 | | | | Log 42214 | | | | | 0..1 42216 | Log 42218 |

FIG. 43-1

| Package | level1 | level2 | level3 | level4 | level5 | level6 | Cardinality | Datatype Name |
|---|---|---|---|---|---|---|---|---|
| PurchaseOrderChange-Confirmation-Message 43000 | PurchaseOrderChange ConfirmationMessage 43002 | | | | | | | PurchaseOrder-ChangeConfirmationMessage 43004 |
| PurchaseOrder 43006 | | PurchaseOrder 43008 | | | | | 1 43010 | |
| | | | ID 43012 | | | | 1 43014 | PurchaseOrderID 43016 |
| | | | ProcessingType-Code 43018 | | | | 1 43020 | BusinessTransactionDocument-ProcessingType-Code 43022 |

FIG. 43-2

| Package | level1 | level2 | level3 | level4 | level5 | level6 | Cardinality | Datatype Name |
|---|---|---|---|---|---|---|---|---|
| | | | Can-celledIndi-cator 43024 | | | | 0..1 43026 | Indicator 43028 |
| | | | PurchaseOr derDate 43030 | | | | 1 43032 | Date 43034 |
| | | | Creation-Date 43036 | | | | 1 43038 | Date 43040 |
| | | | Crea-tionUserAc-countID 43042 | | | | 1 43044 | UserAccoountID 43046 |
| Party 43048 | | | Purchasin-gOrganisa-tionParty 43050 | | | | 1 43052 | |
| | | | | InternalID 43054 | | | 1 43056 | PartyInternalID 43058 |

FIG. 43-3

| Package | level1 | level2 | level3 | level4 | level5 | level6 | Cardinality | Datatype Name |
|---|---|---|---|---|---|---|---|---|
| | | | Purchas-ingGroup-Party 43060 | | | | 1 43062 | |
| | | | | InternalID 43064 | | | 1 43066 | PartyInternalID 43068 |
| | | | SellerParty 43070 | | | | 1 43072 | |
| | | | | InternalID 43074 | | | 1 43076 | PartyInternalID 43078 |
| | | | BillFrom-Party 43080 | | | | 0..1 43082 | |
| | | | | InternalID 43084 | | | 1 43086 | PartyInternalID 43088 |
| | | | Vendor-Party 43090 | | | | 0..1 43092 | |

FIG. 43-4

| Package | level1 | level2 | level3 | level4 | level5 | level6 | Cardinality | Datatype Name |
|---|---|---|---|---|---|---|---|---|
| | | | | InternalID 43094 | | | 1 43096 | PartyInternalID 43098 |
| Delivery-Terms 43100 | | | Delivery-Terms 43102 | | | | 0..1 43104 | |
| | | | | Incoterms 43106 | | | 0..1 43108 | Incoterms 43110 |
| | | | | | Classifica-tionCode 43112 | | 1 43114 | IncotermsClassifi-cationCode 43116 |
| | | | | | Transfer-Location-Name 43118 | | 0..1 43120 | IncotermsTrans-ferLocationName 43122 |
| PaymentIn formation 43124 | | | CashDis-countTerms 43126 | | | | 0..1 43128 | CashDiscount-Terms 43130 |

FIG. 43-5

| Package | level1 | level2 | level3 | level4 | level5 | level6 | Cardinality | Datatype Name |
|---|---|---|---|---|---|---|---|---|
| | | | | Maxi-mumCash Discount 43132 | | | 0..1 43134 | CashDiscount 43136 |
| | | | | | DaysValue 43138 | | 0..1 43140 | IntegerValue 43142 |
| | | | | | Percent 43144 | | 1 43146 | Percent 43148 |
| | | | | Normal-CashDis-count 43150 | | | 0..1 43152 | CashDiscount 43154 |
| | | | | | DaysValue 43156 | | 1 43158 | IntegerValue 43160 |
| | | | | | Percent 43162 | | 1 43164 | Percent 43166 |

FIG. 43-6

| Package | level1 | level2 | level3 | level4 | level5 | level6 | Cardinality | Datatype Name |
|---|---|---|---|---|---|---|---|---|
| | | | | FullPayment-DueDays Value 43168 | | | 0..1 43170 | IntegerValue 43172 |
| PriceIn-formation 43174 | | | Price 43176 | | | | 1 43178 | |
| | | | | Tota-lAmount 43180 | | | 1 43182 | Amount 43184 |
| Item 43186 | | | Item 43188 | | | | 1..N 43190 | |
| | | | | ID 43192 | | | 1 43194 | PurchaseOrde-rItemID 43196 |
| | | | | Process-ingType-Code 43198 | | | 1 43200 | BusinessTransac-tionDocumen-tItemProcessing-TypeCode 43202 |

FIG. 43-7

| Package | level1 | level2 | level3 | level4 | level5 | level6 | Cardinality | Datatype Name |
|---|---|---|---|---|---|---|---|---|
| | | | | Can-celledIndi-cator 43204 | | | 0..1 43206 | Indicator 43208 |
| | | | | Quantity 43210 | | | 1 43212 | Quantity 43214 |
| | | | | PlantID 43216 | | | 1 43218 | PlantID 43220 |
| | | | | Descrip-tion 43222 | | | 1 43224 | Short_Description 43226 |
| Party 43228 | | | | Requestor Party 43230 | | | 0..1 43232 | |
| | | | | | InternalID 43234 | | 1 43236 | PartyInternalID 43238 |

FIG. 43-8

| Package | level1 | level2 | level3 | level4 | level5 | level6 | Cardinality | Datatype Name |
|---|---|---|---|---|---|---|---|---|
| Location 43240 | | | | Inven-toryMan-agedLoca-tion 43242 | | | 0..1 43244 | |
| | | | | | InternalID 43246 | | 1 43248 | LocationInternalID 43250 |
| | | | | Ship-ToLoca-tion 43252 | | | 1 43254 | |
| | | | | | InternalID 43256 | | 1 43258 | LocationInternalID 43260 |
| Product-Informa-tion 43262 | | | | Product 43264 | | | 0..1 43266 | |
| | | | | | InternalID 43268 | | 1 43270 | ProductIntenalID 43272 |

FIG. 43-9

| Package | level1 | level2 | level3 | level4 | level5 | level6 | Cardinality | Datatype Name |
|---|---|---|---|---|---|---|---|---|
| | | | | | Manufac-turerID 43274 | | 0..1 43276 | ProductPartyID 43278 |
| | | | | Pro-ductCate-goryID 43280 | | | 1 43282 | |
| | | | | | InternalID 43284 | | 1 43286 | ProductCategory-InternalID 43288 |
| PriceIn-forma-tion 43290 | | | | Price 43292 | | | 1 43294 | |
| | | | | | Tota-lAmount 43296 | | 1 43298 | Amount 43300 |
| | | | | | NetPrice 43302 | | 1 43304 | Price 43306 |

FIG. 43-10

| Package | level1 | level2 | level3 | level4 | level5 | level6 | Cardinality | Datatype Name |
|---|---|---|---|---|---|---|---|---|
| | | | | | | Amount 43308 | 1 43310 | Amount 43312 |
| | | | | | | BaseQuantity 43314 | 1 43316 | Quantity 43318 |
| DeliveryTerms 43320 | | | | DeliveryTerms 43322 | | | 0..1 43324 | |
| | | | | | Incoterms 43326 | | 0..1 43328 | Incoterms 43330 |
| | | | | | | ClassificationCode 43332 | 1 43334 | IncotermsClassificationCode 43336 |
| | | | | | | TransferLocationName 43338 | 0..1 43340 | IncotermsTransferLocationName 43342 |
| | | | | | QuantityTolerance 43344 | | 0..1 43346 | QuantityTolerance 43348 |

FIG. 43-11

| Package | level1 | level2 | level3 | level4 | level5 | level6 | Cardinality | Datatype Name |
|---|---|---|---|---|---|---|---|---|
| | | | | | | OverPer-cent 43350 | 0..1 43352 | Percent 43354 |
| | | | | | | OverPer-cent Unlimit-edIndicator 43356 | 0..1 43358 | ValueUnlimitedIn-dicator 43360 |
| | | | | | | UnderPer-cent 43362 | 0..1 43364 | Percent 43366 |
| Confir-mation 43368 | | | | Confirma-tion 43370 | | | 0..N 43372 | |
| | | | | | ID 43374 | | 1 43376 | PurchaseOrde-rItemConfirma-tionID 43378 |

FIG. 43-12

| Package | level1 | level2 | level3 | level4 | level5 | level6 | Cardinality | Datatype Name |
|---|---|---|---|---|---|---|---|---|
| | | | | | Process-ingType-Code 43380 | | 1 43382 | BusinessTransac-tionDocument-ProcessingType-Code 43384 |
| | | | | | Quantity 43386 | | 1 43388 | Quantity 43390 |
| | | | | | Delivery-DateTime 43392 | | 1 43394 | LOCAL_DateTime 43396 |
| Busi-ness-Trans-action Docu-men-tRefer-ence 43398 | | | | Supplier-QuoteRef erence 43400 | | | 0..1 43402 | |
| | | | | | ID 43404 | | 1 43406 | SupplierQuoteID 43408 |

FIG. 43-13

| Package | level1 | level2 | level3 | level4 | level5 | level6 | Cardinality | Datatype Name |
|---|---|---|---|---|---|---|---|---|
| | | | | | ItemID 43410 | | 1 43412 | Supplier-QuoteItemID 43414 |
| | | | | Pur-chaseContractRefer-ence 43416 | | | 0..1 43418 | |
| | | | | | ID 43420 | | 1 43422 | PurchaseContrac-tID 43424 |
| | | | | | ItemID 43426 | | 1 43428 | PurchaseContrac-tItemID 43430 |
| Sched-uleLine 43432 | | | | Sched-uleLine 43434 | | | 1..N 43436 | |

FIG. 43-14

| Package | level1 | level2 | level3 | level4 | level5 | level6 | Cardinality | Datatype Name |
|---|---|---|---|---|---|---|---|---|
| | | | | | ID 43438 | | 1 43440 | BusinessTransactionDocumentItemScheduleLineID 43442 |
| | | | | | DeliveryDateTime 43444 | | 1 43446 | LOCAL_DateTime 43448 |
| | | | | | Quantity 43450 | | 1 43452 | Quantity 43454 |
| | | | | | PurchaseRequestReference 43456 | | 0..1 43458 | |
| | | | | | | ID 43460 | 1 43462 | PurchaseRequestID 43464 |
| | | | | | | ItemID 43466 | 1 43468 | PurchaseRequestItemID 43470 |

FIG. 43-15

| Package | level1 | level2 | level3 | level4 | level5 | level6 | Cardinality | Datatype Name |
|---|---|---|---|---|---|---|---|---|
| Log 43472 | | Log 43474 | | | | | 0..1 43476 | Log 43478 |

FIG. 44-1

| Package | level1 | level2 | level3 | level4 | level5 | level6 | Cardinality | Datatype Name |
|---|---|---|---|---|---|---|---|---|
| PurchaseOrder-ChangeRequestMessage 44000 | Pur-chaseOr-der-ChangeR equest-Message 44002 | | | | | | | PurchaseOr-derChangeRe questMes-sage 44004 |
| PurchaseOrder 44006 | | Pur-chaseOrder 44008 | | | | | 1 44010 | |
| | | | ID 44012 | | | | 1 44014 | PurchaseOr-derID 44016 |
| | | | Process-ingType-Code 44018 | | | | 0..1 44020 | Business-Transaction-Document-Processing-TypeCode 44022 |
| | | | Can-celledIn-dicator 44024 | | | | 0..1 44026 | Indicator 44028 |

FIG. 44-2

| Package | | | | level1 | level2 | level3 | level4 | level5 | level6 | Cardinality | Datatype Name |
|---|---|---|---|---|---|---|---|---|---|---|---|
| | | | | | | Pur-chaseOr-derDate 44030 | | | | 0..1 44032 | Date 44034 |
| | | Party 44036 | | | | Purchas-ingOr-ganisa-tionParty 44038 | | | | 0..1 44040 | |
| | | | | | | | InternalID 44042 | | | 1 44044 | PartyInter-nalID 44046 |
| | | | | | | Purchas-ingGroup Party 44048 | | | | 0..1 44050 | |
| | | | | | | | InternalID 44052 | | | 1 44054 | PartyInter-nalID 44056 |

FIG. 44-3

| Package | | | | level1 | level2 | level3 | level4 | level5 | level6 | Cardinality | Datatype Name |
|---|---|---|---|---|---|---|---|---|---|---|---|
| | | | | | | Seller-Party 44058 | | | | 0..1 44060 | |
| | | | | | | | InternalID 44062 | | | 1 44064 | PartyInter-nalID 44066 |
| | | | | | | BillFrom-Party 44068 | | | | 0..1 44070 | |
| | | | | | | | InternalID 44072 | | | 1 44074 | PartyInter-nalID 44076 |
| | | | | | | Vendor-Party 44078 | | | | 0..1 44080 | |
| | | | | | | | InternalID 44082 | | | 1 44084 | PartyInter-nalID 44086 |
| | | Delivery-Terms 44088 | | | | Delivery-Terms 44090 | | | | 0..1 44092 | |

FIG. 44-4

| Package | | | | level1 | level2 | level3 | level4 | level5 | level6 | Cardinality | Datatype Name |
|---|---|---|---|---|---|---|---|---|---|---|---|
| | | | | | | | Incoterms 44094 | | | 0..1 44096 | Incoterms 44098 |
| | | | | | | | | Classifi-cation-Code 44100 | | 1 44102 | Inco-termsClassifi-cationCode 44104 |
| | | | | | | | | Transfer-Loca-tionName 44106 | | 0..1 44108 | Incoterm-sTransferLo-cationName 44110 |
| | | PaymentIn-formation 44112 | | | | CashDis-count-Terms 44114 | | | | 0..1 44116 | CashDis-countTerms 44118 |
| | | | | | | | Maximum-CashDis-count 44120 | | | 0..1 44122 | CashDiscount 44124 |
| | | | | | | | | Days-Value 44126 | | 0..1 44128 | IntegerValue 44130 |

FIG. 44-5

| Package | | | | level1 | level2 | level3 | level4 | level5 | level6 | Cardinality | Datatype Name |
|---|---|---|---|---|---|---|---|---|---|---|---|
| | | | | | | | | Percent 44132 | | 1 44134 | Percent 44136 |
| | | | | | | | Normal-CashDis-count 44138 | | | 0..1 44140 | CashDiscount 44142 |
| | | | | | | | | Days-Value 44144 | | 1 44146 | IntegerValue 44148 |
| | | | | | | | | Percent 44150 | | 1 44152 | Percent 44154 |
| | | | | | | | FullPay-ment-DueDays Value 44156 | | | 0..1 44158 | IntegerValue 44160 |
| | | Item 44162 | | | | Item 44164 | | | | 1..N 44166 | |
| | | | | | | | ID 44168 | | | 1 44170 | PurchaseOr-derItemID 44172 |

FIG. 44-6

| Package | | | | level1 | level2 | level3 | level4 | level5 | level6 | Cardinality | Datatype Name |
|---|---|---|---|---|---|---|---|---|---|---|---|
| | | | | | | | Process-ingType-Code 44174 | | | 0..1 44176 | Business-Transaction-Documen-tItemProcess-ingTypeCode 44178 |
| | | | | | | | Can-celledIndi-cator 44180 | | | 0..1 44182 | Indicator 44184 |
| | | | | | | | Quantity 44186 | | | 0..1 44188 | Quantity 44190 |
| | | | | | | | PlantID 44192 | | | 0..1 44194 | PlantID 44196 |
| | | | | | | | Descrip-tion 44198 | | | 0..1 44200 | Short_Descri ption 44202 |
| | | | Party 44204 | | | | Requestor Party 44206 | | | 0..1 44208 | |

FIG. 44-7

| Package | | | | level1 | level2 | level3 | level4 | level5 | level6 | Cardinality | Datatype Name |
|---|---|---|---|---|---|---|---|---|---|---|---|
| | | | | | | | | InternalID 44210 | | 1 44212 | PartyInternalID 44214 |
| | | | Location 44216 | | | | InventoryManagedLocation 44218 | | | 0..1 44220 | |
| | | | | | | | | InternalID 44222 | | 1 44224 | LocationInternalID 44226 |
| | | | | | | | ShipToLocation 44228 | | | 0..1 44230 | |
| | | | | | | | | InternalID 44232 | | 1 44234 | LocationInternalID 44236 |

FIG. 44-8

| Package | | | | level1 | level2 | level3 | level4 | level5 | level6 | Cardinality | Datatype Name |
|---|---|---|---|---|---|---|---|---|---|---|---|
| | | | Pro-ductIn-forma-tion 44238 | | | | Product 44240 | | | 0..1 44242 | |
| | | | | | | | | InternalID 44244 | | 1 44246 | ProductIn-tenalID 44248 |
| | | | | | | | | Manufac-turerID 44250 | | 0..1 44252 | Product-PartyID 44254 |
| | | | | | | | Pro-ductCate-goryID 44256 | | | 0..1 44258 | |
| | | | | | | | | InternalID 44260 | | 1 44262 | ProductCate-goryInter-nalID 44264 |

FIG. 44-9

| Package | | | | level1 | level2 | level3 | level4 | level5 | level6 | Cardinality | Datatype Name |
|---|---|---|---|---|---|---|---|---|---|---|---|
| | | | PriceInformation 44266 | | | | Price 44268 | | | 0..1 44270 | |
| | | | | | | | | TotalAmount 44272 | | 1 44274 | Amount 44276 |
| | | | | | | | | NetPrice 44278 | | 1 44280 | Price 44282 |
| | | | | | | | | | Amount 44284 | 1 44286 | Amount 44288 |
| | | | | | | | | | BaseQuantity 44290 | 1 44292 | Quantity 44294 |
| | | | DeliveryTerms 44296 | | | | DeliveryTerms 44298 | | | 0..1 44300 | |
| | | | | | | | | Incoterms 44302 | | 0..1 44304 | Incoterms 44306 |

FIG. 44-10

| Package | | | | level1 | level2 | level3 | level4 | level5 | level6 | Cardinality | Datatype Name |
|---|---|---|---|---|---|---|---|---|---|---|---|
| | | | | | | | | | Classifi-cation-Code 44308 | 1 44310 | Inco-termsClassifi-cationCode 44312 |
| | | | | | | | | | Trans-ferLoca-tion-Name 44314 | 0..1 44316 | Incoterm-sTransferLo-cationName 44318 |
| | | | | | | | | Quantity-Toler-ance 44320 | | 0..1 44322 | QuantityTol-erance 44324 |
| | | | | | | | | | Over-Percent 44326 | 0..1 44328 | Percent 44330 |
| | | | | | | | | | Over-Percent Unlimit-edIndi-cator 44332 | 0..1 44334 | ValueUnlimit-edIndicator 44336 |

FIG. 44-11

| Package | | | | level1 | level2 | level3 | level4 | level5 | level6 | Cardinality | Datatype Name |
|---|---|---|---|---|---|---|---|---|---|---|---|
| | | | | | | | | | Under-Percent 44338 | 0..1 44340 | Percent 44342 |
| | | | Busi-ness-Trans-action Docu men-tRefer ence 44344 | | | | Supplier-QuoteRef erence 44346 | | | 0..1 44348 | |
| | | | | | | | | ID 44350 | | 1 44352 | Supplier-QuoteID 44354 |
| | | | | | | | | ItemID 44356 | | 1 44358 | Supplier-QuoteItemID 44360 |

FIG. 44-12

| Package | | | | level1 | level2 | level3 | level4 | level5 | level6 | Cardinality | Datatype Name |
|---|---|---|---|---|---|---|---|---|---|---|---|
| | | | | | | | Purchase-Contrac-tRefer-ence 44362 | | | 0..1 44364 | |
| | | | | | | | | ID 44366 | | 1 44368 | Purchase-ContractID 44370 |
| | | | | | | | | ItemID 44372 | | 1 44374 | Purchase-Contrac-tItemID 44376 |
| | | | Sched uleLin e 44378 | | | | Sched-uleLine 44380 | | | 1..N 44382 | |
| | | | | | | | | ID 44384 | | 1 44386 | Business-Transaction-Documen-tItemSched-uleLineID 44388 |

FIG. 44-13

| Package | | | | level1 | level2 | level3 | level4 | level5 | level6 | Cardinality | Datatype Name |
|---|---|---|---|---|---|---|---|---|---|---|---|
| | | | | | | | | Delivery-DateTime 44390 | | 0..1 44392 | LOCAL_Date Time 44394 |
| | | | | | | | | Quantity 44396 | | 0..1 44398 | Quantity 44400 |
| | | | | | | | | Pur-chaseRe questRef erence 44402 | | 0..1 44404 | |
| | | | | | | | | | ID 44406 | 1 44408 | PurchaseRe-questID 44410 |
| | | | | | | | | | ItemID 44412 | 1 44414 | PurchaseRe-questItemID 44416 |

FIG. 45-1

| Package | level1 | level2 | level3 | level4 | level5 | level6 | Cardinality | Datatype Name |
|---|---|---|---|---|---|---|---|---|
| PurchaseOrder-CreateConfirmationMessage 45000 | PurchaseOrderCreateConfirmation-Message 45002 | | | | | | | PurchaseOrderCreate-ConfirmationMessage 45004 |
| PurchaseOrder 45006 | | PurchaseOrder 45008 | | | | | 1 45010 | |
| | | | ID 45012 | | | | 1 45014 | PurchaseOrderID 45016 |
| | | | Processing-TypeCode 45018 | | | | 1 45020 | BusinessTransactionDocumentProcessingType-Code 45022 |

FIG. 45-2

| Package | level1 | level2 | level3 | level4 | level5 | level6 | Cardinality | Datatype Name |
|---|---|---|---|---|---|---|---|---|
| | | | PurchaseOrderDate 45024 | | | | 1 45026 | Date 45028 |
| | | | CreationDate 45030 | | | | 1 45032 | Date 45034 |
| | | | CreationUserAccountID 45036 | | | | 1 45038 | UserAccountID 45040 |
| Party 45042 | | | PurchasingOrganisationParty 45044 | | | | 1 45046 | |
| | | | | InternalID 45048 | | | 1 45050 | PartyInternalID 45052 |
| | | | PurchasingGroupParty 45054 | | | | 1 45056 | |

FIG. 45-3

| Package | level1 | level2 | level3 | level4 | level5 | level6 | Cardinality | Datatype Name |
|---|---|---|---|---|---|---|---|---|
| | | | | InternalID 45058 | | | 1 45060 | PartyInter-nalID 45062 |
| | | | SellerParty 45064 | | | | 1 45066 | |
| | | | | InternalID 45068 | | | 1 45070 | PartyInter-nalID 45072 |
| | | | BillFromParty 45074 | | | | 0..1 45076 | |
| | | | | InternalID 45078 | | | 1 45080 | PartyInter-nalID 45082 |
| | | | VendorParty 45084 | | | | 0..1 45086 | |
| | | | | InternalID 45088 | | | 1 45090 | PartyInter-nalID 45092 |

FIG. 45-4

| Package | level1 | level2 | level3 | level4 | level5 | level6 | Cardinality | Datatype Name |
|---|---|---|---|---|---|---|---|---|
| Delivery-Terms 45094 | | | Delivery-Terms 45096 | | | | 0..1 45098 | |
| | | | | Incoterms 45100 | | | 0..1 45102 | Incoterms 45104 |
| | | | | | Classifica-tionCode 45106 | | 1 45108 | Inco-termsClassi-ficationCode 45110 |
| | | | | | Transfer-Location-Name 45112 | | 0..1 45114 | Incoterm-sTransferLo-cationName 45116 |
| Pay-mentIn-formation 45118 | | | CashDis-countTerms 45120 | | | | 0..1 45122 | CashDis-countTerms 45124 |
| | | | | Maximum-CashDis-count 45126 | | | 0..1 45128 | CashDis-count 45130 |

FIG. 45-5

| Package | level1 | level2 | level3 | level4 | level5 | level6 | Cardinality | Datatype Name |
|---|---|---|---|---|---|---|---|---|
| | | | | | DaysValue 45132 | | 0..1 45134 | IntegerValue 45136 |
| | | | | | Percent 45138 | | 1 45140 | Percent 45142 |
| | | | | Normal-CashDis-count 45144 | | | 0..1 45146 | CashDis-count 45148 |
| | | | | | DaysValue 45150 | | 1 45152 | IntegerValue 45154 |
| | | | | | Percent 45156 | | 1 45158 | Percent 45160 |
| | | | | FullPayment DueDays-Value 45162 | | | 0..1 45164 | IntegerValue 45166 |

FIG. 45-6

| Package | level1 | level2 | level3 | level4 | level5 | level6 | Cardinality | Datatype Name |
|---|---|---|---|---|---|---|---|---|
| PriceIn-formation 45168 | | | Price 45170 | | | | 1 45172 | |
| | | | | TotalAmount 45174 | | | 1 45176 | Amount 45178 |
| Item 45180 | | | Item 45182 | | | | 1..N 45184 | |
| | | | | ID 45186 | | | 1 45188 | Pur-chaseOrde-rItemID 45190 |
| | | | | Processing-TypeCode 45192 | | | 1 45194 | Business-Transac-tionDocu-mentItem-Processing-TypeCode 45196 |
| | | | | Quantity 45198 | | | 1 45200 | Quantity 45202 |

FIG. 45-7

| Package | level1 | level2 | level3 | level4 | level5 | level6 | Cardinality | Datatype Name |
|---|---|---|---|---|---|---|---|---|
| | | | | PlantID 45204 | | | 1 45206 | PlantID 45208 |
| | | | | Description 45210 | | | 1 45212 | Short_Description 45214 |
| Party 45216 | | | | Requestor-Party 45218 | | | 0..1 45220 | |
| | | | | | InternalID 45222 | | 1 45224 | PartyInternalID 45226 |
| Location 45228 | | | | Inventory-ManagedLocation 45230 | | | 0..1 45232 | |
| | | | | | InternalID 45234 | | 1 45236 | LocationInternalID 45238 |

FIG. 45-8

| Package | level1 | level2 | level3 | level4 | level5 | level6 | Cardinality | Datatype Name |
|---|---|---|---|---|---|---|---|---|
| | | | | ShipToLocation 45240 | | | 1 45242 | |
| | | | | | InternalID 45244 | | 1 45246 | LocationInternalID 45248 |
| ProductInformation 45250 | | | | Product 45252 | | | 0..1 45254 | |
| | | | | | InternalID 45256 | | 1 45258 | ProductIntenalID 45260 |
| | | | | | ManufacturerID 45262 | | 0..1 45264 | Product-PartyID 45266 |
| | | | | ProductCategoryID 45268 | | | 1 45270 | |

FIG. 45-9

| Package | level1 | level2 | level3 | level4 | level5 | level6 | Cardinality | Datatype Name |
|---|---|---|---|---|---|---|---|---|
| | | | | | InternalID 45272 | | 1 45274 | ProductCategoryInter-nalID 45276 |
| PriceInforma-tion 45278 | | | | Price 45280 | | | 1 45282 | |
| | | | | | Tota-lAmount 45284 | | 1 45286 | Amount 45288 |
| | | | | | NetPrice 45290 | | 1 45292 | Price 45294 |
| | | | | | | Amount 45296 | 1 45298 | Amount 45300 |
| | | | | | | BaseQuan-tity 45302 | 1 45304 | Quantity 45306 |

FIG. 45-10

| Package | level1 | level2 | level3 | level4 | level5 | level6 | Cardinality | Datatype Name |
|---|---|---|---|---|---|---|---|---|
| Delivery-Terms 45308 | | | | DeliveryTerms 45310 | | | 0..1 45312 | |
| | | | | | Incoterms 45314 | | 0..1 45316 | Incoterms 45318 |
| | | | | | | ClassificationCode 45320 | 1 45322 | IncotermsClassificationCode 45324 |
| | | | | | | TransferLocationName 45326 | 0..1 45328 | IncotermsTransferLocationName 45330 |
| | | | | | QuantityTolerance 45332 | | 0..1 45334 | QuantityTolerance 45336 |
| | | | | | | OverPercent 45338 | 0..1 45340 | Percent 45342 |

FIG. 45-11

| Package | level1 | level2 | level3 | level4 | level5 | level6 | Cardinality | Datatype Name |
|---|---|---|---|---|---|---|---|---|
| | | | | | | OverPercent UnlimitedIndicator 45344 | 0..1 45346 | ValueUnlimitedIndicator 45348 |
| | | | | | | UnderPercent 45350 | 0..1 45352 | Percent 45354 |
| BusinessTransactionDocumentReference 45356 | | | | SupplierQuoteReference 45358 | | | 0..1 45360 | |
| | | | | | ID 45362 | | 1 45364 | SupplierQuoteID 45366 |

FIG. 45-12

| Package | level1 | level2 | level3 | level4 | level5 | level6 | Cardinality | Datatype Name |
|---|---|---|---|---|---|---|---|---|
| | | | | | ItemID 45368 | | 1 45370 | Supplier-QuoteItemID 45372 |
| | | | | Purchase-Contrac-tReference 45374 | | | 0..1 45376 | |
| | | | | | ID 45378 | | 1 45380 | Purchase-ContractID 45382 |
| | | | | | ItemID 45384 | | 1 45386 | Purchase-Contrac-tItemID 45388 |
| ScheduleLine 45390 | | | | Sched-uleLine 45392 | | | 1..N 45394 | |

FIG. 45-13

| Package | level1 | level2 | level3 | level4 | level5 | level6 | Cardinality | Datatype Name |
|---|---|---|---|---|---|---|---|---|
| | | | | | ID 45396 | | 1 45398 | Business-Transac-tionDocu-mentItem-Sched-uleLineID 45400 |
| | | | | | Delivery-DateTime 45402 | | 1 45404 | LOCAL_DateTime 45406 |
| | | | | | Quantity 45408 | | 1 45410 | Quantity 45412 |
| | | | | | Pur-chaseRe-questReference 45414 | | 0..1 45416 | |
| | | | | | | ID 45418 | 1 45420 | PurchaseRe-questID 45422 |

FIG. 45-14

| Package | level1 | level2 | level3 | level4 | level5 | level6 | Cardinality | Datatype Name |
|---|---|---|---|---|---|---|---|---|
| | | | | | | ItemID 45424 | 1 45426 | PurchaseRequestItemID 45428 |
| Log 45430 | | Log 45432 | | | | | 0..1 45434 | Log 45436 |

FIG. 46-1

| Package | level1 | level2 | level3 | level4 | level5 | level6 | Cardinality | Datatype Name |
|---|---|---|---|---|---|---|---|---|
| PurchaseOrderCreateRequestMessage 46000 | PurchaseOrderCreateRequestMessage 46002 | | | | | | | PurchaseOrderCreateRequestMessage 46004 |
| PurchaseOrder 46006 | | PurchaseOrder 46008 | | | | | 1 46010 | |
| | | | ID 46012 | | | | 0..1 46014 | PurchaseOrderID 46016 |
| | | | ProcessingTypeCode 46018 | | | | 1 46020 | BusinessTransactionDocumentProcessingTypeCode 46022 |

FIG. 46-2

| Package | level1 | level2 | level3 | level4 | level5 | level6 | Cardinality | Datatype Name |
|---|---|---|---|---|---|---|---|---|
| | | | Pur-chaseOr-derDate 46024 | | | | 0..1 46026 | Date 46028 |
| Party 46030 | | | Purchasin-gOrganisa-tionParty 46032 | | | | 1 46034 | |
| | | | | InternalID 46036 | | | 1 46038 | PartyInter-nalID 46040 |
| | | | Purchas-ingGroup-Party 46042 | | | | 1 46044 | |
| | | | | InternalID 46046 | | | 1 46048 | PartyInter-nalID 46050 |
| | | | SellerParty 46052 | | | | 1 46054 | |

FIG. 46-3

| Package | level1 | level2 | level3 | level4 | level5 | level6 | Cardinality | Datatype Name |
|---|---|---|---|---|---|---|---|---|
| | | | | InternalID 46056 | | | 1 46058 | PartyInternalID 46060 |
| | | | BillFromParty 46062 | | | | 0..1 46064 | |
| | | | | InternalID 46066 | | | 1 46068 | PartyInternalID 46070 |
| | | | VendorParty 46072 | | | | 0..1 46074 | |
| | | | | InternalID 46076 | | | 1 46078 | PartyInternalID 46080 |
| DeliveryTerms 46082 | | | DeliveryTerms 46084 | | | | 0..1 46086 | |

FIG. 46-4

| Package | level1 | level2 | level3 | level4 | level5 | level6 | Cardinality | Datatype Name |
|---|---|---|---|---|---|---|---|---|
| | | | | Inco-terms 46088 | | | 0..1 46090 | Incoterms 46092 |
| | | | | | Classifica-tionCode 46094 | | 1 46096 | Inco-termsClassifi-cationCode 46098 |
| | | | | | TransferLo-cationName 46100 | | 0..1 46102 | Incoterm-sTransferLo-cationName 46104 |
| Pay-mentIn-formation 46106 | | | CashDis-count-Terms 46108 | | | | 0..1 46110 | CashDis-countTerms 46112 |
| | | | | Maximum CashDis-count 46114 | | | 0..1 46116 | CashDiscount 46118 |

FIG. 46-5

| Package | level1 | level2 | level3 | level4 | level5 | level6 | Cardinality | Datatype Name |
|---|---|---|---|---|---|---|---|---|
| | | | | | DaysValue 46120 | | 0..1 46122 | IntegerValue 46124 |
| | | | | | Percent 46126 | | 1 46128 | Percent 46130 |
| | | | | NormalCashDiscount 46132 | | | 0..1 46134 | CashDiscount 46136 |
| | | | | | DaysValue 46138 | | 1 46140 | IntegerValue 46142 |
| | | | | | Percent 46144 | | 1 46146 | Percent 46148 |
| | | | | FullPaymentDueDaysValue 46150 | | | 0..1 46152 | IntegerValue 46154 |
| Item 46156 | | | Item 46158 | | | | 1..N 46160 | |

FIG. 46-6

| Package | level1 | level2 | level3 | level4 | level5 | level6 | Cardinality | Datatype Name |
|---|---|---|---|---|---|---|---|---|
| | | | | ID 46162 | | | 1 46164 | PurchaseOrderItemID 46166 |
| | | | | ProcessingTypeCode 46168 | | | 0..1 46170 | BusinessTransactionDocumentItemProcessingTypeCode 46172 |
| | | | | Quantity 46174 | | | 1 46176 | Quantity 46178 |
| | | | | PlantID 46180 | | | 1 46182 | PlantID 46184 |
| | | | | Description 46186 | | | 0..1 46188 | Short_Description 46190 |
| Party 46192 | | | | RequestorParty 46194 | | | 0..1 46196 | |

FIG. 46-7

| Package | | | | level1 | level2 | level3 | level4 | level5 | level6 | Cardinality | Datatype Name |
|---|---|---|---|---|---|---|---|---|---|---|---|
| | | | | | | | | InternalID 46198 | | 1 46200 | PartyInternalID 46202 |
| | | | Location 46204 | | | | InventoryManagedLocation 46206 | | | 0..1 46208 | |
| | | | | | | | | InternalID 46210 | | 1 46212 | LocationInternalID 46214 |
| | | | | | | | ShipToLocation 46216 | | | 0..1 46218 | |
| | | | | | | | | InternalID 46220 | | 1 46222 | LocationInternalID 46224 |

FIG. 46-8

| Package | level1 | level2 | level3 | level4 | level5 | level6 | Cardinality | Datatype Name |
|---|---|---|---|---|---|---|---|---|
| Pro-duct-Infor-ma-tion 46226 | | | | Product 46228 | | | 0..1 46230 | |
| | | | | | InternalID 46232 | | 1 46234 | ProductIn-tenalID 46236 |
| | | | | | Manufac-turerID 46238 | | 0..1 46240 | Product-PartyID 46242 |
| | | | | Pro-ductCate goryID 46244 | | | 0..1 46246 | |
| | | | | | InternalID 46248 | | 1 46250 | ProductCate-goryInternalID 46252 |

FIG. 46-9

| Package | level1 | level2 | level3 | level4 | level5 | level6 | Cardinality | Datatype Name |
|---|---|---|---|---|---|---|---|---|
| PriceInformation 46254 | | | | Price 46256 | | | 1 46258 | |
| | | | | | TotalAmount 46260 | | 1 46262 | Amount 46264 |
| | | | | | NetPrice 46266 | | 1 46268 | Price 46270 |
| | | | | | | Amount 46272 | 1 46274 | Amount 46276 |
| | | | | | | BaseQuantity 46278 | 1 46280 | Quantity 46282 |
| DeliveryTerms 46284 | | | | DeliveryTerms 46286 | | | 0..1 46288 | |

FIG. 46-10

| Package | level1 | level2 | level3 | level4 | level5 | level6 | Cardinality | Datatype Name |
|---|---|---|---|---|---|---|---|---|
| | | | | | Incoterms 46290 | | 0..1 46292 | Incoterms 46294 |
| | | | | | | Classifica-tionCode 46296 | 1 46298 | Inco-termsClassifi-cationCode 46300 |
| | | | | | | TransferLo-cationName 46302 | 0..1 46304 | Incoterm-sTransferLo-cationName 46306 |
| | | | | | Quantity-Tolerance 46308 | | 0..1 46310 | QuantityToler-ance 46312 |
| | | | | | | OverPer-cent 46314 | 0..1 46316 | Percent 46318 |
| | | | | | | OverPer-cent Unlimit-edIndicator 46320 | 0..1 46322 | ValueUnlimit-edIndicator 46324 |

FIG. 46-11

| Package | level1 | level2 | level3 | level4 | level5 | level6 | Cardinality | Datatype Name |
|---|---|---|---|---|---|---|---|---|
| | | | | | | UnderPer-cent 46326 | 0..1 46328 | Percent 46330 |
| Busi-ness-Trans action Docu-men-tRefer ence 46332 | | | | Supplier-QuoteRef erence 46334 | | | 0..1 46336 | |
| | | | | | ID 46338 | | 1 46340 | Supplier-QuoteID 46342 |
| | | | | | ItemID 46344 | | 1 46346 | Supplier-QuoteItemID 46348 |

FIG. 46-12

| Package | | | | level1 | level2 | level3 | level4 | level5 | level6 | Cardinality | Datatype Name |
|---|---|---|---|---|---|---|---|---|---|---|---|
| | | | | | | | PurchaseContractReference 46350 | | | 0..1 46352 | |
| | | | | | | | | ID 46354 | | 1 46356 | PurchaseContractID 46358 |
| | | | | | | | | ItemID 46360 | | 1 46362 | PurchaseContractItemID 46364 |
| | | | ScheduleLine 46366 | | | | ScheduleLine 46368 | | | 1..N 46370 | |
| | | | | | | | | ID 46372 | | 1 46374 | BusinessTransactionDocumentItemScheduleLineID 46376 |

FIG. 46-13

| Package | level1 | level2 | level3 | level4 | level5 | level6 | Cardinality | Datatype Name |
|---|---|---|---|---|---|---|---|---|
| | | | | | Delivery-DateTime 46378 | | 1 46380 | LOCAL_DateTime 46382 |
| | | | | | Quantity 46384 | | 1 46386 | Quantity 46388 |
| | | | | | Pur-chaseRe-questRefer-ence 46390 | | 0..1 46392 | |
| | | | | | | ID 46394 | 1 46396 | PurchaseRe-questID 46398 |
| | | | | | | ItemID 46400 | 1 46402 | PurchaseRe-questItemID 46404 |

FIG. 47-1

| Package | level1 | level2 | level3 | Cardinality | Datatype Name |
|---|---|---|---|---|---|
| PurchaseOr-derItem-ByAccoun-tAssign-mentQuery-Message 47000 | Pur-chaseOrde-rItemByAc-countAssign mentQue-ryMessage 47002 | | | | PurchaseOrderItemByAccoun-tAssignmentQueryMessage 47004 |
| Selection 47006 | | Pur-chaseOrde-rItemSelec-tionByAc-countAs-signment 47008 | | 1 47010 | |
| | | | PurchaseOrderIte-mAccountAssign-mentGeneralLedger-AccountID 47012 | 0..1 47014 | GeneralLedgerAccountID 47016 |

FIG. 47-2

| Package | level1 | level2 | level3 | Cardinality | Datatype Name |
|---|---|---|---|---|---|
| | | | PurchaseOrderItemAccountAssignmentProfitCentreID 47018 | 0..1 47020 | ProfitCentreID 47022 |
| | | | PurchaseOrderItemAccountAssignmentCostCentreID 47024 | 0..1 47026 | CostCentreID 47028 |
| | | | PurchaseOrderItemAccountAssignmentSalesOrderID 47030 | 0..1 47032 | SalesOrderID 47034 |
| | | | PurchaseOrderItemAccountAssignmentSalesOrderItemID 47036 | 0..1 47038 | SalesOrderItemID 47040 |

FIG. 47-3

| Package | level1 | level2 | level3 | Cardinality | Datatype Name |
|---|---|---|---|---|---|
| | | | PurchaseOrderItemAccountAssignment-ProjectWorkBreak-downStructureEle-mentID 47042 | 0..1 47044 | ProjectWorkBreakdownStructu-reElementID 47046 |
| | | | PurchaseOrderIte-mAccountAssign-mentProjectNet-workID 47048 | 0..1 47050 | ProjectNetworkID 47052 |
| | | | PurchaseOrderIte-mAccountAssign-mentProjectActivityID 47054 | 0..1 47056 | ProjectActivityID 47058 |
| | | | PurchaseOrderIte-mAccountAssign-mentMasterFixedAs-setID 47060 | 0..1 47062 | MasterFixedAssetID 47064 |

FIG. 47-4

| Package | level1 | level2 | level3 | Cardinality | Datatype Name |
| --- | --- | --- | --- | --- | --- |
| | | | PurchaseOrderItemAccountAssignmentFixedAssetID 47066 | 0..1 47068 | FixedAssetID 47070 |

FIG. 48-1

| fxPackage | level1 | level2 | level3 | level4 | level5 | level6 | Cardinality | Datatype Name |
|---|---|---|---|---|---|---|---|---|
| PurchaseOrder-ByAccountAs-signmentRe-sponseMessage 48000 | Pur-chaseOr-derByAc-countAs-signmen-tRespon-seMes-sage 48002 | | | | | | | PurchaseOr-derByAccoun-tAssignmen-tResponse-Message 48004 |
| PurchaseOr-der 48006 | | Pur-chaseOrder 48008 | | | | | 0..1 48010 | |
| | | | ID 48012 | | | | 1 48014 | PurchaseOrde-rID 48016 |
| | | | Process-ingType-Code 48018 | | | | 1 48020 | Business-Transaction-Document-Processing-TypeCode 48022 |

FIG. 48-2

| fxPackage | level1 | level2 | level3 | level4 | level5 | level6 | Cardinality | Datatype Name |
|---|---|---|---|---|---|---|---|---|
| | | | Can-celledIn-dicator 48024 | | | | 0..1 48026 | Indicator 48028 |
| | | | Pur-chaseOr-derDate 48030 | | | | 1 48032 | Date 48034 |
| | | | Crea-tionDate 48036 | | | | 1 48038 | Date 48040 |
| | | | Crea-tionUser Accoun-tID 48042 | | | | 1 48044 | UserAccooun-tID 48046 |
| Party 48048 | | | Purchas-ingOr-ganisa-tionParty 48050 | | | | 1 48052 | |

FIG. 48-3

| fxPackage | level1 | level2 | level3 | level4 | level5 | level6 | Cardinality | Datatype Name |
|---|---|---|---|---|---|---|---|---|
| | | | | Inter-nalID 48054 | | | 1 48056 | PartyInternalID 48058 |
| | | | Purchas-ingGroup Party 48060 | | | | 1 48062 | |
| | | | | Inter-nalID 48064 | | | 1 48066 | PartyInternalID 48068 |
| | | | Seller-Party 48070 | | | | 1 48072 | |
| | | | | Inter-nalID 48074 | | | 1 48076 | PartyInternalID 48078 |
| | | | BillFrom-Party 48080 | | | | 0..1 48082 | |

FIG. 48-4

| fxPackage | level1 | level2 | level3 | level4 | level5 | level6 | Cardinality | Datatype Name |
|---|---|---|---|---|---|---|---|---|
| | | | | Inter-nalID 48084 | | | 1 48086 | PartyInternalID 48088 |
| | | | Vendor-Party 48090 | | | | 0..1 48092 | |
| | | | | Inter-nalID 48094 | | | 1 48096 | PartyInternalID 48098 |
| Delivery-Terms 48100 | | | Delivery-Terms 48102 | | | | 0..1 48104 | |
| | | | | Inco-terms 48106 | | | 0..1 48108 | Incoterms 48110 |
| | | | | | Classifica-tionCode 48112 | | 1 48114 | IncotermsClas-sificationCode 48116 |

FIG. 48-5

| fxPackage | level1 | level2 | level3 | level4 | level5 | level6 | Cardinality | Datatype Name |
|---|---|---|---|---|---|---|---|---|
| | | | | | Transfer-Location-Name 48118 | | 0..1 48120 | Incoterm-sTransferLoca-tionName 48122 |
| PaymentIn formation 48124 | | | CashDis-count-Terms 48126 | | | | 0..1 48128 | CashDiscount-Terms 48130 |
| | | | | Maxi-mum-Cash-Discount 48132 | | | 0..1 48134 | CashDiscount 48136 |
| | | | | | DaysValue 48138 | | 0..1 48140 | IntegerValue 48142 |
| | | | | | Percent 48144 | | 1 48146 | Percent 48148 |
| | | | | Normal-Cash-Discount 48150 | | | 0..1 48152 | CashDiscount 48154 |

FIG. 48-6

| fxPackage | level1 | level2 | level3 | level4 | level5 | level6 | Cardinality | Datatype Name |
|---|---|---|---|---|---|---|---|---|
| | | | | | DaysValue 48156 | | 1 48158 | IntegerValue 48160 |
| | | | | | Percent 48162 | | 1 48164 | Percent 48166 |
| | | | | Full-Payment DueDay sValue 48168 | | | 0..1 48170 | IntegerValue 48172 |
| PriceIn-formation 48174 | | | Price 48176 | | | | 0..1 48178 | |
| | | | | Tota-lAmount 48180 | | | 0..1 48182 | Amount 48184 |
| Item 48186 | | | Item 48188 | | | | 1..N 48190 | |
| | | | | ID 48192 | | | 1 48194 | PurchaseOrde-rItemID 48196 |

FIG. 48-7

| fxPackage | level1 | level2 | level3 | level4 | level5 | level6 | Cardinality | Datatype Name |
|---|---|---|---|---|---|---|---|---|
| | | | | Processing-TypeCode 48198 | | | 1 48200 | Business-Transaction-DocumentItemProcessingTypeCode 48202 |
| | | | | CancelledIndicator 48204 | | | 0..1 48206 | Indicator 48208 |
| | | | | Quantity 48210 | | | 1 48212 | Quantity 48214 |
| | | | | PlantID 48216 | | | 1 48218 | PlantID 48220 |
| | | | | Description 48222 | | | 1 48224 | Short_Description 48226 |
| Party 48228 | | | | Requestor Party 48230 | | | 0..1 48232 | |

FIG. 48-8

| fxPackage | level1 | level2 | level3 | level4 | level5 | level6 | Cardinality | Datatype Name |
|---|---|---|---|---|---|---|---|---|
| | | | | | InternalID 48234 | | 1 48236 | PartyInternalID 48238 |
| Location 48240 | | | | InventoryManagedLocation 48242 | | | 0..1 48244 | |
| | | | | | InternalID 48246 | | 1 48248 | LocationInternalID 48250 |
| | | | | ShipToLocation 48252 | | | 1 48254 | |
| | | | | | InternalID 48256 | | 1 48258 | LocationInternalID 48260 |

FIG. 48-9

| fxPackage | level1 | level2 | level3 | level4 | level5 | level6 | Cardinality | Datatype Name |
|---|---|---|---|---|---|---|---|---|
| Pro-ductIn-forma-tion 48262 | | | | Product 48264 | | | 0..1 48266 | |
| | | | | | InternalID 48268 | | 0..1 48270 | ProductIn-tenalID 48272 |
| | | | | | Manufac-turerID 48274 | | 0..1 48276 | ProductPartyID 48278 |
| | | | | Pro-ductCat egory 48280 | | | 1 48282 | |
| | | | | | InternalID 48284 | | 1 48286 | ProductCate-goryInternalID 48288 |

FIG. 48-10

| fxPackage | level1 | level2 | level3 | level4 | level5 | level6 | Cardinality | Datatype Name |
|---|---|---|---|---|---|---|---|---|
| AccountAs-signment 48290 | | | | AccountAs-signment 48292 | | | 0..N 48294 | |
| | | | | | Quantity 48296 | | 0..1 48298 | Quantity 48300 |
| | | | | | Percent 48302 | | 0..1 48304 | Percent 48306 |
| | | | | | Gener-alLedger-AccountID 48308 | | 0..1 48310 | Gener-alLedgerAc-countID 48312 |
| | | | | | ProfitCen-treID 48314 | | 0..1 48316 | ProfitCentreID 48318 |
| | | | | | CostCen-treID 48320 | | 0..1 48322 | CostCentreID 48324 |

FIG. 48-11

| fxPackage | level1 | level2 | level3 | level4 | level5 | level6 | Cardinality | Datatype Name |
|---|---|---|---|---|---|---|---|---|
| | | | | | SalesOrderID 48326 | | 0..1 48328 | SalesOrderID 48330 |
| | | | | | SalesOrderItemID 48332 | | 0..1 48334 | SalesOrderItemID 48336 |
| | | | | | ProjectWorkBreakdownStructureElementID 48338 | | 0..1 48340 | ProjectWorkBreakdownStructureElementID 48342 |
| | | | | | ProjectNetworkID 48344 | | 0..1 48346 | ProjectNetworkID 48348 |
| | | | | | ProjectActivityID 48350 | | 0..1 48352 | ProjectActivityID 48354 |

FIG. 48-12

| fxPackage | level1 | level2 | level3 | level4 | level5 | level6 | Cardinality | Datatype Name |
|---|---|---|---|---|---|---|---|---|
| | | | | | MasterFixedAssetID 48356 | | 0..1 48358 | MasterFixedAssetID 48360 |
| | | | | | FixedAssetID 48362 | | 0..1 48364 | FixedAssetID 48366 |
| PriceInformation 48368 | | | | Price 48370 | | | 0..1 48372 | |
| | | | | | TotalAmount 48374 | | 0..1 48376 | Amount 48378 |
| | | | | | NetPrice 48380 | | 0..1 48382 | Price 48384 |
| | | | | | | Amount 48386 | 1 48388 | Amount 48390 |

FIG. 48-13

| fxPackage | level1 | level2 | level3 | level4 | level5 | level6 | Cardinality | Datatype Name |
|---|---|---|---|---|---|---|---|---|
| | | | | | | BaseQuantity 48392 | 1 48394 | Quantity 48396 |
| Delivery Terms 48398 | | | | DeliveryTerms 48400 | | | 0..1 48402 | |
| | | | | | Incoterms 48404 | | 0..1 48406 | Incoterms 48408 |
| | | | | | | ClassificationCode 48410 | 1 48412 | IncotermsClassificationCode 48414 |
| | | | | | | TransferLocationName 48416 | 0..1 48418 | IncotermsTransferLocationName 48420 |
| | | | | | Quantity-Tolerance 48422 | | 0..1 48424 | QuantityTolerance 48426 |

FIG. 48-14

| fxPackage | level1 | level2 | level3 | level4 | level5 | level6 | Cardinality | Datatype Name |
|---|---|---|---|---|---|---|---|---|
| | | | | | | OverPercent 48428 | 0..1 48430 | Percent 48432 |
| | | | | | | OverPercent UnlimitedIndicator 48434 | 0..1 48436 | ValueUnlimitedIndicator 48438 |
| | | | | | | UnderPercent 48440 | 0..1 48442 | Percent 48444 |
| Confirmation 48446 | | | | Confirmation 48448 | | | 0..n 48450 | |
| | | | | | ID 48452 | | 1 48454 | PurchaseOrderItemConfirmationID 48456 |

FIG. 48-15

| fxPackage | level1 | level2 | level3 | level4 | level5 | level6 | Cardinality | Datatype Name |
|---|---|---|---|---|---|---|---|---|
| | | | | | Process-ingType-Code 48458 | | 1 48460 | Business-Transaction-Document-Processing-TypeCode 48462 |
| | | | | | Quantity 48464 | | 1 48466 | Quantity 48468 |
| | | | | | Delivery-DateTime 48470 | | 1 48472 | LOCAL_DateTime 48474 |
| Busi-ness-Trans-action Docu-men-tRefer-ence 48476 | | | | Supplier QuoteR eference 48478 | | | 0..1 48480 | |

FIG. 48-16

| fxPackage | level1 | level2 | level3 | level4 | level5 | level6 | Cardinality | Datatype Name |
|---|---|---|---|---|---|---|---|---|
| | | | | | ID 48482 | | 1 48484 | Supplier-QuoteID 48486 |
| | | | | | ItemID 48488 | | 1 48490 | Supplier-QuoteItemID 48492 |
| | | | | Pur-chase-Contrac-tRefer-ence 48494 | | | 0..1 48496 | |
| | | | | | ID 48498 | | 1 48500 | PurchaseCon-tractID 48502 |
| | | | | | ItemID 48504 | | 1 48506 | PurchaseCon-tractItemID 48508 |
| Sched-uleLine 48510 | | | | Sched-uleLine 48512 | | | 0..N 48514 | |

FIG. 48-17

| fxPackage | level1 | level2 | level3 | level4 | level5 | level6 | Cardinality | Datatype Name |
|---|---|---|---|---|---|---|---|---|
| | | | | | ID 48516 | | 1 48518 | Business-Transaction-DocumentItemSchedule-LineID 48520 |
| | | | | | Delivery-DateTime 48522 | | 1 48524 | LOCAL_DateTime 48526 |
| | | | | | Quantity 48528 | | 1 48530 | Quantity 48532 |
| | | | | | Pur-chaseRe-questRef-erence 48534 | | 0..1 48536 | |
| | | | | | | ID 48538 | 1 48540 | PurchaseRe-questID 48542 |

FIG. 48-18

| fxPackage | level1 | level2 | level3 | level4 | level5 | level6 | Cardinality | Datatype Name |
|---|---|---|---|---|---|---|---|---|
| | | | | | | ItemID 48544 | 1 48546 | PurchaseRequestItemID 48548 |
| Log 48550 | | Log 48552 | | | | | 0..1 48554 | Log 48556 |

FIG. 49-1

| Package | level1 | level2 | level3 | level4 | level5 | Cardinality | Datatype Name |
|---|---|---|---|---|---|---|---|
| PurchaseOrderItemConfirmConfirmationMessage 49000 | PurchaseOrderItemConfirmConfirmationMessage 49002 | | | | | | PurchaseOrderItemConfirmConfirmationMessage 49004 |
| PurchaseOrder 49006 | | PurchaseOrder 49008 | | | | 1 49010 | |
| | | | ID 49012 | | | 1 49014 | PurchaseOrderID 49016 |
| Item 49018 | | | Item 49020 | | | 1 49022 | |
| | | | | ID 49024 | | 1 49026 | PurchaseOrderItemID 49028 |

FIG. 49-2

| Package | | | | level1 | level2 | level3 | level4 | level5 | Cardinality | Datatype Name |
|---|---|---|---|---|---|---|---|---|---|---|
| | | | Confirmation 49030 | | | | Confirmation 49032 | | 1..N 49034 | |
| | | | | | | | | ID 49036 | 1 49038 | PurchaseOrderItemConfirmationID 49040 |
| | | | | | | | | ProcessingTypeCode 49042 | 1 49044 | BusinessTransactionDocumentProcessingTypeCode 49046 |
| | | | | | | | | Quantity 49048 | 1 49050 | Quantity 49052 |
| | | | | | | | | DeliveryDateTime 49054 | 1 49056 | LOCAL_DateTime 49058 |

FIG. 49-3

| Package | | level1 | level2 | level3 | level4 | level5 | Cardinality | Datatype Name |
|---|---|---|---|---|---|---|---|---|
| | Log 49060 | | Log 49062 | | | | 0..1 49064 | Log 49066 |

FIG. 50-1

| Package | level1 | level2 | level3 | level4 | level5 | Cardinality | Datatype Name |
|---|---|---|---|---|---|---|---|
| PurchaseOrderItemCon-firmRequestMessage 50000 | PurchaseOrde-rItemConfirmRe-questMessage 50002 | | | | | | PurchaseOrde-rItemConfirmRe-questMessage 50004 |
| PurchaseOrder 50006 | | PurchaseOrder 50008 | | | | 1 50010 | |
| | | | ID 50012 | | | 1 50014 | PurchaseOrderID 50016 |
| Item 50018 | | | Item 50020 | | | 1 50022 | |
| | | | | ID 50024 | | 1 50026 | PurchaseOrde-rItemID 50028 |
| Confirma-tion 50030 | | | | Confirma-tion 50032 | | 1..N 50034 | |
| | | | | | ID 50036 | 1 50038 | PurchaseOrde-rItemConfirma-tionID 50040 |

FIG. 50-2

| Package | | | | level1 | level2 | level3 | level4 | level5 | Cardinality | Datatype Name |
|---|---|---|---|---|---|---|---|---|---|---|
| | | | | | | | | ProcessingTypeCode 50042 | 1 50044 | BusinessTransactionDocumentProcessingTypeCode 50046 |
| | | | | | | | | Quantity 50048 | 1 50050 | Quantity 50052 |
| | | | | | | | | DeliveryDateTime 50054 | 1 50056 | LOCAL_DateTime 50058 |

FIG. 51-1

| fxPackage | level1 | level2 | level3 | level4 | level5 | level6 | Cardinality | Datatype Name |
|---|---|---|---|---|---|---|---|---|
| PurchaseOrderMessage 51000 | PurchaseOrderMessage 51002 | | | | | | | PurchaseOrderMessage 51004 |
| PurchaseOrder 51006 | | PurchaseOrder 51008 | | | | | 0..N 51010 | |
| | | | ID 51012 | | | | 1 51014 | PurchaseOrderID 51016 |
| | | | ProcessingTypeCode 51018 | | | | 1 51020 | BusinessTransactionDocumentProcessingTypeCode 51022 |
| | | | CancelledIndicator 51024 | | | | 0..1 51026 | Indicator 51028 |

FIG. 51-2

| fxPackage | level1 | level2 | level3 | level4 | level5 | level6 | Cardinality | Datatype Name |
|---|---|---|---|---|---|---|---|---|
| | | | PurchaseOrderDate 51030 | | | | 1 51032 | Date 51034 |
| | | | CreationDate 51036 | | | | 1 51038 | Date 51040 |
| | | | CreationUserAccountID 51042 | | | | 1 51044 | UserAccoountID 51046 |
| Party 51048 | | | PurchasingOrganisationParty 51050 | | | | 1 51052 | |
| | | | | InternalID 51054 | | | 1 51056 | PartyInternalID 51058 |
| | | | PurchasingGroupParty 51060 | | | | 1 51062 | |

FIG. 51-3

| fxPackage | level1 | level2 | level3 | level4 | level5 | level6 | Cardinality | Datatype Name |
|---|---|---|---|---|---|---|---|---|
| | | | | InternalID 51064 | | | 1 51066 | PartyInter-nalID 51068 |
| | | | SellerParty 51070 | | | | 1 51072 | |
| | | | | InternalID 51074 | | | 1 51076 | PartyInter-nalID 51078 |
| | | | BillFrom-Party 51080 | | | | 0..1 51082 | |
| | | | | InternalID 51084 | | | 1 51086 | PartyInter-nalID 51088 |
| | | | VendorParty 51090 | | | | 0..1 51092 | |
| | | | | InternalID 51094 | | | 1 51096 | PartyInter-nalID 51098 |

FIG. 51-4

| fxPackage | level1 | level2 | level3 | level4 | level5 | level6 | Cardinality | Datatype Name |
|---|---|---|---|---|---|---|---|---|
| DeliveryTerms 51100 | | | DeliveryTerms 51102 | | | | 0..1 51104 | |
| | | | | Incoterms 51106 | | | 0..1 51108 | Incoterms 51110 |
| | | | | | ClassificationCode 51112 | | 1 51114 | IncotermsClassificationCode 51116 |
| | | | | | TransferLocationName 51118 | | 0..1 51120 | IncotermsTransferLocationName 51122 |
| PaymentInformation 51124 | | | CashDiscountTerms 51126 | | | | 0..1 51128 | CashDiscountTerms 51130 |

FIG. 51-5

| fxPackage | level1 | level2 | level3 | level4 | level5 | level6 | Cardinality | Datatype Name |
|---|---|---|---|---|---|---|---|---|
| | | | | Maximum-CashDis-count 51132 | | | 0..1 51134 | CashDiscount 51136 |
| | | | | | DaysValue 51138 | | 0..1 51140 | IntegerValue 51142 |
| | | | | | Percent 51144 | | 1 51146 | Percent 51148 |
| | | | | Normal-CashDis-count 51150 | | | 0..1 51152 | CashDiscount 51154 |
| | | | | | DaysValue 51156 | | 1 51158 | IntegerValue 51160 |
| | | | | | Percent 51162 | | 1 51164 | Percent 51166 |

FIG. 51-6

| fxPackage | level1 | level2 | level3 | level4 | level5 | level6 | Cardinality | Datatype Name |
|---|---|---|---|---|---|---|---|---|
| | | | | FullPay-ment-DueDays-Value 51168 | | | 0..1 51170 | IntegerValue 51172 |
| PriceIn-forma-tion 51174 | | | Price 51176 | | | | 0..1 51178 | |
| | | | | Tota-lAmount 51180 | | | 0..1 51182 | Amount 51184 |
| Item 51186 | | | Item 51188 | | | | 1..N 51190 | |
| | | | | ID 51192 | | | 1 51194 | PurchaseOr-derItemID 51196 |

FIG. 51-7

| fxPackage | level1 | level2 | level3 | level4 | level5 | level6 | Cardinality | Datatype Name |
|---|---|---|---|---|---|---|---|---|
| | | | | Process-ingType-Code 51198 | | | 1 51200 | Business-Transaction-Documen-tItemProcess-ingTypeCode 51202 |
| | | | | Can-celledIndi-cator 51204 | | | 0..1 51206 | Indicator 51208 |
| | | | | Quantity 51210 | | | 1 51212 | Quantity 51214 |
| | | | | PlantID 51216 | | | 1 51218 | PlantID 51220 |
| | | | | Description 51222 | | | 1 51224 | Short_Descrip tion 51226 |
| Party 51228 | | | | Requestor-Party 51230 | | | 0..1 51232 | |

FIG. 51-8

| fxPackage | level1 | level2 | level3 | level4 | level5 | level6 | Cardinality | Datatype Name |
|---|---|---|---|---|---|---|---|---|
| | | | | | InternalID 51234 | | 1 51236 | PartyInter-nalID 51238 |
| Loca-tion 51240 | | | | Inventory-Managed-Location 51242 | | | 0..1 51244 | |
| | | | | | InternalID 51246 | | 1 51248 | LocationInter-nalID 51250 |
| | | | | ShipToLo-cation 51252 | | | 1 51254 | |
| | | | | | InternalID 51256 | | 1 51258 | LocationInter-nalID 51260 |

FIG. 51-9

| fxPackage | level1 | level2 | level3 | level4 | level5 | level6 | Cardinality | Datatype Name |
|---|---|---|---|---|---|---|---|---|
| Pro-duct-Infor-ma-tion 51262 | | | | Product 51264 | | | 0..1 51266 | |
| | | | | | InternalID 51268 | | 0..1 51270 | ProductIn-tenalID 51272 |
| | | | | | Manufactur-erID 51274 | | 0..1 51276 | Product-PartyID 51278 |
| | | | | Pro-ductCate-gory 51280 | | | 1 51282 | |
| | | | | | InternalID 51284 | | 1 51286 | ProductCate-goryInternalID 51288 |

FIG. 51-10

| fxPackage | level1 | level2 | level3 | level4 | level5 | level6 | Cardinality | Datatype Name |
|---|---|---|---|---|---|---|---|---|
| Ac-coun-tAs-sign-ment 51290 | | | | AccountAs-signment 51292 | | | 0..N 51294 | |
| | | | | | Gener-alLedgerAc-countID 51296 | | 0..1 51298 | Gener-alLedgerAc-countID 51300 |
| | | | | | ProfitCen-treID 51302 | | 0..1 51304 | ProfitCentreID 51306 |
| | | | | | CostCen-treID 51308 | | 0..1 51310 | CostCentreID 51312 |
| | | | | | SalesOrde-rID 51314 | | 0..1 51316 | SalesOrderID 51318 |

FIG. 51-11

| fxPackage | level1 | level2 | level3 | level4 | level5 | level6 | Cardinality | Datatype Name |
|---|---|---|---|---|---|---|---|---|
| | | | | | SalesOrde-rItemID 51320 | | 0..1 51322 | SalesOrde-rItemID 51324 |
| | | | | | Project-WorkBreak-downStruc-tureElemen-tID 51326 | | 0..1 51328 | ProjectWork-Breakdown-StructureEle-mentID 51330 |
| | | | | | ProjectNet-workID 51332 | | 0..1 51334 | ProjectNet-workID 51336 |
| | | | | | ProjectActiv-ityID 51338 | | 0..1 51340 | ProjectActiv-ityID 51342 |
| | | | | | Master-FixedAs-setID 51344 | | 0..1 51346 | Master-FixedAssetID 51348 |

FIG. 51-12

| fxPackage | level1 | level2 | level3 | level4 | level5 | level6 | Cardinality | Datatype Name |
|---|---|---|---|---|---|---|---|---|
| | | | | | FixedAs-setID 51350 | | 0..1 51352 | FixedAssetID 51354 |
| PriceInfor-ma-tion 51356 | | | | Price 51358 | | | 0..1 51360 | |
| | | | | | TotalAmount 51362 | | 0..1 51364 | Amount 51366 |
| | | | | | NetPrice 51368 | | 0..1 51370 | Price 51372 |
| | | | | | | Amount 51374 | 1 51376 | Amount 51378 |
| | | | | | | BaseQuantity 51380 | 1 51382 | Quantity 51384 |
| Deliv-ery-Terms 51386 | | | | Delivery-Terms 51388 | | | 0..1 51390 | |

FIG. 51-13

| fxPackage | level1 | level2 | level3 | level4 | level5 | level6 | Cardinality | Datatype Name |
|---|---|---|---|---|---|---|---|---|
| | | | | | Incoterms 51392 | | 0..1 51394 | Incoterms 51396 |
| | | | | | | Classifica-tionCode 51398 | 1 51400 | Inco-termsClassifi-cationCode 51402 |
| | | | | | | TransferLoca-tionName 51404 | 0..1 51406 | Incoterm-sTransferLo-cationName 51408 |
| | | | | | QuantityTol-erance 51410 | | 0..1 51412 | QuantityToler-ance 51414 |
| | | | | | | OverPercent 51416 | 0..1 51418 | Percent 51420 |
| | | | | | | OverPercent UnlimitedIn-dicator 51422 | 0..1 51424 | ValueUnlimit-edIndicator 51426 |

FIG. 51-14

| fxPackage | level1 | level2 | level3 | level4 | level5 | level6 | Cardinality | Datatype Name |
|---|---|---|---|---|---|---|---|---|
| | | | | | | UnderPercent 51428 | 0..1 51430 | Percent 51432 |
| Con-firma-tion 51434 | | | | Confirma-tion 51436 | | | 0..n 51438 | |
| | | | | | ID 51440 | | 1 51442 | PurchaseOr-derItemCon-firmationID 51444 |
| | | | | | Processing-TypeCode 51446 | | 1 51448 | Business-Transaction-Document-Processing-TypeCode 51450 |
| | | | | | Quantity 51452 | | 1 51454 | Quantity 51456 |
| | | | | | Delivery-DateTime 51458 | | 1 51460 | LOCAL_DateTime 51462 |

FIG. 51-15

| fxPackage | level1 | level2 | level3 | level4 | level5 | level6 | Cardinality | Datatype Name |
|---|---|---|---|---|---|---|---|---|
| Business-Transaction Document-Reference 51464 | | | | Supplier-QuoteReference 51466 | | | 0..1 51468 | |
| | | | | | ID 51470 | | 1 51472 | Supplier-QuoteID 51474 |
| | | | | | ItemID 51476 | | 1 51478 | Supplier-QuoteItemID 51480 |
| | | | | Purchase-Contrac-tReference 51482 | | | 0..1 51484 | |
| | | | | | ID 51486 | | 1 51488 | PurchaseCon-tractID 51490 |

FIG. 51-16

| fxPackage | level1 | level2 | level3 | level4 | level5 | level6 | Cardinality | Datatype Name |
|---|---|---|---|---|---|---|---|---|
| | | | | | ItemID 51492 | | 1 51494 | PurchaseCon-tractItemID 51496 |
| ScheduleLine 51498 | | | | Sched-uleLine 51500 | | | 0..N 51502 | |
| | | | | | ID 51504 | | 1 51506 | Business-Transaction-Documen-tItemSched-uleLineID 51508 |
| | | | | | Delivery-DateTime 51510 | | 1 51512 | LOCAL_DateTime 51514 |
| | | | | | Quantity 51516 | | 1 51518 | Quantity 51520 |

FIG. 51-17

| fxPackage | level1 | level2 | level3 | level4 | level5 | level6 | Cardinality | Datatype Name |
|---|---|---|---|---|---|---|---|---|
| | | | | | Pur-chaseReque stReference 51522 | | 0..1 51524 | |
| | | | | | | ID 51526 | 1 51528 | PurchaseRe-questID 51530 |
| | | | | | | ItemID 51532 | 1 51534 | PurchaseRe-questItemID 51536 |
| Log 51538 | | Log 51540 | | | | | 0..1 51542 | Log 51544 |

| Package | | | | Level 1 | Level 2 | Level 3 | Cardinality | Datatype Name |
|---|---|---|---|---|---|---|---|---|
| PurchaseRequestByIDQueryMessage 59000 | | | | Pur-chaseRe-questByID-QueryMes-sage 59002 | | | | PurchaseRe-questByIDQue-ryMessage 59004 |
| | Selection 59006 | | | | Pur-chaseRe-questSelec-tionByID 59008 | | 1 59010 | |
| | | | | | | Pur-chaseRe-questID 59012 | 1 59014 | PurchaseRe-questID 59016 |
| | | | | | | Pur-chaseRe-questItemID 59018 | 0..1 59020 | PurchaseRe-questItemID 59022 |

FIG. 60-1

| Package | level1 | level2 | level3 | level4 | level5 | Cardinality | Datatype Name |
|---|---|---|---|---|---|---|---|
| PurchaseRequestByIDResponseMessage 60000 | PurchaseRequestByIDResponseMessage 60002 | | | | | | PurchaseRequestByIDResponseMessage 60004 |
| PurchaseRequest 60006 | | PurchaseRequest 60008 | | | | 0..1 60010 | |
| | | | ID 60012 | | | 1 60014 | PurchaseRequestID 60016 |
| | | | ProcessingTypeCode 60018 | | | 1 60020 | BusinessTransactionDocumentProcessingTypeCode 60022 |
| ReleaseInformation 60024 | | | ReleaseTerms 60026 | | | 0..1 60028 | |

FIG. 60-2

| Package | level1 | level2 | level3 | level4 | level5 | Cardinality | Datatype Name |
|---|---|---|---|---|---|---|---|
| | | | | Purchasing-DocumentRelease-Code 60030 | | 1 60032 | PurchasingDocumentReleaseCode 60034 |
| | | | | Release-StrategyID 60036 | | 1 60038 | ReleaseStrategyID 60040 |
| | | | | ReleaseGroupID 60042 | | 1 60044 | ReleaseGroupID 60046 |
| Item 60048 | | | Item 60050 | | | 1..N 60052 | |
| | | | | ID 60054 | | 1 60056 | PurchaseRequestItemID 60058 |

FIG. 60-3

| Package | level1 | level2 | level3 | level4 | level5 | Cardinality | Datatype Name |
|---|---|---|---|---|---|---|---|
| | | | | Process-ingType-Code 60060 | | 0..1 60062 | BusinessTransactionDocu-mentItemProcessingType-Code 60064 |
| | | | | Can-celledIn-dicator 60066 | | 0..1 60068 | Indicator 60070 |
| | | | | Crea-tionUser Accoun-tID 60072 | | 1 60074 | UserAccoountID 60076 |
| | | | | Request-edQuan-tity 60078 | | 1 60080 | Quantity 60082 |
| | | | | Or-deredQu antity 60084 | | 1 60086 | Quantity 60088 |

FIG. 60-4

| Package | level1 | level2 | level3 | level4 | level5 | Cardinality | Datatype Name |
|---|---|---|---|---|---|---|---|
| | | | | PlantID 60090 | | 1 60092 | PlantID 60094 |
| | | | | Pur-chaseRe-quest-Date 60096 | | 1 60098 | Date 60100 |
| | | | | Delivery-Date 60102 | | 1 60104 | Date 60106 |
| | | | | Descrip-tion 60108 | | 1 60110 | SHORT_Description 60112 |
| | | | | Tota-lAmount 60114 | | 0..1 60116 | Amount 60118 |
| | | | | Valua-tionPrice 60120 | | 0..1 60122 | Price 60124 |

FIG. 60-5

| Package | level1 | level2 | level3 | level4 | level5 | Cardinality | Datatype Name |
|---|---|---|---|---|---|---|---|
| | | | | | Amount 60126 | 1 60128 | Amount 60130 |
| | | | | | BaseQuan-tity 60132 | 1 60134 | Quantity 60136 |
| Party 60138 | | | | Re-questor-Party 60140 | | 0..1 60142 | |
| | | | | | InternalID 60144 | 1 60146 | PartyIntenalID 60148 |
| | | | | Purchas-ingGroup Party 60150 | | 1 60152 | |
| | | | | | InternalID 60154 | 1 60156 | PartyIntenalID 60158 |

FIG. 60-6

| Package | level1 | level2 | level3 | level4 | level5 | Cardinality | Datatype Name |
|---|---|---|---|---|---|---|---|
| Location 60160 | | | | InventoryManagedLocation 60162 | | 0..1 60164 | |
| | | | | | InternalID 60166 | 1 60168 | LocationIntenalID 60170 |
| | | | | ShipToLocation 60172 | | 1 60174 | |
| | | | | | InternalID 60176 | 1 60178 | LocationIntenalID 60180 |
| ProductInformation 60182 | | | | Product 60184 | | 0..1 60186 | |
| | | | | | InternalID 60188 | 1 60190 | ProductIntenalID 60192 |

FIG. 60-7

| Package | level1 | level2 | level3 | level4 | level5 | Cardinality | Datatype Name |
|---|---|---|---|---|---|---|---|
| | | | | | Manufac-turerID 60194 | 0..1 60196 | ProductPartyID 60198 |
| | | | | Pro-ductCate gory 60200 | | 1 60202 | |
| | | | | | InternalID 60204 | 1 60206 | ProductCategoryInternalID 60208 |
| Re-leaseIn-forma-tion 60210 | | | | Release-Terms 60212 | | 0..1 60214 | |
| | | | | | Purchas-ingDocu-mentRe-leaseCode 60216 | 1 60218 | PurchasingDocumentRe-leaseCode 60220 |

FIG. 60-8

| Package | level1 | level2 | level3 | level4 | level5 | Cardinality | Datatype Name |
|---|---|---|---|---|---|---|---|
| | | | | | Release-StrategyID 60222 | 1 60224 | ReleaseStrategyID 60226 |
| | | | | | Re-leaseGroupID 60228 | 1 60230 | ReleaseGroupID 60232 |
| Sour-ceOf-Supply 60234 | | | | SourceOf Supply 60236 | | 0..1 60238 | |
| | | | | | SellerParty-InternalID 60240 | 0..1 60242 | PartyIntenalID 60244 |
| | | | | | Proposed-SellerParty-InternalID 60246 | 0..1 60248 | PartyIntenalID 60250 |

FIG. 60-9

| Package | level1 | level2 | level3 | level4 | level5 | Cardinality | Datatype Name |
| --- | --- | --- | --- | --- | --- | --- | --- |
| | | | | | PurchasingOrganisationPartyInternalID 60252 | 0..1 60254 | PartyIntenalID 60256 |
| | | | | | PurchaseContractID 60258 | 0..1 60260 | PurchaseContractID 60262 |
| | | | | | PurchaseContractItemID 60264 | 0..1 60266 | PurchaseContractItemID 60268 |
| | | | | | ShipFromLocationID 60270 | 0..1 60272 | LocationIntenalID 60274 |
| | | | | | ProductProcurementArrangementID 60276 | 0..1 60278 | ProductProcurementArrangementID 60280 |

| Package | level1 | level2 | level3 | level4 | level5 | Cardinality | Datatype Name |
|---|---|---|---|---|---|---|---|
| Log 60282 | | Log 60284 | | | | 0..1 60286 | Log 60288 |

| Package | level1 | level2 | level3 | Cardinality | Datatype Name |
|---|---|---|---|---|---|
| PurchaseRequestByReleaseInformationQueryMessage 61000 | PurchaseRequestByReleaseInformationQueryMessage 61002 | | | | PurchaseRequestByReleaseInformationQueryMessage 61004 |
| Selection 61006 | | PurchaseRequestSelectionByReleaseInformation 61008 | | 1 61010 | |
| | | | PurchaseRequestReleaseGroupID 61012 | 1 61014 | ReleaseGroupID 61016 |
| | | | PurchaseRequestPurchasingReleaseApproverCode 61018 | 1 61020 | PurchasingReleaseApproverCode 61022 |

FIG. 61-2

| Package | level1 | level2 | level3 | Cardinality | Datatype Name |
|---|---|---|---|---|---|
| | | | PurchaseRequestReleasedIndicator 61024 | 1 61026 | Indicator 61028 |

FIG. 62-1

| Package | level1 | level2 | level3 | level4 | level5 | Cardinality | Datatype Name |
|---|---|---|---|---|---|---|---|
| PurchaseRequestByReleaseInformationResponseMessage 62000 | PurchaseRequestByReleaseInformationResponseMessage 62002 | | | | | | PurchaseRequestByReleaseInformationResponseMessage 62004 |
| PurchaseRequest 62006 | | PurchaseRequest 62008 | | | | 0..N 62010 | |
| | | | ID 62012 | | | 1 62014 | PurchaseRequestID 62016 |
| | | | ProcessingTypeCode 62018 | | | 1 62020 | BusinessTransactionDocumentProcessingTypeCode 62022 |
| Item 62024 | | | Item 62026 | | | 1..N 62028 | |

FIG. 62-2

| Package | | | | level1 | level2 | level3 | level4 | level5 | Cardinality | Datatype Name |
|---|---|---|---|---|---|---|---|---|---|---|
| | | | | | | | ID 62030 | | 1 62032 | PurchaseReques-tItemID 62034 |
| | | | | | | | Process-ingType-Code 62036 | | 0..1 62038 | BusinessTransaction-DocumentItemProc-essingTypeCode 62040 |
| | | | | | | | Crea-tionUserAc countID 62042 | | 1 62044 | UserAccoountID 62046 |
| | | | | | | | Request-edQuantity 62048 | | 1 62050 | Quantity 62052 |
| | | | | | | | Ordered-Quantity 62054 | | 1 62056 | Quantity 62058 |
| | | | | | | | PlantID 62060 | | 1 62062 | PlantID 62064 |

FIG. 62-3

| Package | | | | level1 | level2 | level3 | level4 | level5 | Cardinality | Datatype Name |
|---|---|---|---|---|---|---|---|---|---|---|
| | | | | | | | Pur-chaseRe-questDate 62066 | | 1 62068 | Date 62070 |
| | | | | | | | Delivery-Date 62072 | | 1 62074 | Date 62076 |
| | | | | | | | Description 62078 | | 1 62080 | SHORT_Description 62082 |
| | | | | | | | Tota-lAmount 62084 | | 0..1 62086 | Amount 62088 |
| | | | | | | | Valuation-Price 62090 | | 0..1 62092 | Price 62094 |
| | | | | | | | | Amount 62096 | 1 62098 | Amount 62100 |
| | | | | | | | | BaseQuantity 62102 | 1 62104 | Quantity 62106 |

FIG. 62-4

| Package | | | | level1 | level2 | level3 | level4 | level5 | Cardinality | Datatype Name |
|---|---|---|---|---|---|---|---|---|---|---|
| | | | Party 62108 | | | | Re-questorParty 62110 | | 0..1 62112 | |
| | | | | | | | | InternalID 62114 | 1 62116 | PartyIntenalID 62118 |
| | | | | | | | Purchas-ingGroup-Party 62120 | | 1 62122 | |
| | | | | | | | | InternalID 62124 | 1 62126 | PartyIntenalID 62128 |
| | | | Loca-tion 62130 | | | | Inventory-Managed-Location 62132 | | 0..1 62134 | |
| | | | | | | | | InternalID 62136 | 1 62138 | LocationIntenalID 62140 |

FIG. 62-5

| Package | | | | level1 | level2 | level3 | level4 | level5 | Cardinality | Datatype Name |
|---|---|---|---|---|---|---|---|---|---|---|
| | | | Product-Information 62142 | | | | Product 62144 | | 0..1 62146 | |
| | | | | | | | | InternalID 62148 | 1 62150 | ProductIntenalID 62152 |
| | | | | | | | ProductCategory 62154 | | 1 62156 | |
| | | | | | | | | InternalID 62158 | 1 62160 | ProductCategoryInternalID 62162 |
| | | | | | | | | ManufacturerID 62164 | 0..1 62166 | ProductPartyID 62168 |

FIG. 62-6

| Package | | | | level1 | level2 | level3 | level4 | level5 | Cardinality | Datatype Name |
|---|---|---|---|---|---|---|---|---|---|---|
| | | | SourceOfSupply 62170 | | | | SourceOfSupply 62172 | | 0..1 62174 | |
| | | | | | | | | SellerPartyInternalID 62176 | 0..1 62178 | PartyIntenalID 62180 |
| | | | | | | | | ProposedSellerPartyInternalID 62182 | 0..1 62184 | PartyIntenalID 62186 |
| | | | | | | | | PurchasingOrganisationPartyInternalID 62188 | 0..1 62190 | PartyIntenalID 62192 |
| | | | | | | | | PurchaseContractID 62194 | 0..1 62196 | PurchaseContractID 62198 |

FIG. 62-7

| Package | level1 | level2 | level3 | level4 | level5 | Cardinality | Datatype Name |
|---|---|---|---|---|---|---|---|
| | | | | | PurchaseContractItemID 62200 | 0..1 62202 | PurchaseContractItemID 62204 |
| | | | | | ShipFromLocationID 62206 | 0..1 62208 | LocationInternalID 62210 |
| | | | | | ProductProcurementArrangementID 62212 | 0..1 62214 | ProductProcurementArrangementID 62216 |
| Log 62218 | | Log 62220 | | | | 0..1 62222 | Log 62224 |

FIG. 63-1

| Package | level1 | level2 | level3 | level4 | level5 | Cardinality | Datatype Name |
|---|---|---|---|---|---|---|---|
| PurchaseRequest-ChangeConfirmationMessage 63000 | PurchaseRequest-ChangeConfirmationMessage 63002 | | | | | | PurchaseRequest-ChangeConfirmationMessage 63004 |
| PurchaseRequest 63006 | | PurchaseRequest 63008 | | | | 1 63010 | |
| | | | ID 63012 | | | 1 63014 | PurchaseRequestID 63016 |
| | | | ProcessingTypeCode 63018 | | | 1 63020 | BusinessTransactionDocumentProcessingTypeCode 63022 |
| ReleaseInformation 63024 | | | ReleaseTerms 63026 | | | 0..1 63028 | |

FIG. 63-2

| Package | level1 | level2 | level3 | level4 | level5 | Cardinality | Datatype Name |
|---|---|---|---|---|---|---|---|
| | | | | Purchas-ingDocu-mentRe-leaseCode 63030 | | 1 63032 | PurchasingDocumen-tReleaseCode 63034 |
| | | | | Release-StrategyID 63036 | | 1 63038 | ReleaseStrategyID 63040 |
| | | | | Re-leaseGrou pID 63042 | | 1 63044 | ReleaseGroupID 63046 |
| Item 63048 | | | Item 63050 | | | 1..N 63052 | |
| | | | | ID 63054 | | 1 63056 | PurchaseReques-tItemID 63058 |
| | | | | Process-ingType-Code 63060 | | 0..1 63062 | BusinessTransac-tionDocumentItem-ProcessingTypeCode 63064 |

FIG. 63-3

| Package | level1 | level2 | level3 | level4 | level5 | Cardinality | Datatype Name |
|---|---|---|---|---|---|---|---|
| | | | | Can-celledIndi-cator 63066 | | 0..1 63068 | Indicator 63070 |
| | | | | Crea-tionUserAc countID 63072 | | 1 63074 | UserAccoountID 63076 |
| | | | | Request-edQuantity 63078 | | 1 63080 | Quantity 63082 |
| | | | | Ordered-Quantity 63084 | | 1 63086 | Quantity 63088 |
| | | | | PlantID 63090 | | 1 63092 | PlantID 63094 |
| | | | | Pur-chaseRe-questDate 63096 | | 1 63098 | Date 63100 |

FIG. 63-4

| Package | | | | level1 | level2 | level3 | level4 | level5 | Cardinality | Datatype Name |
|---|---|---|---|---|---|---|---|---|---|---|
| | | | | | | | Delivery-Date 63102 | | 1 63104 | Date 63106 |
| | | | | | | | Description 63108 | | 1 63110 | SHORT_Description 63112 |
| | | | | | | | Tota-lAmount 63114 | | 0..1 63116 | Amount 63118 |
| | | | | | | | Valuation-Price 63120 | | 0..1 63122 | Price 63124 |
| | | | | | | | | Amount 63126 | 1 63128 | Amount 63130 |
| | | | | | | | | BaseQuan-tity 63132 | 1 63134 | Quantity 63136 |
| | | | Party 63138 | | | | Re-questorParty 63140 | | 0..1 63142 | |

FIG. 63-5

| Package | level1 | level2 | level3 | level4 | level5 | Cardinality | Datatype Name |
|---|---|---|---|---|---|---|---|
| | | | | | InternalID 63144 | 1 63146 | PartyIntenalID 63148 |
| | | | | Purchas-ingGroup-Party 63150 | | 1 63152 | |
| | | | | | InternalID 63154 | 1 63156 | PartyIntenalID 63158 |
| Location 63160 | | | | Inventory-Managed-Location 63162 | | 0..1 63164 | |
| | | | | | InternalID 63166 | 1 63168 | LocationIntenalID 63170 |
| | | | | ShipToLo-cation 63172 | | 1 63174 | |
| | | | | | InternalID 63176 | 1 63178 | LocationIntenalID 63180 |

FIG. 63-6

| Package | level1 | level2 | level3 | level4 | level5 | Cardinality | Datatype Name |
|---|---|---|---|---|---|---|---|
| Product-Informa-tion 63182 | | | | Product 63184 | | 0..1 63186 | |
| | | | | | InternalID 63188 | 1 63190 | ProductIntenalID 63192 |
| | | | | | Manufactur-erID 63194 | 0..1 63196 | ProductPartyID 63198 |
| | | | | Pro-ductCate-gory 63200 | | 1 63202 | |
| | | | | | InternalID 63204 | 1 63206 | ProductCategory-InternalID 63208 |
| Re-leaseIn-formation 63210 | | | | Release-Terms 63212 | | 0..1 63214 | |

FIG. 63-7

| Package | level1 | level2 | level3 | level4 | level5 | Cardinality | Datatype Name |
|---|---|---|---|---|---|---|---|
| | | | | | PurchasingDocumentReleaseCode 63216 | 1 63218 | PurchasingDocumentReleaseCode 63220 |
| | | | | | ReleaseStrategyID 63222 | 1 63224 | ReleaseStrategyID 63226 |
| | | | | | ReleaseGroupID 63228 | 1 63230 | ReleaseGroupID 63232 |
| SourceOfSupply 63234 | | | | SourceOfSupply 63236 | | 0..1 63238 | |
| | | | | | SellerPartyInternalID 63240 | 0..1 63242 | PartyIntenalID 63244 |

FIG. 63-8

| Package | level1 | level2 | level3 | level4 | level5 | Cardinality | Datatype Name |
|---|---|---|---|---|---|---|---|
| | | | | | Proposed-SellerParty-InternalID 63246 | 0..1 63248 | PartyIntenalID 63250 |
| | | | | | Purchasin-gOrganisa-tionParty-InternalID 63252 | 0..1 63254 | PartyIntenalID 63256 |
| | | | | | Purchase-ContractID 63258 | 0..1 63260 | PurchaseContractID 63262 |
| | | | | | Purchase-Contrac-tItemID 63264 | 0..1 63266 | PurchaseContrac-tItemID 63268 |
| | | | | | ShipFrom-LocationID 63270 | 0..1 63272 | LocationIntenalID 63274 |

FIG. 63-9

| Package | level1 | level2 | level3 | level4 | level5 | Cardinality | Datatype Name |
|---|---|---|---|---|---|---|---|
| | | | | | ProductProcurementArrangementID 63276 | 0..1 63278 | ProductProcurementArrangementID 63280 |
| Log 63282 | | Log 63284 | | | | 0..1 63286 | Log 63288 |

FIG. 64-1

| Package | level1 | level2 | level3 | level4 | level5 | Cardinality | Datatype Name |
|---|---|---|---|---|---|---|---|
| PurchaseRequestChangeRequestMessage 64000 | PurchaseRequestChangeRequestMessage 64002 | | | | | | PurchaseRequestChangeRequestMessage 64004 |
| PurchaseRequest 64006 | | PurchaseRequest 64008 | | | | 1 64010 | |
| | | | ID 64012 | | | 1 64014 | PurchaseRequestID 64016 |
| | | | ProcessingTypeCode 64018 | | | 0..1 64020 | BusinessTransactionDocumentProcessingTypeCode 64022 |
| Item 64024 | | | Item 64026 | | | 1..N 64028 | |
| | | | | ID 64030 | | 1 64032 | PurchaseRequestItemID 64034 |

FIG. 64-2

| Package | level1 | level2 | level3 | level4 | level5 | Cardinality | Datatype Name |
|---|---|---|---|---|---|---|---|
| | | | | ProcessingTypeCode 64036 | | 0..1 64038 | BusinessTransactionDocumentItemProcessingTypeCode 64040 |
| | | | | CancelledIndicator 64042 | | 0..1 64044 | Indicator 64046 |
| | | | | RequestedQuantity 64048 | | 0..1 64050 | Quantity 64052 |
| | | | | PlantID 64054 | | 0..1 64056 | PlantID 64058 |
| | | | | PurchaseRequestDate 64060 | | 0..1 64062 | Date 64064 |
| | | | | DeliveryDate 64066 | | 0..1 64068 | Date 64070 |

FIG. 64-3

| Package | level1 | level2 | level3 | level4 | level5 | Cardinality | Datatype Name |
|---|---|---|---|---|---|---|---|
| | | | | Description 64072 | | 0..1 64074 | SHORT_Description 64076 |
| | | | | Tota-lAmount 64078 | | 0..1 64080 | Amount 64082 |
| | | | | Valuation-Price 64084 | | 0..1 64086 | Price 64088 |
| | | | | | Amount 64090 | 1 64092 | Amount 64094 |
| | | | | | BaseQuantity 64096 | 1 64098 | Quantity 64100 |
| Party 64102 | | | | Requestor-Party 64104 | | 0..1 64106 | |
| | | | | | InternalID 64108 | 1 64110 | PartyIntenalID 64112 |

FIG. 64-4

| Package | | | | level1 | level2 | level3 | level4 | level5 | Cardinality | Datatype Name |
|---|---|---|---|---|---|---|---|---|---|---|
| | | | | | | | Purchas-ingGroup-Party 64114 | | 0..1 64116 | |
| | | | | | | | | InternalID 64118 | 1 64120 | PartyIntenalID 64122 |
| | | | Loca-tion 64124 | | | | Inventory-Managed-Location 64126 | | 0..1 64128 | |
| | | | | | | | | InternalID 64130 | 1 64132 | LocationIntenalID 64134 |
| | | | | | | | ShipToLo-cation 64136 | | 0..1 64138 | |
| | | | | | | | | InternalID 64140 | 1 64142 | LocationIntenalID 64144 |

FIG. 64-5

| Package | level1 | level2 | level3 | level4 | level5 | Cardinality | Datatype Name |
|---|---|---|---|---|---|---|---|
| ProductInformation 64146 | | | | Product 64148 | | 0..1 64150 | |
| | | | | | InternalID 64152 | 1 64154 | ProductIntenalID 64156 |
| | | | | | ManufacturerID 64158 | 0..1 64160 | ProductPartyID 64162 |
| | | | | ProductCategory 64164 | | 0..1 64166 | |
| | | | | | InternalID 64168 | 1 64170 | ProductCategoryInternalID 64172 |
| SourceOfSupply 64174 | | | | SourceOfSupply 64176 | | 0..1 64178 | |

FIG. 64-6

| Package | level1 | level2 | level3 | level4 | level5 | Cardinality | Datatype Name |
|---|---|---|---|---|---|---|---|
| | | | | | SellerParty-InternalID 64180 | 0..1 64182 | PartyIntenalID 64184 |
| | | | | | Proposed-SellerParty-InternalID 64186 | 0..1 64188 | PartyIntenalID 64190 |
| | | | | | PurchasingOr-ganisation-PartyInternalID 64192 | 0..1 64194 | PartyIntenalID 64196 |
| | | | | | PurchaseCon-tractID 64198 | 0..1 64200 | PurchaseContractID 64202 |
| | | | | | PurchaseCon-tractItemID 64204 | 0..1 64206 | PurchaseContractItemID 64208 |
| | | | | | ShipFromLoca-tionID 64210 | 0..1 64212 | LocationIntenalID 64214 |

FIG. 64-7

| Package | | | | level1 | level2 | level3 | level4 | level5 | Cardinality | Datatype Name |
|---|---|---|---|---|---|---|---|---|---|---|
| | | | | | | | | ProductProcurementArrangementID 64216 | 0..1 64218 | ProductProcurementArrangementID 64220 |

FIG. 65-1

| Package | level1 | level2 | level3 | level4 | level5 | Cardinality | Datatype Name |
|---|---|---|---|---|---|---|---|
| PurchaseRequest-CreateConfirmationMessage 65000 | PurchaseRequestCreateConfirmation-Message 65002 | | | | | | PurchaseRequestCreateConfirmationMessage 65004 |
| PurchaseRequest 65006 | | PurchaseRequest 65008 | | | | 1 65010 | |
| | | | ID 65012 | | | 1 65014 | PurchaseRequestID 65016 |
| | | | ProcessingType-Code 65018 | | | 1 65020 | BusinessTransaction-DocumentProcessing-TypeCode 65022 |
| ReleaseInformation 65024 | | | Release-Terms 65026 | | | 0..1 65028 | |

FIG. 65-2

| Package | level1 | level2 | level3 | level4 | level5 | Cardinality | Datatype Name |
|---|---|---|---|---|---|---|---|
| | | | | Purchasing-DocumentRe-leaseCode 65030 | | 1 65032 | PurchasingDocumen-tReleaseCode 65034 |
| | | | | ReleaseStrat-egyID 65036 | | 1 65038 | ReleaseStrategyID 65040 |
| | | | | Re-leaseGroupID 65042 | | 1 65044 | ReleaseGroupID 65046 |
| Item 65048 | | | Item 65050 | | | 1..N 65052 | |
| | | | | ID 65054 | | 1 65056 | PurchaseReques-tItemID 65058 |
| | | | | Processing-TypeCode 65060 | | 0..1 65062 | BusinessTransaction-DocumentItemProcess-ingTypeCode 65064 |

FIG. 65-3

| Package | level1 | level2 | level3 | level4 | level5 | Cardinality | Datatype Name |
|---|---|---|---|---|---|---|---|
| | | | | Crea-tionUserAc-countID 65066 | | 1 65068 | UserAccoountID 65070 |
| | | | | Requested-Quantity 65072 | | 1 65074 | Quantity 65076 |
| | | | | PlantID 65078 | | 1 65080 | PlantID 65082 |
| | | | | PurchaseRe-questDate 65084 | | 1 65086 | Date 65088 |
| | | | | DeliveryDate 65090 | | 1 65092 | Date 65094 |
| | | | | Description 65096 | | 1 65098 | SHORT_Description 65100 |
| | | | | TotalAmount 65102 | | 0..1 65104 | Amount 65106 |

FIG. 65-4

| Package | level1 | level2 | level3 | level4 | level5 | Cardinality | Datatype Name |
|---|---|---|---|---|---|---|---|
| | | | | ValuationPrice 65108 | | 0..1 65110 | Price 65112 |
| | | | | | Amount 65114 | 1 65116 | Amount 65118 |
| | | | | | BaseQuantity 65120 | 1 65122 | Quantity 65124 |
| Party 65126 | | | | Requestor-Party 65128 | | 0..1 65130 | |
| | | | | | InternalID 65132 | 1 65134 | PartyIntenalID 65136 |
| | | | | Purchasing-GroupParty 65138 | | 1 65140 | |
| | | | | | InternalID 65142 | 1 65144 | PartyIntenalID 65146 |

FIG. 65-5

| Package | level1 | level2 | level3 | level4 | level5 | Cardinality | Datatype Name |
|---|---|---|---|---|---|---|---|
| Location 65148 | | | | Inventory-ManagedLo-cation 65150 | | 0..1 65152 | |
| | | | | | InternalID 65154 | 1 65156 | LocationIntenalID 65158 |
| | | | | ShipToLoca-tion 65160 | | 1 65162 | |
| | | | | | InternalID 65164 | 1 65166 | LocationIntenalID 65168 |
| Product-Informa-tion 65170 | | | | Product 65172 | | 0..1 65174 | |
| | | | | | InternalID 65176 | 1 65178 | ProductIntenalID 65180 |
| | | | | | Manufacture-rID 65182 | 0..1 65184 | ProductPartyID 65186 |

FIG. 65-6

| Package | level1 | level2 | level3 | level4 | level5 | Cardinality | Datatype Name |
|---|---|---|---|---|---|---|---|
| | | | | ProductCategory 65188 | | 1 65190 | |
| | | | | | InternalID 65192 | 1 65194 | ProductCategoryInternalID 65196 |
| ReleaseInformation 65198 | | | | ReleaseTerms 65200 | | 0..1 65202 | |
| | | | | | PurchasingDocumentReleaseCode 65204 | 1 65206 | PurchasingDocumentReleaseCode 65208 |
| | | | | | ReleaseStrategyID 65210 | 1 65212 | ReleaseStrategyID 65214 |
| | | | | | ReleaseGroupID 65216 | 1 65218 | ReleaseGroupID 65220 |

FIG. 65-7

| Package | | | | level1 | level2 | level3 | level4 | level5 | Cardinality | Datatype Name |
|---|---|---|---|---|---|---|---|---|---|---|
| | | | Sour-ceOf-Supply 65222 | | | | SourceOfSup-ply 65224 | | 0..1 65226 | |
| | | | | | | | | SellerParty-InternalID 65228 | 0..1 65230 | PartyIntenalID 65232 |
| | | | | | | | | Proposed-SellerParty-InternalID 65234 | 0..1 65236 | PartyIntenalID 65238 |
| | | | | | | | | Purchasin-gOrganisa-tionParty-InternalID 65240 | 0..1 65242 | PartyIntenalID 65244 |
| | | | | | | | | Purchase-ContractID 65246 | 0..1 65248 | PurchaseContractID 65250 |

FIG. 65-8

| Package | level1 | level2 | level3 | level4 | level5 | Cardinality | Datatype Name |
|---|---|---|---|---|---|---|---|
| | | | | | Purchase-Contrac-tItemID 65252 | 0..1 65254 | PurchaseContrac-tItemID 65256 |
| | | | | | ShipFromLo-cationID 65258 | 0..1 65260 | LocationIntenalID 65262 |
| | | | | | ProductPro-curementAr-rangementID 65264 | 0..1 65266 | ProductProcurementAr-rangementID 65268 |
| Log 65270 | | Log 65272 | | | | 0..1 65274 | Log 65276 |

FIG. 66-1

| Package | level1 | level2 | level3 | level4 | level5 | Cardinality | Datatype Name |
|---|---|---|---|---|---|---|---|
| PurchaseRequestCreateRequestMessage 66000 | PurchaseRequestCreateRequestMessage 66002 | | | | | | PurchaseRequestCreateRequestMessage 66004 |
| PurchaseRequest 66006 | | PurchaseRequest 66008 | | | | 1 66010 | |
| | | | ID 66012 | | | 0..1 66014 | PurchaseRequestID 66016 |
| | | | ProcessingTypeCode 66018 | | | 1 66020 | BusinessTransactionDocumentProcessingTypeCode 66022 |
| Item 66024 | | | Item 66026 | | | 1..N 66028 | |
| | | | | ID 66030 | | 1 66032 | PurchaseRequestItemID 66034 |

FIG. 66-2

| Package | level1 | level2 | level3 | level4 | level5 | Cardinality | Datatype Name |
|---|---|---|---|---|---|---|---|
| | | | | Process-ingType-Code 66036 | | 0..1 66038 | BusinessTransactionDocumen-tItemProcessingTypeCode 66040 |
| | | | | Request-edQuantity 66042 | | 1 66044 | Quantity 66046 |
| | | | | PlantID 66048 | | 1 66050 | PlantID 66052 |
| | | | | Delivery-Date 66054 | | 0..1 66056 | Date 66058 |
| | | | | Description 66060 | | 0..1 66062 | SHORT_Description 66064 |
| | | | | Tota-lAmount 66066 | | 0..1 66068 | Amount 66070 |
| | | | | Valuation-Price 66072 | | 0..1 66074 | Price 66076 |

FIG. 66-3

| Package | level1 | level2 | level3 | level4 | level5 | Cardinality | Datatype Name |
|---|---|---|---|---|---|---|---|
| | | | | | Amount 66078 | 1 66080 | Amount 66082 |
| | | | | | BaseQuantity 66084 | 1 66086 | Quantity 66088 |
| Party 66090 | | | | Re-questorParty 66092 | | 0..1 66094 | |
| | | | | | InternalID 66096 | 1 66098 | PartyIntenalID 66100 |
| | | | | Purchas-ingGroup-Party 66102 | | 1 66104 | |
| | | | | | InternalID 66106 | 1 66108 | PartyIntenalID 66110 |
| Location 66112 | | | | Inventory-Managed-Location 66114 | | 0..1 66116 | |

FIG. 66-4

| Package | level1 | level2 | level3 | level4 | level5 | Cardinality | Datatype Name |
|---|---|---|---|---|---|---|---|
| | | | | | InternalID 66118 | 1 66120 | LocationIntenalID 66122 |
| | | | | ShipToLocation 66124 | | 0..1 66126 | |
| | | | | | InternalID 66128 | 1 66130 | LocationIntenalID 66132 |
| ProductInformation 66134 | | | | Product 66136 | | 0..1 66138 | |
| | | | | | InternalID 66140 | 1 66142 | ProductIntenalID 66144 |
| | | | | | ManufacturerID 66146 | 0..1 66148 | ProductPartyID 66150 |
| | | | | ProductCategory 66152 | | 0..1 66154 | |

FIG. 66-5

| Package | | | | level1 | level2 | level3 | level4 | level5 | Cardinality | Datatype Name |
|---|---|---|---|---|---|---|---|---|---|---|
| | | | | | | | | InternalID 66156 | 1 66158 | ProductCategoryInternalID 66160 |
| | | | Sour-ceOf-Supply 66162 | | | | SourceOf-Supply 66164 | | 0..1 66166 | |
| | | | | | | | | SellerParty-InternalID 66168 | 0..1 66170 | PartyIntenalID 66172 |
| | | | | | | | | Proposed-SellerParty-InternalID 66174 | 0..1 66176 | PartyIntenalID 66178 |
| | | | | | | | | PurchasingOr-ganisation-PartyInternalID 66180 | 0..1 66182 | PartyIntenalID 66184 |
| | | | | | | | | PurchaseCon-tractID 66186 | 0..1 66188 | PurchaseContractID 66190 |

FIG. 66-6

| Package | level1 | level2 | level3 | level4 | level5 | Cardinality | Datatype Name |
|---|---|---|---|---|---|---|---|
| | | | | | PurchaseContractItemID 66192 | 0..1 66194 | PurchaseContractItemID 66196 |
| | | | | | ShipFromLocationID 66198 | 0..1 66200 | LocationIntenalID 66202 |
| | | | | | ProductProcurementArrangementID 66204 | 0..1 66206 | ProductProcurementArrangementID 66208 |

FIG. 67-1

| Package | Level 1 | Level 2 | Level 3 | Cardinality | Datatype Name |
|---|---|---|---|---|---|
| PurchaseRequestItemByAccountAssignmentQueryMessage 67000 | PurchaseRequestItemByAccountAssignmentQueryMessage 67002 | | | | PurchaseRequestItemByAccountAssignmentQueryMessage 67004 |
| Selection 67006 | | PurchaseRequestSelectionByAccountAssignment 67008 | | 1 67010 | |
| | | | PurchaseRequestItemAccountAssignmentGeneralLedgerAccountID 67012 | 0..1 67014 | GeneralLedgerAccountID 67016 |
| | | | PurchaseRequestItemAccountAssignmentProfitCentreID 67018 | 0..1 67020 | ProfitCentreID 67022 |

FIG. 67-2

| Package | | | | Level 1 | Level 2 | Level 3 | Cardinality | Datatype Name |
|---|---|---|---|---|---|---|---|---|
| | | | | | | PurchaseReques-tItemAccountAssign-mentCostCentreID 67024 | 0..1 67026 | CostCentreID 67028 |
| | | | | | | PurchaseReques-tItemAccountAssign-mentSalesOrderID 67030 | 0..1 67032 | SalesOrderID 67034 |
| | | | | | | PurchaseReques-tItemAccountAssign-mentSalesOrde-rItemID 67036 | 0..1 67038 | SalesOrderItemID 67040 |
| | | | | | | PurchaseRequestIte mAccountAssign-mentProjectWork-BreakdownStructu-reElementID 67042 | 0..1 67044 | ProjectWorkBreakdown-StructureElementID 67046 |

FIG. 67-3

| Package | | | | Level 1 | Level 2 | Level 3 | Cardinality | Datatype Name |
|---|---|---|---|---|---|---|---|---|
| | | | | | | PurchaseRequestItemAccountAssignmentProjectNetworkID 67048 | 0..1 67050 | ProjectNetworkID 67052 |
| | | | | | | PurchaseRequestItemAccountAssignmentProjectActivityID 67054 | 0..1 67056 | ProjectActivityID 67058 |
| | | | | | | PurchaseRequestItemAccountAssignmentMasterFixedAssetID 67060 | 0..1 67062 | MasterFixedAssetID 67064 |
| | | | | | | PurchaseRequestItemAccountAssignmentFixedAssetID 67066 | 0..1 67068 | FixedAssetID 67070 |

FIG. 68-1

| Package | level1 | level2 | level3 | level4 | level5 | Cardinality | Datatype Name |
|---|---|---|---|---|---|---|---|
| PurchaseRequestItemByAccountAssignmentResponseMessage 68000 | PurchaseRequestItemByAccountAssignmentResponseMessage 68002 | | | | | | PurchaseRequestItemByAccountAssignmentResponseMessage 68004 |
| PurchaseRequest 68006 | | PurchaseRequest 68008 | | | | 0..1 68010 | |
| | | | ID 68012 | | | 1 68014 | PurchaseRequestID 68016 |
| | | | ProcessingTypeCode 68018 | | | 1 68020 | BusinessTransactionDocumentProcessingTypeCode 68022 |
| ReleaseInformation 68024 | | | ReleaseTerms 68026 | | | 0..1 68028 | |

FIG. 68-2

| Package | level1 | level2 | level3 | level4 | level5 | Cardinality | Datatype Name |
|---|---|---|---|---|---|---|---|
| | | | | Purchasing-DocumentRe-leaseCode 68030 | | 1 68032 | PurchasingDocumentRe-leaseCode 68034 |
| | | | | Release-StrategyID 68036 | | 1 68038 | ReleaseStrategyID 68040 |
| | | | | Re-leaseGroupID 68042 | | 1 68044 | ReleaseGroupID 68046 |
| Item 68048 | | | Item 68050 | | | 1..N 68052 | |
| | | | | ID 68054 | | 1 68056 | PurchaseRequestItemID 68058 |
| | | | | Processing-TypeCode 68060 | | 0..1 68062 | BusinessTransactionDocu-mentItemProcessingType-Code 68064 |

FIG. 68-3

| Package | | | | level1 | level2 | level3 | level4 | level5 | Cardinality | Datatype Name |
|---|---|---|---|---|---|---|---|---|---|---|
| | | | | | | | CancelledIndicator 68066 | | 0..1 68068 | Indicator 68070 |
| | | | | | | | CreationUserAccountID 68072 | | 1 68074 | UserAccoountID 68076 |
| | | | | | | | RequestedQuantity 68078 | | 1 68080 | Quantity 68082 |
| | | | | | | | OrderedQuantity 68084 | | 1 68086 | Quantity 68088 |
| | | | | | | | PlantID 68090 | | 1 68092 | PlantID 68094 |
| | | | | | | | PurchaseRequestDate 68096 | | 1 68098 | Date 68100 |
| | | | | | | | DeliveryDate 68102 | | 1 68104 | Date 68106 |

FIG. 68-4

| Package | | | | level1 | level2 | level3 | level4 | level5 | Cardinality | Datatype Name |
|---|---|---|---|---|---|---|---|---|---|---|
| | | | | | | | Description 68108 | | 1 68110 | SHORT_Description 68112 |
| | | | | | | | TotalAmount 68114 | | 0..1 68116 | Amount 68118 |
| | | | | | | | Valuation-Price 68120 | | 0..1 68122 | Price 68124 |
| | | | | | | | | Amount 68126 | 1 68128 | Amount 68130 |
| | | | | | | | | BaseQuantity 68132 | 1 68134 | Quantity 68136 |
| | | | Party 68138 | | | | Requestor-Party 68140 | | 0..1 68142 | |
| | | | | | | | | InternalID 68144 | 1 68146 | PartyIntenalID 68148 |
| | | | | | | | Purchasing-GroupParty 68150 | | 1 68152 | |

FIG. 68-5

| Package | | | | level1 | level2 | level3 | level4 | level5 | Cardinality | Datatype Name |
|---|---|---|---|---|---|---|---|---|---|---|
| | | | | | | | | InternalID 68154 | 1 68156 | PartyIntenalID 68158 |
| | | | Location 68160 | | | | Inventory-ManagedLo-cation 68162 | | 0..1 68164 | |
| | | | | | | | | InternalID 68166 | 1 68168 | LocationIntenalID 68170 |
| | | | | | | | ShipToLoca-tion 68172 | | 1 68174 | |
| | | | | | | | | InternalID 68176 | 1 68178 | LocationIntenalID 68180 |
| | | | Product-Informa-tion 68182 | | | | Product 68184 | | 0..1 68186 | |
| | | | | | | | | InternalID 68188 | 1 68190 | ProductIntenalID 68192 |

FIG. 68-6

| Package | | | | level1 | level2 | level3 | level4 | level5 | Cardinality | Datatype Name |
|---|---|---|---|---|---|---|---|---|---|---|
| | | | | | | | | Manufacturer-ID 68194 | 0..1 68196 | ProductPartyID 68198 |
| | | | | | | | ProductCategory 68200 | | 1 68202 | |
| | | | | | | | | InternalID 68204 | 1 68206 | ProductCategoryInternalID 68208 |
| | | | AccountAssignment 68210 | | | | AccountAssignment 68212 | | 0..N 68214 | |
| | | | | | | | | GeneralLedgerAccountID 68216 | 0..1 68218 | GeneralLedgerAccountID 68220 |
| | | | | | | | | ProfitCentreID 68222 | 0..1 68224 | ProfitCentreID 68226 |
| | | | | | | | | CostCentreID 68228 | 0..1 68230 | CostCentreID 68232 |

FIG. 68-7

| Package | | | | level1 | level2 | level3 | level4 | level5 | Cardinality | Datatype Name |
|---|---|---|---|---|---|---|---|---|---|---|
| | | | | | | | | SalesOrderID 68234 | 0..1 68236 | SalesOrderID 68238 |
| | | | | | | | | SalesOrde-rItemID 68240 | 0..1 68242 | SalesOrderItemID 68244 |
| | | | | | | | | ProjectWork-Breakdown-StructureEle-mentID 68246 | 0..1 68248 | ProjectWorkBreakdown-StructureElementID 68250 |
| | | | | | | | | ProjectNet-workID 68252 | 0..1 68254 | ProjectNetworkID 68256 |
| | | | | | | | | ProjectActiv-ityID 68258 | 0..1 68260 | ProjectActivityID 68262 |
| | | | | | | | | Master-FixedAssetID 68264 | 0..1 68266 | MasterFixedAssetID 68268 |

FIG. 68-8

| Package | | | | level1 | level2 | level3 | level4 | level5 | Cardinality | Datatype Name |
|---|---|---|---|---|---|---|---|---|---|---|
| | | | | | | | | FixedAssetID 68270 | 0..1 68272 | FixedAssetID 68274 |
| | | | Re-leaseIn-forma-tion 68276 | | | | Release-Terms 68278 | | 0..1 68280 | |
| | | | | | | | | Purchasing-DocumentRe-leaseCode 68282 | 1 68284 | PurchasingDocumentRe-leaseCode 68286 |
| | | | | | | | | ReleaseStrat-egyID 68288 | 1 68290 | ReleaseStrategyID 68292 |
| | | | | | | | | Re-leaseGroupID 68294 | 1 68296 | ReleaseGroupID 68298 |

FIG. 68-9

| Package | | | | level1 | level2 | level3 | level4 | level5 | Cardinality | Datatype Name |
|---|---|---|---|---|---|---|---|---|---|---|
| | | | Sour-ceOf-Supply 68300 | | | | SourceOf-Supply 68302 | | 0..1 68304 | |
| | | | | | | | | SellerParty-InternalID 68306 | 0..1 68308 | PartyIntenalID 68310 |
| | | | | | | | | Proposed-SellerParty-InternalID 68312 | 0..1 68314 | PartyIntenalID 68316 |
| | | | | | | | | Purchasin-gOrganisa-tionPartyInter-nalID 68318 | 0..1 68320 | PartyIntenalID 68322 |
| | | | | | | | | PurchaseCon-tractID 68324 | 0..1 68326 | PurchaseContractID 68328 |

FIG. 68-10

| Package | level1 | level2 | level3 | level4 | level5 | Cardinality | Datatype Name |
|---|---|---|---|---|---|---|---|
| | | | | | PurchaseContractItemID 68330 | 0..1 68332 | PurchaseContractItemID 68334 |
| | | | | | ShipFromLocationID 68336 | 0..1 68338 | LocationIntenalID 68340 |
| | | | | | ProductProcurementArrangementID 68342 | 0..1 68344 | ProductProcurementArrangementID 68346 |
| Log 68348 | | Log 68350 | | | | 0..1 68352 | Log 68354 |

FIG. 69-1

| Package | Level 1 | Level 2 | Level 3 | Cardinality | Datatype Name |
|---|---|---|---|---|---|
| PurchaseRequestItem-ByProductAndOrganisa-tionalDataQueryMessage 69000 | PurchaseRequestItem-ByProductAndOrganisa-tionalDataQueryMessage 69002 | | | | PurchaseRequestByPro-ductAndOrganisational-DataQueryMessage 69004 |
| Selectiom 69006 | | PurchaseReques-tItemSelection-ByProductAndOr-ganisationalData 69008 | | 1 69010 | |
| | | | PurchaseRe-questItemPro-ductInternalID 69012 | 0..1 69014 | ProductInternalID 69016 |
| | | | PurchaseRe-questItemPro-ductCategory-InternalID 69018 | 0..1 69020 | ProductCategoryInter-nalID 69022 |
| | | | PurchaseRe-questItemDe-scription 69024 | 0..1 69026 | SHORT_Description 69028 |

FIG. 69-2

| Package | Level 1 | Level 2 | Level 3 | Cardinality | Datatype Name |
|---|---|---|---|---|---|
| | | | PurchaseRequestItemPurchasingGroupPartyInternalID 69030 | 0..1 69032 | PartyIntenalID 69034 |
| | | | PurchaseRequestItemRequestorPartyInternalID 69036 | 0..1 69038 | PartyIntenalID 69040 |
| | | | PurchaseRequestItemPlantID 69042 | 0..1 69044 | PlantID 69046 |
| | | | PurchaseRequestItemProcessingTypeCode 69048 | 0..1 69050 | BusinessTransactionDocumentItemProcessingTypeCode 69052 |

FIG. 70-1

| Package | level1 | level2 | level3 | level4 | level5 | Cardinality | Datatype Name |
|---|---|---|---|---|---|---|---|
| PurchaseRequestItemByProductAndOrganisationalDataResponseMessage 70000 | PurchaseRequestItemByProductAndOrganisationalDataResponseMessage 70002 | | | | | | PurchaseRequestItemByProductAndOrganisationalDataResponseMessage 70004 |
| PurchaseRequest 70006 | | PurchaseRequest 70008 | | | | 0..N 70010 | |
| | | | ID 70012 | | | 1 70014 | PurchaseRequestID 70016 |
| | | | ProcessingTypeCode 70018 | | | 1 70020 | BusinessTransactionDocumentProcessingTypeCode 70022 |
| Item 70024 | | | Item 70026 | | | 1..N 70028 | |
| | | | | ID 70030 | | 1 70032 | PurchaseRequestItemID 70034 |

FIG. 70-2

| Package | level1 | level2 | level3 | level4 | level5 | Cardinality | Datatype Name |
|---|---|---|---|---|---|---|---|
| | | | | Process-ingType-Code 70036 | | 0..1 70038 | BusinessTransaction-DocumentItemProcess-ingTypeCode 70040 |
| | | | | Crea-tionUserA ccountID 70042 | | 1 70044 | UserAccoountID 70046 |
| | | | | Request-edQuan-tity 70048 | | 1 70050 | Quantity 70052 |
| | | | | Ordered-Quantity 70054 | | 1 70056 | Quantity 70058 |
| | | | | PlantID 70060 | | 1 70062 | PlantID 70064 |
| | | | | Pur-chaseRe-questDate 70066 | | 1 70068 | Date 70070 |

FIG. 70-3

| Package | level1 | level2 | level3 | level4 | level5 | Cardinality | Datatype Name |
|---|---|---|---|---|---|---|---|
| | | | | Delivery-Date 70072 | | 1 70074 | Date 70076 |
| | | | | Descrip-tion 70078 | | 1 70080 | SHORT_Description 70082 |
| | | | | Tota-lAmount 70084 | | 0..1 70086 | Amount 70088 |
| | | | | Valua-tionPrice 70090 | | 0..1 70092 | Price 70094 |
| | | | | | Amount 70096 | 1 70098 | Amount 70100 |
| | | | | | BaseQuantity 70102 | 1 70104 | Quantity 70106 |
| Party 70108 | | | | Re-questor-Party 70110 | | 0..1 70112 | |

FIG. 70-4

| Package | level1 | level2 | level3 | level4 | level5 | Cardinality | Datatype Name |
|---|---|---|---|---|---|---|---|
| | | | | | InternalID 70114 | 1 70116 | PartyIntenalID 70118 |
| | | | | Purchas-ing-GroupParty 70120 | | 1 70122 | |
| | | | | | InternalID 70124 | 1 70126 | PartyIntenalID 70128 |
| Location 70130 | | | | Inven-toryMan-agedLo-cation 70132 | | 0..1 70134 | |
| | | | | | InternalID 70136 | 1 70138 | LocationIntenalID 70140 |
| ProductInfor-mation 70142 | | | | Product 70144 | | 0..1 70146 | |
| | | | | | InternalID 70148 | 1 70150 | ProductIntenalID 70152 |

FIG. 70-5

| Package | level1 | level2 | level3 | level4 | level5 | Cardinality | Datatype Name |
|---|---|---|---|---|---|---|---|
| | | | | | Manufacture-rID 70154 | 0..1 70156 | ProductPartyID 70158 |
| | | | | Pro-ductCate-gory 70160 | | 1 70162 | |
| | | | | | InternalID 70164 | 1 70166 | ProductCategoryInter-nalID 70168 |
| SourceOfSup-ply 70170 | | | | Sour-ceOfSup-ply 70172 | | 0..1 70174 | |
| | | | | | SellerParty-InternalID 70176 | 0..1 70178 | PartyIntenalID 70180 |
| | | | | | Proposed-SellerParty-InternalID 70182 | 0..1 70184 | PartyIntenalID 70186 |

FIG. 70-6

| Package | level1 | level2 | level3 | level4 | level5 | Cardinality | Datatype Name |
|---|---|---|---|---|---|---|---|
| | | | | | PurchasingOrganisationPartyInternalID 70188 | 0..1 70190 | PartyIntenalID 70192 |
| | | | | | PurchaseContractID 70194 | 0..1 70196 | PurchaseContractID 70198 |
| | | | | | PurchaseContractItemID 70200 | 0..1 70202 | PurchaseContractItemID 70204 |
| | | | | | ShipFromLocationID 70206 | 0..1 70208 | LocationIntenalID 70210 |
| | | | | | ProductProcurementArrangementID 70212 | 0..1 70214 | ProductProcurementArrangementID 70216 |
| Log 70218 | | Log 70220 | | | | 0..1 70222 | Log 70224 |

FIG. 71-1

| Package | Level 1 | Level 2 | Level 3 | Level 4 | Level 5 | Cardinality | Datatype Name |
|---|---|---|---|---|---|---|---|
| PurchaseRequestMessage 71000 | PurchaseRequestMessage 71002 | | | | | | PurchaseRequestMessage 71004 |
| PurchaseRequest 71006 | | PurchaseRequest 71008 | | | | 0..N 71010 | |
| | | | ID 71012 | | | 1 71014 | PurchaseRequestID 71016 |
| | | | ProcessingTypeCode 71018 | | | 1 71020 | BusinessTransactionDocumentProcessingTypeCode 71022 |
| ReleaseInformation 71024 | | | ReleaseTerms 71026 | | | 0..1 71028 | |
| | | | | PurchasingDocumentReleaseCode 71030 | | 1 71032 | PurchasingDocumentReleaseCode 71034 |

FIG. 71-2

| Package | Level 1 | Level 2 | Level 3 | Level 4 | Level 5 | Cardinality | Datatype Name |
|---|---|---|---|---|---|---|---|
| | | | | Release-StrategyID 71036 | | 1 71038 | ReleaseStrategyID 71040 |
| | | | | Re-leaseGroupID 71042 | | 1 71044 | ReleaseGroupID 71046 |
| | | | | Purchasin-gRe-leaseApproverCode 71048 | | 0..1 71050 | PurchasingApproverRelease-Code 71052 |
| Item 71054 | | | Item 71056 | | | 1..N 71058 | |
| | | | | ID 71060 | | 1 71062 | PurchaseRequestItemID 71064 |
| | | | | Processing-TypeCode 71066 | | 0..1 71068 | BusinessTransactionDocu-mentItemProcessingType-Code 71070 |

FIG. 71-3

| Package | Level 1 | Level 2 | Level 3 | Level 4 | Level 5 | Cardinality | Datatype Name |
|---|---|---|---|---|---|---|---|
| | | | | CancelledIndicator 71072 | | 0..1 71074 | Indicator 71076 |
| | | | | CreationUserAccountID 71078 | | 1 71080 | UserAccoountID 71082 |
| | | | | Requested-Quantity 71084 | | 1 71086 | Quantity 71088 |
| | | | | Ordered-Quantity 71090 | | 1 71092 | Quantity 71094 |
| | | | | PlantID 71096 | | 1 71098 | PlantID 71100 |
| | | | | PurchaseRequestDate 71102 | | 1 71104 | Date 71106 |
| | | | | DeliveryDate 71108 | | 1 71110 | Date 71112 |

FIG. 71-4

| Package | Level 1 | Level 2 | Level 3 | Level 4 | Level 5 | Cardinality | Datatype Name |
|---|---|---|---|---|---|---|---|
| | | | | Description 71114 | | 1 71116 | SHORT_Description 71118 |
| | | | | TotalAmount 71120 | | 0..1 71122 | Amount 71124 |
| | | | | Valuation-Price 71126 | | 0..1 71128 | Price 71130 |
| | | | | | Amount 71132 | 1 71134 | Amount 71136 |
| | | | | | BaseQuan-tity 71138 | 1 71140 | Quantity 71142 |
| Party 71144 | | | | Requestor-Party 71146 | | 0..1 71148 | |
| | | | | | InternalID 71150 | 1 71152 | PartyIntenalID 71154 |

FIG. 71-5

| Package | Level 1 | Level 2 | Level 3 | Level 4 | Level 5 | Cardinality | Datatype Name |
|---|---|---|---|---|---|---|---|
| | | | | Purchasing-GroupParty 71156 | | 1 71158 | |
| | | | | | InternalID 71160 | 1 71162 | PartyIntenalID 71164 |
| Location 71166 | | | | Inventory-ManagedLo-cation 71168 | | 0..1 71170 | |
| | | | | | InternalID 71172 | 1 71174 | LocationIntenalID 71176 |
| | | | | ShipToLoca-tion 71178 | | 1 71180 | |
| | | | | | InternalID 71182 | 1 71184 | LocationIntenalID 71186 |
| Product-Informa-tion 71188 | | | | Product 71190 | | 0..1 71192 | |

FIG. 71-6

| Package | Level 1 | Level 2 | Level 3 | Level 4 | Level 5 | Cardinality | Datatype Name |
|---|---|---|---|---|---|---|---|
| | | | | | InternalID 71194 | 1 71196 | ProductIntenalID 71198 |
| | | | | | Manufactur-erID 71200 | 0..1 71202 | ProductPartyID 71204 |
| | | | | ProductCate gory 71206 | | 1 71208 | |
| | | | | | InternalID 71210 | 1 71212 | ProductCategoryInternalID 71214 |
| Accoun-tAssign-ment 71216 | | | | AccountAs-signment 71218 | | 0..N 71220 | |
| | | | | | Quantity 71222 | 0..1 71224 | Quantity 71226 |
| | | | | | Percent 71228 | 0..1 71230 | Percent 71232 |

FIG. 71-7

| Package | Level 1 | Level 2 | Level 3 | Level 4 | Level 5 | Cardinality | Datatype Name |
|---|---|---|---|---|---|---|---|
| | | | | | GeneralLedgerAccountID 71234 | 0..1 71236 | GeneralLedgerAccountID 71238 |
| | | | | | ProfitCentreID 71240 | 0..1 71242 | ProfitCentreID 71244 |
| | | | | | CostCentreID 71246 | 0..1 71248 | CostCentreID 71250 |
| | | | | | SalesOrderID 71252 | 0..1 71254 | SalesOrderID 71256 |
| | | | | | SalesOrderItemID 71258 | 0..1 71260 | SalesOrderItemID 71262 |

FIG. 71-8

| Package | Level 1 | Level 2 | Level 3 | Level 4 | Level 5 | Cardinality | Datatype Name |
|---|---|---|---|---|---|---|---|
| | | | | | ProjectWorkBreakdownStructureElementID 71264 | 0..1 71266 | ProjectWorkBreakdownStructureElementID 71268 |
| | | | | | ProjectNetworkID 71270 | 0..1 71272 | ProjectNetworkID 71274 |
| | | | | | ProjectActivityID 71276 | 0..1 71278 | ProjectActivityID 71280 |
| | | | | | MasterFixedAssetID 71282 | 0..1 71284 | MasterFixedAssetID 71286 |
| | | | | | FixedAssetID 71288 | 0..1 71290 | FixedAssetID 71292 |

FIG. 71-9

| Package | Level 1 | Level 2 | Level 3 | Level 4 | Level 5 | Cardinality | Datatype Name |
|---|---|---|---|---|---|---|---|
| Re-leaseIn-formation 71294 | | | | Release-Terms 71296 | | 0..1 71298 | |
| | | | | | Purchasing-Documen-tRelease-Code 71300 | 1 71302 | PurchasingDocumentRe-leaseCode 71304 |
| | | | | | Release-StrategyID 71306 | 1 71308 | ReleaseStrategyID 71310 |
| | | | | | Re-leaseGroupI D 71312 | 1 71314 | ReleaseGroupID 71316 |
| SourceOf Supply 71318 | | | | SourceOf-Supply 71320 | | 0..1 71322 | |

FIG. 71-10

| Package | Level 1 | Level 2 | Level 3 | Level 4 | Level 5 | Cardinality | Datatype Name |
|---|---|---|---|---|---|---|---|
| | | | | | SellerParty-InternalID 71324 | 0..1 71326 | PartyIntenalID 71328 |
| | | | | | Proposed-SellerParty-InternalID 71330 | 0..1 71332 | PartyIntenalID 71334 |
| | | | | | Purchasin-gOrganisa-tionParty-InternalID 71336 | 0..1 71338 | PartyIntenalID 71340 |
| | | | | | Purchase-ContractID 71342 | 0..1 71344 | PurchaseContractID 71346 |
| | | | | | Purchase-Contrac-tItemID 71348 | 0..1 71350 | PurchaseContractItemID 71352 |

FIG. 71-11

| Package | Level 1 | Level 2 | Level 3 | Level 4 | Level 5 | Cardinality | Datatype Name |
|---|---|---|---|---|---|---|---|
| | | | | | ShipFrom-LocationID 71354 | 0..1 71356 | LocationInternalID 71358 |
| | | | | | ProductPro-curementAr-rangementID 71360 | 0..1 71362 | ProductProcurementArrange-mentID 71364 |
| Log 71366 | | Log 71368 | | | | 0..1 71370 | Log 71372 |

FIG. 72-1

| Package | Level 1 | Level 2 | Level 3 | Level 4 | Level 5 | Cardinality | Datatype Name |
|---|---|---|---|---|---|---|---|
| PurchaseRequestReleaseConfirmationMessage 72000 | PurchaseRequestReleaseConfirmationMessage 72002 | | | | | | PurchaseRequestReleaseConfirmationMessage 72004 |
| PurchaseRequest 72006 | | PurchaseRequest 72008 | | | | 0..1 72010 | |
| | | | ID 72012 | | | 1 72014 | PurchaseRequestID 72016 |
| ReleaseInformation 72018 | | | ReleaseTerms 72020 | | | 0..1 72022 | |
| | | | | PurchasingDocumentReleaseCode 72024 | | 1 72026 | PurchasingDocumentReleaseCode 72028 |

FIG. 72-2

| Package | Level 1 | Level 2 | Level 3 | Level 4 | Level 5 | Cardinality | Datatype Name |
|---|---|---|---|---|---|---|---|
| Item 72030 | | | Item 72032 | | | 0..1 72034 | |
| | | | | ID 72036 | | 1 72038 | PurchaseRequestItemID 72040 |
| ReleaseInformation 72042 | | | | ReleaseTerms 72044 | | 0..1 72046 | |
| | | | | | PurchasingDocumentReleaseCode 72048 | 1 72050 | PurchasingDocumentReleaseCode 72052 |
| Log 72054 | | Log 72056 | | | | 0..1 72058 | Log 72060 |

FIG. 73

| Package | Level 1 | Level 2 | Level 3 | Level 4 | Cardinality | Datatype Name |
|---|---|---|---|---|---|---|
| PurchaseRequestReleaseRequestMessage 73000 | PurchaseRequestReleaseRequestMessage 73002 | | | | | PurchaseRequestReleaseRequestMessage 73004 |
| PurchaseRequest 73006 | | PurchaseRequest 73008 | | | 1 73010 | |
| | | | ID 73012 | | 1 73014 | PurchaseRequestID 73016 |
| ReleaseInformation 73018 | | | ReleaseTerms 73020 | | 1 73022 | |
| | | | | PurchasingReleaseApproverCode 73024 | 1 73026 | PurchasingReleaseApproverCode 73028 |
| Item 73030 | | | Item 73032 | | 0..1 73034 | |
| | | | | ID 73036 | 1 73038 | PurchaseRequestItemID 73040 |

MANAGING CONSISTENT INTERFACES FOR PURCHASE ORDER BUSINESS OBJECTS ACROSS HETEROGENEOUS SYSTEMS

RELATED APPLICATION

This application claims the benefit of U.S. Provisional Application No. 60/848,497 filed Sep. 28, 2006, and fully incorporating the contents therein.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

Methods and systems consistent with the subject matter described herein facilitate e-commerce by providing consistent interfaces that can be used during a business transaction. Such business entities may include different companies within different industries. For example, one company may be in the chemical industry, while another company may be in the automotive industry. The business entities also may include different businesses within a given industry, or they may include different departments within a given company.

The interfaces are consistent across different industries and across different business units because they are generated using a single business object model. The business object model defines the business-related concepts at a central location for a number of business transactions. In other words, the business object model reflects the decisions made about modeling the business entities of the real world acting in business transactions across industries and business areas. The business object model is defined by the business objects and their relationships to each other (overall net structure).

A business object is a capsule with an internal hierarchical structure, behavior offered by its operations, and integrity constraints. Business objects are semantically disjointed, i.e., the same business information is represented once. The business object model contains all of the elements in the messages, user interfaces and engines for these business transactions. Each message represents a business document with structured information. The user interfaces represent the information that the users deal with, such as analytics, reporting, maintaining or controlling. The engines provide services concerning a specific topic, such as pricing or tax. Semantically related business objects may be grouped into process components that realize a certain business process. The process component exposes its functionality via enterprise services. Process components are part of the business process platform. Defined groups of process components can be deployed individually, where each of these groups is often termed a deployment unit.

Methods and systems consistent with the subject matter described herein generate interfaces from the business object model by assembling the elements that are required for a given transaction in a corresponding hierarchical manner. Because each interface is derived from the business object model, the interface is consistent with the business object model and with the other interfaces that are derived from the business object model. Moreover, the consistency of the interfaces is also maintained at all hierarchical levels. By using consistent interfaces, each business entity can easily exchange information with another business entity without the need for human interaction, thus facilitating business transactions.

Example methods and systems described herein provide an object model and, as such, derive two or more interfaces that are consistent from this object model. Further, the subject matter described herein can provide a consistent set of interfaces that are suitable for use with more than one industry. This consistency is reflected at a structural level as well as through the semantic meaning of the elements in the interfaces. Additionally, the techniques and components described herein provide a consistent set of interfaces suitable for use with different businesses. Methods and systems consistent with the subject matter described herein provide a consistent set of interfaces suitable for use with a business scenario that spans across the components within a company. These components, or business entities, may be heterogeneous.

For example, a user or a business application of any number of modules, including one may execute or otherwise implement methods that utilize consistent interfaces that, for example, query business objects, respond to the query, create/change/delete/cancel business objects, and/or confirm the particular processing, often across applications, systems, businesses, or even industries. The foregoing example computer implementable methods—as well as other disclosed processes—may also be executed or implemented by or within software. Moreover, some or all of these aspects may be further included in respective systems or other devices for identifying and utilizing consistence interfaces. For example, one system implementing consistent interfaces derived from a business object model may include memory storing a plurality of global data types and at least a subset of various deployment units Each of these deployment units include one or more business objects. These business objects include, for example, PurchaseOrder ERP and PurchaseRequest ERP. Moreover, these business objects may be involved in a message choreography that depicts one or more messages between applications that can reside in heterogeneous systems. In some cases, the messages may include data from or based on such processes represented by the business object.

In another example, the business objects may include a root node, with a plurality of data elements located directly at the root node, and one or more subordinate nodes of varying cardinality. This cardinality may be 1:1, 1:n, 1:c, 1:cn, and so forth. Each of these subordinate nodes may include it own data elements and may further include other suborindate nodes. Moreover, each node may reference any number of appropriate dependent objects.

The foregoing example computer implementable methods—as well as other disclosed processes—may also be executed or implemented by or within software. Moreover, some or all of these aspects may be further included in respective systems or other devices for creating and utilizing consistent services or interfaces. The details of these and other aspects and embodiments of the disclosure are set forth in the accompanying drawings and the description below. Other features, objects, and advantages of the various embodiments will be apparent from the description and drawings, as well as from the claims. It should be understood that the foregoing business objects in each deployment unit are for illustration purposes only and other complementary or replacement business objects may be implemented.

BRIEF DESCRIPTION OF THE DRAWINGS

FIGS. 34-1 through 34-10 show an exemplary PurchaseOrder Object Model;

FIGS. 35-1 through 35-4 show an exemplary PurchaseOrderMessage Message Data Type;

FIG. 39 shows an exemplary PurchaseOrderByIDQuery Element Structure;

FIGS. 40-1 through 40-14 show an exemplary PurchaseOrderByIDResponse Element Structure;

FIGS. 41-1 through 41-3 show an exemplary PurchaseOrderBySellerAndProductAndOrganisationalDataQuery Element Structure;

FIGS. 42-1 through 42-7 show an exemplary PurchaseOrderBySellerAndProductAndOrganisationalDataResponse Element Structure;

FIGS. 43-1 through 43-15 show an exemplary PurchaseOrderChangeConfirmation Element Structure;

FIGS. 44-1 through 44-13 show an exemplary PurchaseOrderChangeRequest Element Structure;

FIGS. 45-1 through 45-14 show an exemplary PurchaseOrderCreateConfirmation Element Structure;

FIGS. 46-1 through 46-13 show an exemplary PurchaseOrderCreateRequest Element Structure;

FIGS. 47-1 through 47-4 show an exemplary PurchaseOrderItemByAccountAssignmentQuery Element Structure;

FIGS. 48-1 through 48-18 show an exemplary PurchaseOrderItemByAccountAssignmentResponse Element Structure;

FIGS. 49-1 through 49-3 show an exemplary PurchaseOrderItemConfirmConfirmationMessage Element Structure;

FIGS. 50-1 through 50-2 show an exemplary PurchaseOrderItemConfirmRequest Element Structure;

FIGS. 51-1 through 51-17 show an exemplary PurchaseOrderMessage Element Structure;

FIGS. 53-1 through 53-6 show an exemplary PurchaseRequest Object Model;

FIG. 59 shows an exemplary PurchaseRequestByIDQueryMessage Element Structure;

FIGS. 60-1 through 60-10 show an exemplary PurchaseRequestByIDResponseMessage Element Structure;

FIGS. 61-1 through 61-2 show an exemplary PurchaseRequestByReleaseInformationQueryMessage Element Structure;

FIGS. 62-1 through 62-7 show an exemplary PurchaseRequestByReleaseInformationResponse Element Structure;

FIGS. 63-1 through 63-9 show an exemplary PurchaseRequestChangeConfirmationMessage Element Structure;

FIGS. 64-1 through 64-7 show an exemplary PurchaseRequestChangeRequestMessage Element Structure;

FIGS. 65-1 through 65-8 show an exemplary PurchaseRequestCreateConfirmationMessage Element Structure;

FIGS. 66-1 through 66-6 show an exemplary PurchaseRequestCreateRequestMessage Element Structure;

FIGS. 67-1 through 67-3 show an exemplary PurchaseRequestItemByAccountAssignmentIDQueryMessage Element Structure;

FIGS. 68-1 through 68-10 show an exemplary PurchaseRequestItemByAccountAssignmentResponseMessage Element Structure;

FIGS. 69-1 through 69-2 show an exemplary PurchaseRequestItemByProductAndOrganisationalDataQueryMessage Element Structure;

FIGS. 70-1 through 70-6 show an exemplary PurchaseRequestItemByProductAndOrganisationalDataResponseMessage Element Structure;

FIGS. 71-1 through 71-11 show an exemplary PurchaseRequestMessage Element Structure;

FIGS. 72-1 through 72-2 show an exemplary PurchaseRequestReleaseConfirmationMessage Element Structure; and FIG. 73 shows an exemplary PurchaseRequestReleaseRequestMessage Element Structure.

DETAILED DESCRIPTION

A. Overview

Figure 1:
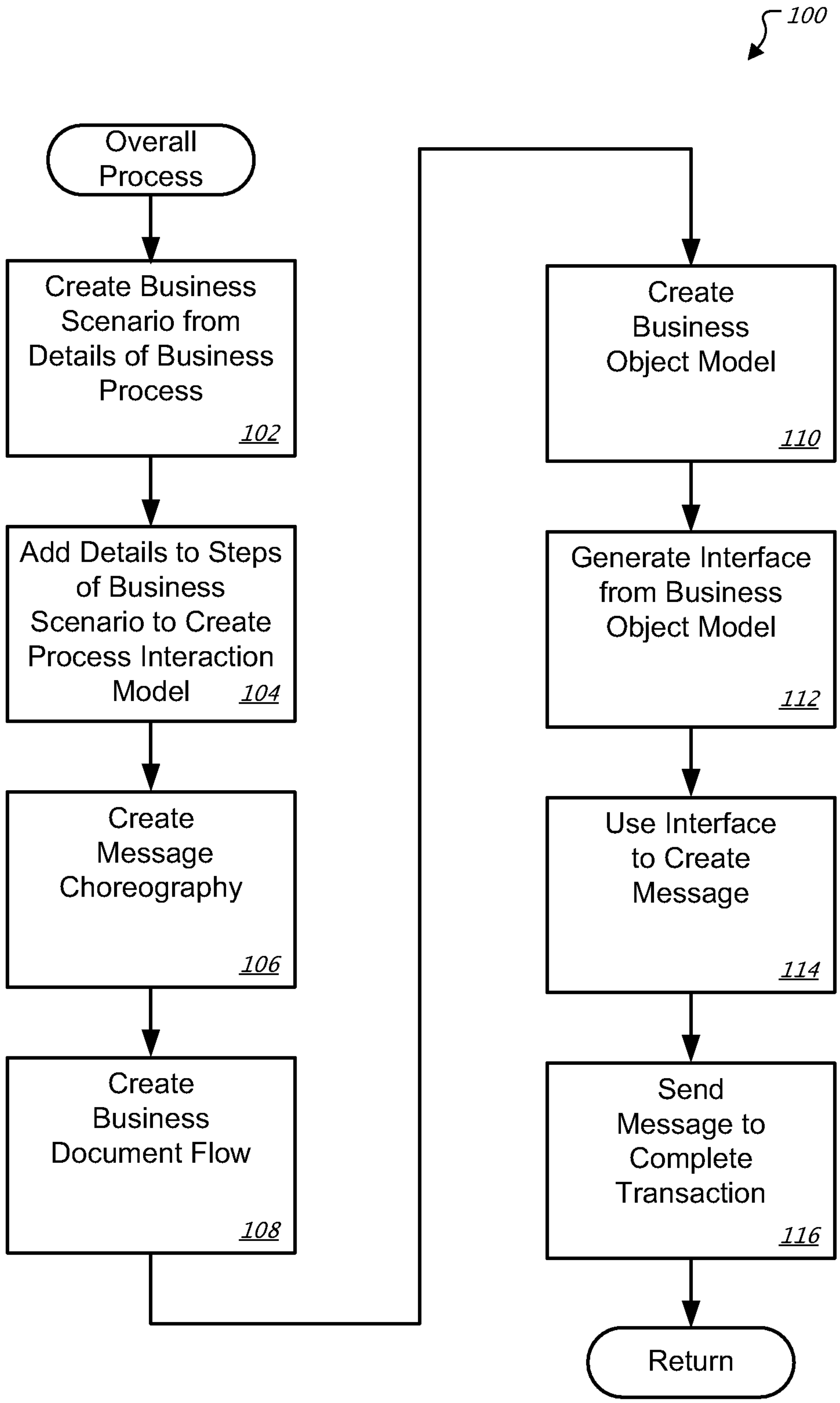
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a "create", "update", or "delete" of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

Figure 2:
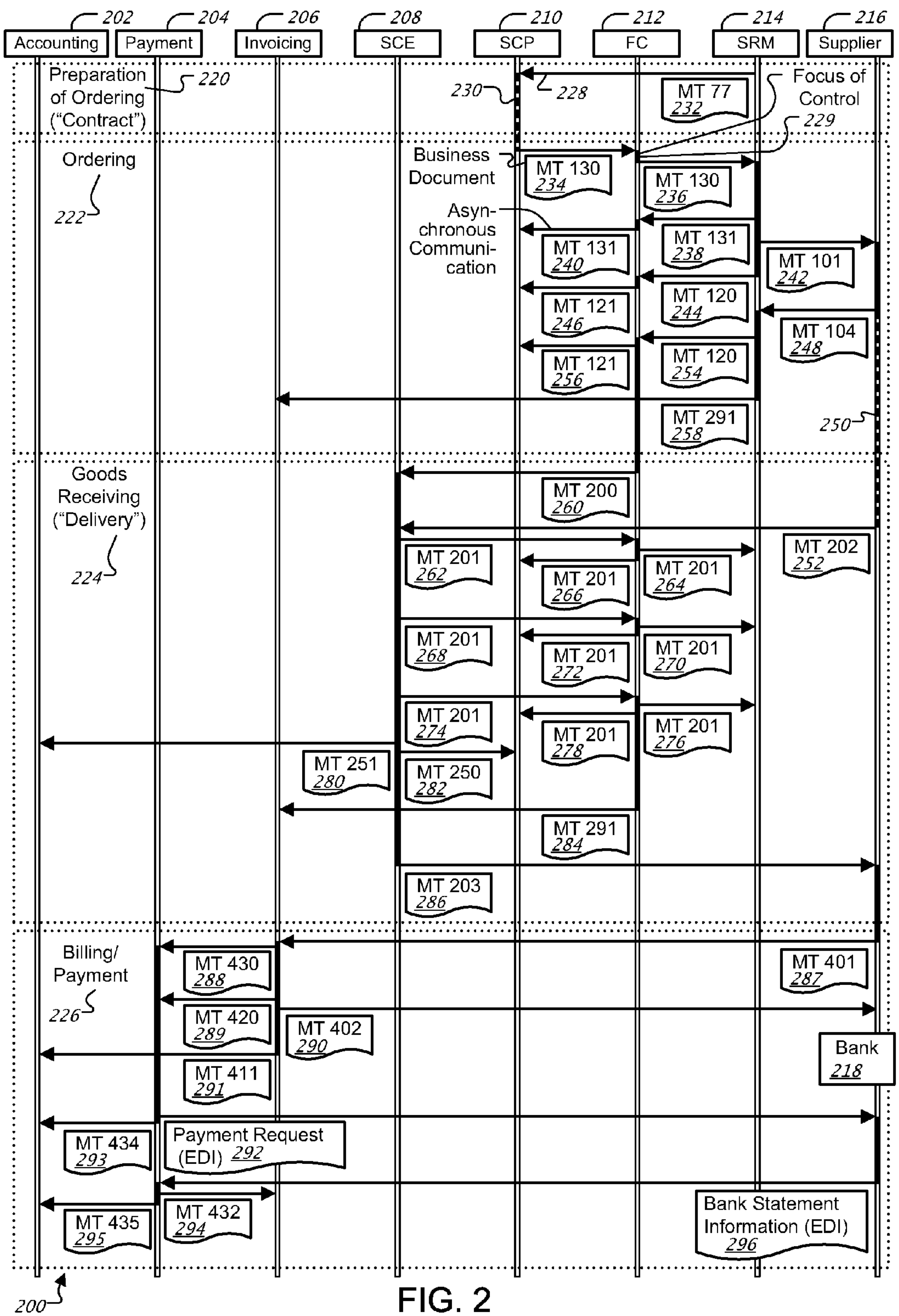
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
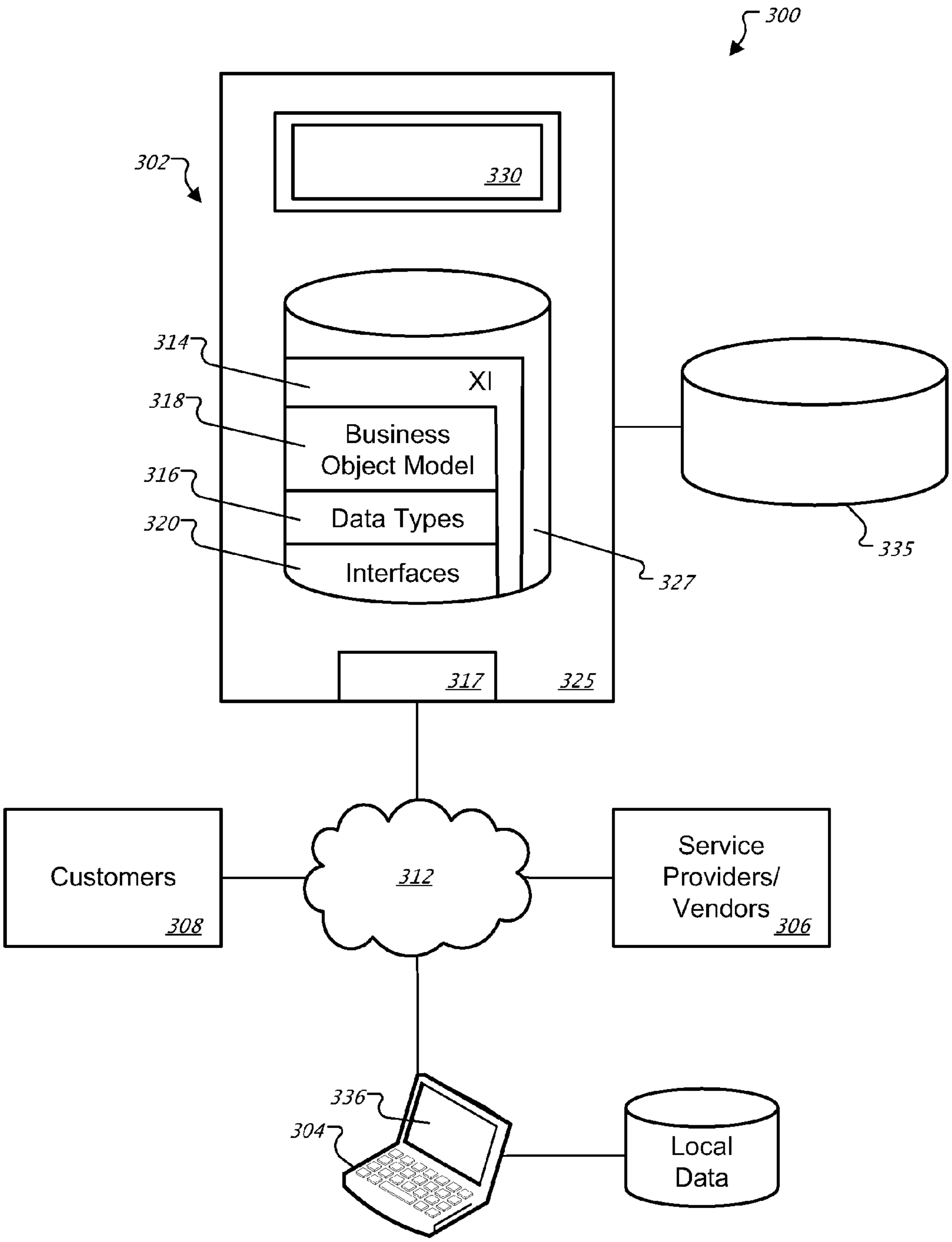
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3 provides merely one example of computers that may be used with the disclosure. Each computer is generally intended to encompass any suitable processing device. For example, although FIG. 3 illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or off-shore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and JavA environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3 illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
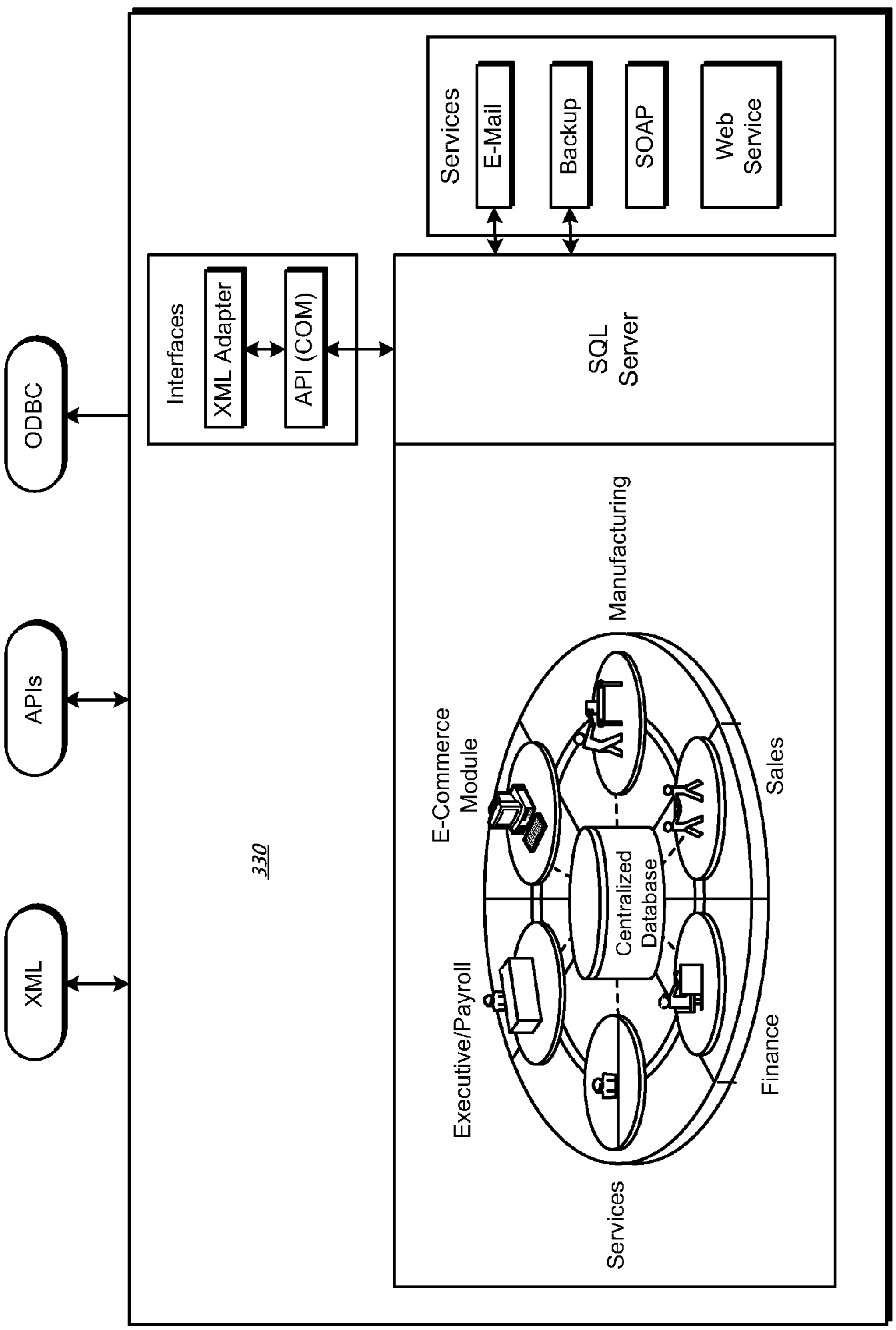
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 130 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface.

Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
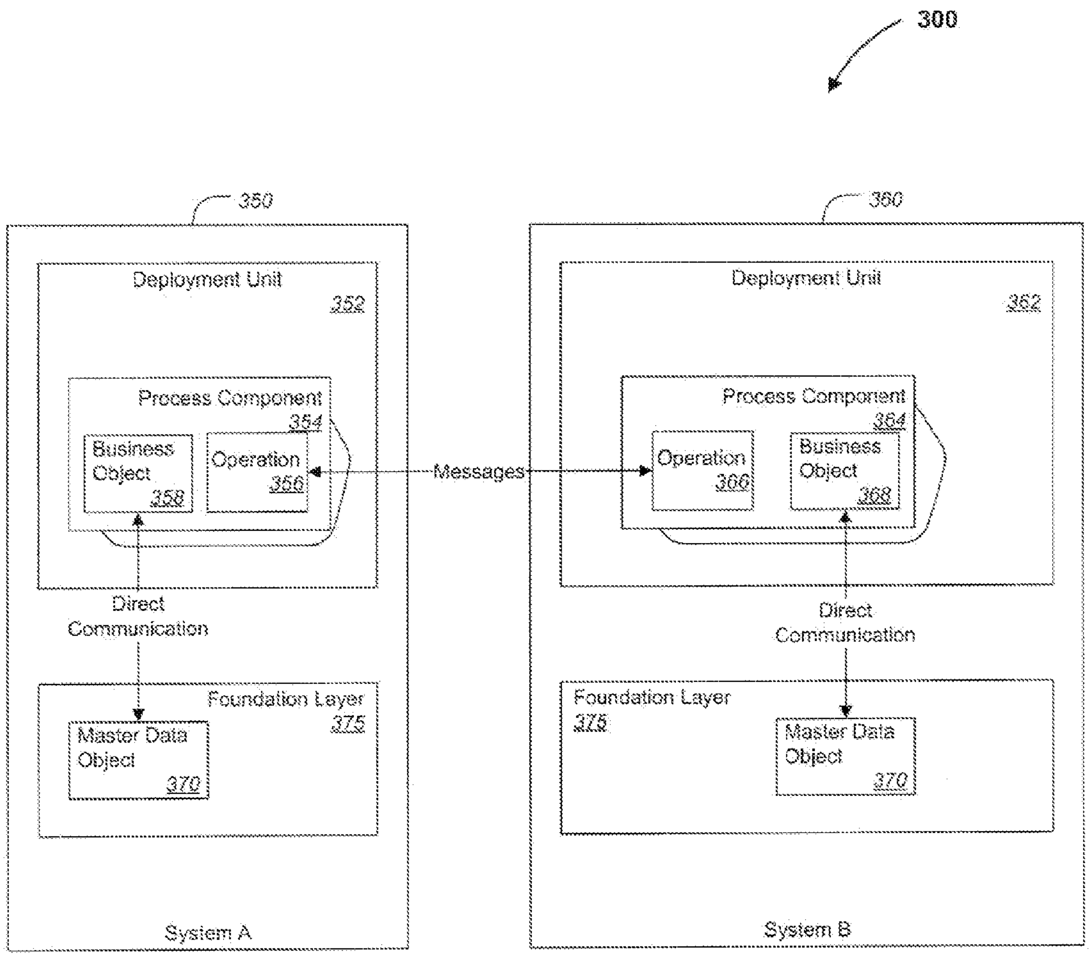

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Figure 5A:
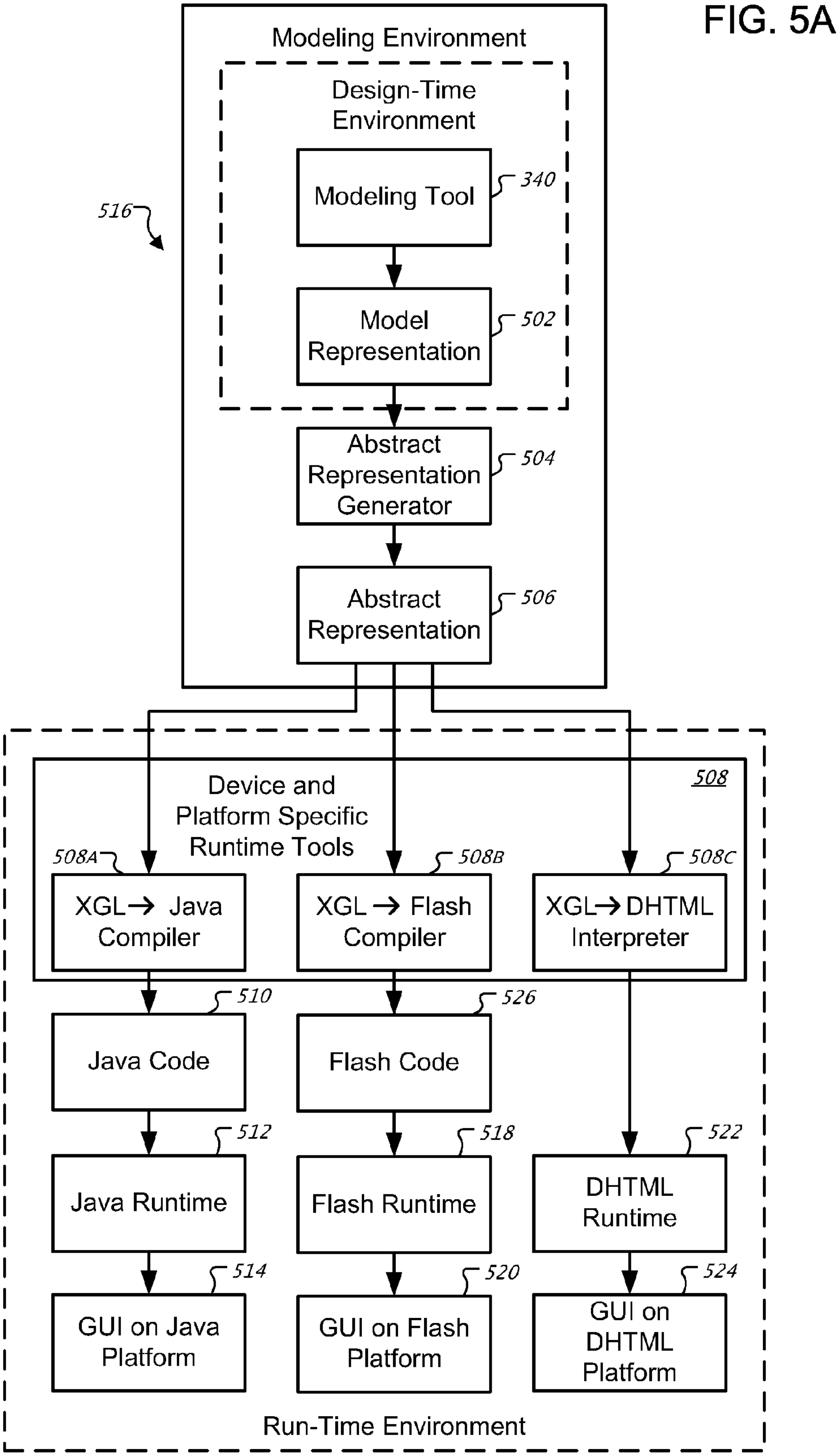
FIG. 5A depicts an example development environment in accordance with one embodiment of FIG. 1.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding. FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment.

Asshown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508*a* may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508*b* may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508*c* may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
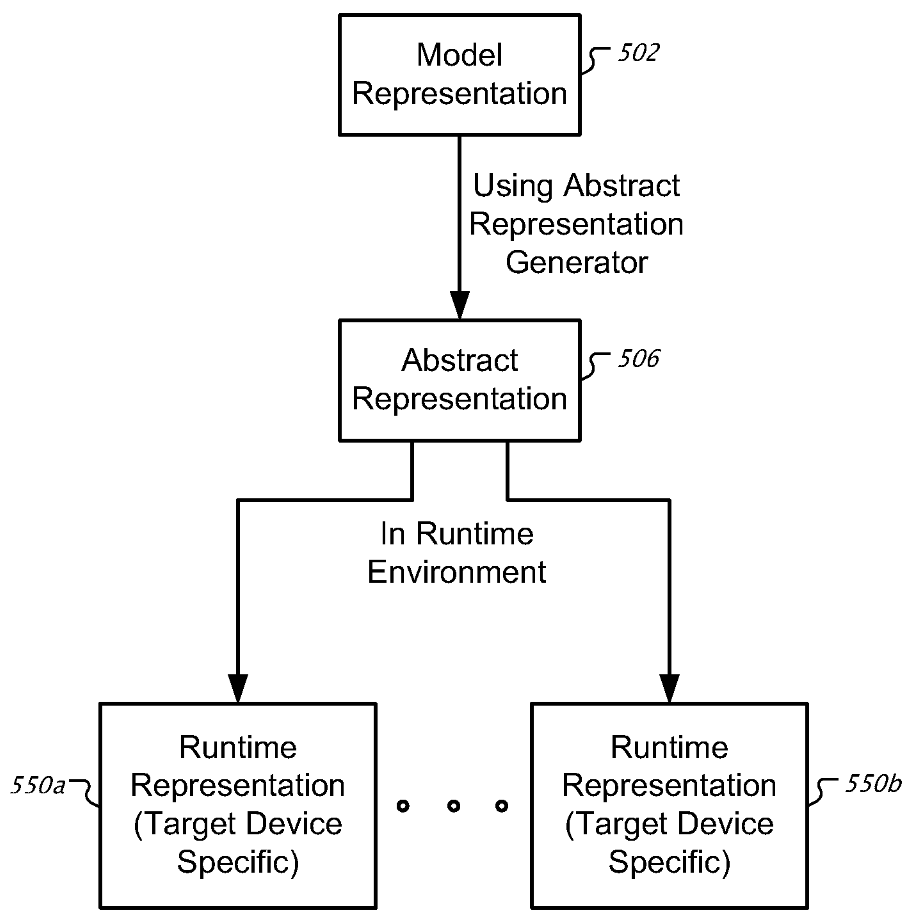
FIG. 5B depicts a simplified process for mapping a model representation to a runtime representation using the example development environment of FIG. 4A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

Figure 6:
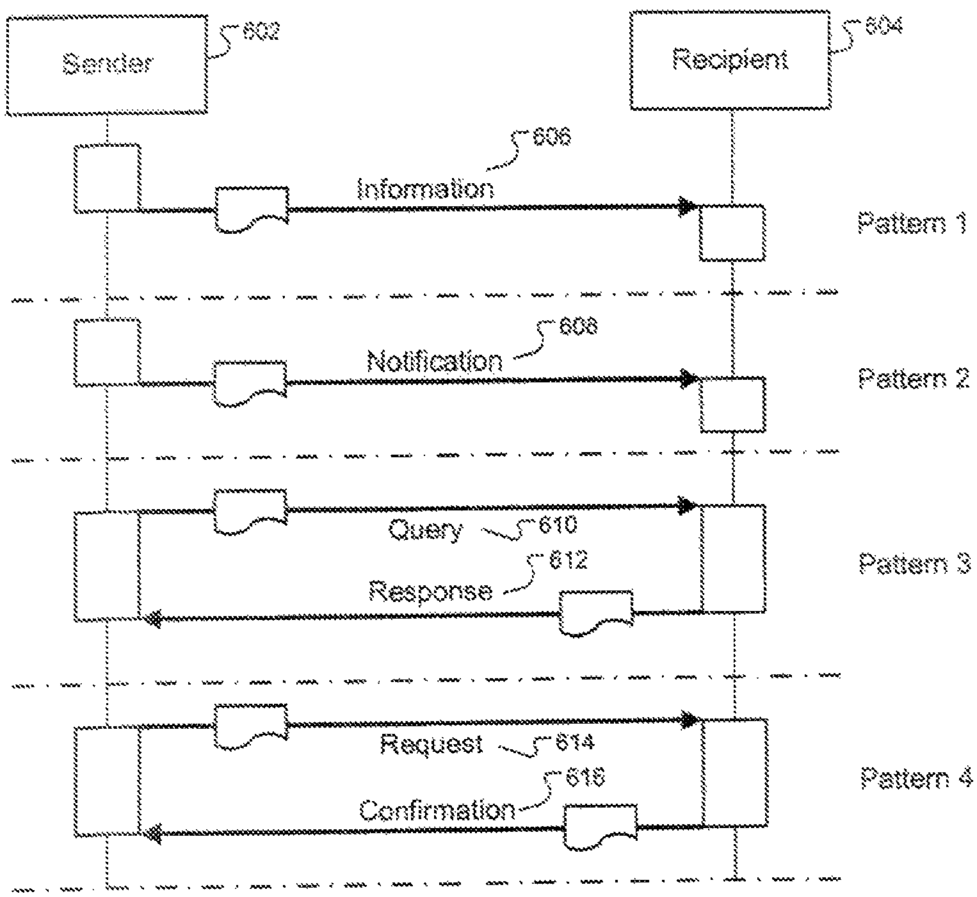
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include "sub"-packages, i.e., the packages may be nested.

Figure 7:
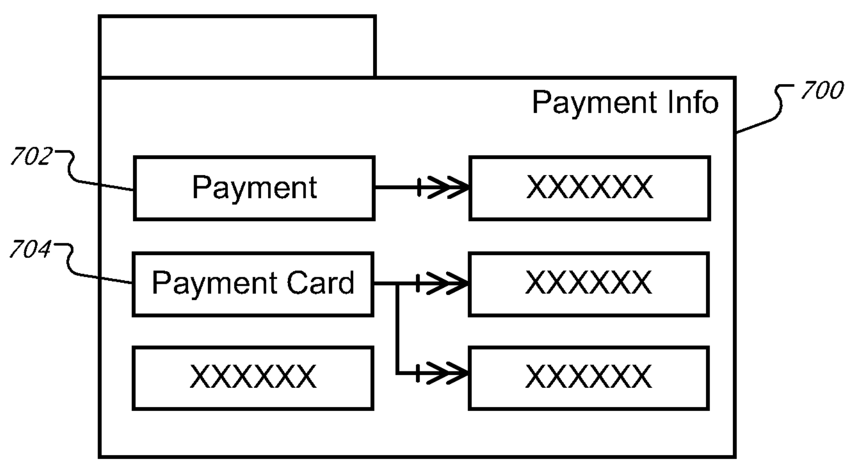
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
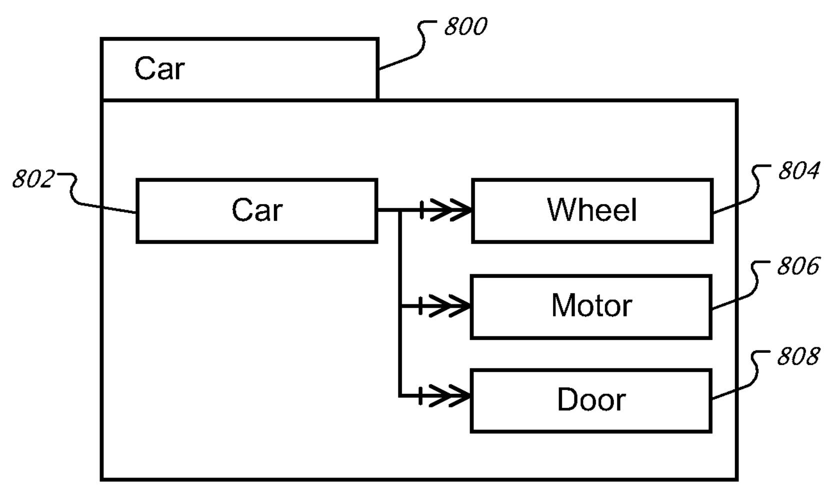
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
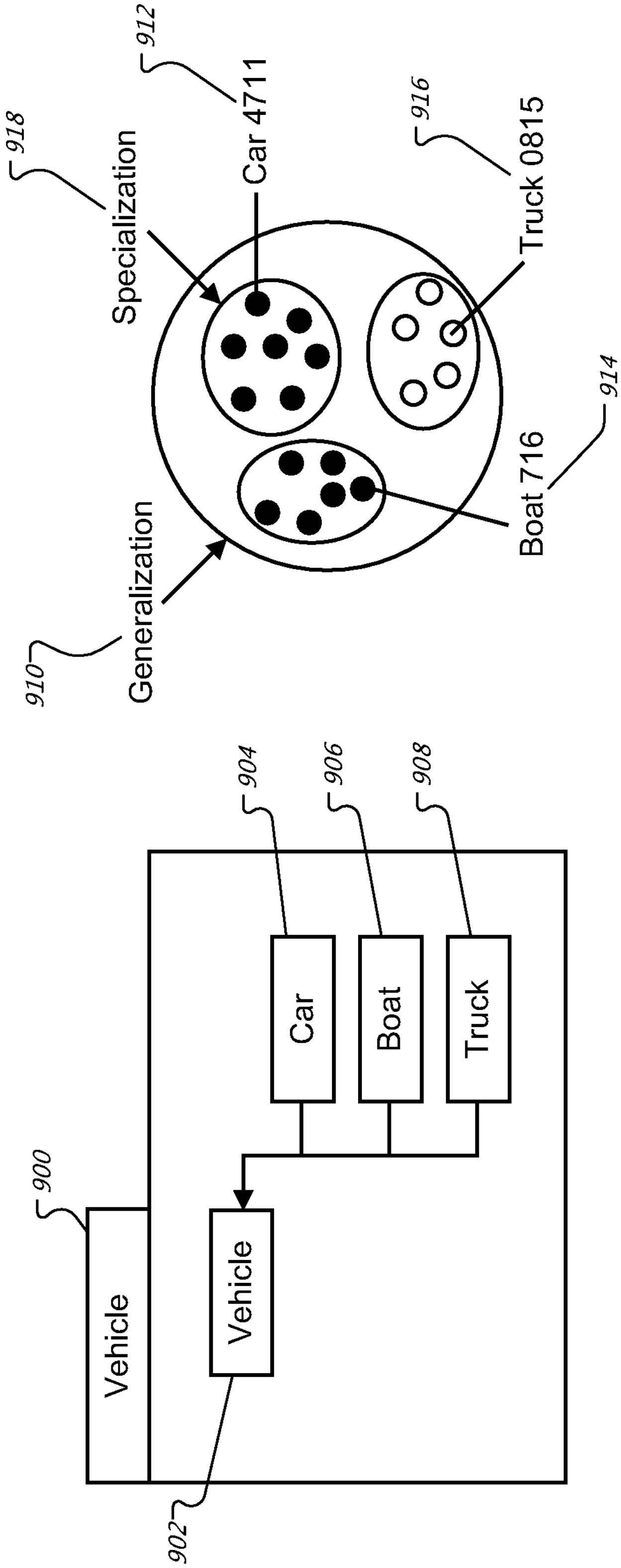
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
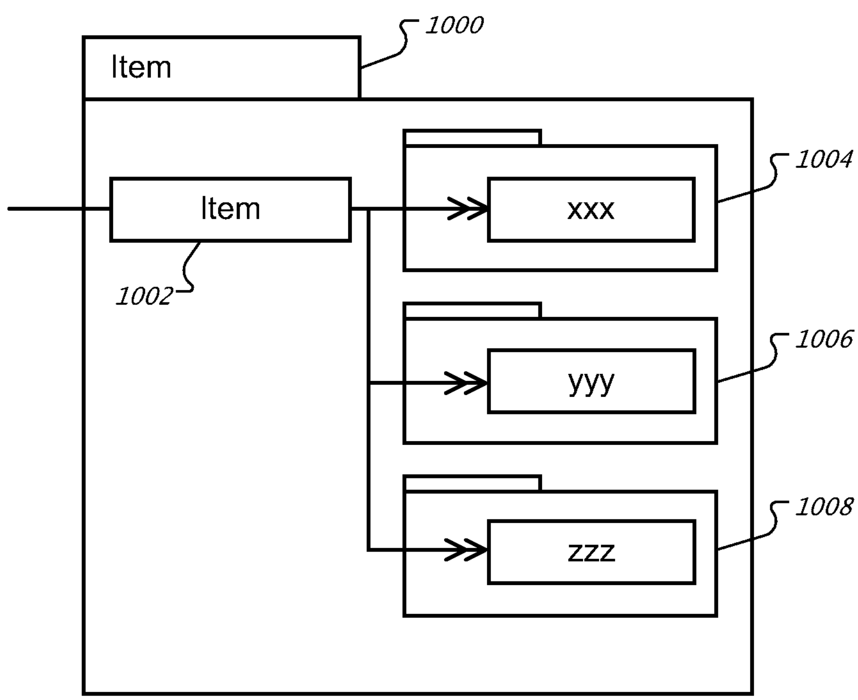
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
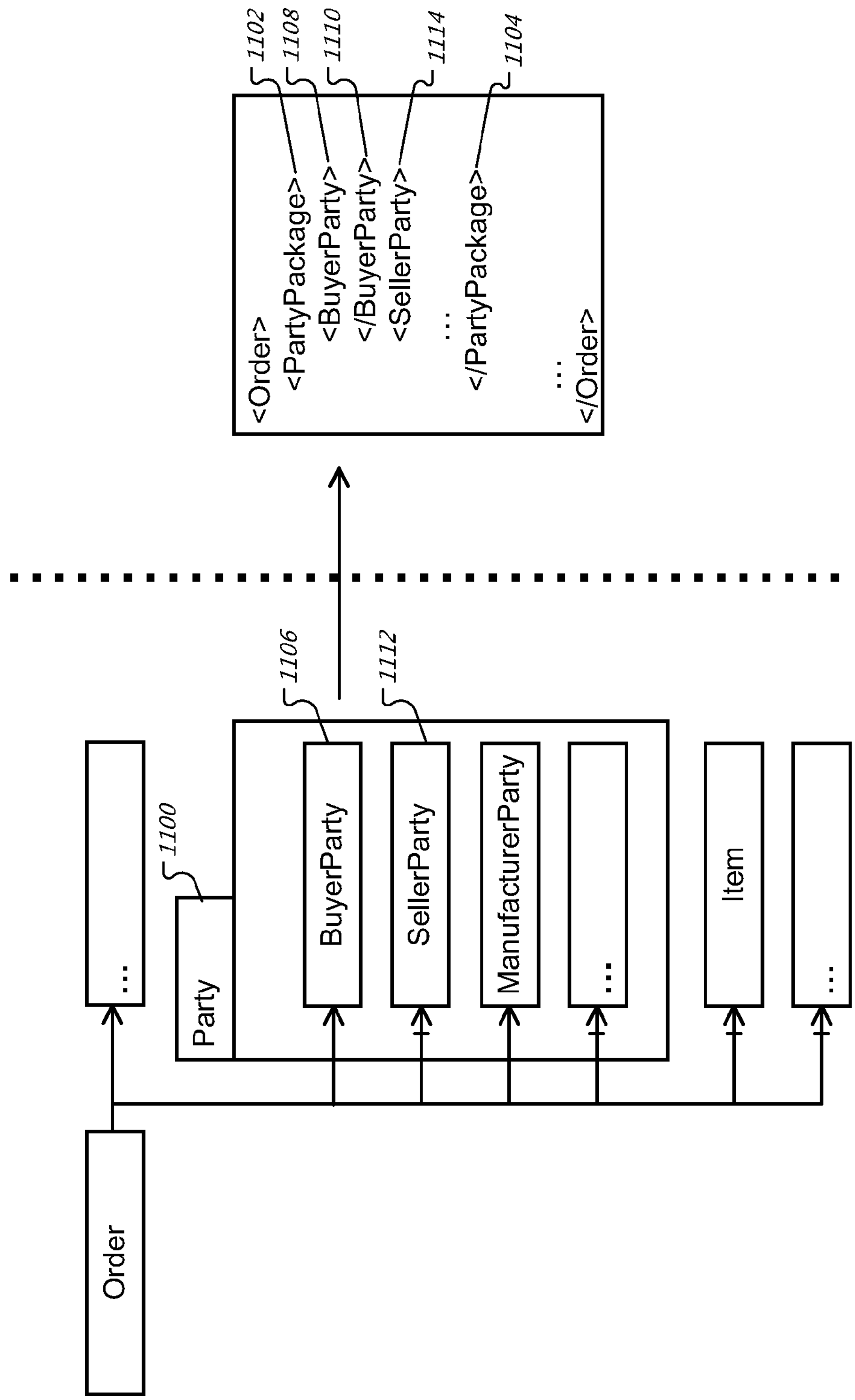
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

Figure 12:
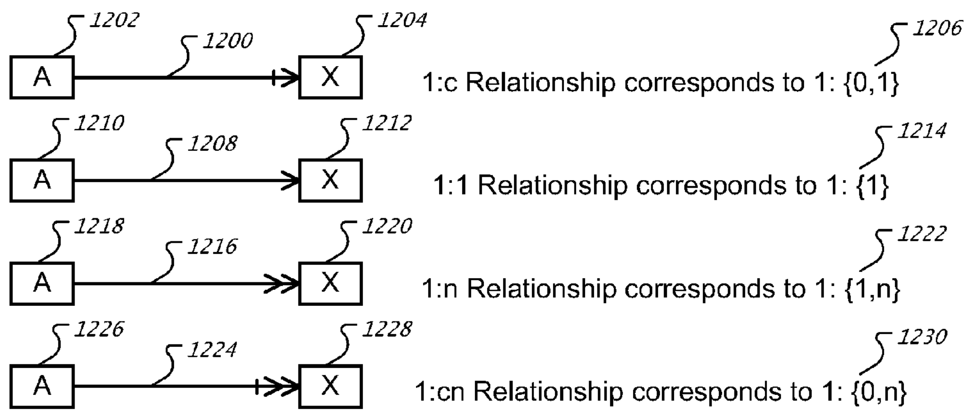
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

Figure 13:
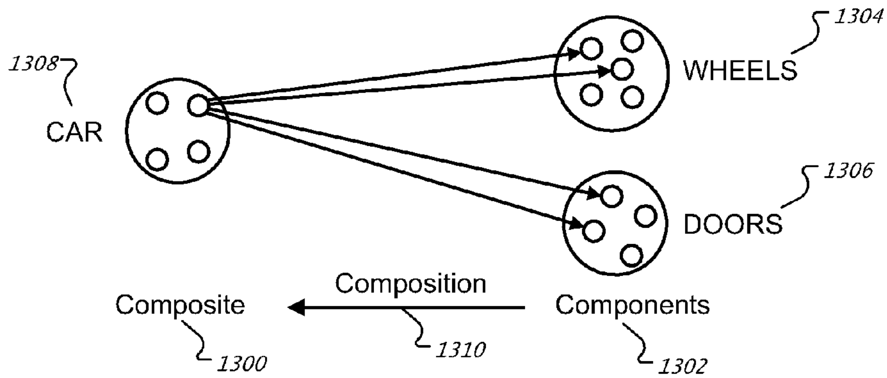
FIG. 13 depicts an example of a composition in accordance with methods and systems consistent with the subject matter described herein.
Figure 14:
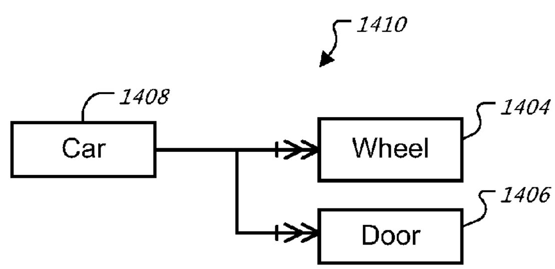
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

Figure 15:
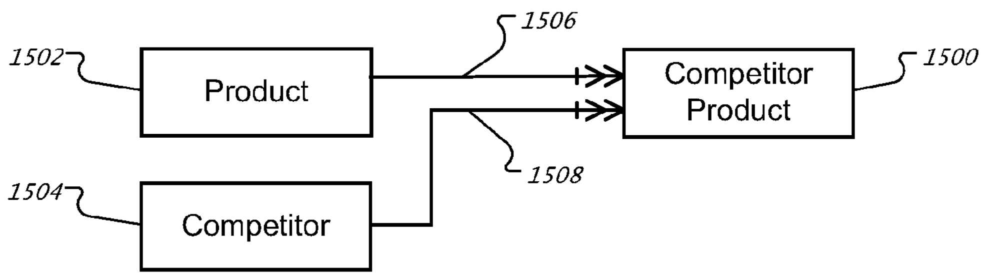
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

Figure 16:
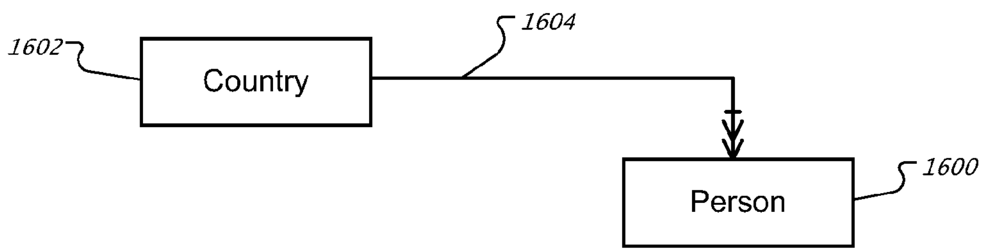
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(3) Specialization

Figure 17:
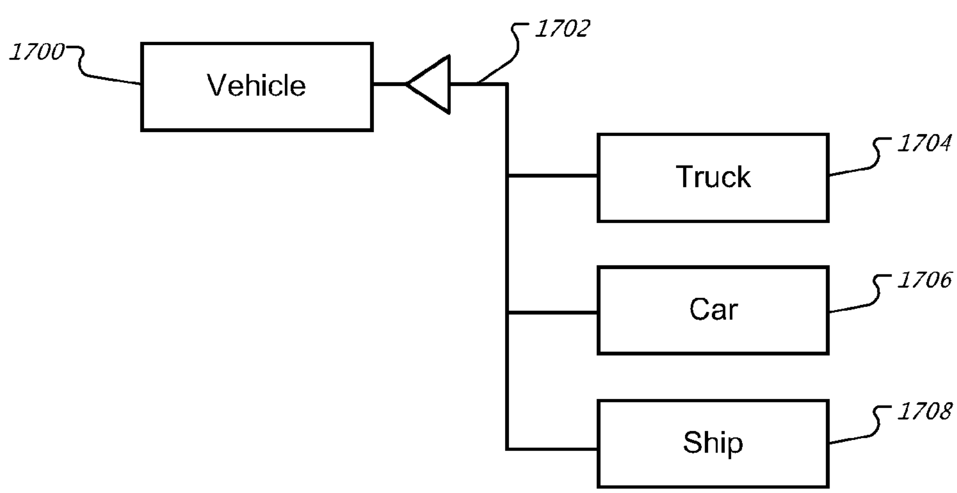
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
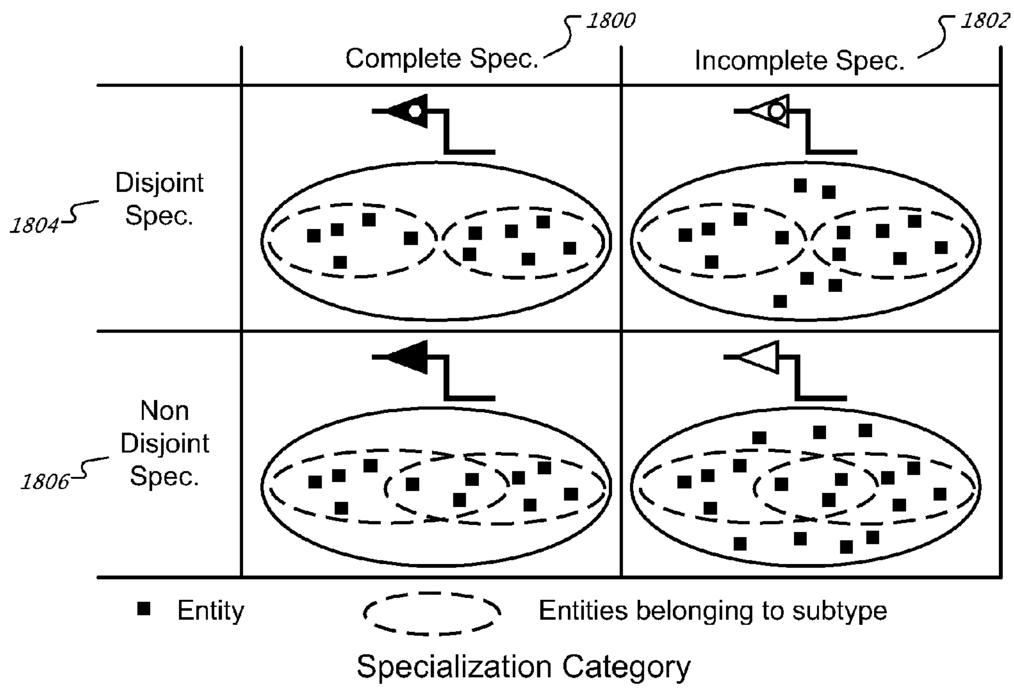
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(2) Hierarchy

Figure 19:
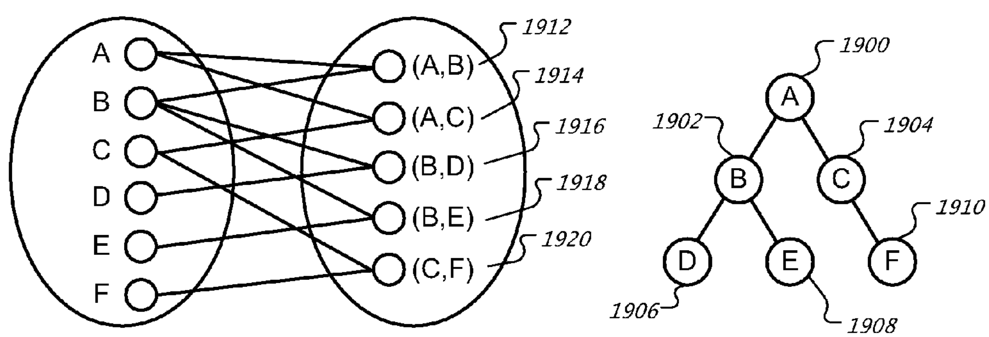
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
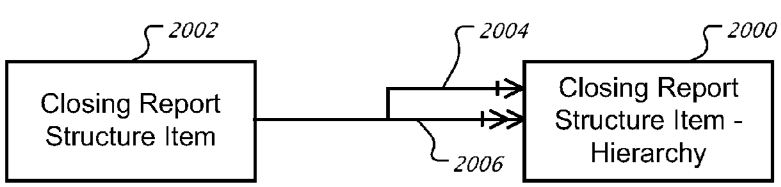
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
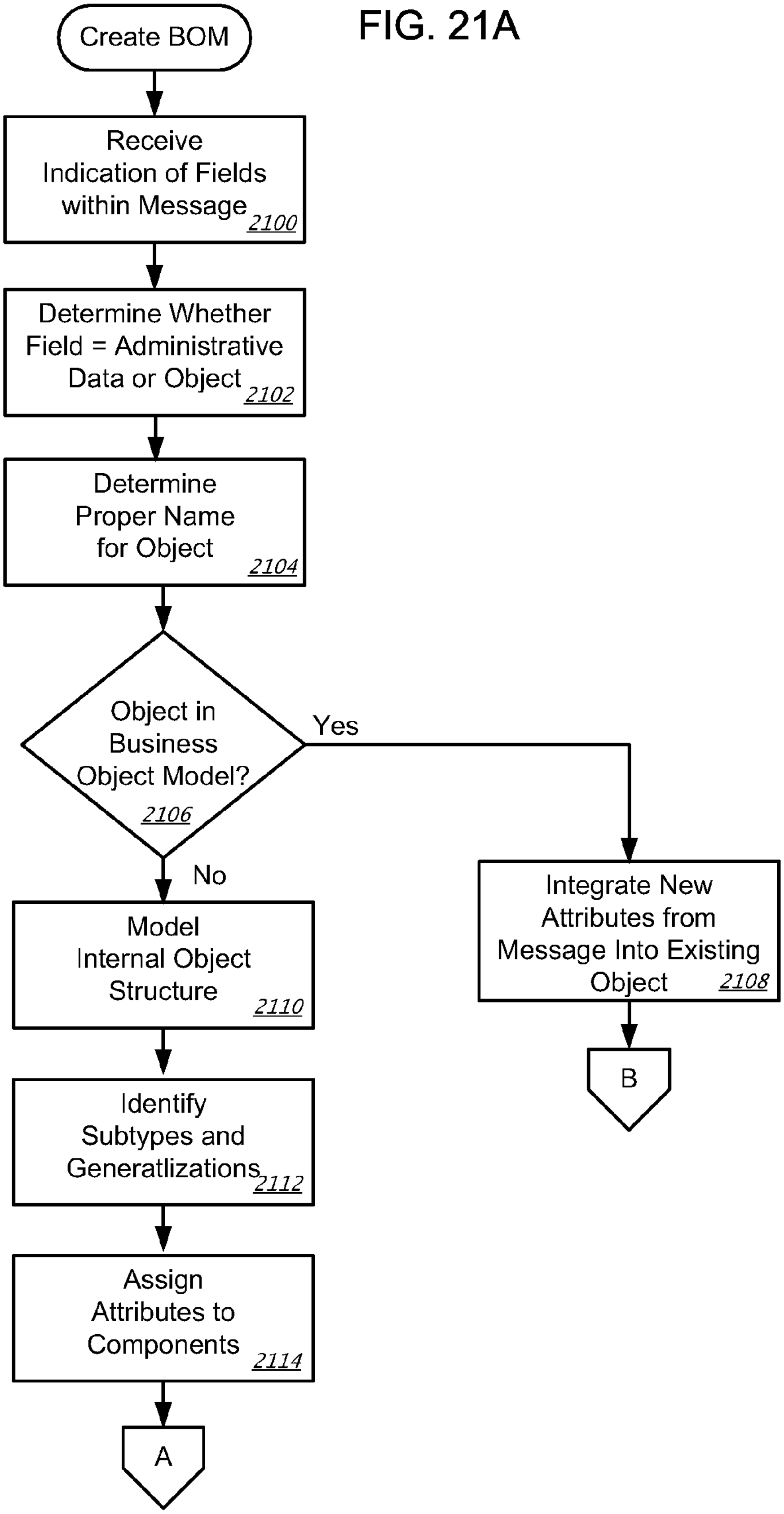
FIGS. 21A-B depict a flow diagram of the steps performed to create a business object model in accordance with methods and systems consistent with the subject matter described herein.
Figure 21B:
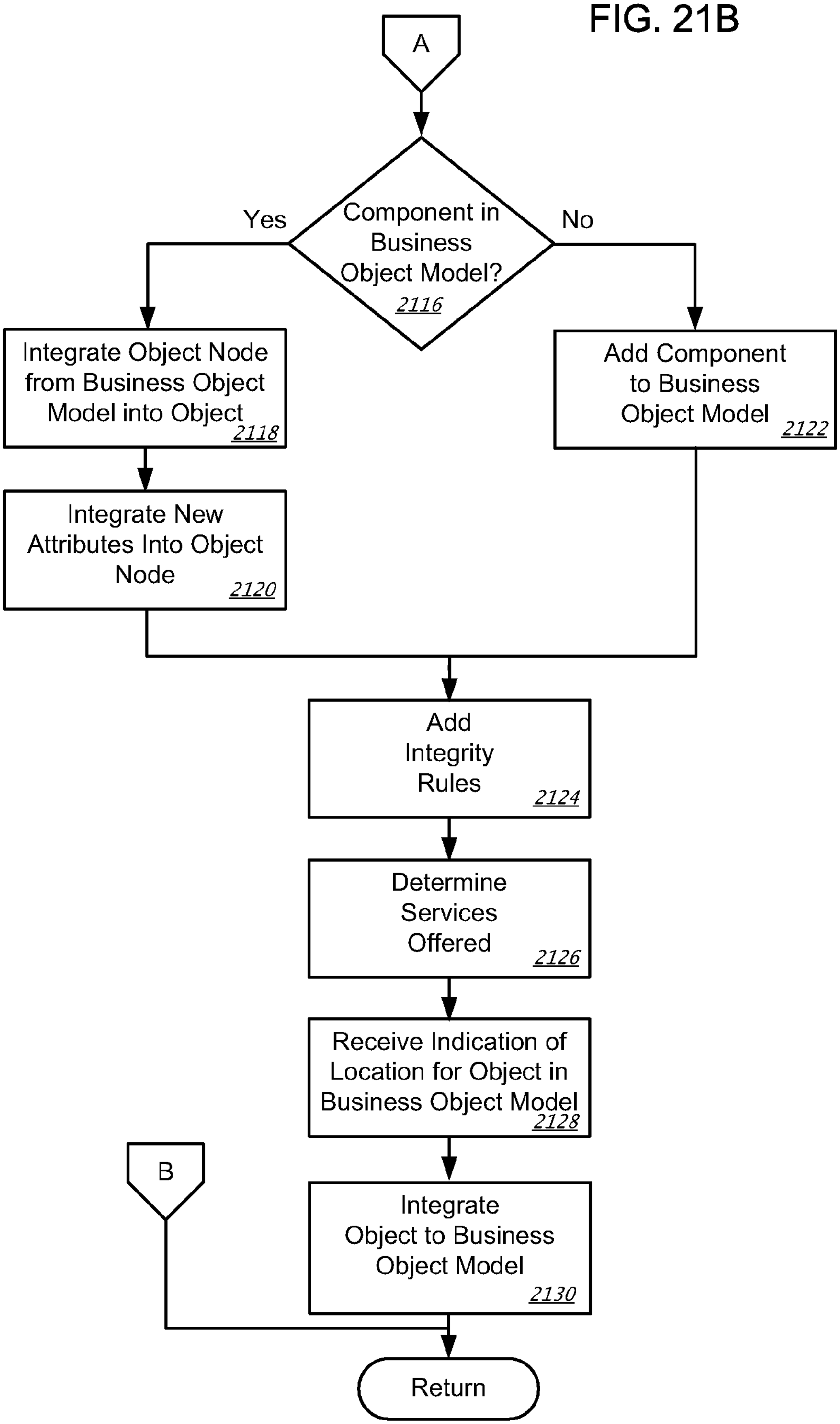

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission | |
| Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |
| DeliveryPriority | |
| DeliveryCondition | |
| TransferLocation | |
| NumberofPartialDelivery | |
| QuantityTolerance | |
| MaximumLeadTime | |
| TransportServiceLevel | |
| TransportCondition | |
| TransportDescription | |
| CashDiscountTerms | |
| PaymentForm | |
| PaymentCardID | |
| PaymentCardReferenceID | |
| SequenceID | |
| Holder | |
| ExpirationDate | |
| AttachmentID | |
| AttachmentFilename | |
| DescriptionofMessage | |
| ConfirmationDescriptionof | |
| Message | |
| FollowUpActivity | |
| ItemID | |

-continued

| |
|---|
| ParentItemID |
| HierarchyType |
| ProductID |
| ProductType |
| ProductNote |
| ProductCategoryID |
| Amount |
| BaseQuantity |
| ConfirmedAmount |
| ConfirmedBaseQuantity |
| ItemBuyer |
| ItemBuyerOrganisationName |
| Person Name |
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTransportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | | |
|---|---|---|---|
| ID | Purchase | | |
| AdditionalID | Order | | |
| PostingDate | | | |
| LastChangeDate | | | |
| AcceptanceStatus | | | |
| Note | | | |
| CompleteTransmission | | | |
| Indicator | | | |
| Buyer | | Buyer | |
| BuyerOrganisationName | | | |
| Person Name | | | |
| FunctionalTitle | | | |
| DepartmentName | | | |
| CountryCode | | | |
| StreetPostalCode | | | |
| POBox Postal Code | | | |
| Company Postal Code | | | |
| City Name | | | |
| DistrictName | | | |
| PO Box ID | | | |
| PO Box Indicator | | | |
| PO Box Country Code | | | |
| PO Box Region Code | | | |
| PO Box City Name | | | |
| Street Name | | | |
| House ID | | | |
| Building ID | | | |
| Floor ID | | | |
| Room ID | | | |
| Care Of Name | | | |
| AddressDescription | | | |
| Telefonnumber | | | |
| MobileNumber | | | |
| Facsimile | | | |
| Email | | | |
| Seller | | Seller | |
| SellerAddress | | | |
| Location | | Location | |
| LocationType | | | |
| DeliveryItemGroupID | | DeliveryTerms | |
| DeliveryPriority | | | |
| DeliveryCondition | | | |
| TransferLocation | | | |
| NumberofPartialDelivery | | | |
| QuantityTolerance | | | |
| MaximumLeadTime | | | |
| TransportServiceLevel | | | |
| TransportCondition | | | |
| TransportDescription | | | |
| CashDiscountTerms | | | |
| PaymentForm | | Payment | |
| PaymentCardID | | | |
| PaymentCardReferenceID | | | |
| SequenceID | | | |
| Holder | | | |
| ExpirationDate | | | |
| AttachmentID | | | |
| AttachmentFilename | | | |
| DescriptionofMessage | | | |
| ConfirmationDescriptionof | | | |
| Message | | | |
| FollowUpActivity | | | |
| ItemID | | Purchase | |
| ParentItemID | | Order | |
| HierarchyType | | Item | |
| ProductID | | | Product |
| ProductType | | | |
| ProductNote | | | |
| ProductCategoryID | | | ProductCategory |
| Amount | | | |
| BaseQuantity | | | |
| ConfirmedAmount | | | |
| ConfirmedBaseQuantity | | | |
| ItemBuyer | | | Buyer |
| ItemBuyerOrganisation | | | |

-continued

| | |
|---|---|
| Name | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | Seller |
| ItemSellerAddress | |
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial Delivery | |
| ItemQuantityTolerance | |
| ItemMaximumLeadTime | |
| ItemTransportServiceLevel | |
| ItemTransportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| Purchase-Order | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscount-Terms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation Description | | | 0 . . . 1 |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | Netunit-Price | 0 . . . 1 |
| | | ConfirmedPrice | | 0 . . . 1 |
| | | | Netunit-Price | 0 . . . 1 |
| | | Buyer | | 0 . . . 1 |
| | | Seller | | 0 . . . 1 |
| | | Location | | 0 . . . 1 |
| | | DeliveryTerms | | 0 . . . 1 |
| | | Attachment | | 0 . . . n |
| | | Description | | 0 . . . 1 |
| | | ConfirmationDescription | | 0 . . . 1 |
| | | ScheduleLine | | 0 . . . n |
| | | | Delivery-Period | 1 |
| | | ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| PurchaseOrder | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |

-continued

| | | | |
|---|---|---|---|
| Location | | | |
| | ShipToLocation | | 0 . . . 1 |
| | | Address | 0 . . . 1 |
| | ShipFromLocation | | 0 . . . 1 |
| | | Address | 0 . . . 1 |
| DeliveryTerms | | | 0 . . . 1 |
| | Incoterms | | 0 . . . 1 |
| | PartialDelivery | | 0 . . . 1 |
| | QuantityTolerance | | 0 . . . 1 |
| | Transport | | 0 . . . 1 |
| CashDiscount Terms | | | 0 . . . 1 |
| | MaximumCash Discount | | 0 . . . 1 |
| | NormalCashDiscount | | 0 . . . 1 |
| PaymentForm | | | 0 . . . 1 |
| | PaymentCard | | 0 . . . 1 |
| Attachment | | | 0 . . . n |
| Description | | | 0 . . . 1 |
| Confirmation | | | 0 . . . 1 |
| Description | | | |
| Item | | | 0 . . . n |
| | HierarchyRelationship | | 0 . . . 1 |
| | Product | | 0 . . . 1 |
| | ProductCategory | | 0 . . . 1 |
| | Price | | 0 . . . 1 |
| | | NetunitPrice | 0 . . . 1 |
| | ConfirmedPrice | | 0 . . . 1 |
| | | NetunitPrice | 0 . . . 1 |
| | Party | | |
| | | BuyerParty | 0 . . . 1 |
| | | SellerParty | 0 . . . 1 |
| | Location | | |
| | | ShipTo Location | 0 . . . 1 |
| | | ShipFrom Location | 0 . . . 1 |
| | DeliveryTerms | | 0 . . . 1 |
| | Attachment | | 0 . . . n |
| | Description | | 0 . . . 1 |
| | Confirmation | | 0 . . . 1 |
| | Description | | |
| | ScheduleLine | | 0 . . . n |
| | | Delivery Period | 1 |
| | ConfirmedScheduleLine | | 0 . . . n |

After identifying the subtypes and generalizations, the developers assign the attributes to these components (step 2114). The attributes for a portion of the components are shown below.

| | | | | |
|---|---|---|---|---|
| Purchase Order | | | | 1 |
| | ID | | | 1 |
| | SellerID | | | 0. . .1 |
| | BuyerPosting DateTime | | | 0. . .1 |
| | BuyerLast ChangeDate Time | | | 0. . .1 |
| | SellerPosting DateTime | | | 0. . .1 |
| | SellerLast ChangeDate Time | | | 0. . .1 |
| | Acceptance StatusCode | | | 0. . .1 |
| | Note | | | 0. . .1 |
| | ItemList Complete Transmission Indicator | | | 0. . .1 |
| | BuyerParty | | | 0. . .1 |

-continued

| | | | |
|---|---|---|---|
| | StandardID | | 0. . .n |
| | BuyerID | | 0. . .1 |
| | SellerID | | 0. . .1 |
| | Address | | 0. . .1 |
| | ContactPerson | | 0. . .1 |
| | | BuyerID | 0. . .1 |
| | | SellerID | 0. . .1 |
| | | Address | 0. . .1 |
| SellerParty | | | 0. . .1 |
| Product RecipientParty | | | 0. . .1 |
| VendorParty | | | 0. . .1 |
| Manufacturer Party | | | 0. . .1 |
| BillToParty | | | 0. . .1 |
| PayerParty | | | 0. . .1 |
| CarrierParty | | | 0. . .1 |
| ShipTo Location | | | 0. . .1 |
| | StandardID | | 0. . .n |
| | BuyerID | | 0. . .1 |
| | SellerID | | 0. . .1 |
| | Address | | 0. . .1 |
| ShipFrom Location | | | 0. . .1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. Communication between components takes place via messages that contain business documents. The business document ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object. The interface represents a usage-specific, hierarchical view of the underlying usage-neutral object model.

Figure 27A:
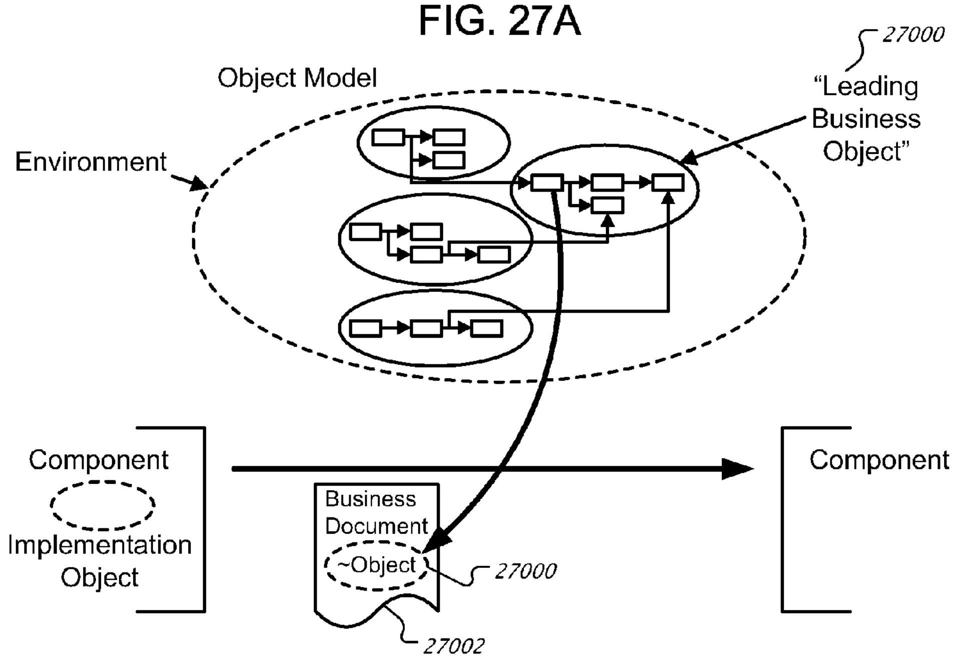
FIGS. 27A-E depict a hierarchization process in accordance with methods and systems consistent with the subject matter described herein.
Figure 27B:
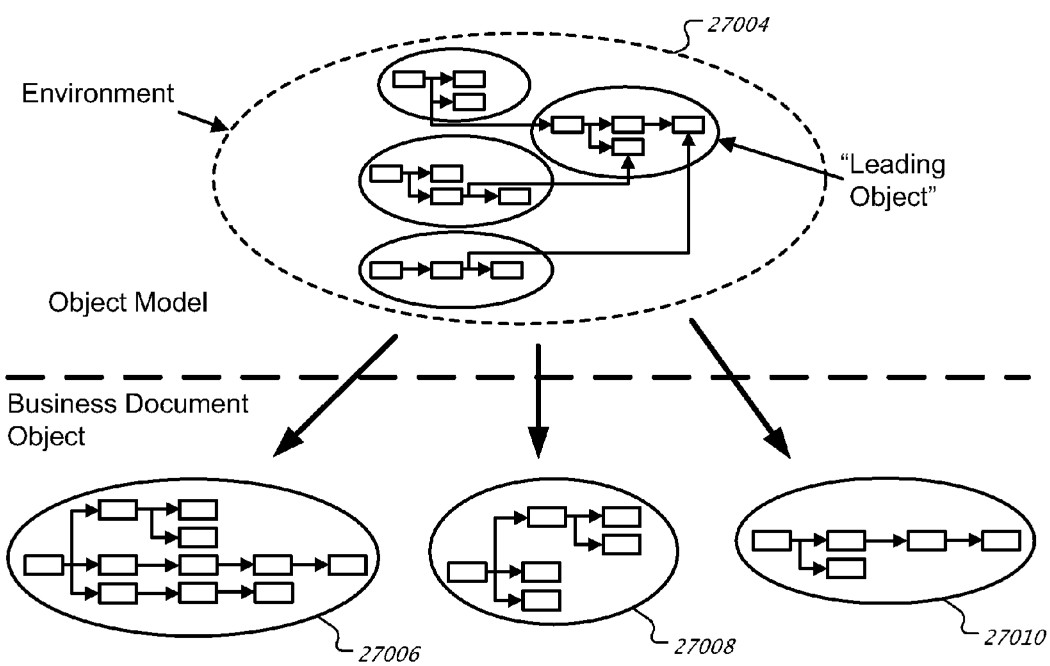

As illustrated in FIG. 27B, several business document objects 27006, 27008, and 27010 as overlapping views may be derived for a given leading object 27004. Each business document object results from the object model by hierarchization.

Figure 27C:
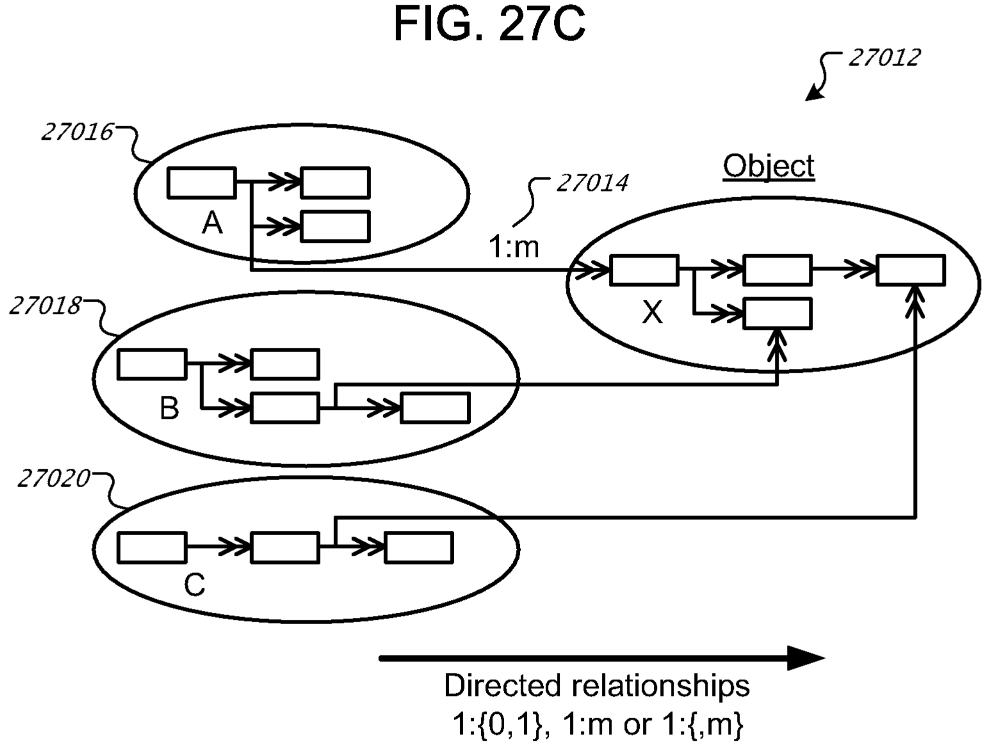

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
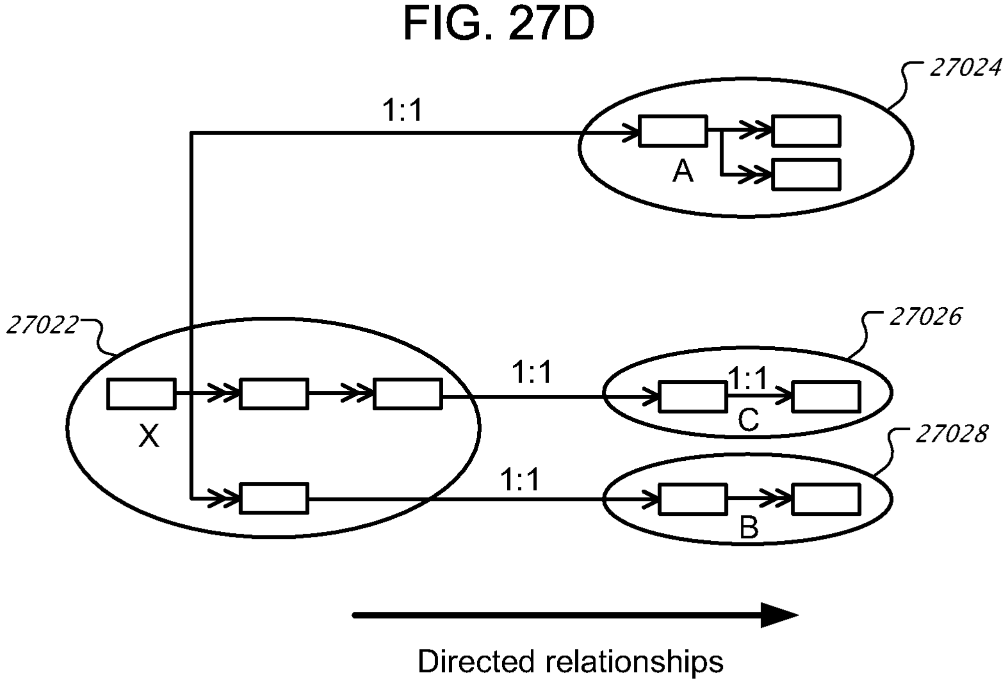

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

Figure 27E:
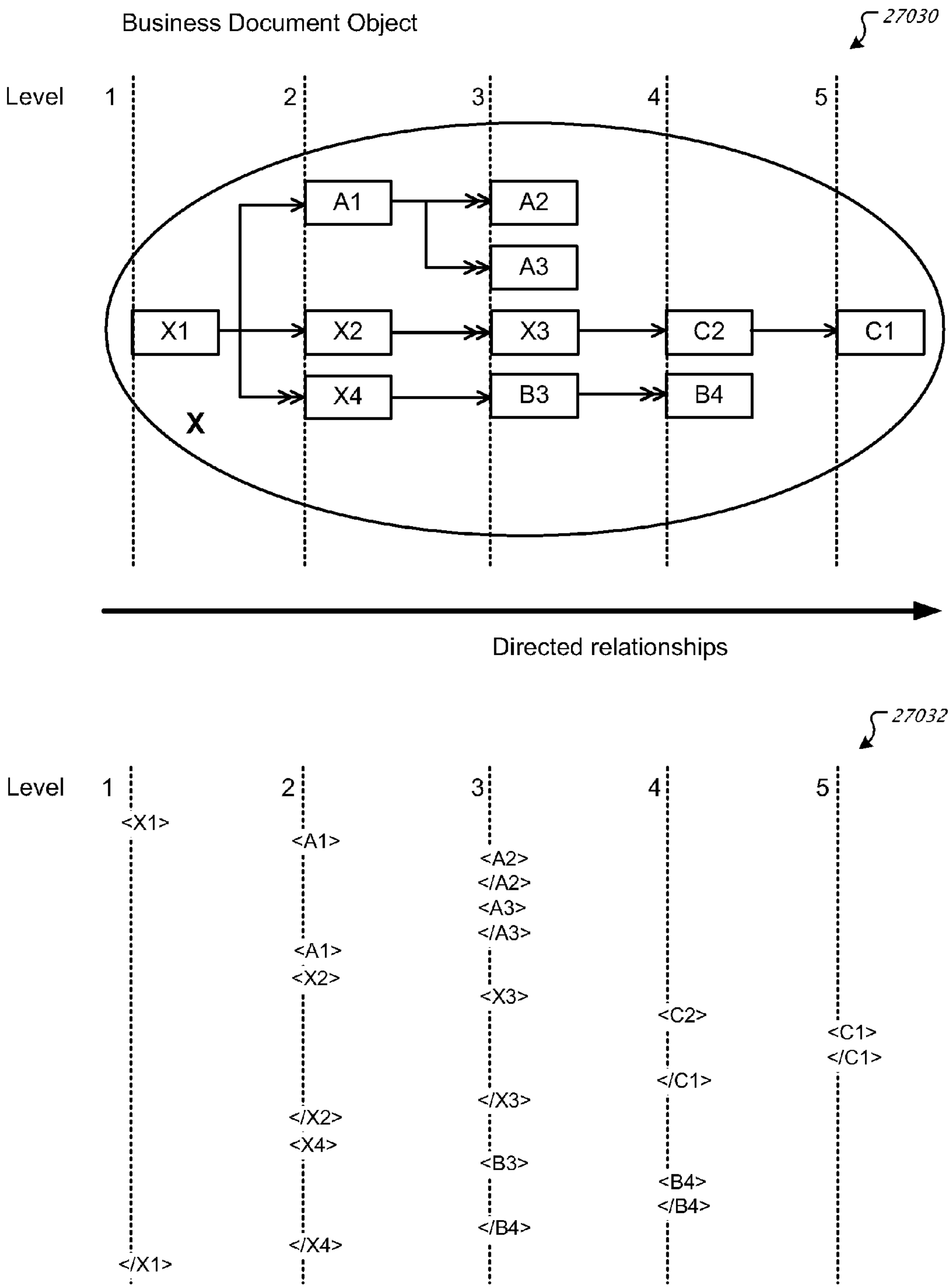

FIG. 27E depicts the business document object X 27030 created by this hierarchization process. Asshown, the arrangement of the elements corresponds to their dependency levels, which directly leads to a corresponding representation as an XML structure 27032.

The following provides certain rules that can be adopted singly or in combination with regard to the hierarchization process:

- A business document object always refers to a leading business document object and is derived from this object.
- The name of the root entity in the business document entity is the name of the business object or the name of a specialization of the business object or the name of a service specific view onto the business object.
- The nodes and elements of the business object that are relevant (according to the semantics of the associated message type) are contained as entities and elements in the business document object.
- The name of a business document entity is predefined by the name of the corresponding business object node. The name of the superordinate entity is not repeated in the name of the business document entity. The "full" semantic name results from the concatenation of the entity names along the hierarchical structure of the business document object.
- The structure of the business document object is, except for deviations due to hierarchization, the same as the structure of the business object.
- The cardinalities of the business document object nodes and elements are adopted identically or more restrictively to the business document object.
- An object from which the leading business object is dependent can be adopted to the business document object. For this arrangement, the relationship is inverted, and the object (or its parts, respectively) are hierarchically subordinated in the business document object.
- Nodes in the business object representing generalized business information can be adopted as explicit entities to the business document object (generally speaking, multiply TypeCodes out). When this adoption occurs, the entities are named according to their more specific semantic (name of TypeCode becomes prefix).
  - Party nodes of the business object are modeled as explicit entities for each party role in the business document object. These nodes are given the name <Prefix><Party Role> Party, for example, BuyerParty, ItemBuyerParty.
  - BTDReference nodes are modeled as separate entities for each reference type in the business document object. These nodes are given the name <Qualifier><BO><Node> Reference, for example SalesOrderReference, OriginSalesOrderReference, SalesOrderItemReference.
  - A product node in the business object comprises all of the information on the Product, ProductCategory, and Batch. This information is modeled in the business document object as explicit entities for Product, ProductCategory, and Batch.
- Entities which are connected by a 1:1 relationship as a result of hierarchization can be combined to a single entity, if they are semantically equivalent. Such a combination can often occurs if a node in the business document object that results from an assignment node is removed because it does not have any elements.
- The message type structure is typed with data types.
  - Elements are typed by GDTs according to their business objects.
  - Aggregated levels are typed with message type specific data types (Intermediate Data Types), with their names being built according to the corresponding paths in the message type structure.
  - The whole message type structured is typed by a message data type with its name being built according to the root entity with the suffix "Message".
- For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
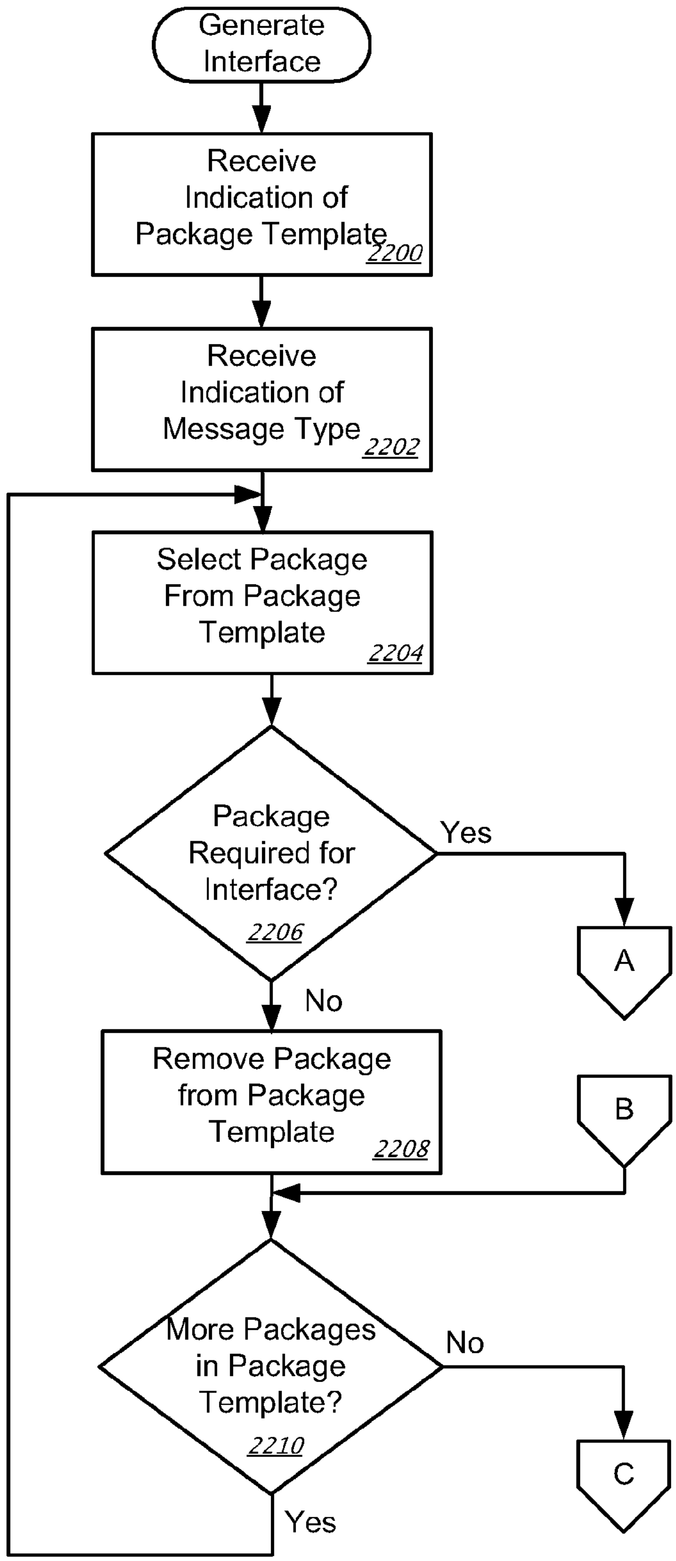
FIGS. 22A-F depict a flow diagram of the steps performed to generate an interface from the business object model in accordance with methods and systems consistent with the subject matter described herein.
Figure 22B:
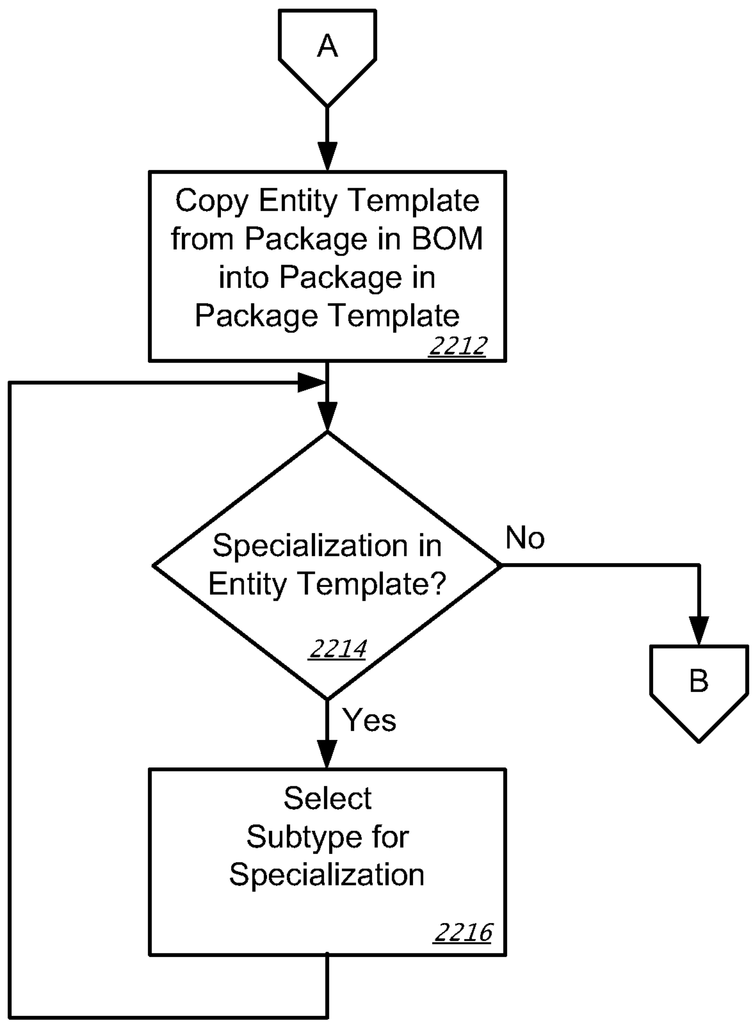
Figure 22C:
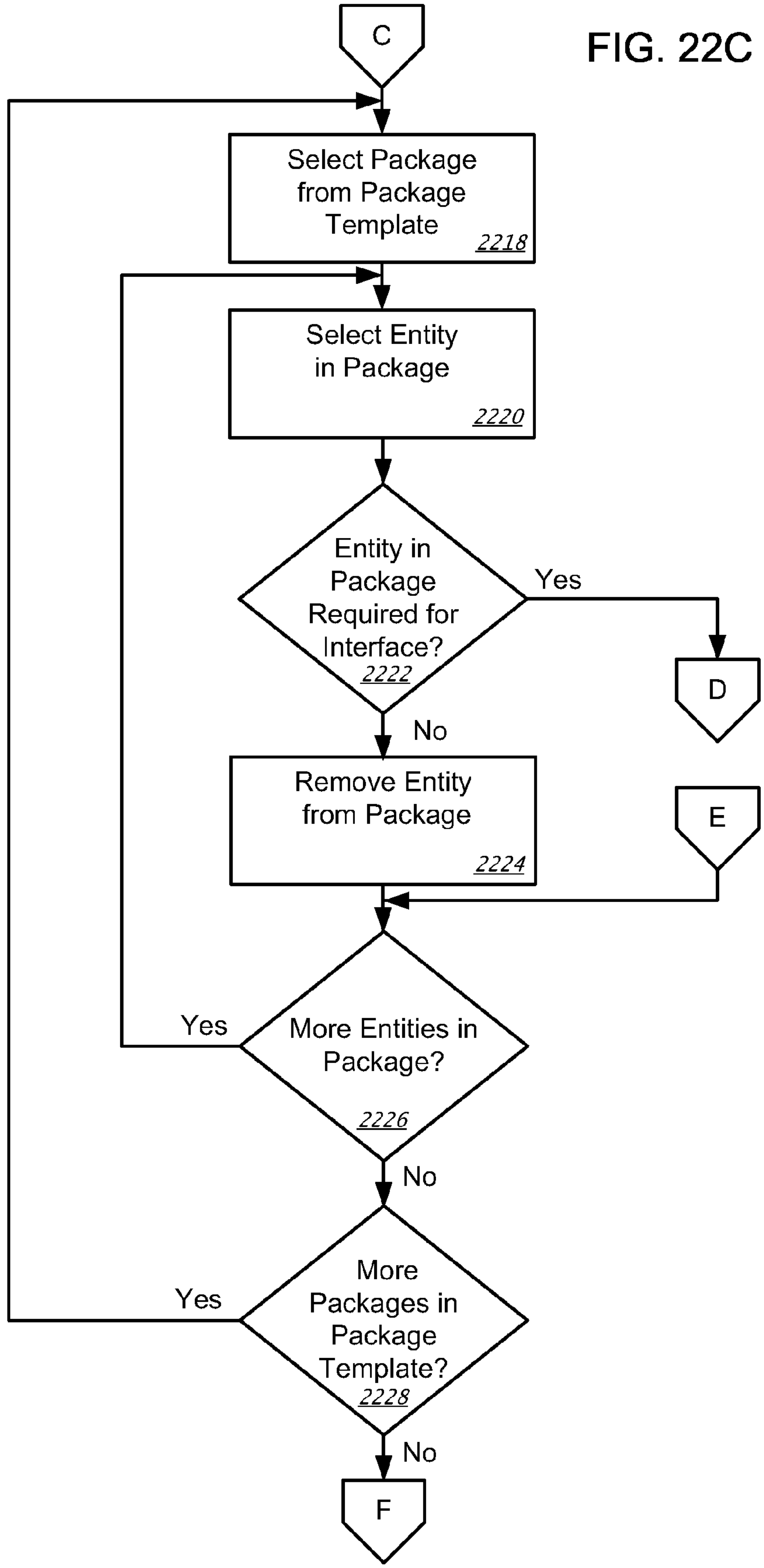

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
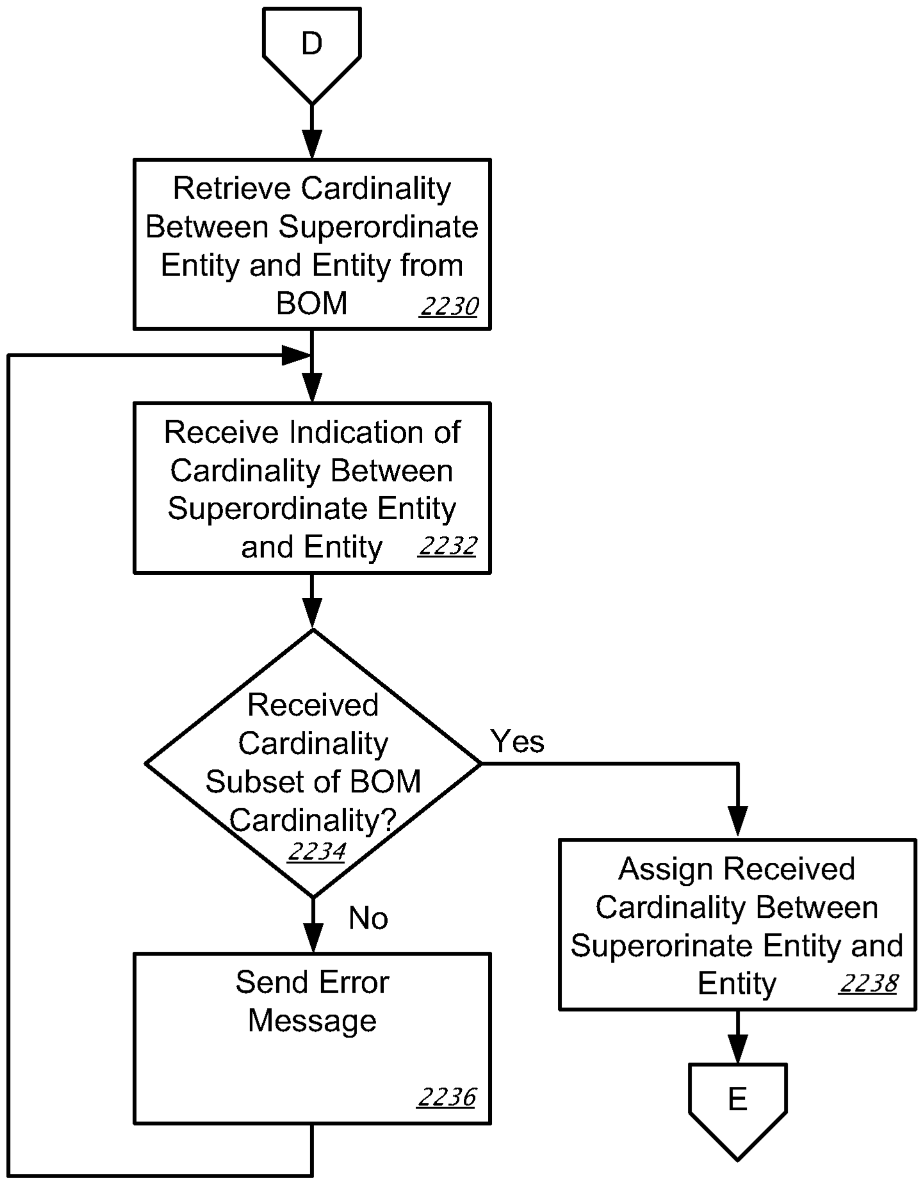

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
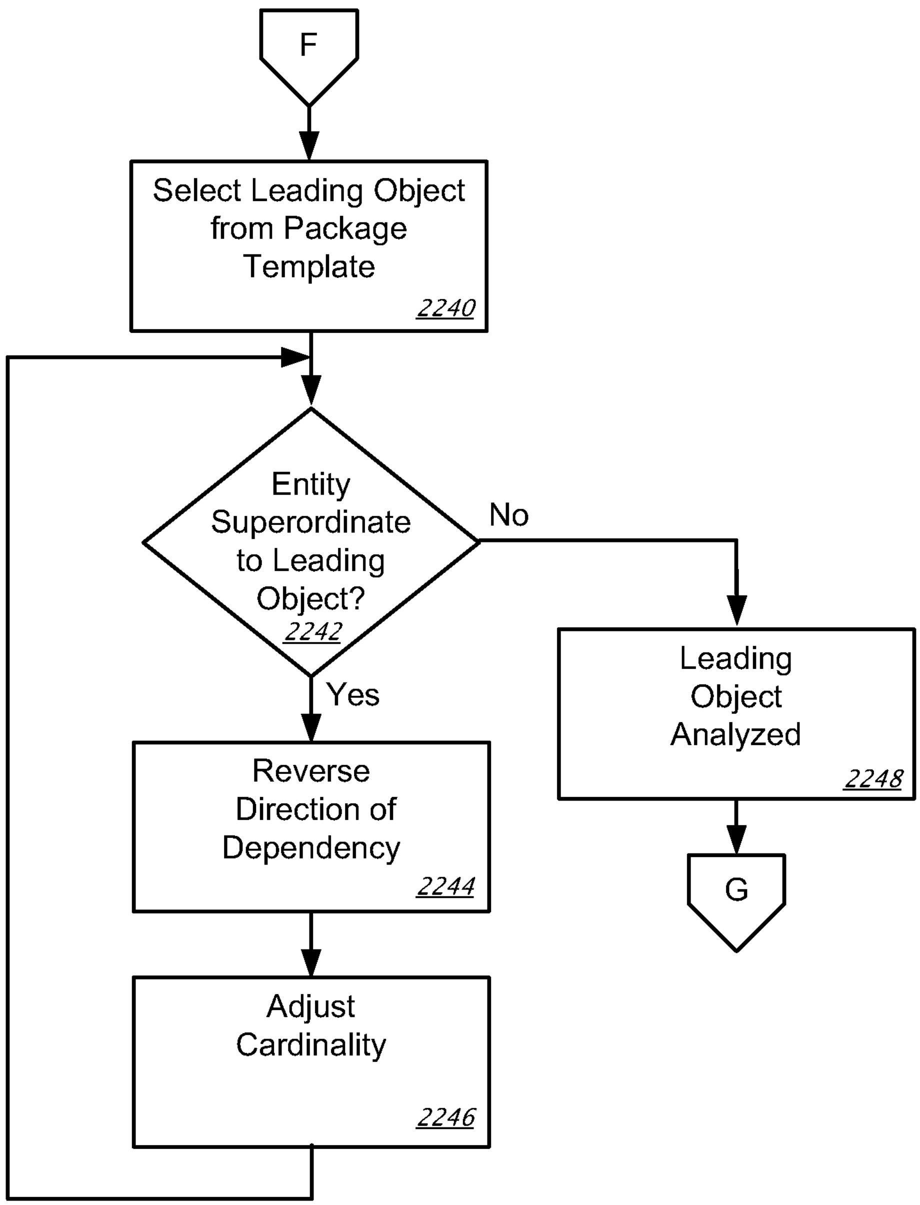

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
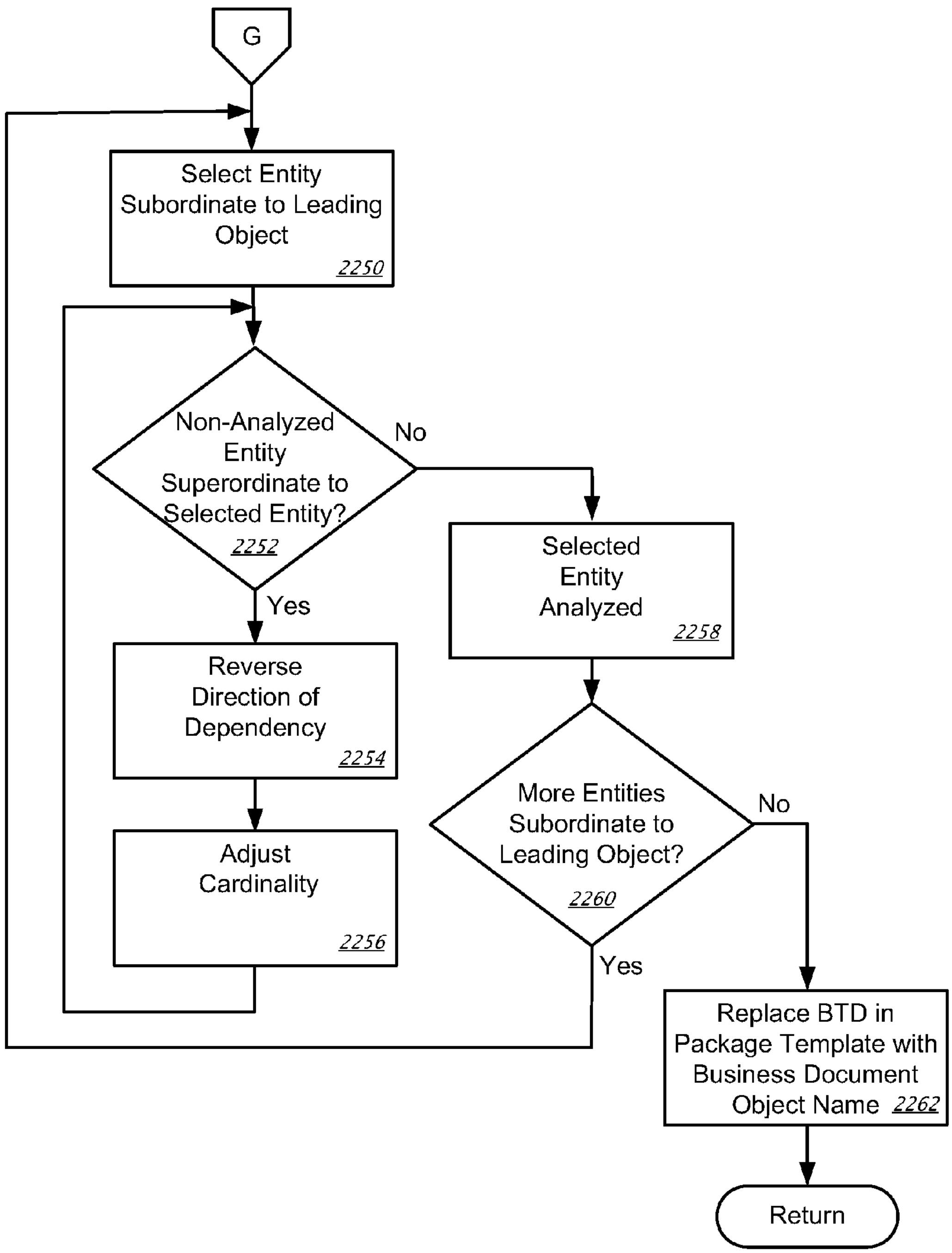

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

Figure 23:
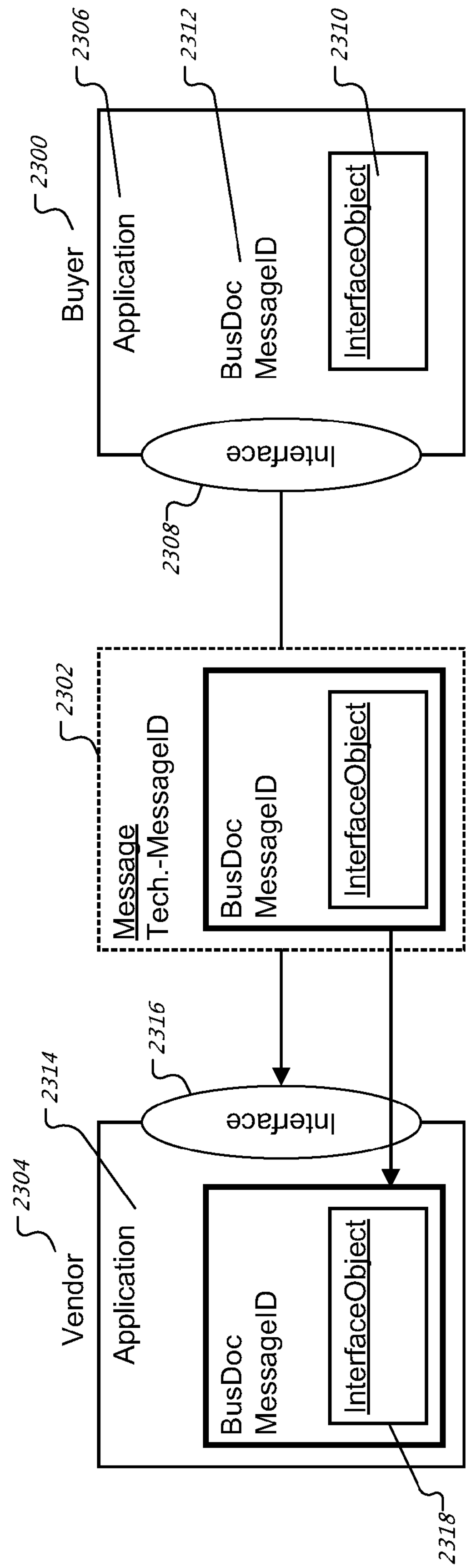
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
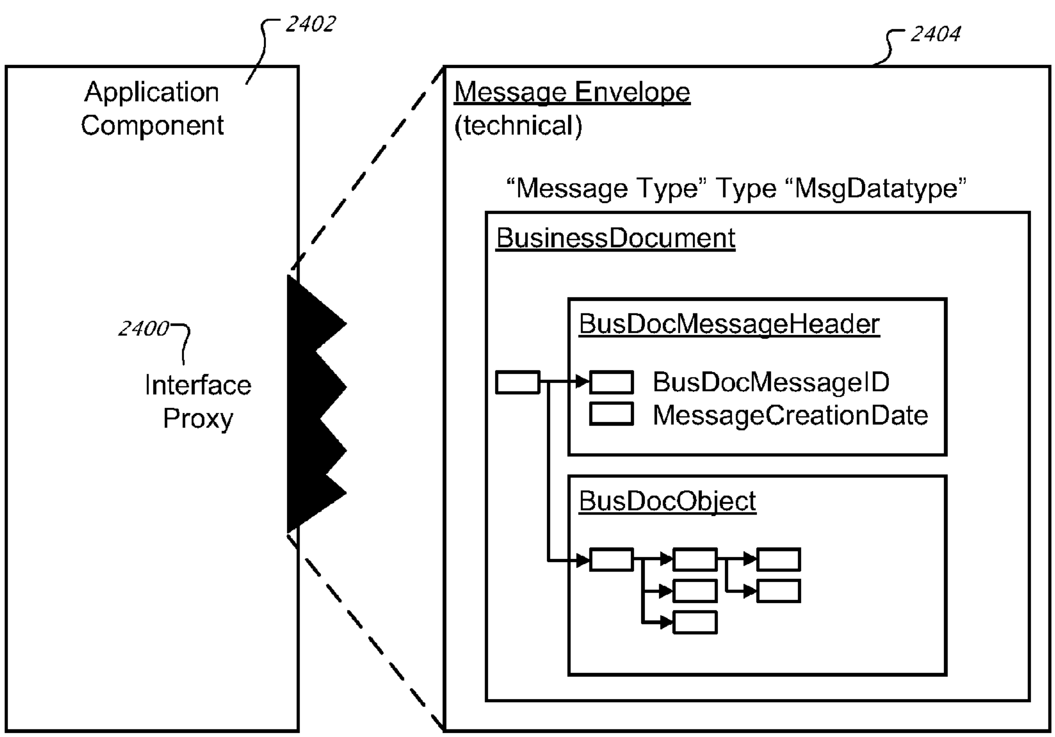
FIG. 24 depicts an interface proxy in accordance with methods and systems consistent with the subject matter described herein.
Figure 25:
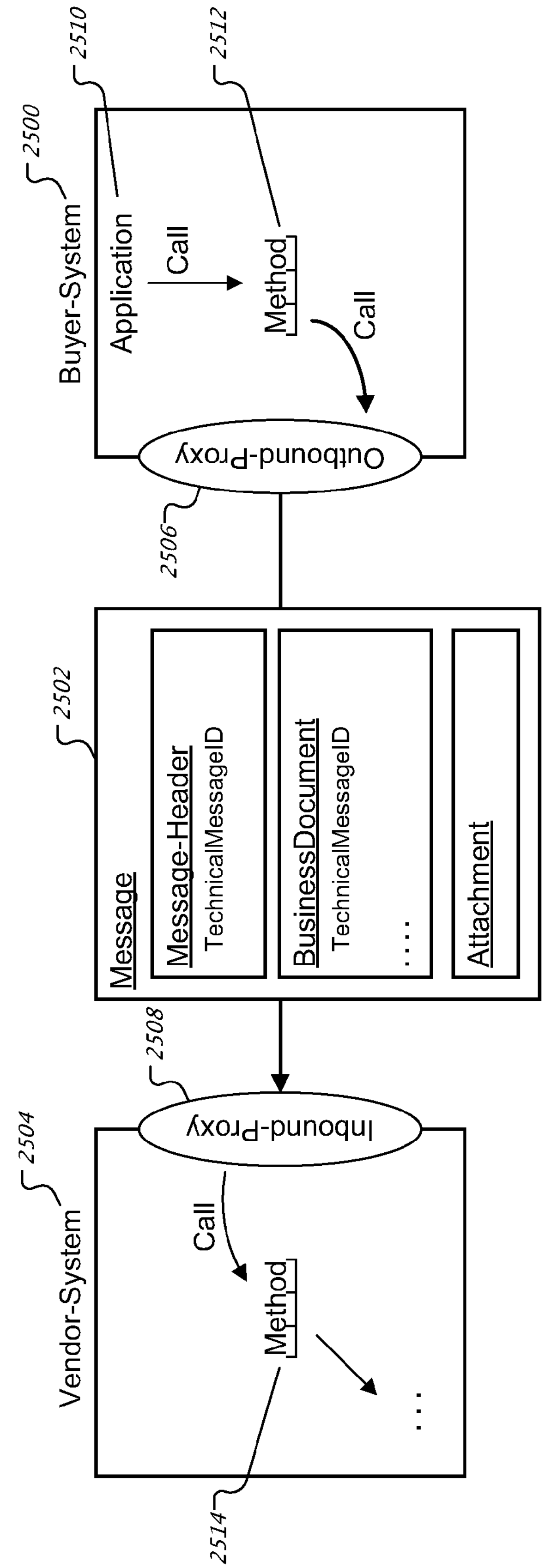
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
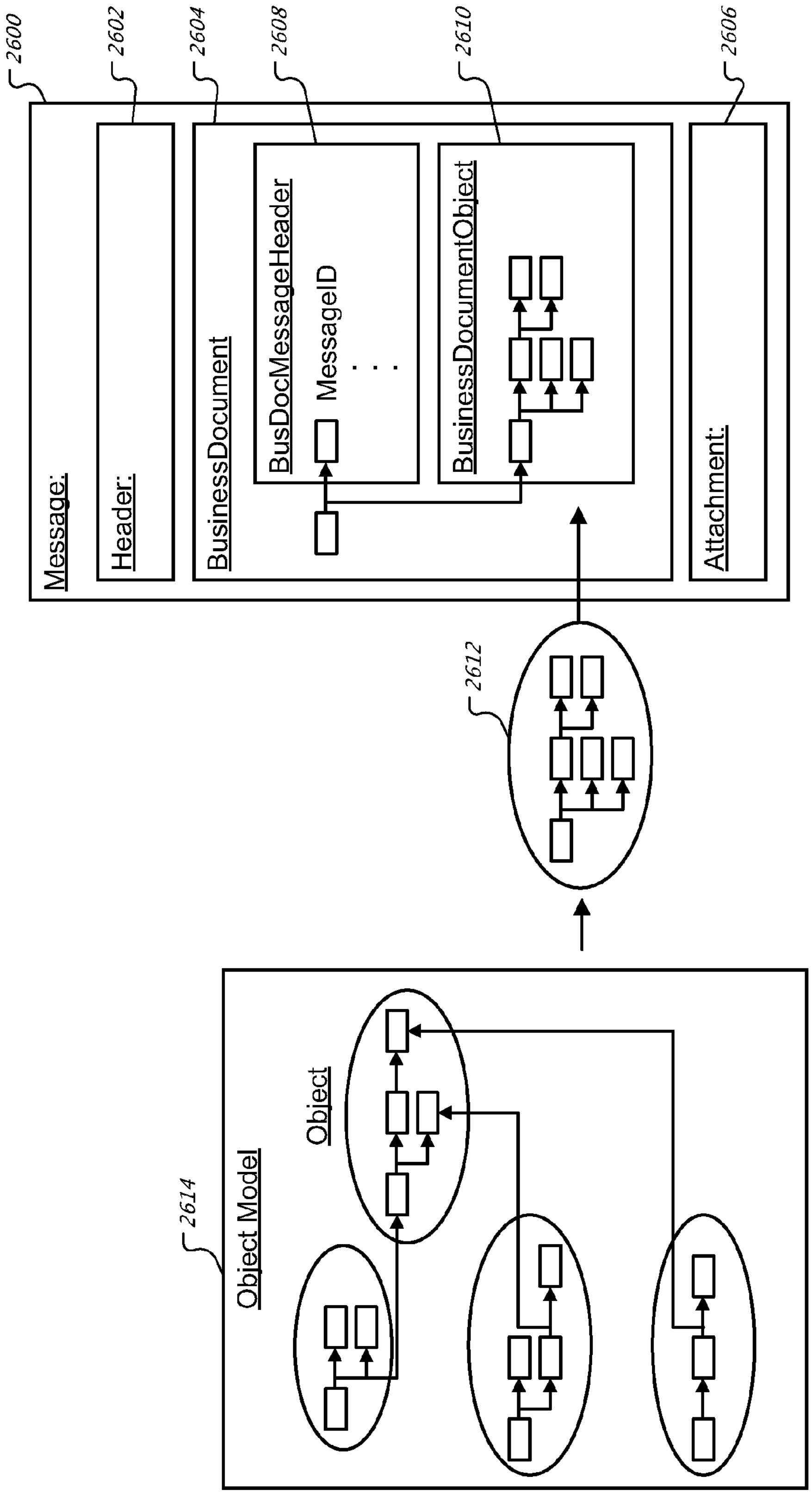
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
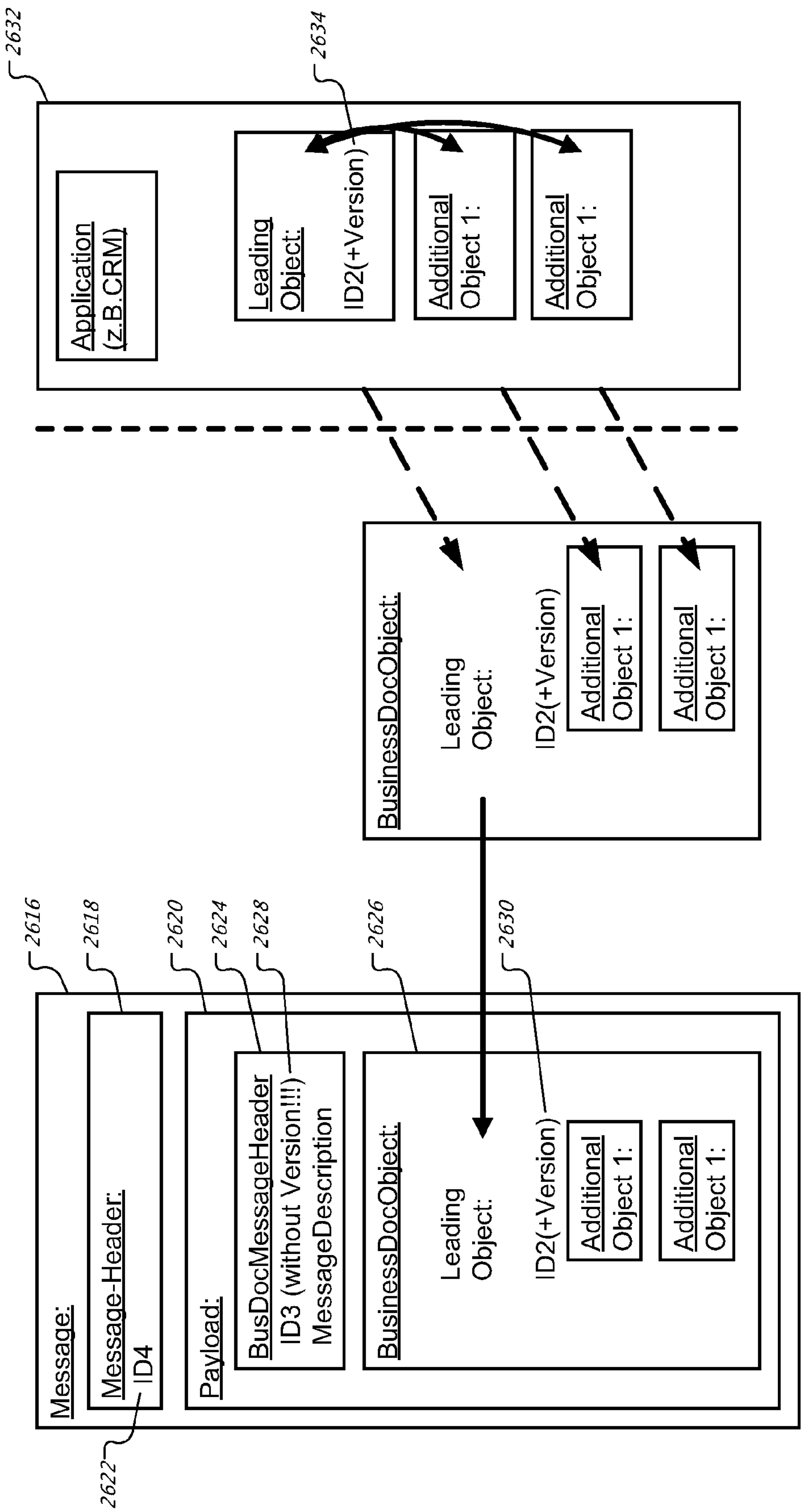
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
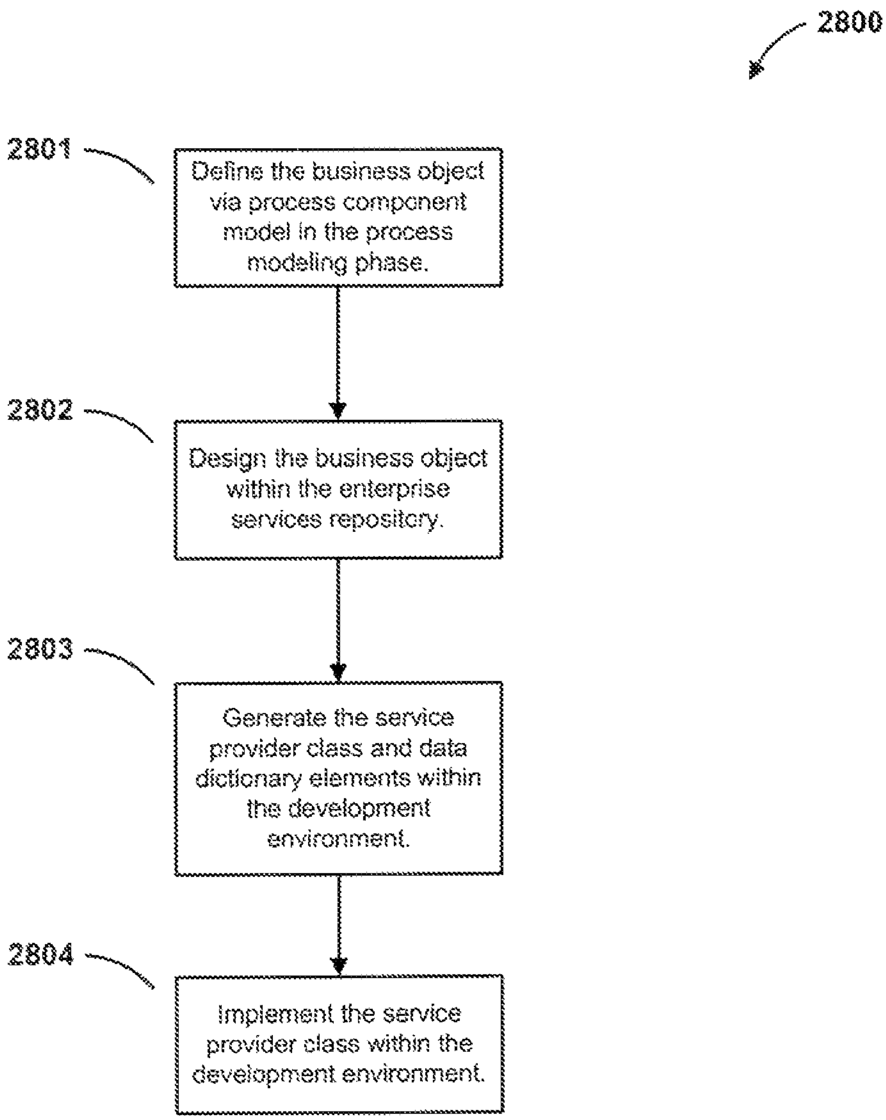
FIG. 28 illustrates an example method for service enabling in accordance with one embodiment of the present disclosure.
Figure 29:
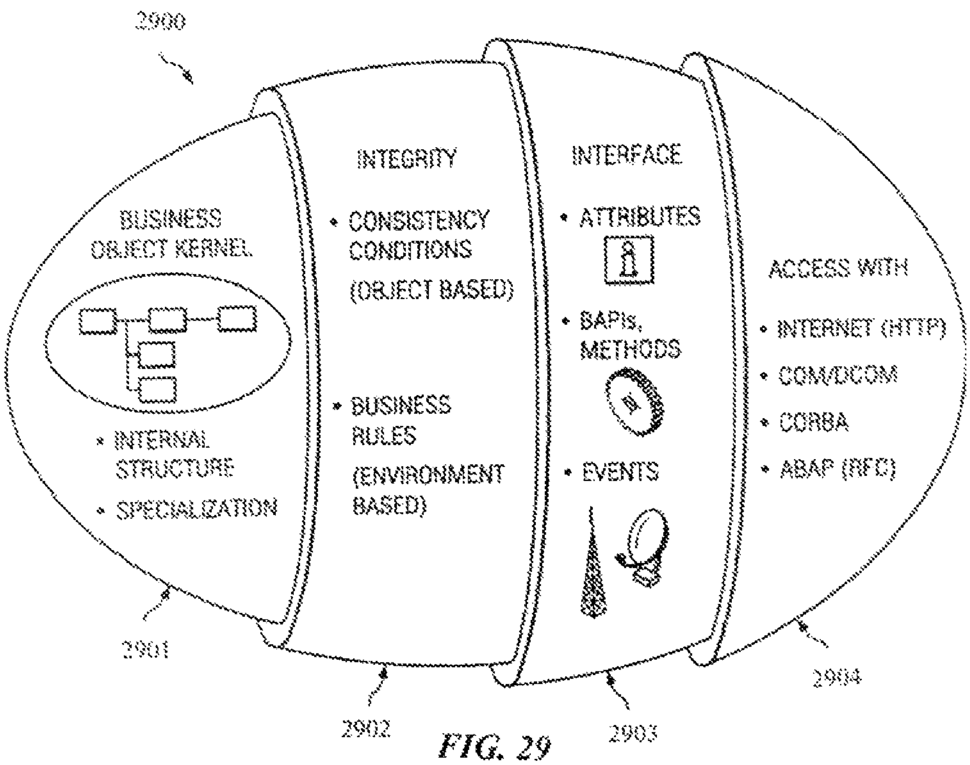
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. Asshown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
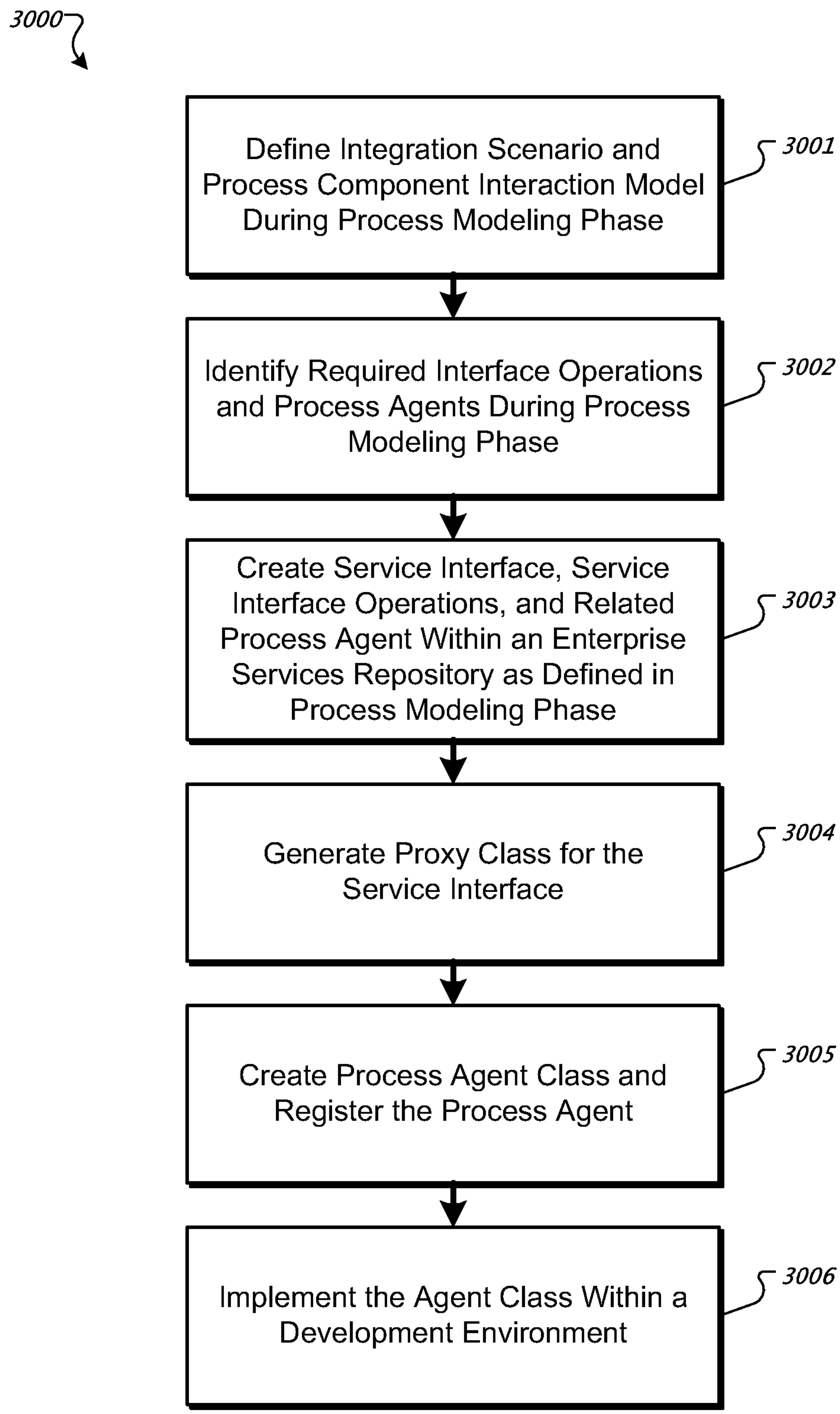
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. Asshown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
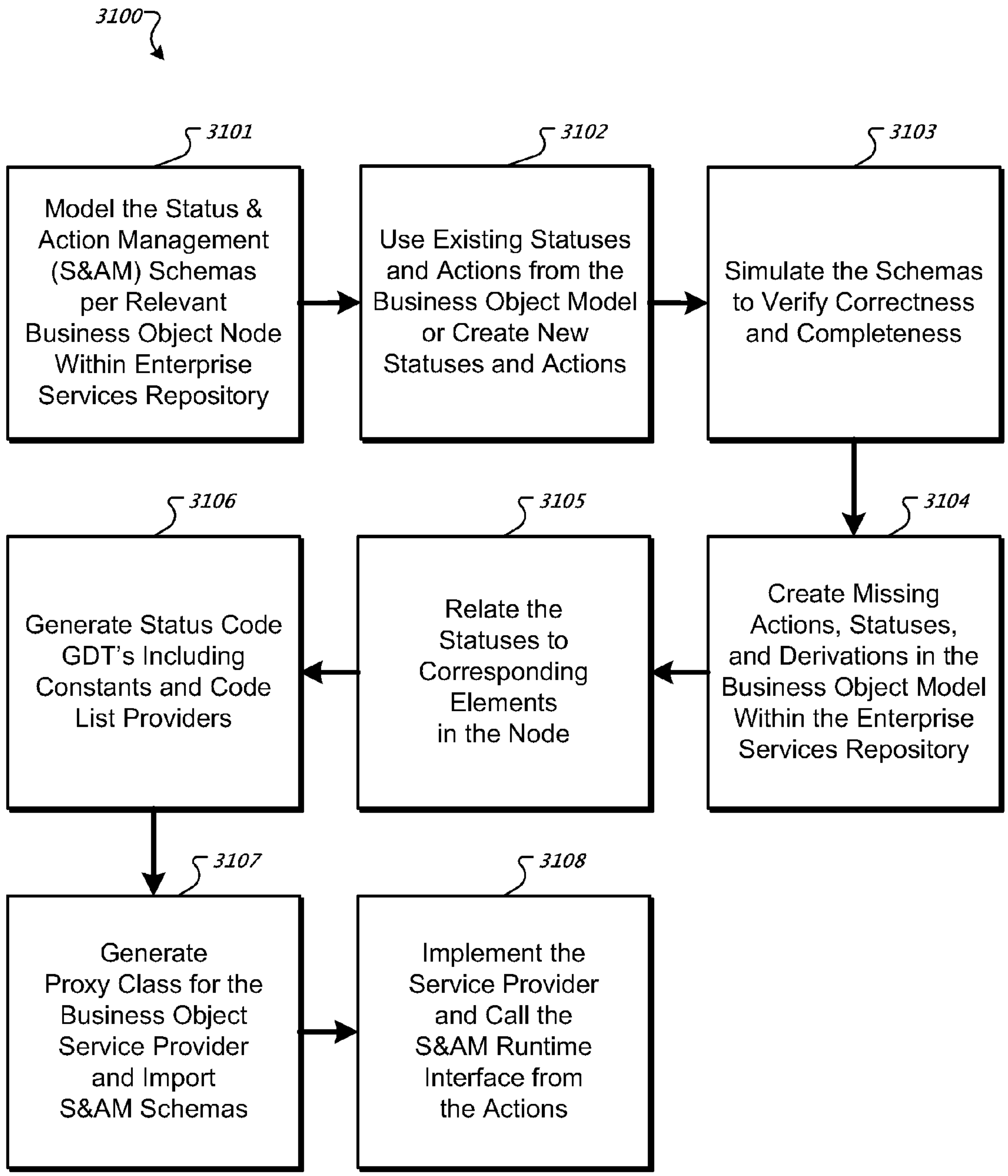
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

Figure 32:
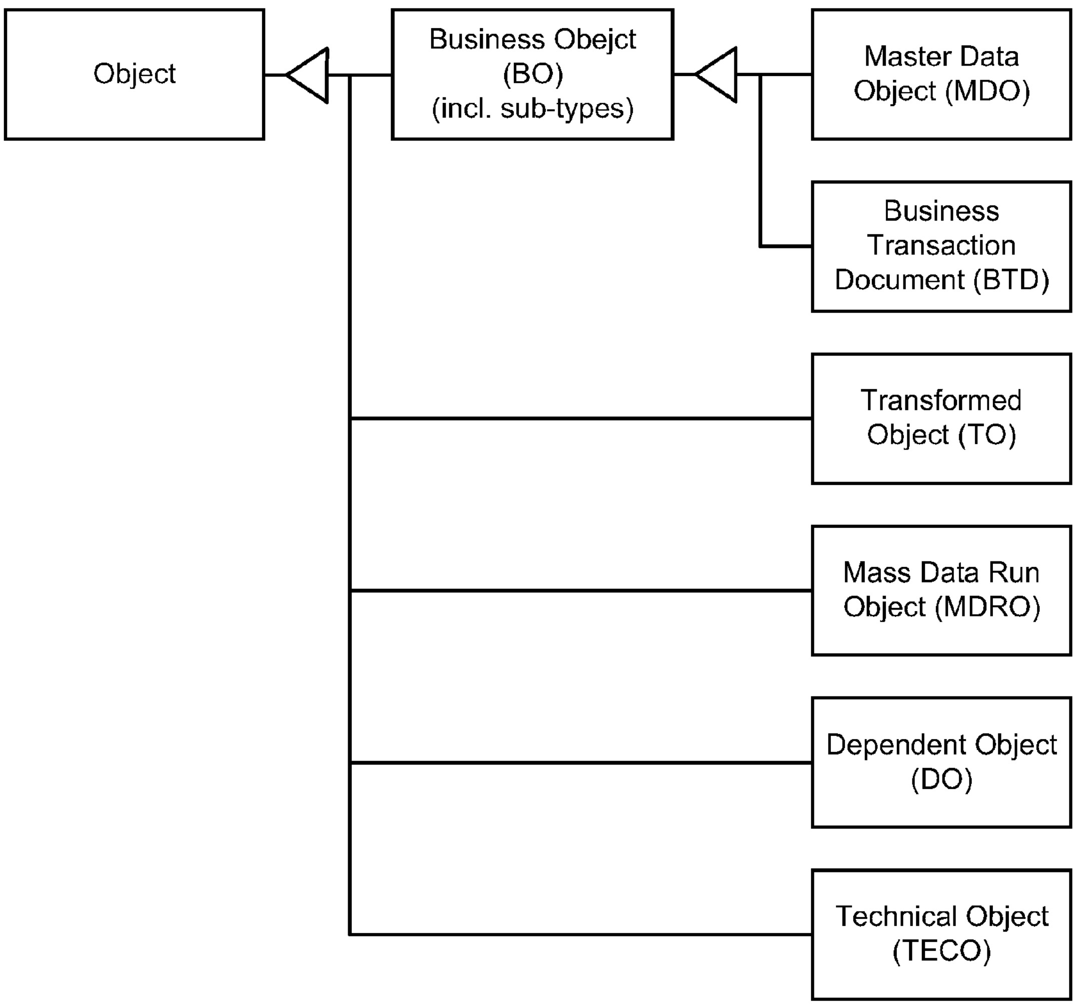
FIG. 32 illustrates various categories of an example object.

FIG. 32 illustrates various categories of an object. The following codelist may be used: Code 1 (i.e., Business Object. A Business Object (BO) may represent a view on a well defined & outlined business content, and may be well known in the business world (for example, in an international standard or industry best practice), and is a self-contained (i.e., capsule), independent business concept), Code 2 (i.e., Master Data Object. A Master Data Object may be considered a business document, which business content is stable over time), Code 3 (i.e., Business Transaction Document. A Business Transaction Document may be considered a document that occurs in business transactions), Code 4 (i.e., Transformed Object. A Transformed Object (TO) may be considered a transformation of multiple Business Objects for a well defined business purpose. It may transform the structure of these BOs with respect to this purpose and contains nodes/attributes derived from the given BOs. It may allow new attributes only for derived information, e.g., summarization, and can implement new Business Logic. It can also contain transformation nodes, but it is not necessary. It may not define UI logic (e.g., the same applies to transformation nodes; UI logic covered by Controller Object)), Code 5 (i.e., Mass Data Run Object. A Mass Data Run Object may be considered a conceptual description of algorithms and their parameters, which modifies/manages/processes a huge amount of data in multiple transactions), Code 6 (i.e., Dependent Object. A Dependent Object ("DO") may be considered a Business Object used as a reuse part in another business object and represents a concept that cannot stand by itself from a business point of view. Instances of dependent objects can only occur in the context of a business objects), Code 7 (i.e., Technical Object. A Technical Object (i.e., TecO) may be considered an object supporting the technical infrastructure or IT Service and Application Management (ITSAM) of application platform. An example of objects for technical infrastructure (i.e., Netweaver) may include: Task, Incident Context).

PurchaseOrder Interface(s)

PurchaseOrder interfaces are the interfaces that can be used in an A2X process to exchange PurchaseOrders and order confirmations between a buyer and the Purchase Order Processing. Up to now the methods of PurchaseOrder processing are limited to the possibility of creating PurchaseOrders manually or with interfaces using proprietary technologies.

To simplify the communication between the buyer and the Purchase Order Processing new interfaces are defined using commonly available technologies. These Interfaces provide the possibilities to create, change or read PurchaseOrders or create PurchaseOrderItem acknowledgements.

More than just a simple interface structure, the new PurchaseOrder interfaces define underlying corporate significance and, at the same time, dispense with the need to exchange proprietary information in straightforward ordering processes. In this way, applications that implement PurchaseOrder interfaces can be integrated without the need for complex project work.

Figure 33:
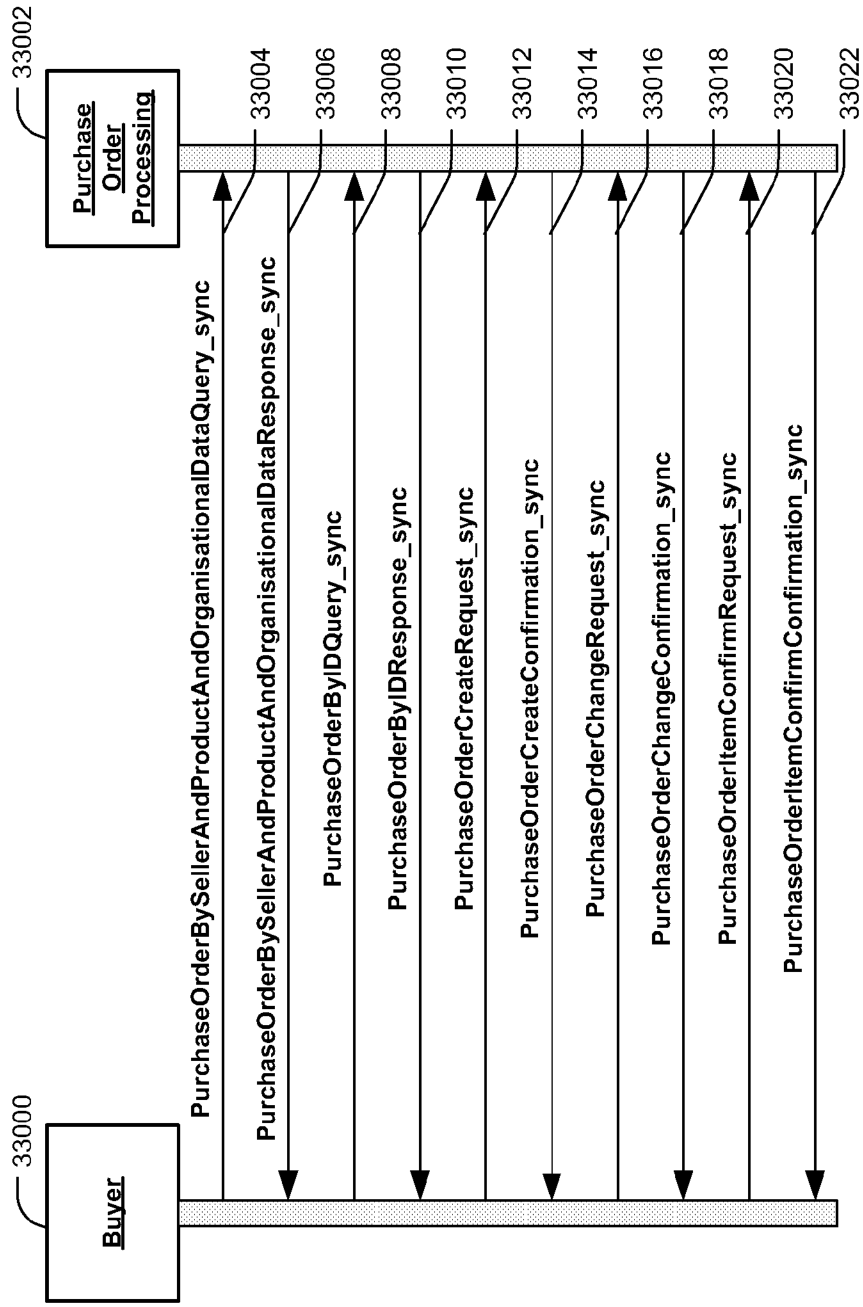
FIG. 33 shows an exemplary PurchaseOrder Message Choreography.

The message choreography of FIG. 33 describes a possible logical sequence of messages that can be used to realize a PurchaseOrderERP business scenario. A "Buyer" system 33000 can query purchase order by seller and product and organizational data using a PurchaseOrderBySellerAndProductAndOrganizationalDataQuery_sync message 33004 as shown, for example, in FIG. 33. A "Purchase Order Processing" system 33002 can respond to the query using a purchaseOrderBySellerAndProductAndOrganizationalDataResponse_sync message 33006 as shown, for example, in FIG. 33. The "Buyer" system 33000 can query purchase order by ID using a PurchaseOrderByIDQuery_sync message 33008 as shown, for example, in FIG. 33. The "Purchase Order Processing" system 33002 can respond to the query using a PurchaseOrderByIDResponse_sync message 33010 as shown, for example, in FIG. 33. The "Buyer" system 33000 can request purchase order create using a PurchaseOrderCreateRequest_sync message 33012 as shown, for example, in FIG. 33. The "Purchase Order Processing" system 33002 can respond to the request using a PurchaseOrderCreateConfirmation_sync message 33014 as shown, for example, in FIG. 33. The "Buyer" system 33000 can request purchase order change using a PurchaseOrderChangeRequest_sync message 33016 as shown, for example, in FIG. 33.

The "Purchase Order Processing" system 33002 can respond to the request using a PurchaseOrderChangeConfirmation_sync message 33018 as shown, for example, in FIG. 33. The "Buyer" system 33000 can request purchase order item confirm using a PurchaseOrderItemConfirmRequest_sync message 33020 as shown, for example, in FIG. 33. The "Purchase Order Processing" system 33002 can respond to the request using a PurchaseOrderItemConfirmConfirmation_sync message 33022 as shown, for example, in FIG. 33.

A PurchaseOrderBySellerAndProductAndOrganisationalDataQuery is an inquiry to the Purchase Order Processing to return a list of PurchaseOrders for certain selection criteria. The structure of the message type PurchaseOrderBySellerAndProductAndOrganisationalDataQuery can be specified by the message data type PurchaseOrderBySellerAndProductAndOrganisationalDataQueryMessage.

A PurchaseOrderBySellerAndProductAndOrganisationalDataResponse is the response to the inquiry of PurchaseOrderBySellerAndProductAndOrganisationalDataQuery and can include information of several PurchaseOrders matching the selection criteria of the inquiry. The structure of the message type PurchaseOrderBySellerAndProductAndOrganisationalDataResponse can be specified by the message data type PurchaseOrderBySellerAndProductAndOrganisationalDataResponseMessage, which can be derived from the message data type PurchaseOrderMessage.

A PurchaseOrderByIDQuery is an inquiry to the Purchase Order Processing to return PurchaseOrders for the PurchaseOrder ID and the PurchaseOrderItem ID. The structure of the message type PurchaseOrderByIDQuery can be specified by the message data type PurchaseOrderByIDQueryMessage.

A PurchaseOrderByIDResponse is the response to the inquiry of PurchaseOrderByIDQuery and can include the selected PurchaseOrder. The structure of the message type PurchaseOrderByIDResponse can be specified by the message data type PurchaseOrderByIDResponseMessage, which can be derived from the message data type PurchaseOrderMessage.

A PurchaseOrderCreateRequest is a buyer's request to the Purchase Order Processing to create a PurchaseOrder. The structure of the message type PurchaseOrderCreateRequest can be specified by the message data type PurchaseOrderCreateRequestMessage, which can be derived from the message data type PurchaseOrderMessage. The PurchaseOrderCreateRequest can be the message that a buyer uses to start a new ordering process with a seller.

A PurchaseOrderCreateConfirmation is a confirmation sent from the Purchase Order Processing to the buyer concerning the request to create a PurchaseOrder. The structure of the message type PurchaseOrderCreateConfirmation can be specified by the message data type PurchaseOrderCreateConfirmationMessage, which can be derived from the message data type PurchaseOrderMessage.

A PurchaseOrderChangeRequest is the buyer's request to the Purchase Order Processing to change an PurchaseOrder. The structure of the message type PurchaseOrderChangeRequest can be specified by the message data type PurchaseOrderChangeRequestMessage, which can be derived from the message data type PurchaseOrderMessage.

A PurchaseOrderChangeConfirmation is a confirmation sent from the Purchase Order Processing to the buyer concerning the request to change a PurchaseOrder. The structure of the message type PurchaseOrderChangeConfirmation can be specified by the message data type PurchaseOrderChangeConfirmationMessage, which can be derived from the message data type PurchaseOrderMessage.

A PurchaseOrderItemConfirmRequest is a request from a buyer to the Purchase Order Processing to create a confirmation for a PurchaseOrderItem. The structure of the message type PurchaseOrderItemConfirmRequest can be specified by the message data type PurchaseOrderItemConfirmRequestMessage, which can be derived from the message data type PurchaseOrderMessage.

A PurchaseOrderItemConfirmConfirmation is the confirmation sent from the Purchase Order Processing to the buyer concerning the request to create a confirmation. The structure of the message type confirmation can be specified by the message data type PurchaseOrderItemConfirmConfirmationMessage, which can be derived from the message data type PurchaseOrderMessage.

A PurchaseOrderItemByAccountAssignmentQuery is an inquiry to the Purchase Order Processing to return a list of PurchaseOrder items for certain selection criteria (accounting data). The structure of the message type PurchaseOrderItemByAccountAssignmentQuery can be specified by the message data type PurchaseOrderItemByAccountAssignmentQueryMessage.

A PurchaseOrderItemByAccountAssignmentResponse is the response to the inquiry of PurchaseOrderItemByAccountAssignmentQuery and can include information of PurchaseOrder items matching the selection criteria of the inquiry. The structure of the message type PurchaseOrderItemByAccountAssignmentResponse can be specified by the message data type PurchaseOrderItemByAccountAssignmentResponseMessage, which can be derived from the message data type PurchaseOrderMessage.

Figures 1, 34:
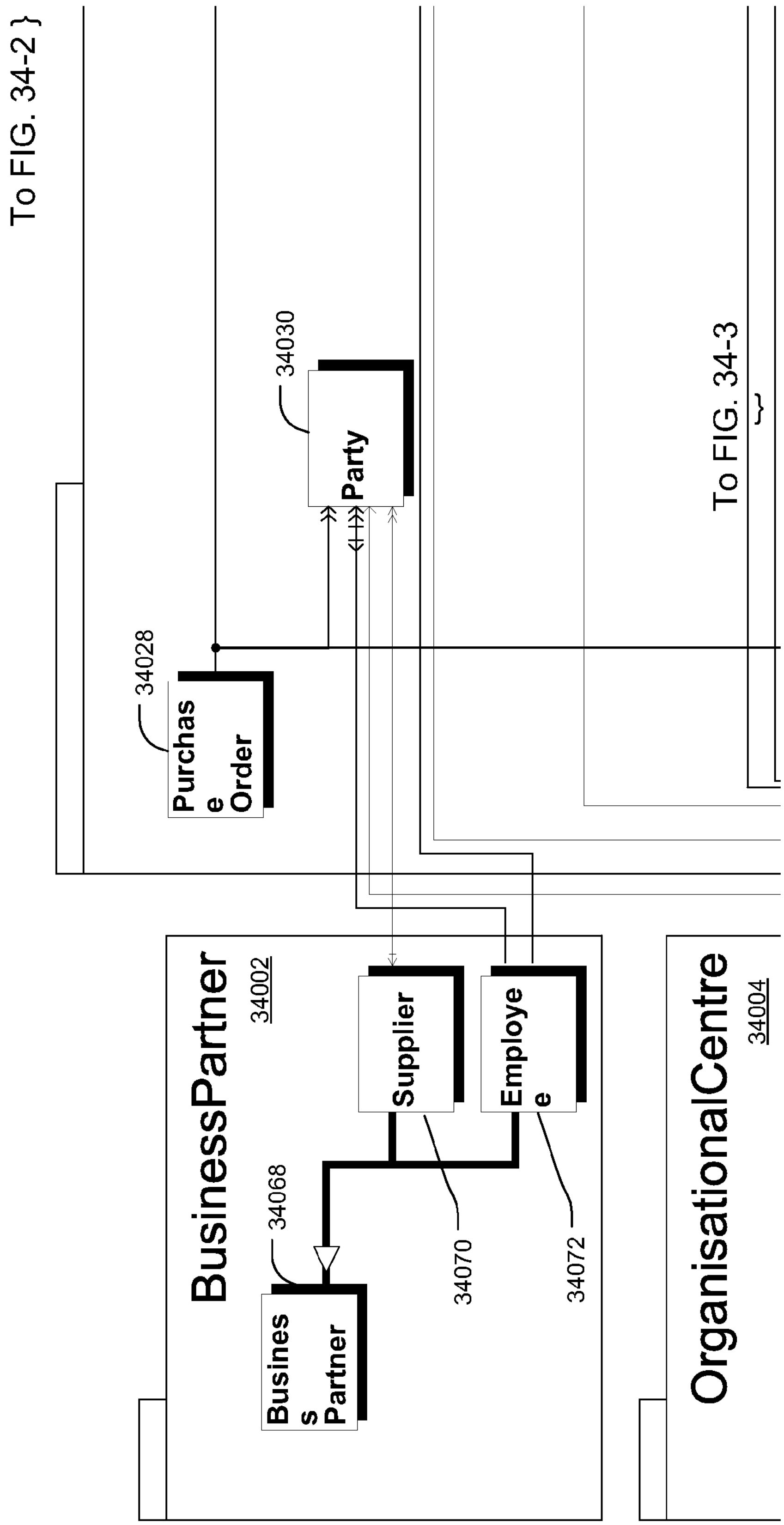
Figures 2, 34:
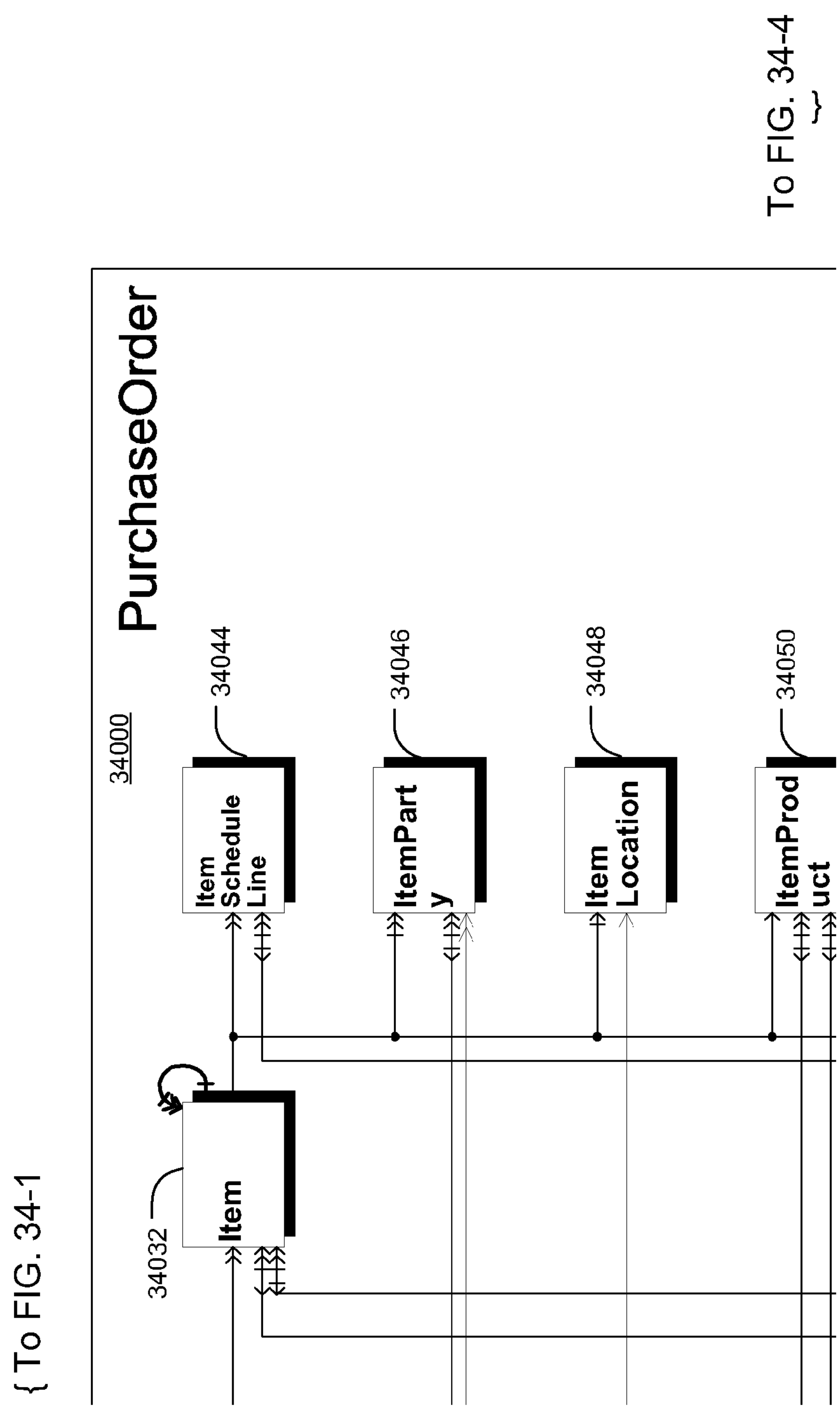
Figures 3, 34:
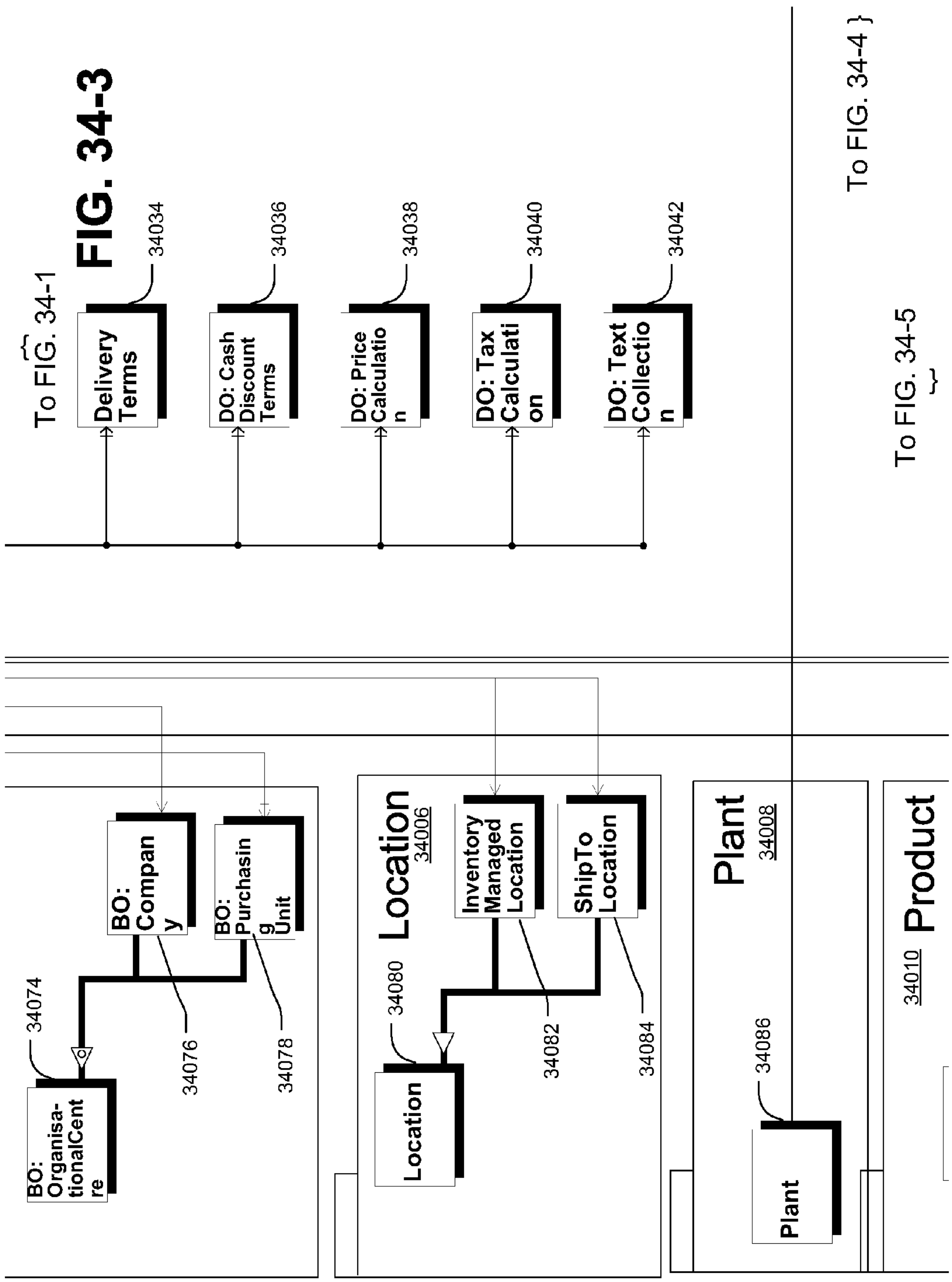
Figures 4, 34:
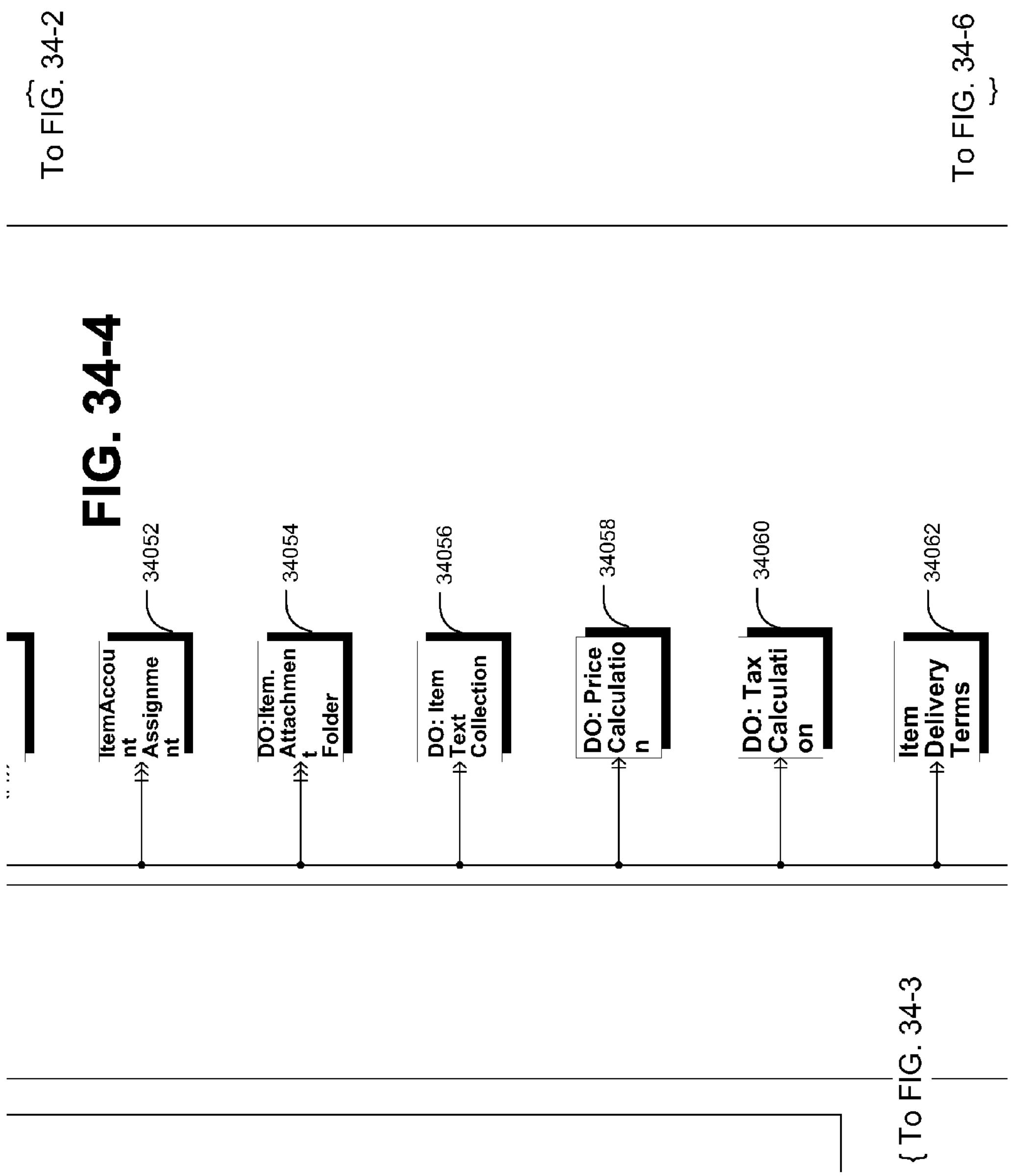
Figures 5, 34:
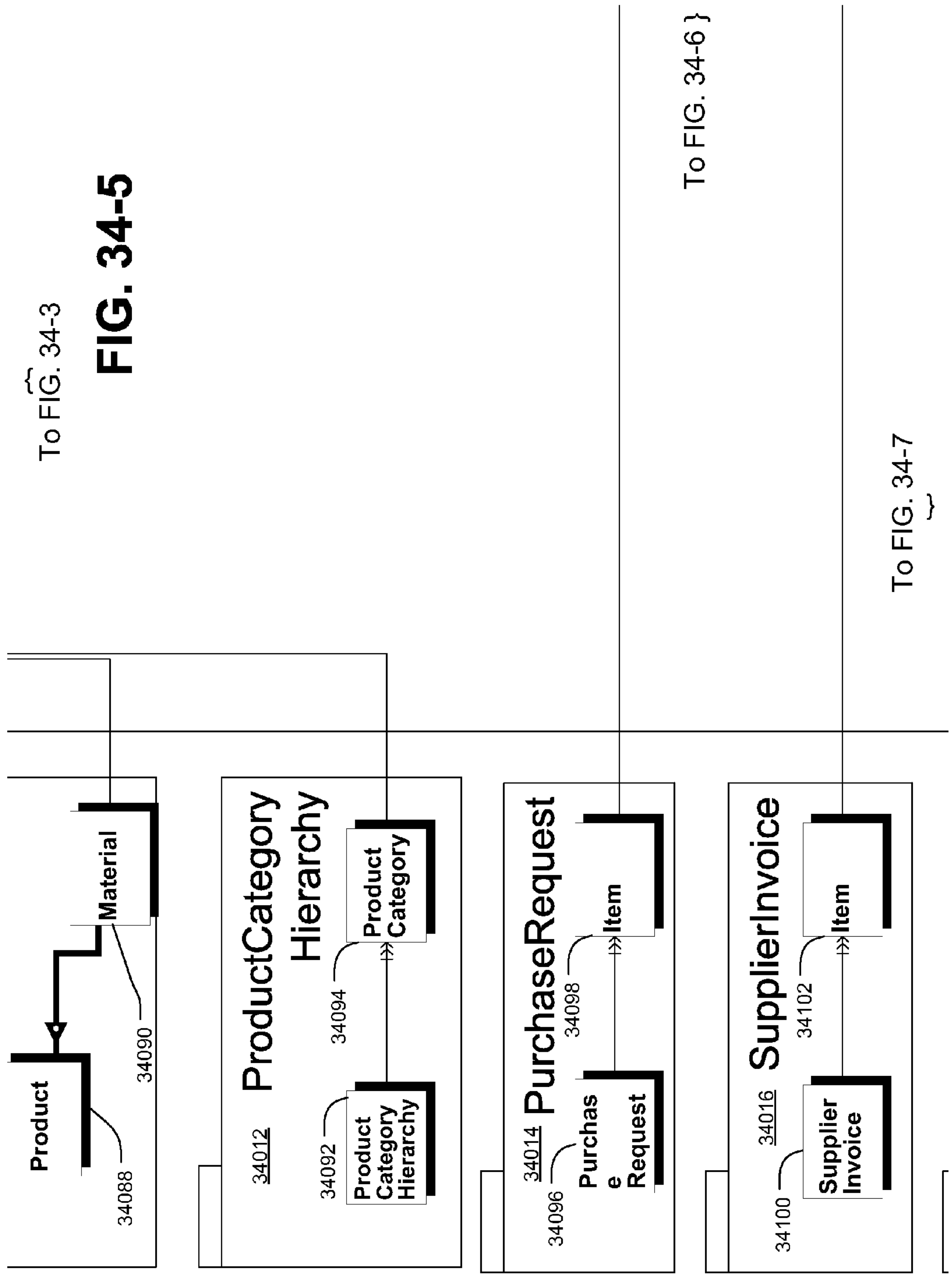
Figures 6, 34:
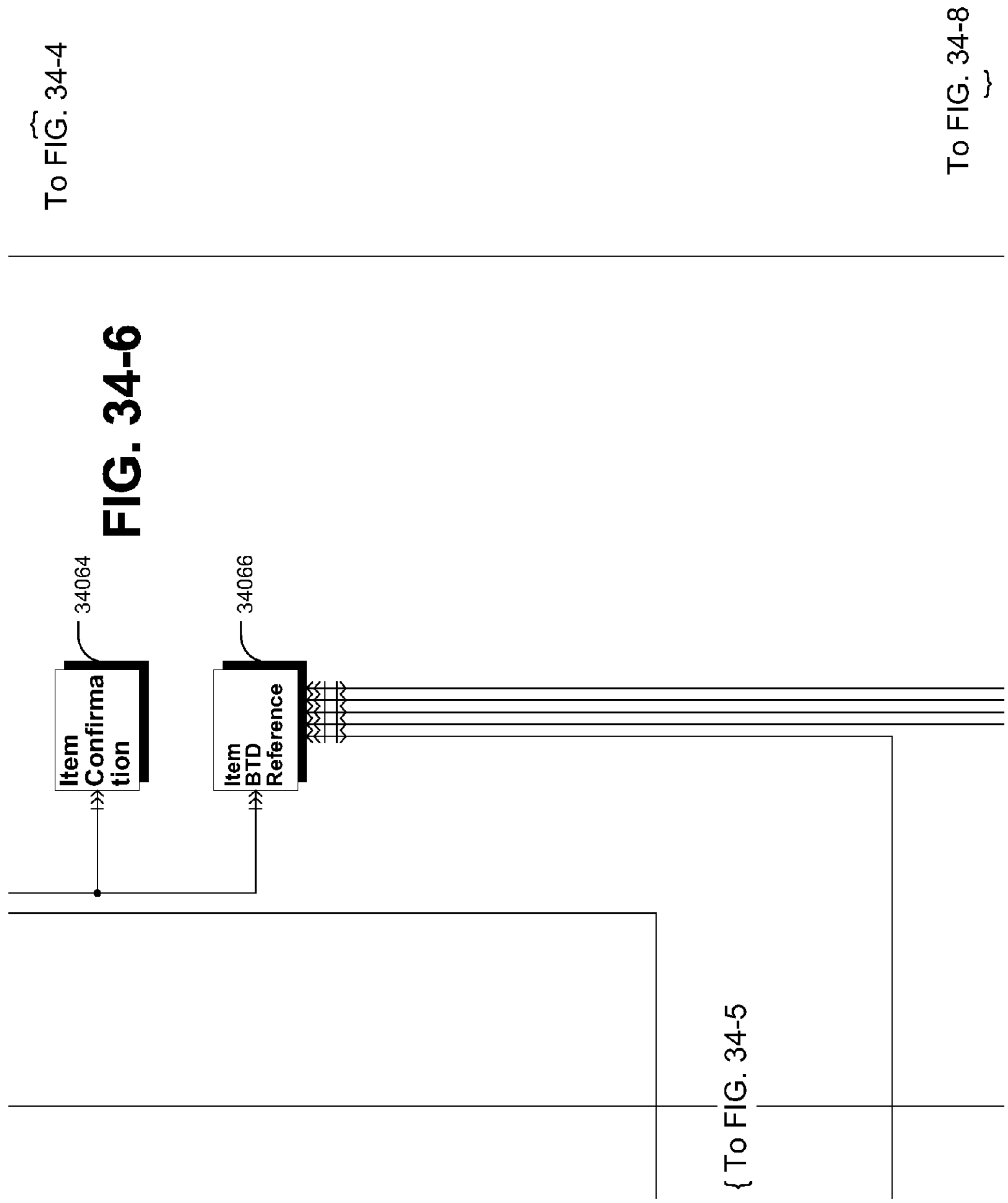
Figures 7, 34:
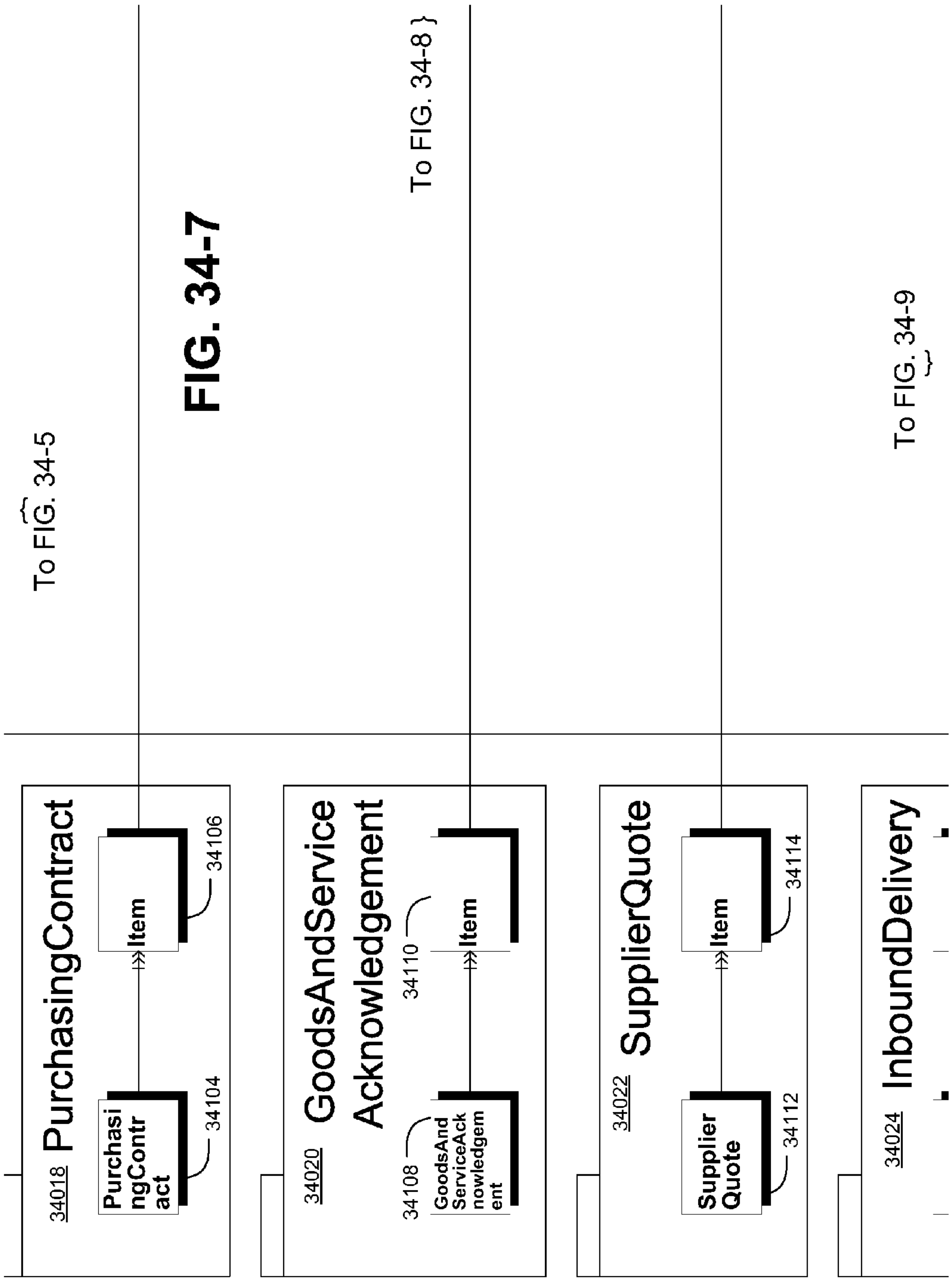
Figures 8, 34:
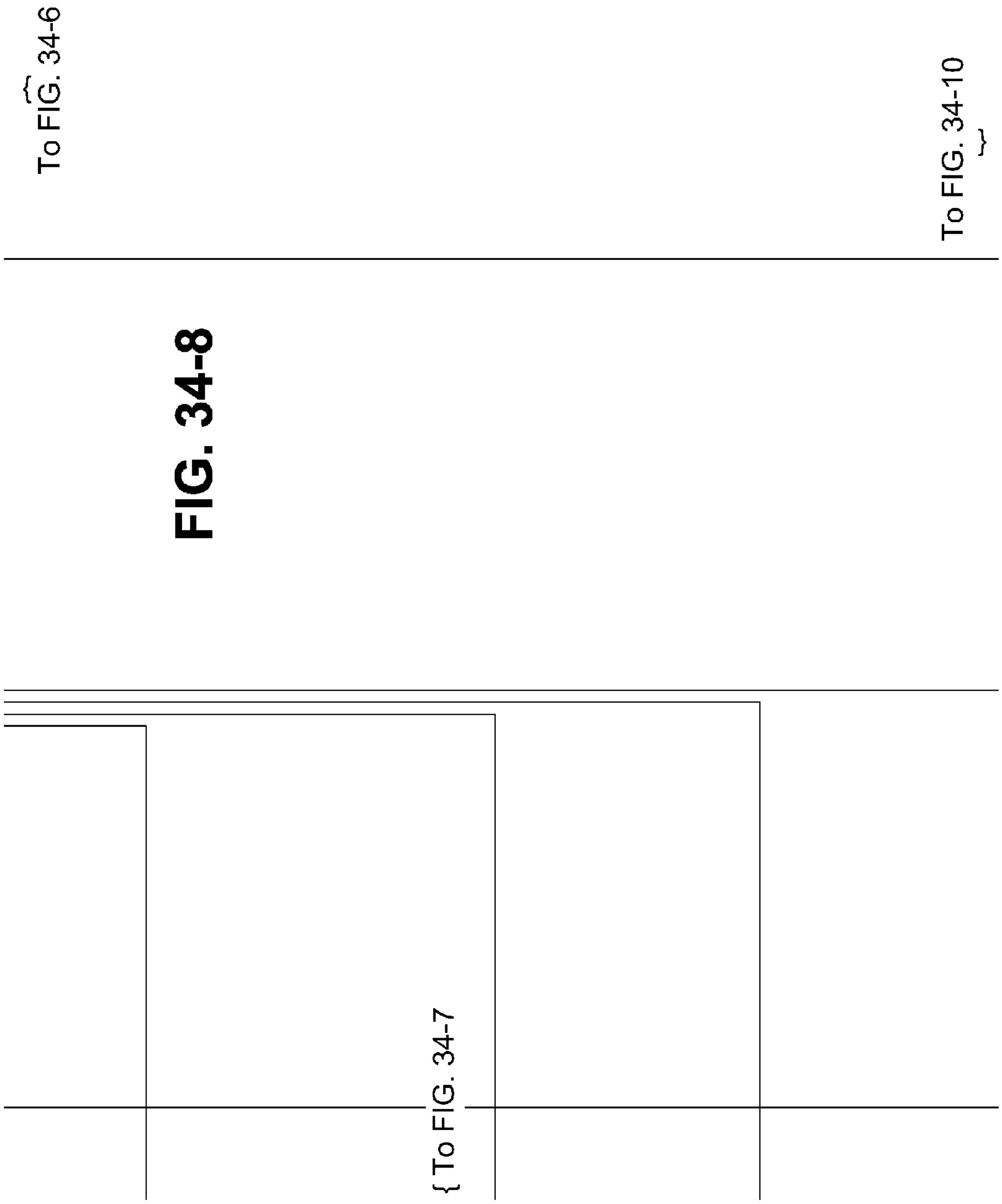
Figures 9, 34:
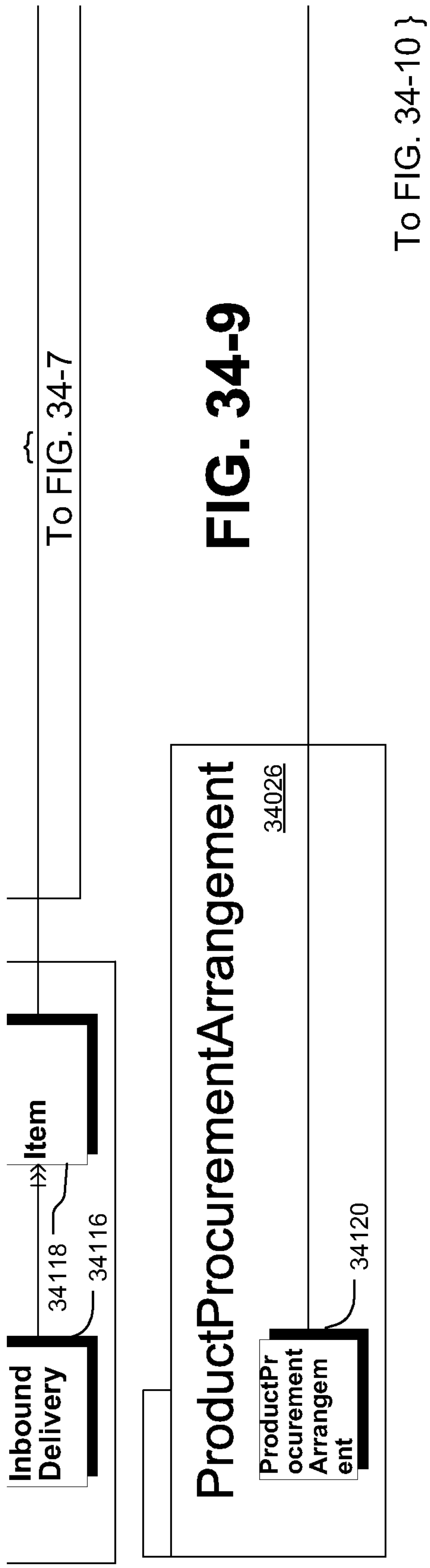
Figures 10, 34:
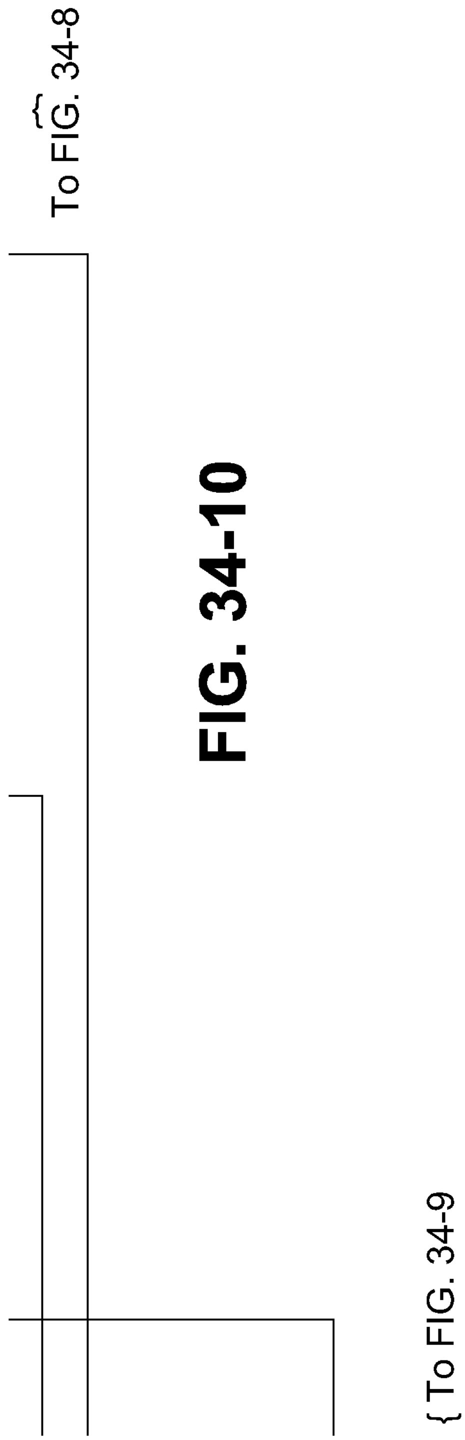

FIGS. 34-1 through 34-10 illustrate an example PurchaseOrder business object model 34000. Specifically, this model depicts interactions among various components of the PurchaseOrder, as well as external components that interact with the PurchaseOrder (shown here as 34002 through 34026 and 34068 through 34120). The PurchaseOrder business object model 34000 includes elements 34028 through 34066. The elements 34028 through 34066 can be hierarchical, as depicted. For example, the purchase order entity 34028 hierarchically includes entities party 34030, item 34032, delivery terms 34034, and entities 34036 through 34042. Similarly, entity item 34032 includes entities 34044 through 34066. Some or all of the entities 34028 through 34066 can correspond to packages and/or entities in the message data types described below.

Figures 1, 35:
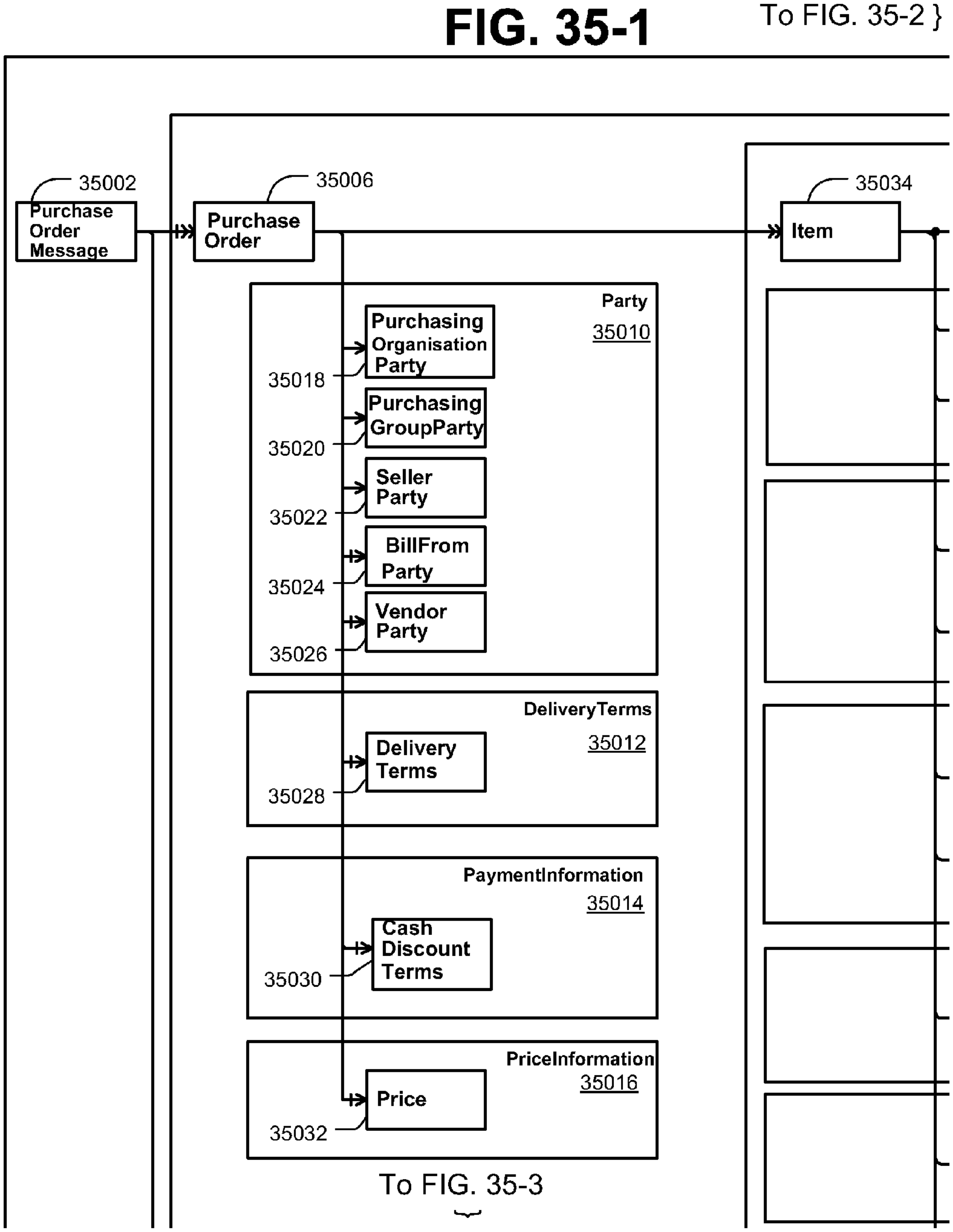
Figures 2, 35:
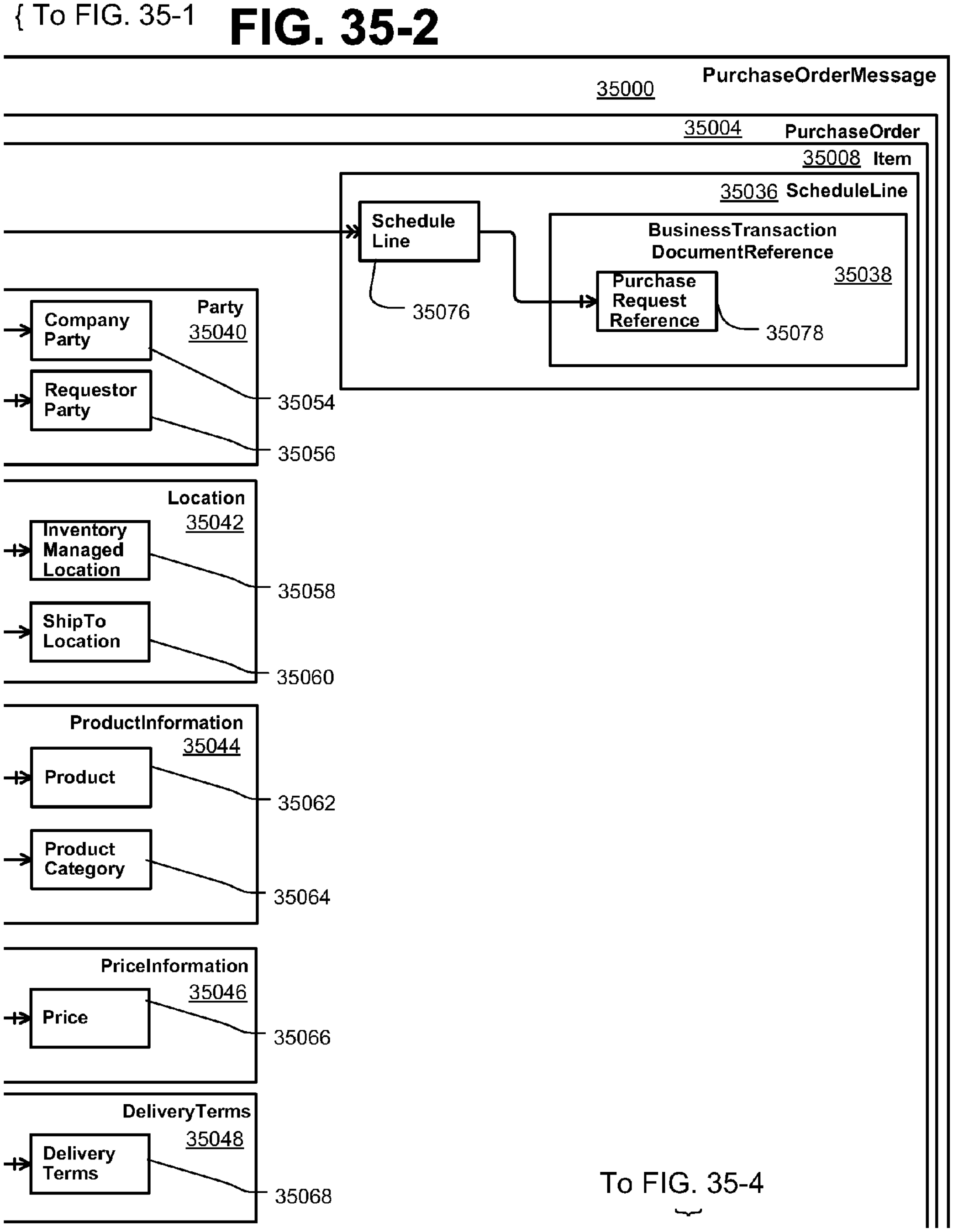
Figures 3, 35:
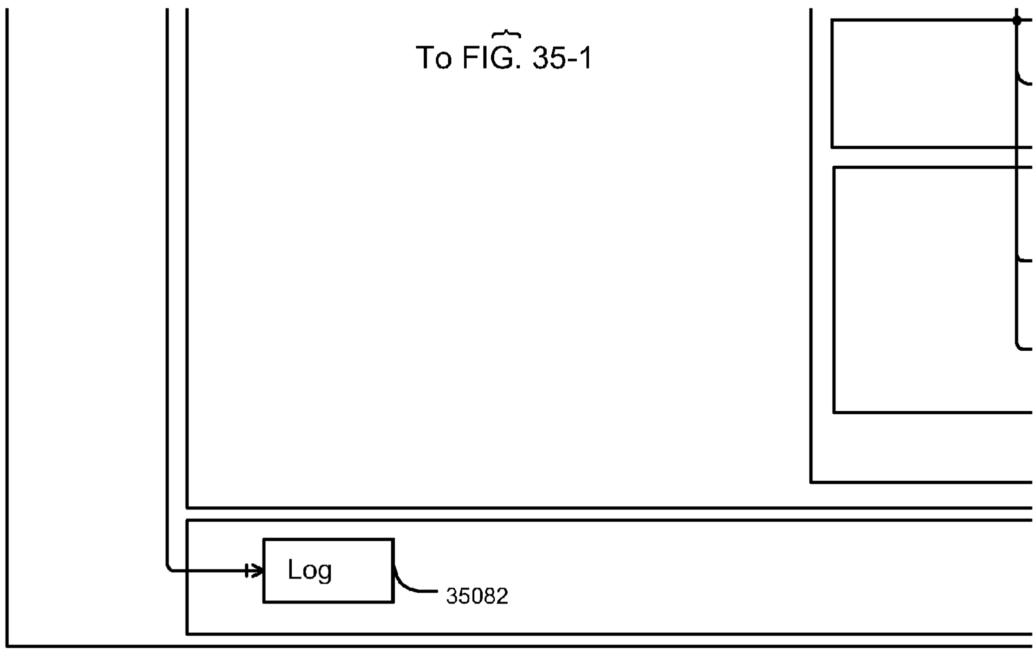
Figures 4, 35:
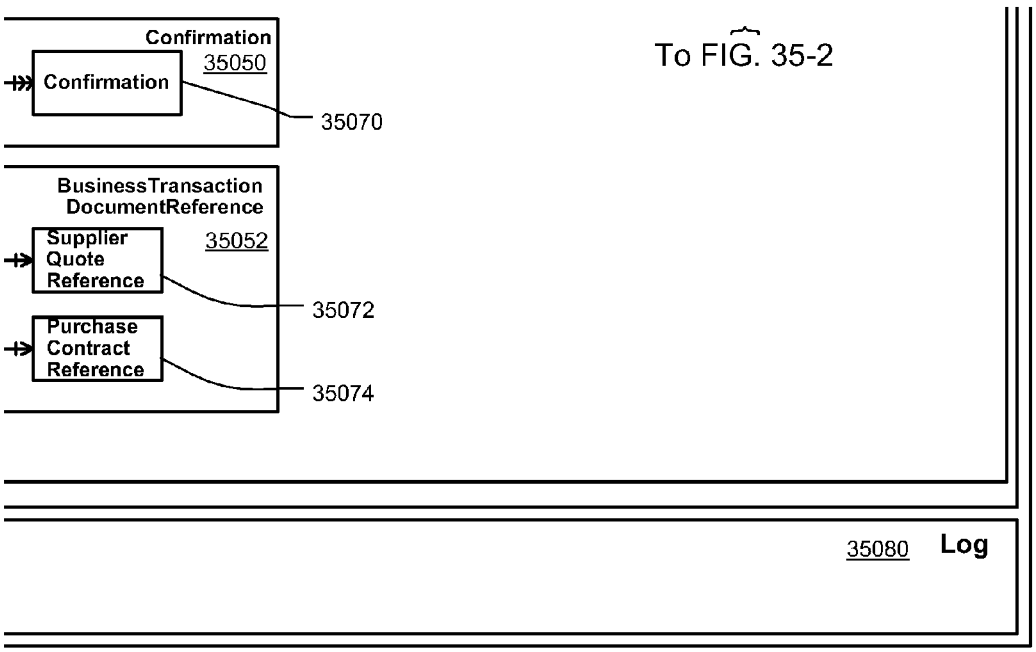

FIGS. 35-1 through 35-4 illustrate one example logical configuration of PurchaseOrderMessage message 35000. Specifically, this figure depicts the arrangement and hierarchy of various components such as one or more levels of packages, entities, and datatypes, shown here as 35000 through 35082. As described above, packages may be used to represent hierarchy levels. Entities are discrete business elements that are used during a business transaction. Data types are used to type object entities and interfaces with a structure. For example, PurchaseOrderMessage message 35000 includes, among other things, PurchaseOrder 35004. Accordingly, heterogeneous applications may communicate using this consistent message configured as such.

Figure 36:
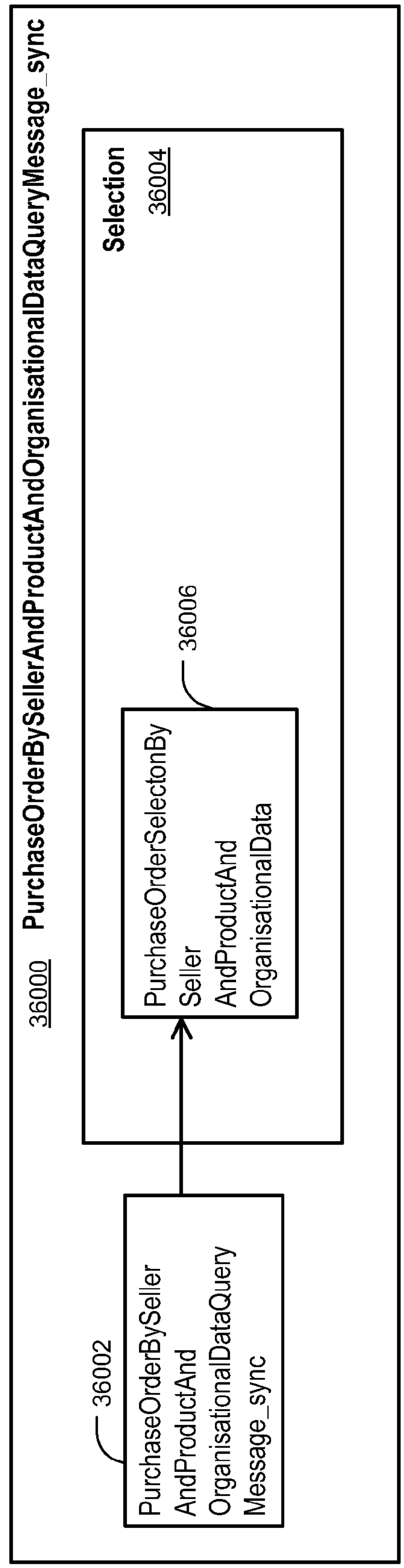
FIG. 36 shows an exemplary PurchaseOrderBySellerAndProduct AndOrganisationalDataQueryMessage Message Data Type.

Additionally, FIG. 36 illustrates one example logical configuration of PurchaseOrderBySellerAndProductAndOrganisationalDataQueryMessage message 36000. Specifically, this figure depicts the arrangement and hierarchy of various components such as one or more levels of packages, entities, and datatypes, shown here as 36000 through 36006. As described above, packages may be used to represent hierarchy levels. Entities are discrete business elements that are used during a business transaction. Data types are used to type object entities and interfaces with a structure. For example, PurchaseOrderBySellerAndProductAndOrganisationalDataQueryMessage message 36000 includes, among other things, Selection 36004. Accordingly, heterogeneous applications may communicate using this consistent message configured as such.

Figure 37:
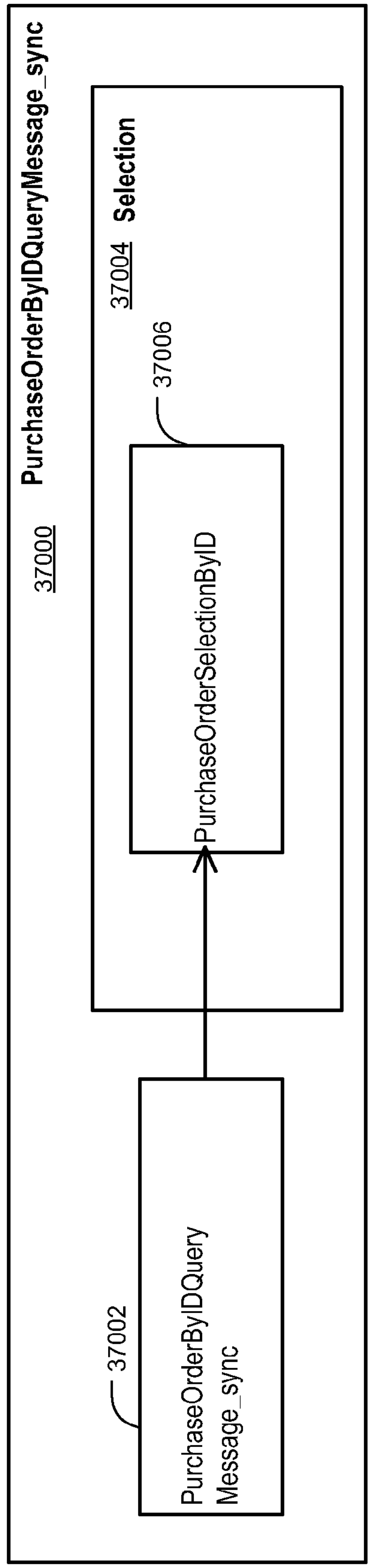
FIG. 37 shows an exemplary PurchaseOrderByIDQueryMessage Message Data Type.

Additionally, FIG. 37 illustrates one example logical configuration of PurchaseOrderByIDQueryMessage message 37000. Specifically, this figure depicts the arrangement and hierarchy of various components such as one or more levels of packages, entities, and datatypes, shown here as 37000 through 37006. As described above, packages may be used to represent hierarchy levels. Entities are discrete business elements that are used during a business transaction. Data types are used to type object entities and interfaces with a structure. For example, PurchaseOrderByIDQueryMessage message 37000 includes, among other things, Selection 37004. Accordingly, heterogeneous applications may communicate using this consistent message configured as such.

Figure 38:
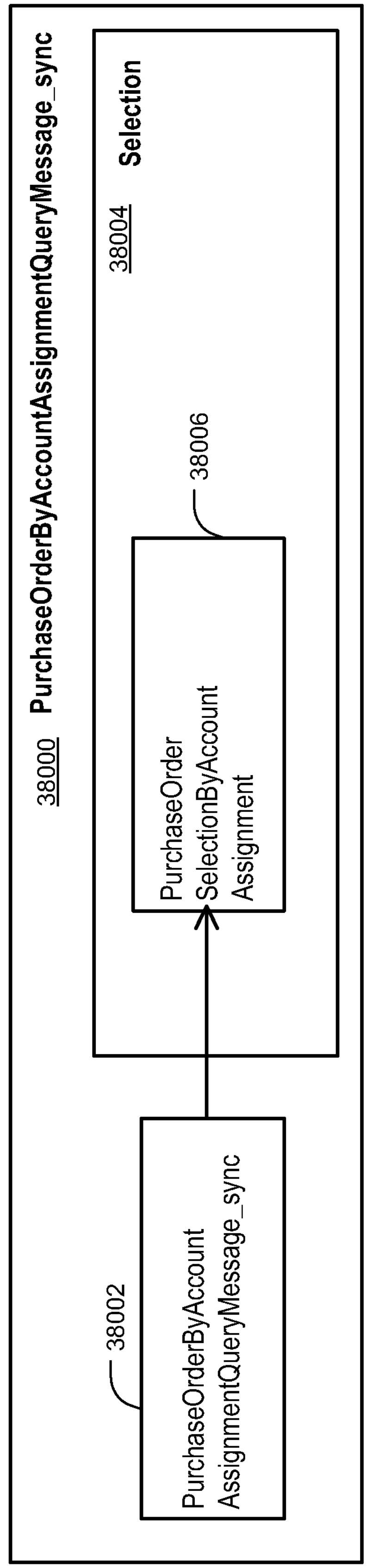
FIG. 38 shows an exemplary PurchaseOrderItemByAccount AssignmentQueryMessage Message Data Type.

Additionally, FIG. 38 illustrates one example logical configuration of PurchaseOrderByAccountAssignmentQueryMessage message 38000. Specifically, this figure depicts the arrangement and hierarchy of various components such as one or more levels of packages, entities, and datatypes, shown here as 38000 through 38006. As described above, packages may be used to represent hierarchy levels. Entities are discrete business elements that are used during a business transaction. Data types are used to type object entities and interfaces with a structure. For example, PurchaseOrderByAccountAssignmentQueryMessage message 38000 includes, among other things, Selection 38004. Accordingly, heterogeneous applications may communicate using this consistent message configured as such.

Additionally, FIG. 39 illustrates one example logical configuration of PurchaseOrderByIDQueryMessage message 39000. Specifically, this figure depicts the arrangement and hierarchy of various components such as one or more levels of packages, entities, and datatypes, shown here as 39000 through 39022. As described above, packages may be used to represent hierarchy levels. Entities are discrete business elements that are used during a business transaction. Data types are used to type object entities and interfaces with a structure. For example, PurchaseOrderByIDQueryMessage message 39000 includes, among other things, PurchaseOrderSelectionByID 39008. Accordingly, heterogeneous applications may communicate using this consistent message configured as such.

Additionally, FIGS. 40-1 through 40-14 illustrate one example logical configuration of PurchaseOrderByIDResponseMessage message 40000. Specifically, this figure depicts the arrangement and hierarchy of various components such as one or more levels of packages, entities, and datatypes, shown here as 40000 through 40478. As described above, packages may be used to represent hierarchy levels. Entities are discrete business elements that are used during a business transaction. Data types are used to type object entities and interfaces with a structure. For example, PurchaseOrderByIDResponseMessage message 40000 includes, among other things, PurchaseOrder 40008. Accordingly, heterogeneous applications may communicate using this consistent message configured as such.

Additionally, FIGS. 41-1 through 41-3 illustrate one example logical configuration of PurchaseOrderBySellerAndProductAndOrganisationalDataQueryMessage message 4200. Specifically, this figure depicts the arrangement and hierarchy of various components such as one or more levels of packages, entities, and datatypes, shown here as 4200 through 4276. As described above, packages may be used to represent hierarchy levels. Entities are discrete business elements that are used during a business transaction.

Data types are used to type object entities and interfaces with a structure. For example, PurchaseOrderBySellerAndProductAndOrganisationalDataQueryMessage message 4200 includes, among other things, PurchaseOrderSellerPartyInternalID 4212. Accordingly, heterogeneous applications may communicate using this consistent message configured as such.

Additionally, FIGS. 42-1 through 42-7 illustrate one example logical configuration of PurchaseOrderBySellerAndProductAndOrganisationalDataResponseMessage message 42000. Specifically, this figure depicts the arrangement and hierarchy of various components such as one or more levels of packages, entities, and datatypes, shown here as 42000 through 42218. As described above, packages may be used to represent hierarchy levels. Entities are discrete business elements that are used during a business transaction. Data types are used to type object entities and interfaces with a structure. For example, PurchaseOrderBySellerAndProductAndOrganisationalDataResponseMessage message 42000 includes, among other things, PurchaseOrder 42008. Accordingly, heterogeneous applications may communicate using this consistent message configured as such.

Additionally, FIGS. 43-1 through 43-15 illustrate one example logical configuration of PurchaseOrderChangeConfirmationMessage message 43000. Specifically, this figure depicts the arrangement and hierarchy of various components such as one or more levels of packages, entities, and datatypes, shown here as 43000 through 43478. As described above, packages may be used to represent hierarchy levels. Entities are discrete business elements that are used during a business transaction. Data types are used to type object entities and interfaces with a structure. For example, PurchaseOrderChangeConfirmationMessage message 43000 includes, among other things, PurchaseOrder 43008. Accordingly, heterogeneous applications may communicate using this consistent message configured as such.

Additionally, FIGS. 44-1 through 44-13 illustrate one example logical configuration of PurchaseOrderChangeRequestMessage message 44000. Specifically, this figure depicts the arrangement and hierarchy of various components such as one or more levels of packages, entities, and datatypes, shown here as 44000 through 44416. As described above, packages may be used to represent hierarchy levels. Entities are discrete business elements that are used during a business transaction. Data types are used to type object entities and interfaces with a structure. For example, PurchaseOrderChangeRequestMessage message 44000 includes, among other things, PurchaseOrder 44008. Accordingly, heterogeneous applications may communicate using this consistent message configured as such.

Additionally, FIGS. 45-1 through 45-14 illustrate one example logical configuration of PurchaseOrderCreateConfirmationMessage message 45000. Specifically, this figure depicts the arrangement and hierarchy of various components such as one or more levels of packages, entities, and datatypes, shown here as 45000 through 45436. As described above, packages may be used to represent hierarchy levels. Entities are discrete business elements that are used during a business transaction. Data types are used to type object entities and interfaces with a structure. For example, PurchaseOrderCreateConfirmationMessage message 45000 includes, among other things, PurchaseOrder 45008. Accordingly, heterogeneous applications may communicate using this consistent message configured as such.

Additionally, FIGS. 46-1 through 46-13 illustrate one example logical configuration of PurchaseOrderCreateRequestMessage message 46000. Specifically, this figure depicts the arrangement and hierarchy of various components such as one or more levels of packages, entities, and datatypes, shown here as 46000 through 46404. As described above, packages may be used to represent hierarchy levels. Entities are discrete business elements that are used during a business transaction. Data types are used to type object entities and interfaces with a structure. For example, PurchaseOrderCreateRequestMessage message 46000 includes, among other things, PurchaseOrder 46008. Accordingly, heterogeneous applications may communicate using this consistent message configured as such.

Additionally, FIGS. 47-1 through 47-4 illustrate one example logical configuration of PurchaseOrderItemByAccountAssignmentQueryMessage message 47000. Specifically, this figure depicts the arrangement and hierarchy of various components such as one or more levels of packages, entities, and datatypes, shown here as 47000 through 47070. As described above, packages may be used to represent hierarchy levels. Entities are discrete business elements that are used during a business transaction. Data types are used to type object entities and interfaces with a structure. For example, PurchaseOrderItemByAccountAssignmentQueryMessage message 47000 includes, among other things, PurchaseOrderItemSelectionByAccountAssignment 47008. Accordingly, heterogeneous applications may communicate using this consistent message configured as such.

Additionally, FIGS. 48-1 through 48-18 illustrate one example logical configuration of PurchaseOrderByAccountAssignmentResponseMessage message 48000. Specifically, this figure depicts the arrangement and hierarchy of various components such as one or more levels of packages, entities, and datatypes, shown here as 48000 through 48556. As described above, packages may be used to represent hierarchy levels. Entities are discrete business elements that are used during a business transaction. Data types are used to type object entities and interfaces with a structure. For example, PurchaseOrderByAccountAssignmentResponseMessage message 48000 includes, among other things, PurchaseOrder 48008. Accordingly, heterogeneous applications may communicate using this consistent message configured as such.

Additionally, FIGS. 49-1 through 49-3 illustrate one example logical configuration of PurchaseOrderItemConfirmConfirmationMessage message 49000. Specifically, this figure depicts the arrangement and hierarchy of various components such as one or more levels of packages, entities, and datatypes, shown here as 49000 through 49066. As described above, packages may be used to represent hierarchy levels. Entities are discrete business elements that are used during a business transaction. Data types are used to type object entities and interfaces with a structure. For example, PurchaseOrderItemConfirmConfirmationMessage message 49000 includes, among other things, PurchaseOrder 49008. Accordingly, heterogeneous applications may communicate using this consistent message configured as such.

Additionally, FIGS. 50-1 through 50-2 illustrate one example logical configuration of PurchaseOrderItemConfirmRequestMessage message 50000. Specifically, this figure depicts the arrangement and hierarchy of various components such as one or more levels of packages, entities, and datatypes, shown here as 50000 through 50058. As described above, packages may be used to represent hierarchy levels. Entities are discrete business elements that are used during a business transaction. Data types are used to type object entities and interfaces with a structure. For example, PurchaseOrderItemConfirmRequestMessage message 50000 includes, among other things, PurchaseOrder 50008. Accordingly, heterogeneous applications may communicate using this consistent message configured as such.

Additionally, FIGS. 51-1 through 51-17 illustrate one example logical configuration of PurchaseOrderItemConfirmConfirmationMessage message 51000. Specifically, this figure depicts the arrangement and hierarchy of various components such as one or more levels of packages, entities, and datatypes, shown here as 51000 through 51544. As described above, packages may be used to represent hierarchy levels. Entities are discrete business elements that are used during a business transaction. Data types are used to type object entities and interfaces with a structure. For example, PurchaseOrderItemConfirmConfirmationMessage message 51000 includes, among other things, PurchaseOrder 51008. Accordingly, heterogeneous applications may communicate using this consistent message configured as such.

Message Data Type PurchaseOrderMessage

The message data type PurchaseOrderMessage can include the PurchaseOrder object 34028 included in the business document and the information of the message log. It can include the packages PurchaseOrder and Log.

The message data type PurchaseOrderMessage can be used as an abstract maximal message data type, which unifies all packages and entities for the following concrete message data types: PurchaseOrderBySellerAndProductAndOrganisationalDataResponseMessage, PurchaseOrderByIDResponseMessage_sync, PurchaseOrderCreateRequestMessage_sync, PurchaseOrderCreateConfirmationMessage_sync, PurchaseOrderChangeRequestMessage_sync, PurchaseOrderChangeConfirmationMessage_sync, PurchaseOrderItemConfirmRequestMessage_sync, PurchaseOrderItemConfirmConfirmationMessage_sync and PurchaseOrderItemByAccountAssignmentResponseMessage_sync. The following table identifies example cardinalities that can be used for messages and their elements.

| | Message Data Type | | | | | | | | |
|---|---|---|---|---|---|---|---|---|---|
| Entity | PurchaseOrder-BySellerAnd-ProductAnd Organisational-DataResponse-Message_Sync Card. | Purchase-OrderByID-Response-Message_ Sync Card. | Purchase-OrderItemBy Account-Assignment Response-Message_ Sync Card. | Purchase-Order-Create-Request-Message_ Sync Card. | Purchase-Order-Create-Confir-mation Message_ Sync Card. | Purchase-Order-Change-Request-Message_ Sync Card. | Purchase-Order-Change-Confir-mation Message_ Sync Card. | Purchase-Order-Item-Confirm-Request Message_ Sync Card. | Purchase-Order-Item-Confirm Confir-mation-Message_ Sync Card. |
| PurchaseOrderMessage | | | | | | | | | |
| PuchaseOrder | 0...N | 0...1 | 0...N | 1 | 1 | 1 | 1 | 1 | 1 |
| PurchasingOrganisationParty | 1 | 1 | 1 | 1 | 1 | 1 | 1 | 0 | 0 |
| PuchasingGroupParty | 1 | 1 | 1 | 1 | 1 | 1 | 1 | 0 | 0 |
| SellerParty | 1 | 1 | 1 | 1 | 1 | 1 | 1 | 0 | 0 |
| BillFromParty | 0...1 | 0...1 | 0...1 | 0...1 | 0...1 | 0...1 | 0...1 | 0 | 0 |
| VendorParty | 0...1 | 0...1 | 0...1 | 0...1 | 0...1 | 0...1 | 0...1 | 0 | 0 |
| Delivery Terms | 0 | 0...1 | 0 | 0...1 | 0...1 | 0...1 | 0...1 | 0 | 0 |
| CashDiscountTerms | 0 | 0...1 | 0 | 0...1 | 0...1 | 0...1 | 0...1 | 0 | 0 |
| Price | 0 | 0...1 | 0 | 0 | 1 | 0 | 1 | 0 | 0 |
| Item | 1...N | 1...N | 1...N | 1...N | 1...N | 1...N | 1...N | 1 | 1 |
| RequestorParty | 0 | 0...1 | 0...1 | 0...1 | 0...1 | 0...1 | 0...1 | 0 | 0 |
| InventoryManagedLocation | 0...1 | 0...1 | 0...1 | 0...1 | 0...1 | 0...1 | 0...1 | 0 | 0 |
| ShipToLocation | 1 | 1 | 0 | 0...1 | 1 | 0...1 | 1 | 0 | 0 |
| Product | 0...1 | 0...1 | 0...1 | 0...1 | 0...1 | 0...1 | 0...1 | 0 | 0 |
| ProductCategory | 1 | 1 | 1 | 1 | 1 | 1 | 1 | 0 | 0 |
| AccountAssignment | 0 | 0 | 0...N | 0 | 0 | 0 | 0 | 0 | 0 |
| Price | 0...1 | 0...1 | 0...1 | 1 | 1 | 0...1 | 0...1 | 0 | 0 |
| DeliveryTerms | 0 | 0...1 | 0 | 0...1 | 0...1 | 0...1 | 0...1 | 0 | 0 |
| Confirmation | 0 | 0...N | 0 | 0 | 0 | 0 | 0...N | 1...N | 1...N |
| SupplierQuoteReference | 0 | 0...1 | 0 | 0...1 | 0...1 | 0...1 | 0...1 | 0 | 0 |
| PurchaseContractReference | 0 | 0...1 | 0 | 0...1 | 0...1 | 0...1 | 0...1 | 0 | 0 |
| ScheduleLine | 0 | 1...N | 0 | 1...N | 1...N | 1...N | 1...N | 0 | 0 |
| PurchaseRequestReference | 0 | 0...1 | 0 | 0...1 | 0...1 | 0...1 | 0...1 | 0 | 0 |
| Log | 0...1 | 0...1 | 0...1 | 0 | 0...1 | 0 | 0...1 | 0 | 0...1 |

A PurchaseOrder package groups together the PurchaseOrder and its packages. It can include the following packages: Party, DeliveryTerms, PaymentInformation, PriceInformation and Item.

A PurchaseOrder is a buyer's request (or a change to or confirmation of such a request) to a seller to provide or deliver certain quantities of products at one or several dates. The PurchaseOrder can be divided into PurchaseOrderItems that each specifies an ordered product and additional information relevant for such a product. It can include the elements: ID, ProcessingTypeCode, CancelledIndicator, BusinessTransactionDocumentDate, CreationDate and CreationUserAccountID.

ID can be the unique identifier specified by the buyer for the PurchaseOrder, and can be of type GDT: PurchaseOrderID. ProcessingTypeCode can be the coded representation of the way in which the PurchaseOrder can be processed, and can be of type GDT: BusinessTransactionDocumentProcessingTypeCode. CancelledIndicator can be an indicator that indicates that the PurchaseOrder is cancelled, and can be of type GDT: Indicator. BusinessTransactionDocumentDate can be the manually entered date at which the PurchaseOrder becomes valid, and can be of type GDT: Date. CreationDate can be the creation date of the PurchaseOrder by the buyer, and can be of type GDT: Date. CreationUserAccountID can be the name of person who created the PurchaseOrder, and can be of type GDT: UserAccoountID.

A Party package groups together all the business parties involved in the PurchaseOrder. It can include the following entities: PurchasingOrganisationParty, PurchasingGroupParty, SellerParty, BillFromParty and VendorParty.

A PurchasingOrganisationParty can be an organisational unit within logistics that subdivides the enterprise according to the requirements of purchasing. A PurchasingOrganisationParty can be responsible for the handling of purchasing deals with suppliers, it purchases products and negotiates purchase terms. In the organisational structure, a PurchasingOrganisationParty usually groups together a number of PurchasingGroupParty. A PurchaseOrder can include exactly one PurchasingOrganisationParty. It can include the element InternalID. InternalID can be the unique identifier of a purchasing organization, and can be of type GDT: PartyInternalID.

A PurchasingGroupParty can be an organisational unit within logistics that subdivides the enterprise from the viewpoint of purchasing according to the responsibilities for the procurement of products and can be the point of contact for the suppliers. A PurchasingGroupParty can also act for several PurchasingOrganisationParties. It can include the element InternalID. InternalID can be the unique identifier of a purchasing group, and can be of type GDT: PartyInternalID.

The SellerParty can be the party that sells the requested product. A PurchaseOrder can be ordered if a SellerParty can be provided. A PurchaseOrder can include one SellerParty. It can include the element InternalID. InternalID can be a unique identifier for the seller, and can be of type GDT: PartyInternalID.

A BillFromParty can be a party from which the invoice is sent. It can include the element InternalID which can be a unique identifier for the party from which the bill is sent, and can be of type GDT: PartyInternalID. A VendorParty can be a party that delivers goods. It can include the element InternalID which can be a unique identifier for the party which delivers the goods, and can be of type GDT: PartyInternalID.

A DeliveryTerms package groups together all the information for a delivery used for a PurchaseOrder. It can include the entity DeliveryTerms. DeliveryTerms are the conditions and agreements that apply when delivering and transporting the ordered goods and providing the necessary services and activities for this. The entity DeliveryTerms can include the element Incoterms. Incoterms are typical contract formulations for delivery conditions that correspond to the rules defined by the International Chamber of Commerce (ICC), and can be of type GDT: Incoterms.

A PaymentInformation package groups together all the payment information of the PurchaseOrder. It can include the entity CashDiscountTerms. CashDiscountTerms are the terms of payment in an ordering process, and can be of type GDT: CashDiscountTerms. The PriceInformation package groups the price information. It can include the entity Price.

A Price can be the PurchaseOrder price for the whole order (sum of the net amounts of all items). It can include the element TotalAmount. TotalAmount can be the net amount of the ordered goods before tax or deducted cash discount, and can be of type GDT: Amount.

An Item package groups together the Item with its packages. It can include the packages: Party, Location, ProductInformation, AccountAssignment, PriceInformation, DeliveryTerms, Confirmation, BusinessTransactionDocumentReference and ScheduleLine.

An Item specifies a product ordered by the PurchaseOrder or additional information about such a product. It can include the elements: ID, ProcessingTypeCode, CancelledIndicator, Quantity, PlantID and Description.

ID can be the unique identifier specified by the buyer for the PurchaseOrderItem, and can be of type GDT: PurchaseOrderItemID ProcessingTypeCode can be the coded representation of the way in which the PurchaseOrder item is processed, and can be of type GDT: BusinessTransactionDocumentItemProcessingTypeCode. CancelledIndicator can be an indicator that indicates that the PurchaseOrderItem is cancelled, and can be of type GDT: Indicator. Quantity can be the amount ordered, and can be of type GDT: Quantity. PlantID can be the unique identifier of a plant, and can be of type GDT: PlantID. Description can be a natural-language text regarding the PurchaseOrderItem, and can be of type GDT: SHORT_Description.

The Party package groups together all participating parties of the Item. It can include the entity RequestorParty. The RequestorParty can be the party that initiates the purchasing process through a request of some kind. It can include the element InternalID. InternalID can be the unique identifier of a party that requests the procurement of goods, and can be of type GDT: PartyInternalID.

The Location package groups together all participating locations. It can include the following entities: InventoryManagedLocation and ShipToLocation. An InventoryManagedLocation can be the storage location at which materials are stored. It can include the element InternalID. InternalID can be the unique identifier of a InventoryManagedLocation, and can be of type GDT: LocationInternalID.

A ShipToLocation can be the place to which goods are to be delivered. It can include the element InternalID. InternalID can be the unique identifier of a ShipToLocation, and can be of type GDT: LocationInternalID. The ProductInformation Package groups together all information for identification, description and classification of a product. Materials can be considered as products. It can include the entities Product and ProductCategory.

A Product can include the details about a product as generally understood from a commercial point of view in business documents. There are the details for identifying a product and product category, and the description of the product. It can include the elements: InternalID and ManufacturerID. InternalID can be a proprietary identifier for the product ordered by the PurchaseOrderItem, and can be of type GDT: ProductInternalID. ManufacturerID can be an identifier for the ordered product assigned by the manufacturer, and can be of type GDT: ProductPartyID.

A ProductCategory can include the details about a product category as generally understood from a commercial point of view in business transaction documents. It can include the element InternalID. InternalID can be a proprietary identifier for a product category, and can be of type GDT: ProductCategoryInternalID.

The AccountAssignment Package groups together all accounting information, including the accounting distribution and the accounting objects. It can include the entity AccountAssignment. AccountAssignment can be the assignment of a set of accounting objects to a PurchaseOrderItem. It can include the elements: Quantity, Percent, GeneralLedgerAccountID, ProfitCentreID, CostCentreID, SalesOrderID, SalesOrderItemID, ProjectWorkBreakdownStructureElementID, ProjectNetworkID, ProjectActivityID, MasterFixedAssetID and FixedAssetID.

Quantity can be the quantity of the account assignment, and can be of type GDT: Quantity. Percent can be the percent of the account assignment, and can be of type GDT: Percent. GeneralLedgerAccountID can be the unique identifier of a GeneralLedgerAccount, and can be of type GDT: GeneralLedgerAccountID. ProfitCentreID can be the unique identifier of a ProfitCentre, and can be of type GDT: ProfitCentreID. CostCentreID can be the unique identifier of a CostCentre, and can be of type GDT: CostCentreID. SalesOrderID can be the unique identifier of a SalesOrder, and can be of type GDT: SalesOrderID. SalesOrderItemID can be the unique identifier of an Item within a SalesOrder, and can be of type GDT: SalesOrderItemID ProjectWorkBreakdownStructureElementID can be the unique identifier of a WBSElement, and can be of type GDT: ProjectWorkBreakdownStructureElementID. ProjectNetworkID can be an identifier for a Project Network, and can be of type GDT: ProjectNetworkID. ProjectActivityID can be an identifier for a Project Activity, and can be of type GDT: ProjectActivityID. MasterFixedAssetID can be the unique identifier of a MasterFixedAsset, and can be of type GDT: MasterFixedAssetID. FixedAssetID can be the unique identifier of a FixedAsset, and can be of type GDT: FixedAssetID.

A PriceInformation package groups together all the price information in a PurchaseOrderItem. It can include the entity Price. The PriceInformation package for a PurchaseOrderItem can include prices and amounts; it can also contain information about how the prices are calculated (pricing scales, and so on).

A Price can be the price of the PurchaseOrderItem of the ordered product. It can include the elements TotalAmount and NetPrice. TotalAmount can be the net price specified by the buyer for the quantity (without tax or cash discount) of the product, and can be of type GDT: Amount. NetPrice can be the net price specified by the buyer for the base quantity (without tax or cash discount) of the product, and can be of type GDT: Price.

A DeliveryTerms package groups together all the information for a delivery used for a PurchaseOrderItem. It can include the entity DeliveryTerms. DeliveryTerms are the conditions and agreements that apply when delivering and transporting the ordered goods and providing the necessary services and activities for this. It can include the elements Incoterms and QuantityTolerance. Incoterms are typical contract formulations for delivery conditions that correspond to the rules defined by the International Chamber of Commerce (ICC), and can be of type GDT: Incoterms. QuantityTolerance can be the tolerated difference between a requested and an actual quantity (e.g., a delivery quantity) as a percentage, and can be of type GDT: QuantityTolerance.

It can include the entity Confirmation. A PurchaseOrderItem Confirmation can be a confirmation by the seller that a specified quantity of a product can be delivered at a specified price within a specified time. It can include the elements: ID, ProcessingTypeCode, Quantity and DeliveryDateTime. ID can be the unique identifier for the confirmation of the PurchaseOrderItem, and can be of type GDT: PurchaseOrderItemConfirmationID. ProcessingTypeCode can be the coded representation of the type of confirmation, and can be of type GDT: BusinessTransactionDocumentProcessingTypeCode. Quantity can be the amount confirmed, and can be of type GDT: Quantity. DeliveryDateTime can be the date and time at which the SellerParty confirms to deliver the ordered goods, and can be of type GDT: LOCAL_DateTime.

The BusinessTransactionDocumentReference package can include the entities: SupplierQuoteReference and PurchaseContractReference. A SupplierQuoteReference points to a SupplierQuoteItem. It can include the elements ID and ItemID ID can be the unique identifier for the SupplierQuoteReference, and can be of type GDT: SupplierQuoteID. ItemID can be the unique identifier for the SupplierQuoteReferenceItem, and can be of type GDT: SupplierQuoteItemID A PurchaseContractReference points to a PurchaseContractItem. It can include the elements ID and ItemID ID can be the unique identifier for the PurchaseContractReference, and can be of type GDT: PurchaseContractID. ItemID can be the unique identifier for the PurchaseContractReferenceItem, and can be of type GDT: PurchaseContractItemID.

The ScheduleLine Package can include the entity ScheduleLine and the package BusinessTransactionDocumentReference. A ScheduleLine can be a line containing the quantity and date of a performance schedule requested by the buyer for a PurchaseOrderItem. It can include the elements: ID, DeliveryDateTime and Quantity. ID can be the unique identifier for the ScheduleLine, and can be of type GDT: BusinessTransactionDocumentItemScheduleLineID. DeliveryDateTime can be the date and time at which a delivery takes place, and can be of type GDT: LOCAL_DateTime. Quantity can be the amount confirmed, and can be of type GDT: Quantity.

The BusinessTransactionDocumentReference package can include the entity PurchaseRequestReference. A PurchaseRequestReference points to a PurchaseRequestItem. It can include the elements: ID can be the unique identifier for the PurchaseRequestReference, and can be of type GDT: PurchaseRequestID. ItemID can be the unique identifier for the PurchaseRequestReferenceItem, and can be of type GDT: PurchaseRequestItemID.

A Log package groups the messages used for user interaction. It can include the entity Log. A log can be a sequence of messages that result when an application executes a task. The entity Log can be of type GDT: Log. The Log package can be used in the message data types used for outbound messages from the perspective of the purchasing application. Therefore, the following message data types can use this package: PurchaseOrderBySellerAndProductAndOrganisationalDataResponseMessage_sync, PurchaseOrderByIDResponseMessage_sync, PurchaseOrderCreateConfirmationMessage_sync, PurchaseOrderChangeConfirmationMessage_sync, PurchaseOrderItemConfirmConfirmationMessage_sync and PurchaseOrderItemByAccountAssignmentResponseMessage_sync.

Message Data Type PurchaseOrderBySellerAndProduct AndOrganisationalDataQueryMessage_sync The message data type PurchaseOrderBySellerAndProductAndOrganisationalDataQueryMessage_sync can include the selection included in the business document. It can include the package Selection.

The Selection package can collect selection criteria for PurchaseOrders. It can include the entity PurchaseOrderSelectionBySellerAndProductAndOrganisationalData. PurchaseOrderSelectionBySellerAndProductAndOrganisationalData specifies selection criteria to select a PurchaseOrder. It can include the elements: PurchaseOrderSellerPartyInternalID, PurchaseOrderPurchasingOrganisationPartyInternalID, PurchaseOrderPurchasingGroupPartyInternalID, PurchaseOrderProcessingTypeCode, PurchaseOrderItemProductInternalID, PurchaseOrderItemProductCategoryInternalID, PurchaseOrderItemDescription, PurchaseOrderItemPlantID, PurchaseOrderItemProcessingTypeCode and PurchaseOrderItemRequestorPartyInternalID.

PurchaseOrderSellerPartyInternalID can be a unique identifier for the seller, and can be of type GDT: PartyInternalID. PurchaseOrderPurchasingOrganisationPartyInternalID can be the unique identifier of a purchasing organisation, and can be of type GDT: PartyInternalID. PurchaseOrderPurchasing- GroupPartyInternalID can be the unique identifier of a purchasing group, and can be of type GDT: PartyInternalID. PurchaseOrderProcessingTypeCode can be the coded representation of the way in which the PurchaseOrder is processed, and can be of type GDT: BusinessTransactionDocumentProcessingTypeCode. PurchaseOrderItemProductInternalID can be a proprietary identifier for the product ordered by the PurchaseOrderItem, and can be of type GDT: ProductInternalID. PurchaseOrderItemProductCategoryInternalID can be a proprietary identifier for a product category, and can be of type GDT: ProductCategoryInternalID. PurchaseOrderItemDescription can be a natural-language text regarding the PurchaseOrderItem, and can be of type GDT: SHORT_Description. PurchaseOrderItemPlantID can be the unique identifier of a plant, and can be of type GDT: PlantID. PurchaseOrderItemProcessingTypeCode can be the coded representation of the way in which the PurchaseOrder item is processed, and can be of type GDT: Business TransactionDocumentItemProcessingTypeCode. PurchaseOrderItemRequestorPartyInternalID can be the unique identifier of a party that requests the procurement of goods, and can be of type GDT: PartyInternalID.

Message Data Type PurchaseOrderByIDQueryMessage_sync

The message data type PurchaseOrderByIDQueryMessage_sync can include the selection included in the business document. It can include the package Selection.

The Selection package can include the ID and the ItemID of the PurchaseOrder, and can include the entity PurchaseOrderSelectionByID. PurchaseOrderSelectionByID specifies selection criteria to select a PurchaseOrder by PurchaseOrder ID and PurchaseOrderItem ID. It can include the elements: PurchaseOrderID and PurchaseOrderItemID PurchaseOrderID can be the unique identifier specified by the buyer for the PurchaseOrder, and can be of type GDT: PurchaseOrderID. PurchaseOrderItemID can be the unique identifier specified by the buyer for the PurchaseOrderItem, and can be of type GDT: PurchaseOrderItemID.

Message Data Type PurchaseOrderItemByAccount AssignmentQueryMessage_sync

The message data type PurchaseOrderItemByAccountAssignmentQueryMessage_sync can include the selection included in the business document, and can include the package Selection. The Selection package can collect selection criteria for PurchaseOrderItems. It can include the entity PurchaseOrderItemSelectionByAccountAssignment.

The PurchaseOrderItemSelectionByAccountAssignment entity specifies selection criteria to select a PurchaseOrderItem. It can include the elements: PurchaseOrderItemAccountAssignmentGeneralLedgerAccountID, PurchaseOrderItemAccountAssignmentProfitCentreID, PurchaseOrderItemAccountAssignmentCostCentreID, PurchaseOrderItemAccountAssignmentSalesOrderID, PurchaseOrderItemAccountAssignmentSalesOrderItemID, PurchaseOrderItemAccountAssignmentProjectWork-Breakdown-StructureElementID, PurchaseOrderItemAccountAssignmentProjectNetworkID, PurchaseOrderItemAccountAssignmentProjectActivityID, PurchaseOrderItemAccountAssignmentMasterFixedAssetID and PurchaseOrderItemAccountAssignmentFixedAssetID.

PurchaseOrderItemAccountAssignmentGeneralLedgerAccountID can be the unique identifier of a GeneralLedgerAccount, and can be of type GDT: GeneralLedgerAccountID. PurchaseOrderItemAccountAssignmentProfitCentreID can be the unique identifier of a ProfitCentre, and can be of type GDT: ProfitCentreID. PurchaseOrderItemAccountAssignmentCostCentreID can be the unique identifier of a CostCentre, and can be of type GDT: CostCentreID. PurchaseOrderItemAccountAssignmentSalesOrderID can be the unique identifier of a Sales Order, and can be of type GDT: SalesOrderID. PurchaseOrderItemAccountAssignmentSalesOrderItemID can be the unique identifier of an Item within a SalesOrder, and can be of type GDT: SalesOrderItemID PurchaseOrderItemAccountAssignmentProjectWorkBreakdownStructureElementID can be the unique identifier of a WBSElement, and can be of type GDT: ProjectWorkBreakdownStructureElementID. PurchaseOrderItemAccountAssignmentProjectNetworkID can be an identifier for a Project Network, and can be of type GDT: ProjectNetworkID. PurchaseOrderItemAccountAssignmentProjectActivityID can be an identifier for a Project Activity, and can be of type GDT: ProjectActivityID. PurchaseOrderItemAccountAssignmentMasterFixedAssetID can be the unique identifier of a MasterFixedAsset, and can be of type GDT: MasterFixedAssetID. PurchaseOrderItemAccountAssignmentFixedAssetID can be the unique identifier of a FixedAsset, and can be of type GDT: FixedAssetID.

PurchaseRequest Interface(s)

In some implementations, PurchaseRequest interfaces can be used to exchange PurchaseRequests for products between a requestor and a buyer. To simplify the communication between the requestor and the Purchase Request Processing new interfaces can be defined using commonly available technologies. These Interfaces can provide the possibilities to create, change, release or read PurchaseRequests. More than just a simple interface structure, the PurchaseRequest interfaces can define underlying corporate significance and, at the same time, dispense with the need to exchange proprietary information in straightforward purchasing request and approval processes. In this way, applications that implement PurchaseRequest interfaces can be integrated without the need for complex project work.

The following messages can be included in PurchaseRequest interfaces: PurchaseRequestItemByAccountAssignmentResponse_sync, PurchaseRequestItemByAccountAssignmentQuery_sync, PurchaseRequestReleaseConfirmation_sync, PurchaseRequestReleaseRequest_sync, PurchaseRequestChangeConfirmation_sync, PurchaseRequestChangeRequest_sync, PurchaseRequestCreateConfirmation_sync, PurchaseRequestCreateRequest_sync, PurchaseRequestByIDResponse_sync, PurchaseRequestByIDQuery_sync, PurchaseRequestItemByProductAndOrganisationalDataResponse_sync, PurchaseRequestItemByProductAndOrganisationalDataQuery_sync, PurchaseRequestByReleaseInformationResponse_sync, and PurchaseRequestByReleaseInformationQuery_sync.

Figure 52:
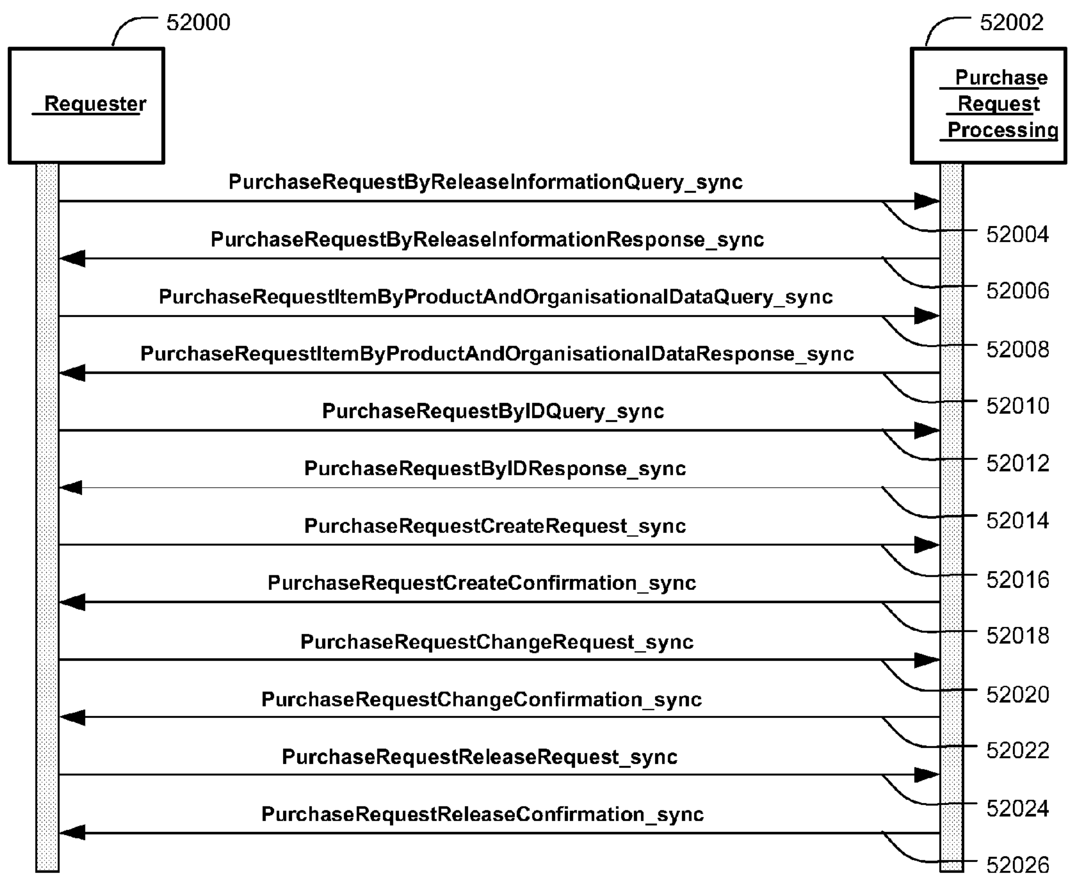
FIG. 52 shows an exemplary PurchaseRequest Message Choreography.

The message choreography of FIG. 52 describes a possible logical sequence of messages that can be used to realize a PurchaseRequest business scenario. A "Requester" system 52000 can query purchase request by release information using a PurchaseRequestByReleaseInformationQuery_sync message 52004 as shown, for example, in FIG. 52. A "PurchaseRequestProcessing" system 52002 can respond to the query using a PurchaseRequestByReleaseInformationResponse_sync message 52006 as shown, for example, in FIG. 52. The "Requester" system 52000 can query purchase request item by product and organizational data using a PurchaseRequestItemByProductAndOrganisationalDataQuery_sync message 52008 as shown, for example, in FIG. 52. The "PurchaseRequestProcessing" system 52002 can respond to the query using a PurchaseRequestItemByProductAndOrganisationalDataResponse_sync message 52010 as shown, for example, in FIG. 52. The "Requester" system 52000 can query purchase request by ID using a PurchaseRequestByIDQuery_sync message 52012 as shown, for example, in FIG. 52. The "PurchaseRequestProcessing" system 52002 can respond to the query using a PurchaseRequestByIDResponse_sync message 52014 as shown, for example, in FIG. 52. The "Requester" system 52000 can request purchase request create using a PurchaseRequestCreateRequest_ sync message 52016 as shown, for example, in FIG. 52. The "PurchaseRequestProcessing" system 52002 can respond to the request using a PurchaseRequestCreateConfirmation_sync message 52018 as shown, for example, in FIG. 52. The "Requester" system 52000 can request purchase request change using a PurchaseRequestChangeRequest_ sync message 52020 as shown, for example, in FIG. 52. The "PurchaseRequestProcessing" system 52002 can respond to the request using a PurchaseRequestChangeConfirmation_sync message 52022 as shown, for example, in FIG. 52. The "Requester" system 52000 can request purchase request release using a PurchaseRequestReleaseRequest_sync message 52024 as shown, for example, in FIG. 52. The "PurchaseRequestProcessing" system 52002 can respond to the request using a PurchaseRequestReleaseConfirmation_sync message 52026 as shown, for example, in FIG. 52.

A PurchaseRequestByReleaseInformationQuery can be an inquiry to the Purchase Request Processing for PurchaseRequests for the release information. The structure of the message type PurchaseRequestByReleaseInformationQuery can be specified by the message data type PurchaseRequestByReleaseInformationQueryMessage.

A PurchaseRequestByReleaseInformationResponse can be the response to PurchaseRequestByReleaseInformationQuery and can contain PurchaseRequests. The structure of the message type PurchaseRequestByReleaseInformationResponse can be specified by the message data type PurchaseRequestByReleaseInformationResponseMessage, which can be derived from the message data type PurchaseRequestMessage.

A PurchaseRequestItemByProductAndOrganisationalDataQuery can be an inquiry to the Purchase Request Processing for PurchaseRequestItems for information about product and organisational data. The structure of the message type PurchaseRequestItemByProductAndOrganisationalDataQuery can be specified by the message data type PurchaseRequstItemByProductAndOrganisationalDataQueryMessage. A PurchaseRequestItemByProductAndOrganisationalDataResponse can be the response to PurchaseRequestItemByProductAndOrganisationalDataQuery and can contain PurchaseRequestItems. The structure of the message type PurchaseRequestItemByProductAndOrganisationalDataResponse can be specified by the message data type PurchaseRequestItemByProductAndOrganisationalDataResponseMessage, which can be derived from the message data type PurchaseRequestMessage.

A PurchaseRequestByIDQuery can be an inquiry to the Purchase Request Processing for PurchaseRequests for the PurchaseRequestID. The structure of the message type PurchaseRequestByIDQuery can be specified by the message data type PurchaseRequestByID QueryMessage.

A PurchaseRequestByIDResponse can be the response to PurchaseRequestByIDQuery and can contain the selected PurchaseRequest. The structure of the message type PurchaseRequestByIDResponse can be specified by the message data type PurchaseRequestByIDResponseMessage, which can be derived from the message data type PurchaseRequestMessage.

A PurchaseRequestCreateRequest can be a request to the Purchase Request Processing to create a PurchaseRequest. The structure of the message type PurchaseRequestCreateRequest can be specified by the message data type PurchaseRequestCreateRequestMessage, which can be derived from the message data type PurchaseRequestMessage.

A PurchaseRequestCreateConfirmation can be a confirmation sent from the Purchase Request Processing and can contain the created PurchaseRequest. The structure of the message type PurchaseRequestCreateConfirmation can be specified by the message data type PurchaseRequestCreateConfirmationMessage, which can be derived from the message data type PurchaseRequestMessage.

A PurchaseRequestChangeRequest can be a request to the Purchase Request Processing to change a PurchaseRequest. The structure of the message type PurchaseRequestChangeRequest can be specified by the message data type PurchaseRequestChangeRequestMessage, which can be derived from the message data type PurchaseRequestMessage.

A PurchaseRequestChangeConfirmation can be a confirmation sent from the Purchase Request Processing and can contain the changed PurchaseRequest. The structure of the message type PurchaseRequestChangeConfirmation can be specified by the message data type PurchaseRequestChangeConfirmationMessage, which can be derived from the message data type PurchaseRequestMessage.

A PurchaseRequestReleaseRequest can be the request to the Purchase Request Processing to release a PurchaseRequest or a PurchaseRequestItem. The structure of the message type PurchaseRequestReleaseRequest can be specified by the message data type PurchaseRequestReleaseRequestMessage.

A PurchaseRequestReleaseConfirmation can be a confirmation sent from the Purchase Request Processing concerning the request to release a PurchaseRequest or a PurchaseRequestItem. The structure of the message type PurchaseRequestReleaseConfirmation can be specified by the message data type PurchaseRequestReleaseConfirmationMessage, which can be derived from the message data type PurchaseRequestMessage.

A PurchaseRequestItemByAccountAssignmentQuery can be an inquiry to the Purchase Request Processing for PurchaseRequestItems for account assignment information. The structure of the message type PurchaseRequestItemByAccountAssignmentQuery can be specified by the message data type PurchaseRequestItemByAccountAssignmentQueryMessage.

A PurchaseRequestItemByAccountAssignmentResponse can be the response to PurchaseRequestItemByAccountAssignmentQuery and can contain PurchaseRequestItems. The structure of the message type PurchaseRequestItemByAccountAssignmentResponse can be specified by the message data type PurchaseRequestItemByAccountAssignmentResponseMessage, which can be derived from the message data type PurchaseRequestMessage.

In some implementations, PurchaseRequest can use the interfaces of PurchaseRequestByReleaseInformationQueryResponse_In, PurchaseRequestItemByProductAndOrganisationalDataQueryResponse_In, PurchaseRequestByIDQueryRespons PurchaseRequestCreateRequestConfirmation_In, PurchaseRequestChangeRequestConfirmation_In, PurchaseRequestReleaseRequestConfirmation_In, and PurchaseRequestItemByAccountAssignmentQueryResponse_In.

Figures 1, 53:
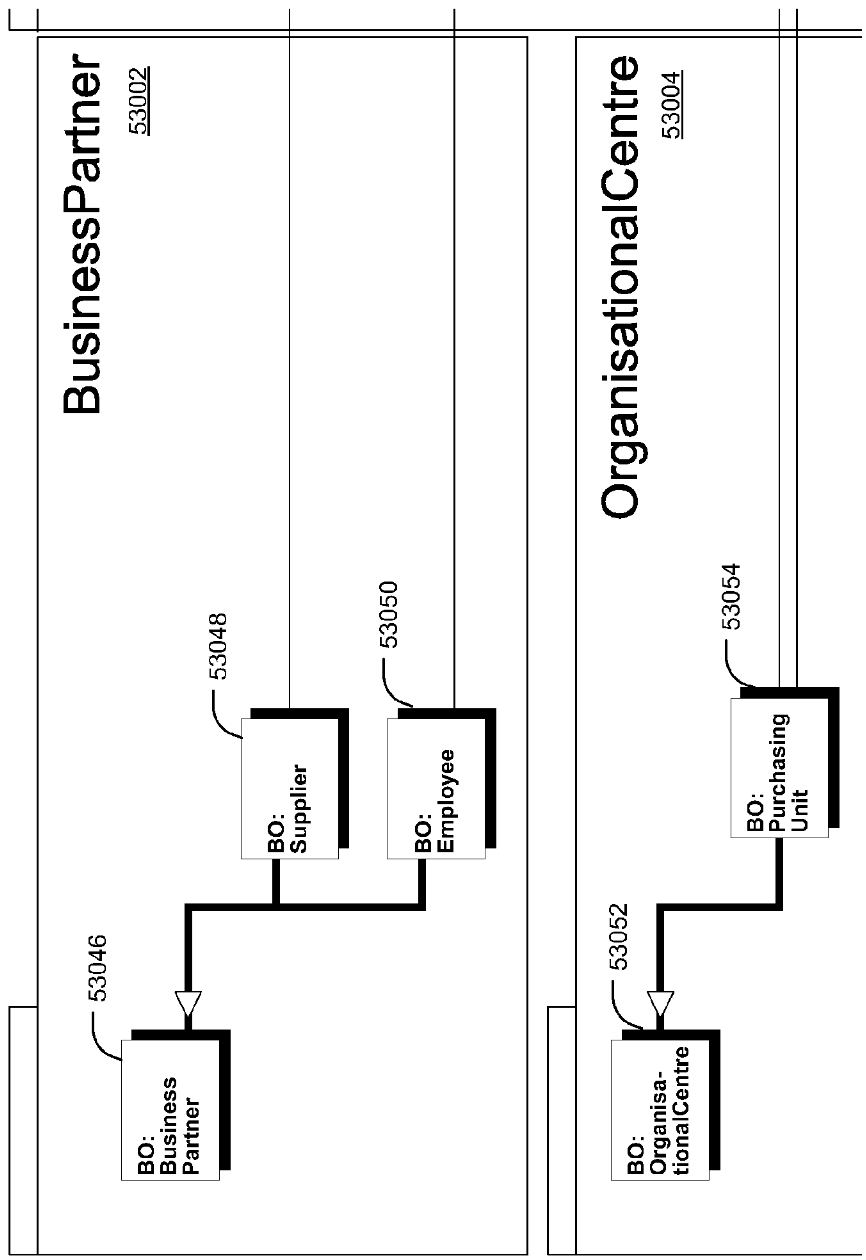
Figures 2, 53:
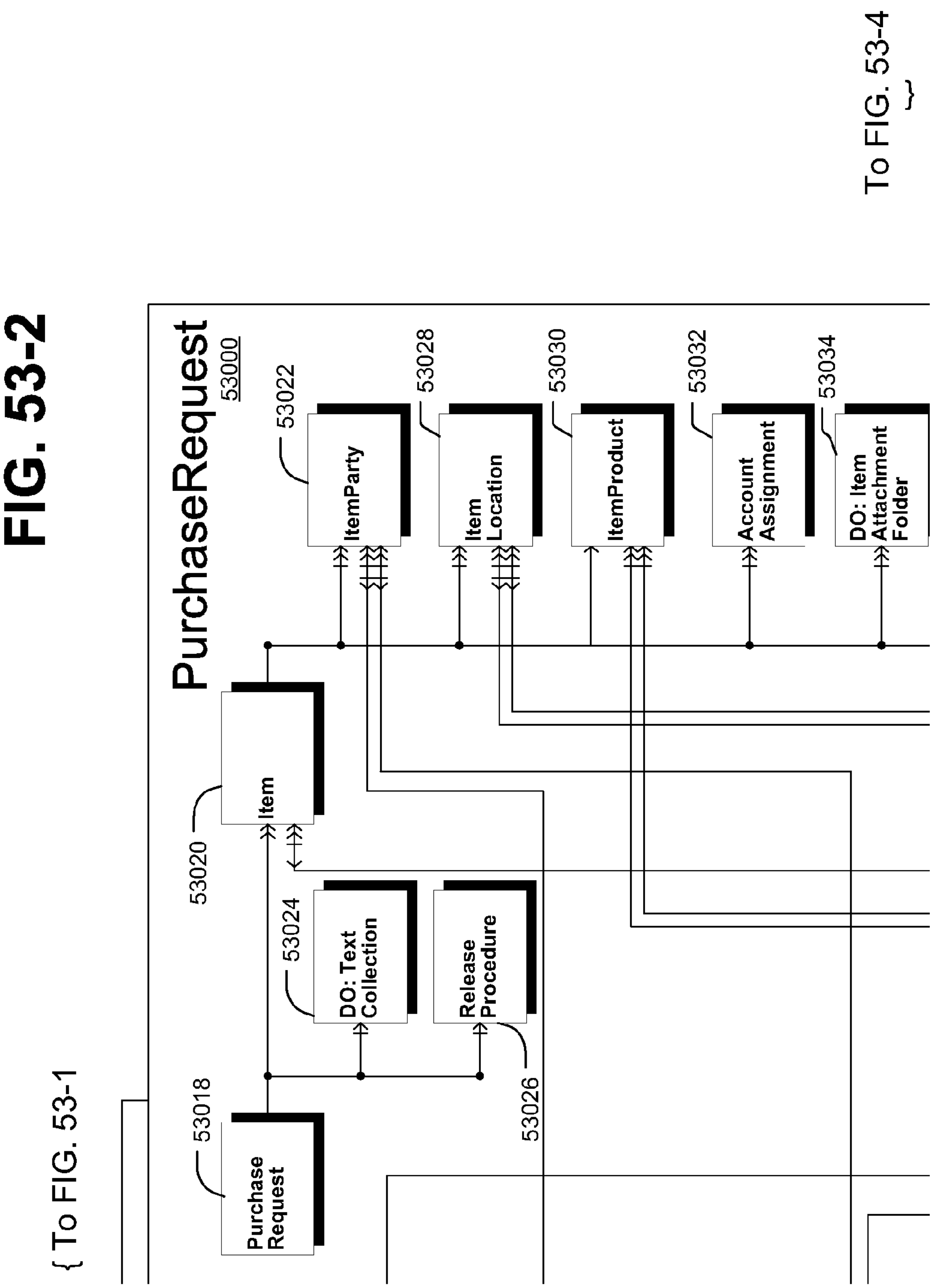
Figures 3, 53:
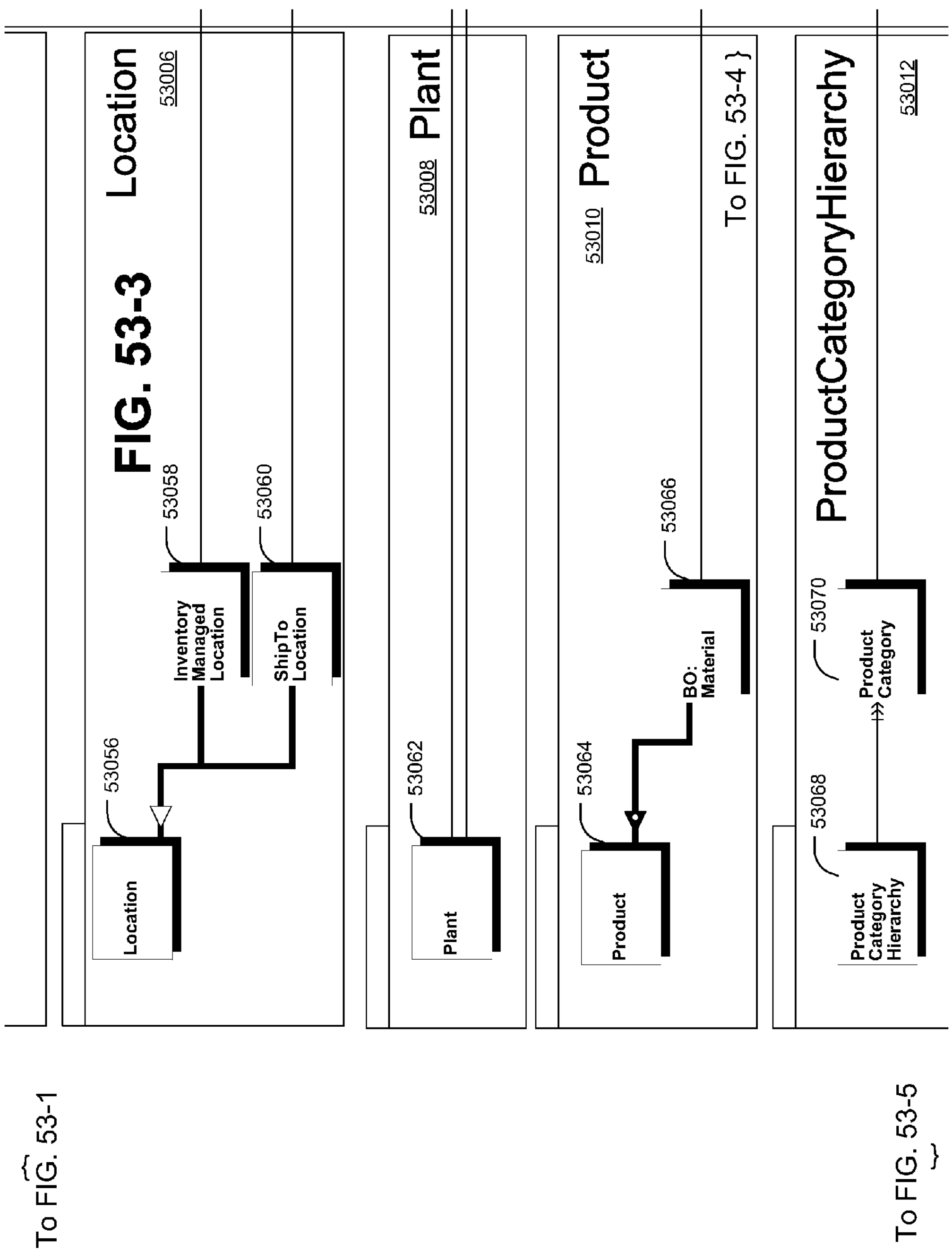
Figures 4, 53:
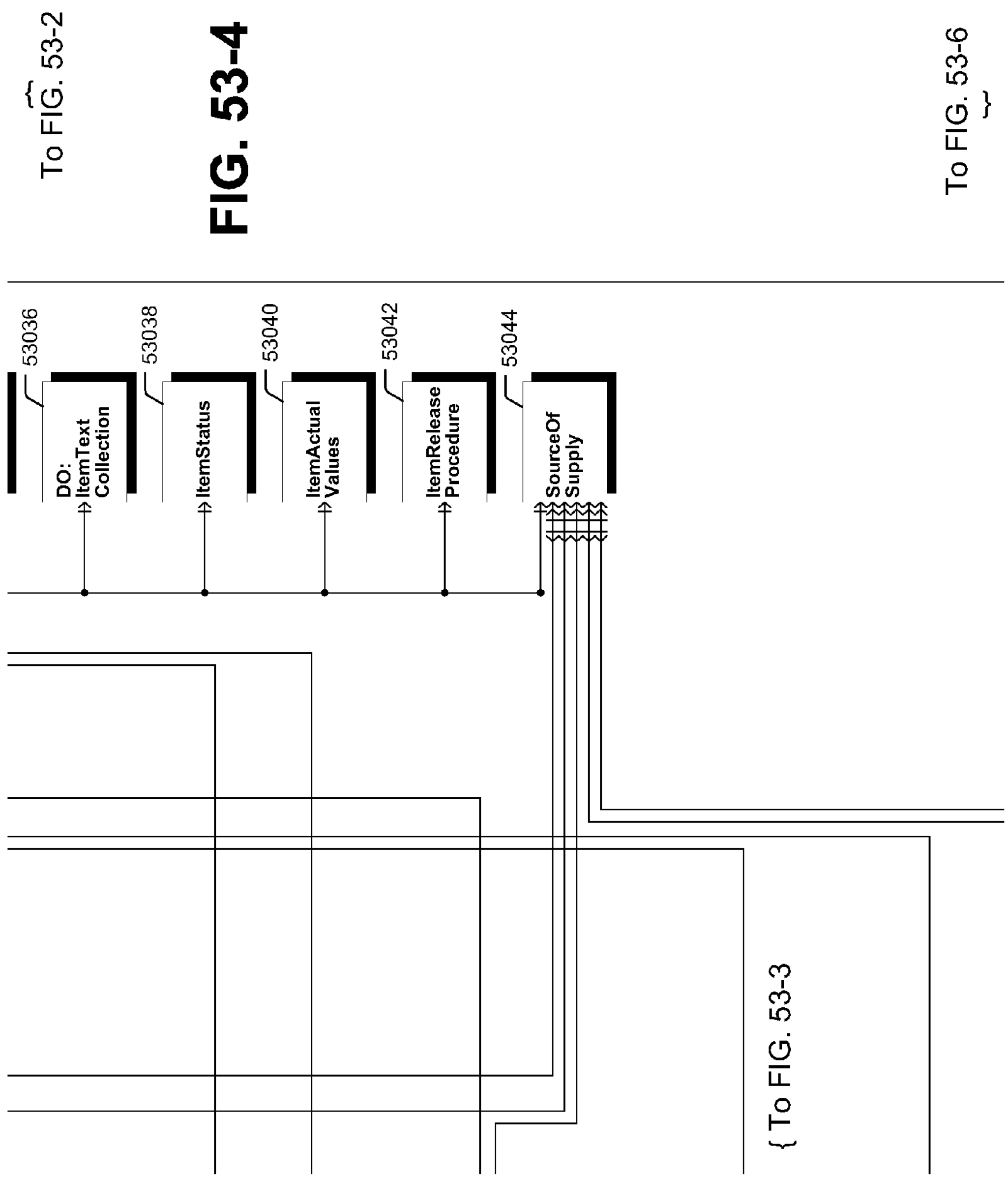
Figures 5, 53:
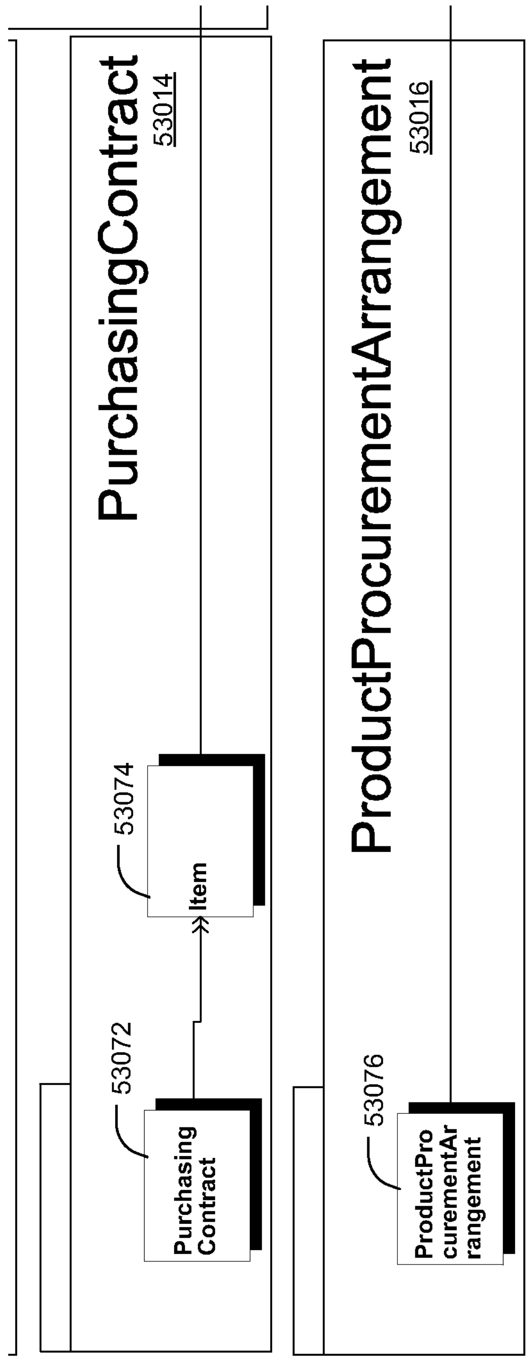
Figures 6, 53:
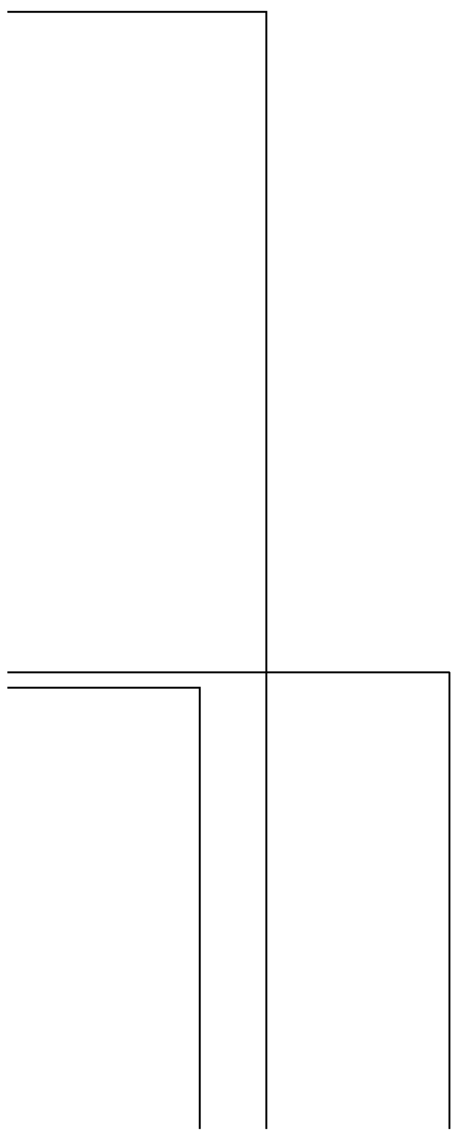

FIGS. 53-1 through 53-6 illustrate an example PurchaseRequest business object model 53000. Specifically, this model depicts interactions among various components of the PurchaseRequest, as well as external components that interact with the PurchaseRequest (shown here as 53002 through 53016 and 53046 through 53076). The PurchaseRequest business object model 53000 includes elements 53018 through 53044. The elements 53018 through 53044 can be hierarchical, as depicted. For example, the purchase request entity 53018 hierarchically includes entities item 53020, dependent object text collection 53024, and release procedure 53026. Additionally, entity item 53020 includes entities 53022 and 53028 through 53044. Some or all of the entities 53018 through 53044 can correspond to packages and/or entities in the message data types described below.

Figure 54:
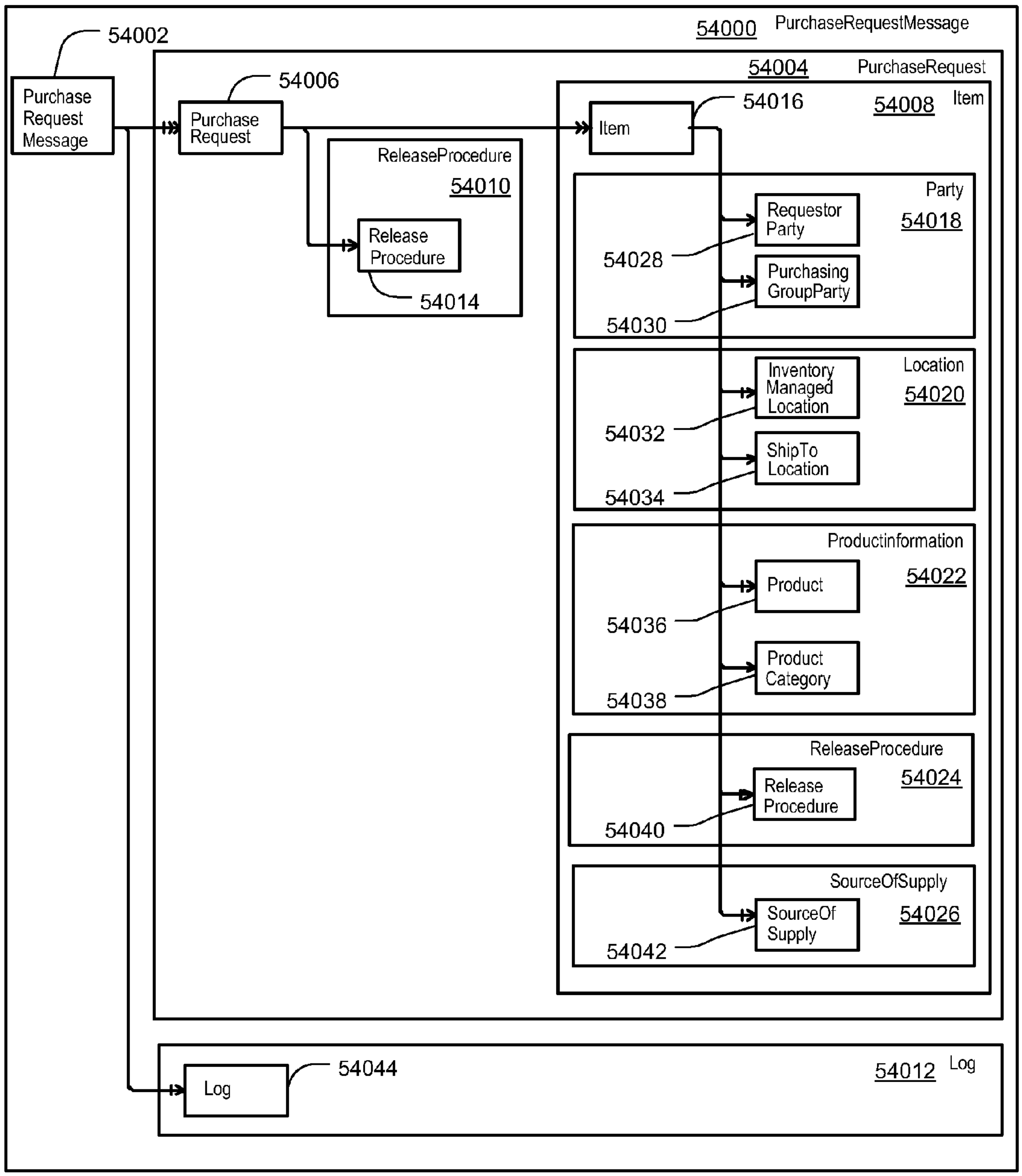
FIG. 54 shows an exemplary PurchaseRequestMessage Message Data Type.

FIG. 54 illustrates one example logical configuration of PurchaseRequestMessage message 54000. Specifically, this figure depicts the arrangement and hierarchy of various components such as one or more levels of packages, entities, and datatypes, shown here as 54000 through 54044. As described above, packages may be used to represent hierarchy levels. Entities are discrete business elements that are used during a business transaction. Data types are used to type object entities and interfaces with a structure. For example, PurchaseRequestMessage message 54000 includes, among other things, ReleaseProcedure 54010. Accordingly, heterogeneous applications may communicate using this consistent message configured as such.

Figure 55:
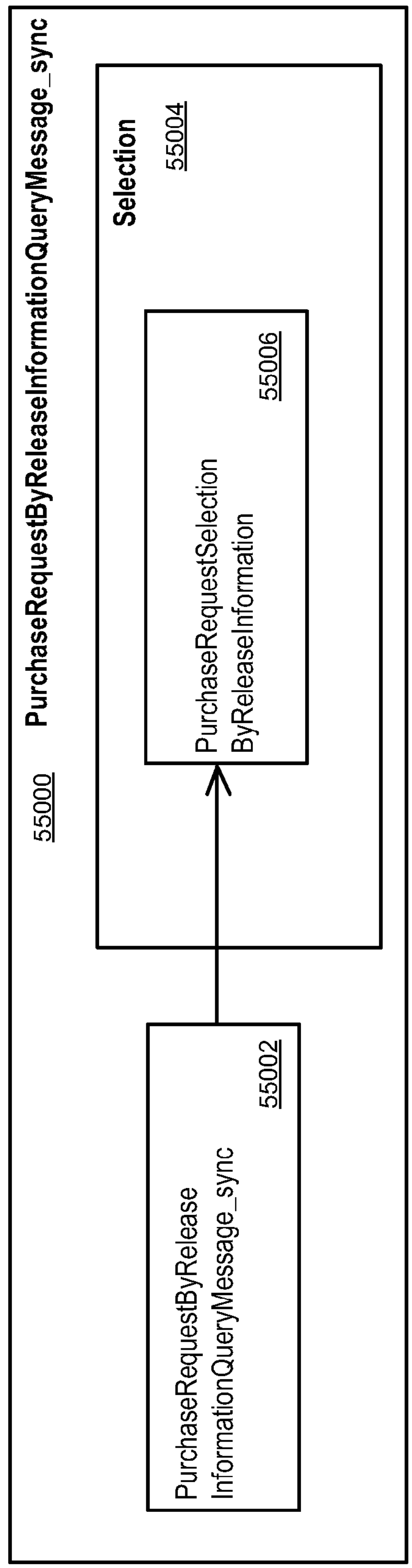
FIG. 55 shows an exemplary PurchaseRequestByRelease InformationQueryMessage Message Data Type.

Additionally, FIG. 55 illustrates one example logical configuration of PurchaseRequestByReleaseInformationQueryMessage_sync message 55000. Specifically, this figure depicts the arrangement and hierarchy of various components such as one or more levels of packages, entities, and datatypes, shown here as 55000 through 55006. As described above, packages may be used to represent hierarchy levels. Entities are discrete business elements that are used during a business transaction. Data types are used to type object entities and interfaces with a structure. For example, PurchaseRequestByReleaseInformationQueryMessage_sync message 55000 includes, among other things, Selection 55004. Accordingly, heterogeneous applications may communicate using this consistent message configured as such.

Figure 56:
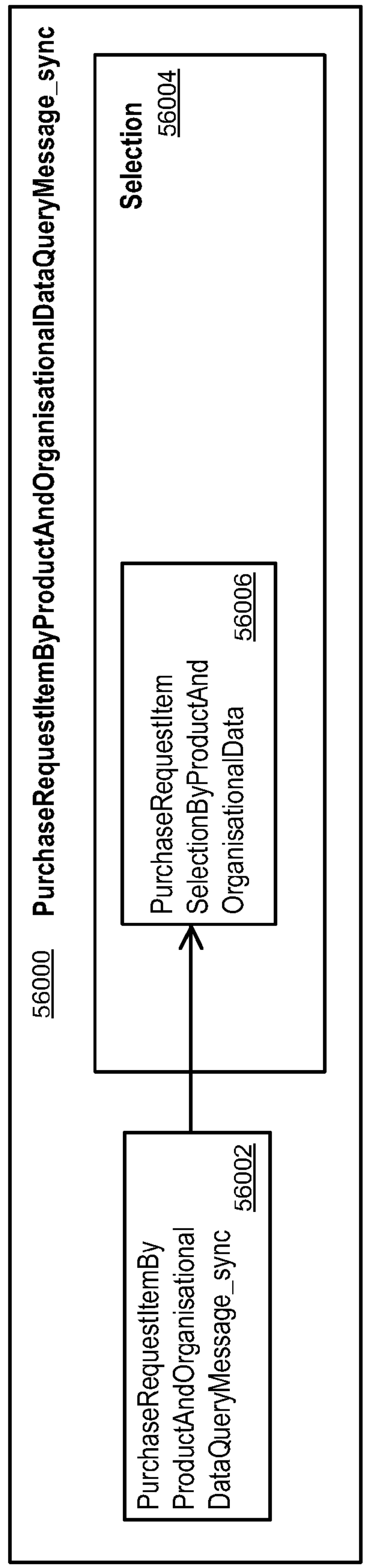
FIG. 56 shows an exemplary PurchaseRequestItemByProduct AndOrganisationalDataQueryMessage Message Data Type.

Additionally, FIG. 56 illustrates one example logical configuration of PurchaseRequestItemByProductAndOrganisationalDataQueryMessage_sync message 56000. Specifically, this figure depicts the arrangement and hierarchy of various components such as one or more levels of packages, entities, and datatypes, shown here as 56000 through 56006. As described above, packages may be used to represent hierarchy levels. Entities are discrete business elements that are used during a business transaction. Data types are used to type object entities and interfaces with a structure. For example, PurchaseRequestItemByProductAndOrganisationalDataQueryMessage_sync message 56000 includes, among other things, Selection 56004. Accordingly, heterogeneous applications may communicate using this consistent message configured as such.

Figure 57:
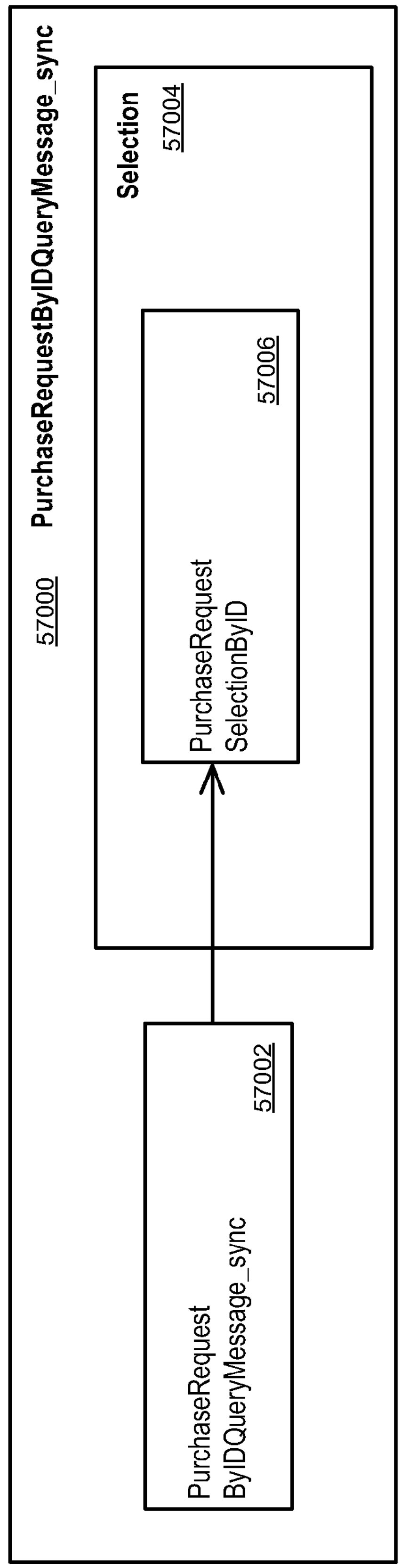
FIG. 57 shows an exemplary PurchaseRequestByIDQueryMessage Message Data Type.

Additionally, FIG. 57 illustrates one example logical configuration of PurchaseRequestByIDQueryMessage_sync message 57000. Specifically, this figure depicts the arrangement and hierarchy of various components such as one or more levels of packages, entities, and datatypes, shown here as 57000 through 57006. As described above, packages may be used to represent hierarchy levels. Entities are discrete business elements that are used during a business transaction. Data types are used to type object entities and interfaces with a structure. For example, PurchaseRequestByIDQueryMessage_sync message 57000 includes, among other things, Selection 57004. Accordingly, heterogeneous applications may communicate using this consistent message configured as such.

Figure 58:
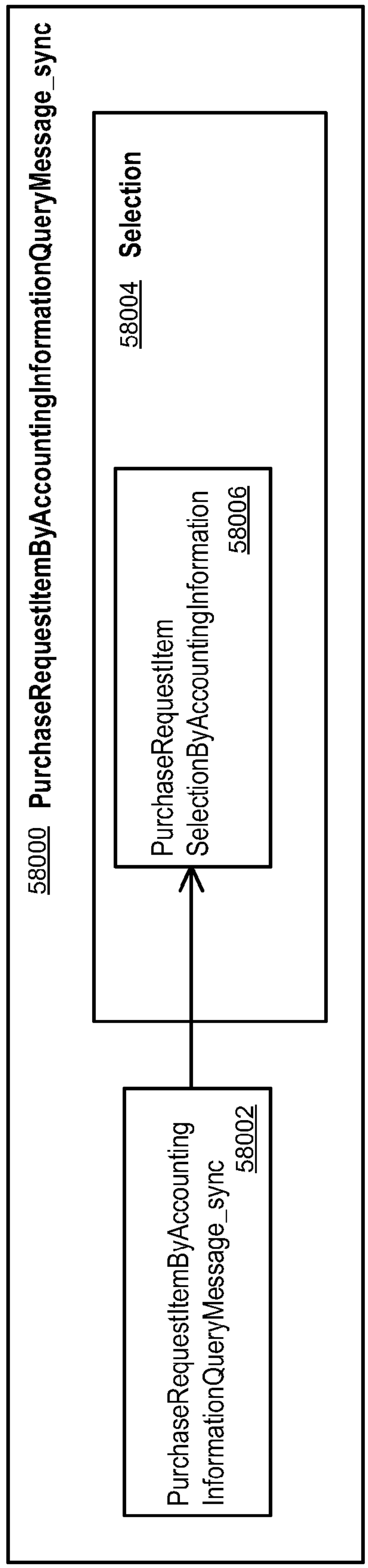
FIG. 58 shows an exemplary PurchaseRequestItemByAccountAssignment QueryMessage Message Data Type.

Additionally, FIG. 58 illustrates one example logical configuration of PurchaseRequestItemByAccountingInformationQueryMessage_sync message 58000. Specifically, this figure depicts the arrangement and hierarchy of various components such as one or more levels of packages, entities, and datatypes, shown here as 58000 through 58006. As described above, packages may be used to represent hierarchy levels. Entities are discrete business elements that are used during a business transaction. Data types are used to type object entities and interfaces with a structure. For example, PurchaseRequestItemByAccountingInformationQueryMessage_sync message 58000 includes, among other things, Selection 58004. Accordingly, heterogeneous applications may communicate using this consistent message configured as such.

Additionally, FIG. 59 illustrates one example logical configuration of PurchaseRequestByIDQueryMessage message 59000. Specifically, this figure depicts the arrangement and hierarchy of various components such as one or more levels of packages, entities, and datatypes, shown here as 59000 through 59022. As described above, packages may be used to represent hierarchy levels. Entities are discrete business elements that are used during a business transaction. Data types are used to type object entities and interfaces with a structure. For example, PurchaseRequestByIDQueryMessage message 59000 includes, among other things, PurchaseRequestSelectionByID 59008. Accordingly, heterogeneous applications may communicate using this consistent message configured as such.

Additionally, FIGS. 60-1 through 60-10 illustrate one example logical configuration of PurchaseRequestByIDResponseMessage message 60000. Specifically, this figure depicts the arrangement and hierarchy of various components such as one or more levels of packages, entities, and datatypes, shown here as 60000 through 60288. As described above, packages may be used to represent hierarchy levels. Entities are discrete business elements that are used during a business transaction. Data types are used to type object entities and interfaces with a structure. For example, PurchaseRequestByIDResponseMessage message 60000 includes, among other things, ProcessingTypeCode 60018. Accordingly, heterogeneous applications may communicate using this consistent message configured as such.

Additionally, FIGS. 61-1 through 61-2 illustrate one example logical configuration of PurchaseRequestByReleaseInformationQueryMessage message 61000. Specifically, this figure depicts the arrangement and hierarchy of various components such as one or more levels of packages, entities, and datatypes, shown here as 61000 through 61028. As described above, packages may be used to represent hierarchy levels. Entities are discrete business elements that are used during a business transaction. Data types are used to type object entities and interfaces with a structure. For example, PurchaseRequestByReleaseInformationQueryMessage message 61000 includes, among other things, PurchaseRequestReleaseGroupID 61012. Accordingly, heterogeneous applications may communicate using this consistent message configured as such.

Additionally, FIGS. 62-1 through 62-7 illustrate one example logical configuration of PurchaseRequestByReleaseInformationResponseMessage message 62000. Specifically, this figure depicts the arrangement and hierarchy of various components such as one or more levels of packages, entities, and datatypes, shown here as 62000 through 62224. As described above, packages may be used to represent hierarchy levels. Entities are discrete business elements that are used during a business transaction. Data types are used to type object entities and interfaces with a structure. For example, PurchaseRequestByReleaseInformationResponseMessage message 62000 includes, among other things, ProcessingTypeCode 62018. Accordingly, heterogeneous applications may communicate using this consistent message configured as such.

Additionally, FIGS. 63-1 through 63-9 illustrate one example logical configuration of PurchaseRequestChangeConfirmationMessage message 63000. Specifically, this figure depicts the arrangement and hierarchy of various components such as one or more levels of packages, entities, and datatypes, shown here as 63000 through 63288. As described above, packages may be used to represent hierarchy levels. Entities are discrete business elements that are used during a business transaction. Data types are used to type object entities and interfaces with a structure. For example, PurchaseRequestChangeConfirmationMessage message 63000 includes, among other things, ProcessingTypeCode 63018. Accordingly, heterogeneous applications may communicate using this consistent message configured as such.

Additionally, FIGS. 64-1 through 64-7 illustrate one example logical configuration of PurchaseRequestChangeRequestMessage message 64000. Specifically, this figure depicts the arrangement and hierarchy of various components such as one or more levels of packages, entities, and datatypes, shown here as 64000 through 64220. As described above, packages may be used to represent hierarchy levels. Entities are discrete business elements that are used during a business transaction. Data types are used to type object entities and interfaces with a structure. For example, PurchaseRequestChangeRequestMessage message 64000 includes, among other things, ProcessingTypeCode 64018. Accordingly, heterogeneous applications may communicate using this consistent message configured as such.

Additionally, FIGS. 65-1 through 65-8 illustrate one example logical configuration of PurchaseRequestCreateConfirmationMessage message 65000. Specifically, this figure depicts the arrangement and hierarchy of various components such as one or more levels of packages, entities, and datatypes, shown here as 65000 through 65276. As described above, packages may be used to represent hierarchy levels. Entities are discrete business elements that are used during a business transaction. Data types are used to type object entities and interfaces with a structure. For example, PurchaseRequestCreateConfirmationMessage message 65000 includes, among other things, ProcessingTypeCode 65018. Accordingly, heterogeneous applications may communicate using this consistent message configured as such.

Additionally, FIGS. 66-1 through 66-6 illustrate one example logical configuration of PurchaseRequestCreateRequestMessage message 66000. Specifically, this figure depicts the arrangement and hierarchy of various components such as one or more levels of packages, entities, and datatypes, shown here as 66000 through 66208. As described above, packages may be used to represent hierarchy levels. Entities are discrete business elements that are used during a business transaction. Data types are used to type object entities and interfaces with a structure. For example, PurchaseRequestCreateRequestMessage message 66000 includes, among other things, ProcessingTypeCode 66018. Accordingly, heterogeneous applications may communicate using this consistent message configured as such.

Additionally, FIGS. 67-1 through 67-3 illustrate one example logical configuration of PurchaseRequestItemByAccountAssignmentQueryMessage message 67000. Specifically, this figure depicts the arrangement and hierarchy of various components such as one or more levels of packages, entities, and datatypes, shown here as 67000 through 67070. As described above, packages may be used to represent hierarchy levels. Entities are discrete business elements that are used during a business transaction. Data types are used to type object entities and interfaces with a structure. For example, PurchaseRequestItemByAccountAssignmentQueryMessage message 67000 includes, among other things, PurchaseRequestItemAccountAssignmentGeneralLedgerAccountID 67012. Accordingly, heterogeneous applications may communicate using this consistent message configured as such.

Additionally, FIGS. 68-1 through 68-10 illustrate one example logical configuration of PurchaseRequestItemByAccountAssignmentResponseMessage message 68000. Specifically, this figure depicts the arrangement and hierarchy of various components such as one or more levels of packages, entities, and datatypes, shown here as 68000 through 68354. As described above, packages may be used to represent hierarchy levels. Entities are discrete business elements that are used during a business transaction. Data types are used to type object entities and interfaces with a structure. For example, PurchaseRequestItemByAccountAssignmentResponseMessage message 68000 includes, among other things, ProcessingTypeCode 68018. Accordingly, heterogeneous applications may communicate using this consistent message configured as such.

Additionally, FIGS. 69-1 through 69-2 illustrate one example logical configuration of PurchaseRequestItemByProductAndOrganisationalDataQueryMessage message 69000. Specifically, this figure depicts the arrangement and hierarchy of various components such as one or more levels of packages, entities, and datatypes, shown here as 69000 through 69052. As described above, packages may be used to represent hierarchy levels. Entities are discrete business elements that are used during a business transaction. Data types are used to type object entities and interfaces with a structure. For example, PurchaseRequestItemByProductAndOrganisationalDataQueryMessage message 69000 includes, among other things, PurchaseRequestItemProductInternalID 69012. Accordingly, heterogeneous applications may communicate using this consistent message configured as such.

Additionally, FIGS. 70-1 through 70-6 illustrate one example logical configuration of PurchaseRequestItemByProductAndOrganisationalDataResponseMessage message 70000. Specifically, this figure depicts the arrangement and hierarchy of various components such as one or more levels of packages, entities, and datatypes, shown here as 70000 through 70224. As described above, packages may be used to represent hierarchy levels. Entities are discrete business elements that are used during a business transaction. Data types are used to type object entities and interfaces with a structure. For example, PurchaseRequestItemByProductAndOrganisationalDataResponseMessage message 70000 includes, among other things, ProcessingTypeCode 70018. Accordingly, heterogeneous applications may communicate using this consistent message configured as such.

Additionally, FIGS. 71-1 through 71-11 illustrate one example logical configuration of PurchaseRequestMessage message 71000. Specifically, this figure depicts the arrangement and hierarchy of various components such as one or more levels of packages, entities, and datatypes, shown here as 71000 through 71372. As described above, packages may be used to represent hierarchy levels. Entities are discrete business elements that are used during a business transaction. Data types are used to type object entities and interfaces with a structure. For example, PurchaseRequestMessage message 71000 includes, among other things, ReleaseTerms 71026. Accordingly, heterogeneous applications may communicate using this consistent message configured as such.

Additionally, FIGS. 72-1 though 72-2 illustrate one example logical configuration of PurchaseRequestReleaseConfirmationMessage message 72000. Specifically, this figure depicts the arrangement and hierarchy of various components such as one or more levels of packages, entities, and datatypes, shown here as 72000 through 72060. As described above, packages may be used to represent hierarchy levels. Entities are discrete business elements that are used during a business transaction. Data types are used to type object entities and interfaces with a structure. For example, PurchaseRequestReleaseConfirmationMessage message 72000 includes, among other things, ReleaseTerms 72020. Accordingly, heterogeneous applications may communicate using this consistent message configured as such.

Additionally, FIG. 73 illustrates one example logical configuration of PurchaseRequestReleaseRequestMessage message 73000. Specifically, this figure depicts the arrangement and hierarchy of various components such as one or more levels of packages, entities, and datatypes, shown here as 73000 through 73040. As described above, packages may be used to represent hierarchy levels. Entities are discrete business elements that are used during a business transaction. Data types are used to type object entities and interfaces with a structure. For example, PurchaseRequestReleaseRequestMessage message 73000 includes, among other things, ReleaseInformation 73018. Accordingly, heterogeneous applications may communicate using this consistent message configured as such.

Message Data Type PurchaseRequestMessage

The message data type PurchaseRequestMessage can contain the PurchaseRequest object included in the business document and the information of the message log. It can contain the packages PurchaseRequest and Log. The message data type PurchaseRequestMessage can be used as an abstract maximal message data type, which can unify all packages and entities for the concrete message data types of PurchaseRequestByReleaseInformationResponseMessage_sync, PurchaseRequestItemByProductAndOrganisationalDataResponseMessage_sync, PurchaseRequestByIDResponseMessage_sync, PurchaseRequestCreateRequestMessage_sync, PurchaseRequestCreateConfirmationMessage_sync, PurchaseRequestChangeRequestMessage_sync, PurchaseRequestChangeConfirmationMessage_sync, PurchaseRequestReleaseRequestMessage_sync, PurchaseRequestReleaseConfirmationMessage_sync, and PurchaseRequestItemByAccountAssignmentResponseMessage_sync.

A PurchaseRequest package can group together the PurchaseRequest and its packages and can contains packages ReleaseProcedure and Item. A PurchaseRequest can be a requirement of a requestor for the internal or external procurement of products. The PurchaseRequest can be subdivided into PurchaseRequestItems that can each specify a requested product and additional information relevant for such a product. It can contain the elements ID and ProcessingTypeCode. ID can be the unique identifier for the PurchaseRequest and is a GDT of type PurchaseRequestID. ProcessingTypeCode can be the coded representation of the way in which the PurchaseRequest can be processed and is a GDT of type BusinessTransactionDocumentProcessingTypeCode.

A ReleaseInformation package can group together all release information for a PurchaseRequest. It can contain the entity of ReleaseTerms. ReleaseTerms can be the release conditions that apply for PurchaseRequests or PurchaseRequestItems. In some implementations it contains the elements PurchasingDocumentReleaseCode, ReleaseStrategyID, ReleaseGroupID, and PurchasingReleaseApproverCode. PurchasingDocumentReleaseCode can be the coded representation of the way in which the purchasing document can be processed if it is subject to a ReleaseProcedure and it is a GDT of type PurchasingDocumentReleaseCode. ReleaseStrategyID can be the unique identifier for a ReleaseStrategy and is a GDT of type ReleaseStrategyID. ReleaseGroupID can be the unique identifier for a ReleaseGroup and is a GDT of type ReleaseGroupID. PurchasingReleaseApproverCode can be the coded representation with which a purchasing document that is subject to a release procedure can be released. PurchasingReleaseApproverCode is a GDT of type PurchasingReleaseApproverCode.

An Item package can group together the Item with its packages. In some implementations, it contains the packages of Party, Location, ProductInformation, AccountAssignment, ReleaseProcedure, and SourceOfSupply. A PurchaseRequestItem can specify a product requested by the PurchaseRequest and can provide additional information about such a product. It can contain the elements ID, CreationUserAccountID, ProcessingTypeCode, CancelledIndicator, RequestedQuantity, OrderedQuantity, PlantID, TotalAmount, ValuationPrice, PurchaseRequestDate, PlannedDeliveryDate, and Description. ID can be the unique identifier for the PurchaseRequestItem and is a GDT of type PurchaseRequestItemID CreationUserAccountID can specify the user ID of the person which has created the PurchaseRequestItem and is a GDT of type UserAccountID. ProcessingTypeCode can be the coded representation of the way in which the PurchaseRequestItem can be processed and is a GDT of type BusinessTransactionDocumentItemProcessingTypeCode. CancelledIndicator can be an indicator that indicates that the PurchaseRequestItem is cancelled. CancelledIndicator is a GDT of type Indicator and is a Qualifier of type Cancelled. RequestedQuantity can be the amount requested and is a GDT of type Quantity of Qualifier type Requested. OrderedQuantity can be the amount ordered and is a GDT of type Quantity and is a Qualifier of Ordered. PlantID can be the unique identifier for the plant and is a GDT of type PlantID. TotalAmount can be the total amount of the PurchaseRequestItem and is a GDT of type Amount and is a Qualifier of type Total. ValuationPrice can be the basis for determining the value of goods for balance sheet purposes and is a GDT of type Price. PurchaseRequestDate can be the manually entered date at which the PurchaseRequest becomes valid. PurchaseRequestDate is a GDT of type Date and is a Qualifier of type BusinessTransactionDocument. PlannedDeliveryDate can be a date at which the delivery takes place and is a GDT of type Date and a Qualifier of type Delivery. Description can be a natural-language text regarding the PurchaseRequestItem and is a GDT of type SHORT_Description.

The Party package can group together all participating parties of the Item. It can contain the entities RequestorParty and PurchasingGroupParty. A RequestorParty can be a party that requests the procurement of products. It can contain the element InternalID. InternalID can be the unique identifier for the RequestorParty and is a GDT of type PartyInternalID. A PurchasingGroupParty can be an organisational unit within logistics that subdivides the enterprise from the viewpoint of purchasing according to the responsibilities for the procurement of products and can be the point of contact for the suppliers. PurchasingGroupParty can contain the element InternalID which can be the unique identifier for the PurchasingGroupParty and is a GDT of type PartyInternalID.

The Location package can group together participating locations. The Location package can contain the entities InventoryManagedLocation and ShipToLocation. An InventoryManagedLocation can be the storage location at which materials are stored. It can contain the element InternalID and can be the unique identifier for the InventoryManagedLocation and is a GDT of type LocationInternalID. A ShipToLocation can be a place to which goods are to be delivered. It can contain the element InternalID which can be the unique identifier for the ShipToLocation and is a GDT of type LocationInternalID.

The ProductInformation Package can group together information for identification, description and classification of a product. Materials can be considered here as products. It can contain the entity Product and ProductCategory. A Product can contain the details about a product as generally understood from a commercial point of view in business documents. There can be the details for identifying a product and product category, and the description of the product. It can contain the elements InternalID and ManufacturerID. InternalID can be a proprietary identifier for the product requested by the PurchaseRequestItem and is a GDT of type ProductInternalID. ManufacturerID can be an identifier for the requested product assigned by the manufacturer and is a GDT of type ProductPartyID. A ProductCategory can contain the details about a product category as generally understood from a commercial point of view in business transaction documents. It can contain the element InternalID which can be a proprietary identifier for a ProductCategory and is a GDT of type ProductCategoryInternalID.

The AccountAssignment Package can group together accounting information, including the accounting distribution and the accounting objects. It can contain the entity AccountAssignment. AccountAssignment can be the assignment of a set of accounting objects to a PurchaseRequestItem.

It can contains the elements Quantity, Percent, GeneralLedgerAccountID, ProfitCentreID, CostCentreID, Sales OrderID, SalesOrderItemID, ProjectWorkBreakdownStructureElementID, ProjectNetworkID, ProjectActivityID, MasterFixedAssetID, and FixedAssetID. Quantity can be the quantity of the account assignment and is a GDT of type Quantity. Percent can be the percent of the account assignment and is a GDT of type Percent. GeneralLedgerAccountID can be the unique identifier for the GeneralLedgerAccount and is a GDT of type GeneralLedgerAccountID. ProfitCentreID can be the unique identifier for the ProfitCentre and is a GDT of type ProfitCentreID. CostCentreID can be the unique identifier for the CostCentre and is a GDT of type CostCentreID. SalesOrderID can be the unique identifier for the SalesOrder and is a GDT of type SalesOrderID. SalesOrderItemID can be the unique identifier for the SalesOrderItem and is a GDT of type SalesOrderItemID ProjectWorkBreakdownStructureElementID can be the unique identifier for the work breakdown structure element and is a GDT of type ProjectWorkBreakdownStructureElementID. ProjectNetworkID can be an identifier for a Project Network and is a GDT of type ProjectNetworkID. ProjectActivityID can be an identifier for a Project Activity and is a GDT of type ProjectActivityID. MasterFixedAssetID can identify a business unit within a company from one or several fixed assets that are depreciated individually, but it can be possible to represent their values together and maintain their data together. MasterFixedAssetID is a GDT of type MasterFixedAssetID. FixedAssetID can be an ID for a fixed asset in the fixed assets of a company and is a GDT of type FixedAssetID.

A ReleaseInformation package can group together release information for a PurchaseRequestItem and can contains the entity ReleaseTerms. ReleaseTerms can be the release conditions that apply for PurchaseRequests or PurchaseRequestItems. It can contain the elements PurchasingDocumentReleaseCode, StrategyID, and ReleaseGroupID. PurchasingDocumentReleaseCode can be the coded representation of the way in which the Purchasing Document Item can be processed if it is subject to a ReleaseProcedure and is a GDT of type PurchasingDocumentReleaseCode. StrategyID can be the unique identifier for a ReleaseStrategy and is a GDT of type ReleaseStrategyID. ReleaseGroupID can be the unique identifier for a ReleaseGroup and is a GDT of type ReleaseGroupID.

A SourceOfSupply package can group together information about sources for the external and internal procurement of products. It can contain the following entity SourceOfSupply. A SourceOfSupply can be a source for the external or internal procurement of products. It can contain the elements SellerPartyInternalID, ProposedSellerPartyInternalID, PurchasingOrganisationPartyInternalID, PurchaseContractID, PurchaseContractItemID, ShipFromLocationID, and ProductProcurementArrangementID. SellerPartyInternalID can be an unique identifier for the SellerParty and is a GDT of type PartyInternalID. ProposedSellerPartyInternalID can be a unique identifier for the ProposedSellerParty and is a GDT of type PartyInternalID PurchasingOrganisationPartyInternalID can be an unique identifier for the PurchasingOrganisationParty and is a GDT of type PartyInternalID. PurchaseContractID can be an unique identifier for the PurchaseContract and is a GDT of type PurchaseContractID. PurchaseContractItemID can be an unique identifier for the PurchaseContractItem and is a GDT of type PurchaseContractItemID ShipFromLocationID can be an unique identifier for the ShipFromLocation and is a GDT of type LocationInternalID. ProductProcurementArrangementID can be an unique identifier for the ProductProcurementArrangement and is a GDT of type ProductProcurementArrangementID.

A Log package can group the messages used for user interaction and can contain the entity Log. A log can be a sequence of messages that result when an application executes a task. The entity Log is a GDT of type Log. The Log package can be used in the message data types used for outbound messages from the perspective of the purchasing application. Therefore the following message data types can use this package: PurchaseRequestByReleaseInformationResponseMessage_sync, PurchaseRequestItemByProductAndOrganisationalDataResponseMessage_sync, PurchaseRequestByIDResponseMessage_sync, PurchaseRequestCreateConfirmationMessage_sync, PurchaseRequestChangeConfirmationMessage_sync, PurchaseRequestReleaseConfirmationMessage_sync, PurchaseRequestItemByAccountAssignmentResponseMessage_sync. The message data type PurchaseRequestByReleaseInformationQueryMessage_sync can contain the selection included in the business document and can contain the package of Selection.

The selection package can contain the ID and the ItemID of the PurchaseRequest It can contain the entity PurchaseRequestSelectionByReleaseInformation. PurchaseRequestSelectionByReleaseInformation can specify release information to select a PurchaseRequest. It can contain the elements PurchaseRequestReleaseGroupID, PurchaseRequestReleaseCode, and PurchaseRequestReleasedIndicator. PurchaseRequestReleaseGroupID can be the unique identifier for a ReleaseGroup and is a GDT of type ReleaseGroupID. PurchaseRequestReleaseCode can be the coded representation with which a business document that can be subject to a release procedure can be released and is a GDT of type PurchasingReleaseApproverCode. PurchaseRequestReleasedIndicator can specify whether the PurchaseRequestItems can be released or not and is a GDT of type Indicator and is a Qualifier of type Released.

Message Data Type PurchaseRequestItemByProduct AndOrganisationalDataQueryMessage_sync The message data type PurchaseRequestItemByProductAndOrganisationalDataQueryMessage_sync can contain the selection included in the business document and it can contain the package Selection. The selection package can collect selection criteria for PurchaseRequestItems and can contain the entity PurchaseRequestItemSelectionByProductAndOrganisationalData. PurchaseRequestItemSelectionByProductAndOrganisationalData can specify a product and organisational data to select a PurchaseRequestItem. It can contain the elements PurchaseRequestItemProductInternalID, PurchaseRequestItemProductCategoryInternalID, PurchaseRequestItemDescription, PurchaseRequestItemPurchasingGroupPartyInternalID, PurchaseRequestItemRequestorPartyInternalID, PurchaseRequestItemPlantID, PurchaseRequestItemDate, and PurchaseRequestItemProcessingTypeCode. PurchaseRequestItemProductInternalID can be a proprietary identifier for the product ordered by the PurchaseRequestItem and is a GDT of type ProductInternalID. PurchaseRequestItemProductCategoryInternalID can be a proprietary identifier for a ProductCategory and is a GDT of type ProductCategoryInternalID. PurchaseRequestItemDescription can be a natural-language text regarding the PurchaseRequestItem and is a GDT of type SHORT_Description. PurchaseRequestItemPurchasingGroupPartyInternalID can be an unique identifier of a PurchasingGroupParty and is a GDT of type PartyInternalID. PurchaseRequestItemRequestorPartyInternalID can be an unique identifier for the RequestorParty and is a GDT of type PartyInternalID. PurchaseRequestItemPlantID can be an unique identifier for the plant and is a GDT of type PlantID. PurchaseRequestItemDate can be a manually entered date at which the PurchaseRequest becomes valid and is a GDT of type Date and is a Qualifier of type BusinessTransactionDocument. PurchaseRequestItemProcessingTypeCode can be a coded representation of the way in which the PurchaseRequest item is processed and is a GDT of type Business TransactionDocumentItemProcessingTypeCode.

Message Data Type PurchaseRequestByIDQueryMessage_sync

The message data type PurchaseRequestByIDQueryMessage_sync can contain the selection included in the business document. It can contain the packages Selection. The selection package can contain the ID and the ItemID of the PurchaseRequest. It can contain the entity PurchaseRequestSelectionByID. PurchaseRequestSelectionByID can specify PurchaseRequest ID and PurchaseRequestItem ID to select a PurchaseRequest or a PurchaseRequestItem. It can contain the elements PurchaseRequestID and PurchaseRequestItemID PurchaseRequestID can be an unique identifier specified by the requestor for the PurchaseRequest and is a GDT of type PurchaseRequestID. PurchaseRequestItemID can be an unique identifier specified by the requestor for the PurchaseRequestItem and is a GDT of type PurchaseRequestItemID.

Message Data Type PurchaseRequestItemByAccountAssignment QueryMessage_sync

The message data type PurchaseRequestItemByAccountAssignmentQueryMessage_sync can contain the selection included in the business document and it can contain the package of Selection. A selection package can contain the account assignment of the PurchaseRequestItem. It can contain the entity PurchaseRequestItemSelectionByAccountAssignment. PurchaseRequestItemSelectionByAccountAssignment can specify account assignment to select a PurchaseRequestItem. It can contain the elements PurchaseRequestItemAccountAssignmentGeneralLedgerAccountID, PurchaseRequestItemAccountAssignmentProfitCentreID, PurchaseRequestItemAccountAssignmentCostCentreID, PurchaseRequestItemAccountAssignmentSalesOrderID, PurchaseRequestItemAccountAssignmentSalesOrderItemID, PurchaseRequestItemAccountAssignmentProjectWorkBreakdownStructureElementID, PurchaseRequestItemAccountAssignmentProjectNetworkID, PurchaseRequestItemAccountAssignmentProjectActivityID, PurchaseRequestItemAccountAssignmentMasterFixedAssetID, and PurchaseRequestItemAccountAssignmentFixedAssetID. PurchaseRequestItemAccountAssignmentGeneralLedgerAccountID can be a unique identifier for the GeneralLedgerAccount and is a GDT of type GeneralLedgerAccountID. PurchaseRequestItemAccountAssignmentProfitCentreID can be an unique identifier for the ProfitCentre and is a GDT of type ProfitCentreID. PurchaseRequestItemAccountAssignmentCostCentreID can be an unique identifier for the CostCentre and is an GDT of type CostCentreID. PurchaseRequestItemAccountAssignmentSalesOrderID can be an unique identifier for the SalesOrder and is a GDT of type SalesOrderID. PurchaseRequestItemAccountAssignmentSalesOrderItemID can be an unique identifier for the SalesOrderItem and is a GDT of type SalesOrderItemID PurchaseRequestItemAccountAssignmentProjectWorkBreakdownStructureElementID can be an unique identifier for the work breakdown structure element and is a GDT of type ProjectWorkBreakdownStructureElementID.

PurchaseRequestItemAccountAssignmentProjectNetworkID can be an identifier for a Project Network and is a GDT of type ProjectNetworkID. PurchaseRequestItemAccountAssignmentProjectActivityID can be an identifier for a Project Activity and is a GDT of type ProjectActivityID. PurchaseRequestItemAccountAssignmentMasterFixedAssetID can identify a business unit within a company from one or several fixed assets that are depreciated individually, but it can be possible to represent their values together and maintain their data together. PurchaseRequestItemAccountAssignmentMasterFixedAssetID is a GDT of type MasterFixedAssetID. PurchaseRequestItemAccountAssignmentFixedAssetID can be an ID for a fixed asset in the fixed assets of a company and is a GDT of type FixedAssetID.

As described in more detail above, variations of the subject matter described herein and all of the functional operations described in this specification can be implemented in digital electronic circuitry, or in computer software, including the structures disclosed in this specification and their structural equivalents, or in combinations of one or more of them. Variations of the subject matter described herein can be implemented as one or more computer program products, i.e., one or more modules of computer program instructions encoded on a computer readable medium for execution by, or to control the operation of, data processing apparatus. Such computer readable medium can be a machine-readable storage device, a machine-readable storage substrate, a memory device, a composition of matter effecting a machine-readable propagated signal, or a combination of one or more them. A propagated signal is an artificially generated signal, e.g., a machine-generated electrical, optical, or electromagnetic signal, that is generated to encode information for transmission to suitable receiver apparatus. In short, although a few variations have been described in detail above, other modifications are possible. For example, the logic flow depicted in the accompanying figures and described herein do not require the particular order shown, or sequential order, to achieve desirable results. Other embodiments may be within the scope of the following claims. In short, although this disclosure has been described in terms of certain embodiments and generally associated methods, alterations and permutations of these embodiments and methods will be apparent to those skilled in the art. Accordingly, the above description of example embodiments does not define or constrain the disclosure. Other changes, substitutions, and alterations are also possible without departing from the spirit and scope of this disclosure, and such changes, substitutions, and alterations may be included within the scope of the claims included herewith.

What is claimed is:

1. A computer-implemented method for providing the ability to create, change, or read purchase orders or create purchase order item acknowledgements, the method steps performed by a processor and comprising:

generating a first message by a first application, the first application executing in an environment of computer systems providing message-based services via message-based interfaces, wherein the first message comprises an inquiry to return a list of purchase orders for certain selection criteria and includes a first message package structured by a first message-based interface associated with the first application, the first message-based interface derived from a common business object model, where the common business object model includes business objects having relationships that enable derivation of message-based interfaces and message packages, and where the first message package is hierarchically organized in memory as:

a purchase order by seller and product and organizational data query message entity; and a selection package including a purchase order selection by seller and product and organizational data entity;

processing, via the first message-based interface, a second message received from a heterogeneous second application in response to the second application's processing of the first message according to the hierarchical organization of the first message package via a second message-based interface derived from the common business object model, where processing the first message by the second message-based interface includes unpacking the first message package based on the common business object model, the second application executing in the environment of computer systems providing message-based services, wherein the second message comprises a response to the inquiry to return a list of purchase orders for certain selection criteria and includes a second message package structured by the second message-based interface derived from the common business object model, and where the second message package is hierarchically organized in memory as:

a purchase order by seller and product and organizational data response message entity; and a purchase order package including at least one purchase order entity, each purchase order entity including an ID, a processing type code, a purchase order date, a creation date, a creation user account ID, a party package, and at least one item package;

generating a third message by the first application, wherein the third message comprises an inquiry to return purchase orders for a purchase order ID and a purchase order item ID and includes a third message package structured by the first message-based interface derived from the common business object model and comprising a selection package;

processing, via the first message-based interface, a fourth message received from the second application in response to the second application's processing of the third message via the second message-based interface, where processing the third message by the second message-based interface includes unpacking the third message package based on the common business object model, and, wherein the fourth message comprises a response to the inquiry to return purchase orders for a purchase order ID and a purchase order item ID and includes a fourth message package comprising a purchase order package;

generating a fifth message by the first application, wherein the fifth message comprises a request to create a purchase order and includes a fifth message package structured by the first message-based interface derived from the common business object model and comprising a purchase order package that includes a party package and an item package;

processing, via the first message-based interface, a sixth message received from the second application in response to the second application's processing of the fifth message via the second message-based interface, where processing the sixth message by the second message-based interface includes unpacking the fifth message package based on the common business object model, and, wherein the sixth message comprises a confirmation concerning the request to create a purchase order and includes a sixth message package comprising a purchase order package that includes a party package and an item package;

generating a seventh message by the first application, wherein the seventh message comprises a request to change a purchase order and includes a seventh message package structured by the first message-based interface derived from the common business object model and comprising a purchase order package that includes an item package;

processing, via the first message-based interface, an eighth message received from the second application in response to the second application's processing of the seventh message via the second message-based interface, where processing the seventh message by the second message-based interface includes unpacking the seventh message package based on the common business object model, and, wherein the eighth message comprises a confirmation concerning the request to change a purchase order and includes an eighth message package structured by the second message-based interface derived from the common business object model and comprising a purchase order package that includes a party package and an item package;

generating a ninth message by the first application, wherein the ninth message comprises a request to create a confirmation for a purchase order item and includes a ninth message package structured by the first message-based interface derived from the common business object model and comprising a purchase order package that includes an item package, the item package further including a confirmation package;

processing, via the first message-based interface, a tenth message received from the second application in response to the second application's processing of the ninth message via the second message-based interface, where processing the ninth message by the second message-based interface includes unpacking the ninth message package based on the common business object model, and, wherein the tenth message comprises a confirmation concerning the request to create a confirmation for a purchase order and includes a tenth message package structured by the second message-based interface derived from the common business object model and comprising a purchase order package that includes an item package, the item package including a confirmation package;

generating an eleventh message by the first application, wherein the eleventh message comprises an inquiry to return a list of purchase order items for certain accounting data selection criteria and includes an eleventh message package structured by the first message-based interface derived from the common business object model and comprising a selection package; and processing, via the first message-based interface, a twelfth message received from the second application in response to the second application's processing of the eleventh message via the second message-based interface, where processing the eleventh message by the second message-based interface includes unpacking the eleventh message package based on the common business object model, and, wherein the twelfth message comprises a response to the inquiry to return a list of purchase order items for certain accounting data selection criteria and includes a twelfth message package structured by the second message-based interface derived from the common business object model and comprising a purchase order package.

2. A computer-implemented method for providing the ability to create, change, or read purchase requests, the method steps performed by a processor and comprising:

generating a first message by a first application, the first application executing in an environment of computer systems providing message-based services via message-based interfaces, wherein the first message comprises an inquiry to return purchase requests for the release information and includes a first message package structured by a first message-based interface associated with the first application, the first message-based interface derived from a common business object model, where the common business object model includes business objects having relationships that enable derivation of message-based interfaces and message packages, and where the first message package is hierarchically organized in memory as:

a purchase request by release information query message entity; and a selection package including a purchase request selection by release information entity, the purchase request selection by release information entity including a purchase request release group ID, a purchase request purchasing release approver code, and a purchase request released indicator;

processing, via the first message-based interface, a second message received from a heterogeneous second application in response to the second application's processing of the first message according to the hierarchical organization of the first message package via a second message-based interface derived from the common business object model, where processing the first message by the second message-based interface includes unpacking the first message package based on the common business object model, the second application executing in the environment of computer systems providing message-based services, wherein the second message comprises a response to the inquiry to return purchase requests for the release information and includes a second message package structured by the second message-based interface derived from the common business object model, and where the second message package is hierarchically organized in memory as:

a purchase request by release information response message entity; and at least one purchase request package, each purchase request package including a purchase request entity and at least one item package, the purchase and a processing type code, and each item package including an item entity, the item entity including an ID, a creation user account ID, a requested quantity, an ordered quantity, a plant ID, a purchase request date, a delivery date, and a description;

generating a third message by the first application, wherein the third message comprises an inquiry to return purchase request items regarding product and organization data, and includes a third message package structured by the first message-based interface derived from the common business object model and comprising a selection package;

processing, via the first message-based interface, a fourth message received from the second application in response to the second application's processing of the third message via the second message-based interface, where processing the third message by the second message-based interface includes unpacking the third message package based on the common business object model, and, wherein the fourth message comprises a response to the inquiry to return purchase request items regarding product and organization data and includes a fourth message package structured by the second message-based interface derived from the common business object model and comprising a purchase request package;

generating a fifth message by the first application, wherein the fifth message comprises an inquiry to return purchase requests for the purchase request ID and includes a fifth rues sage package structured by the first message-based interface derived from the common business object model and comprising a selection package;

processing, via the first message-based interface, a sixth message received from the second application in response to the second application's processing of the fifth message via the second message-based interface, where processing the fifth message by the second message-based interface includes unpacking the fifth message package based on the common business object model, and, wherein the sixth message comprises a response to the inquiry to return purchase requests for the purchase request ID and includes a sixth message package structured by the second message-based interface derived from the common business object model and comprising a purchase request package;

generating a seventh message by the first application, wherein the seventh message comprises a request to create a purchase request and includes a seventh message package structured by the first message-based interface derived from the common business object model and comprising a purchase request package that includes an item package;

processing, via the first message-based interface, an eighth message received from the second application in response to the second application's processing of the seventh message via the second message-based interface, where processing the seventh message by the second message-based interface includes unpacking the seventh message package based on the common business object model, and, wherein the eighth message comprises a confirmation concerning the request to create a purchase request and includes an eighth message package structured by the second message-based interface derived from the common business object model and comprising a purchase request package that includes an item package;

generating a ninth message by the first application, wherein the ninth message comprises a request to change a purchase request and includes a ninth message package structured by the first message-based interface derived from the common business object model and comprising a purchase request package that includes an item package;

processing, via the first message-based interface, a tenth message received from the second application in response to the second application's processing of the ninth message via the second message-based interface, where processing the ninth message by the second message-based interface includes unpacking the ninth message package based on the common business object model, and, wherein the tenth message comprises a confirmation concerning the request to change a purchase request and includes a tenth message package structured by the second message-based interface derived from the common business object model and comprising a purchase request package that includes an item package;

generating an eleventh message by the first application, wherein the eleventh message comprises a request to release a purchase request or a purchase request item and includes an eleventh message package structured by the first message-based interface derived from the common business object model and comprising a purchase request package that includes a release information package;

processing, via the first message-based interface, a twelfth message received from the second application in response to the second application's processing of the eleventh message via the second message-based interface, where processing the eleventh message by the second message-based interface includes unpacking the eleventh message package based on the common business object model, and, wherein the twelfth message comprises a confirmation concerning the request to release a purchase request or a purchase request item and includes a twelfth message package structured by the second message-based interface derived from the common business object model;

generating a thirteenth message by the first application, wherein the thirteenth message comprises an inquiry for purchase request items for account assignment information and includes a thirteenth message package structured by the first message-based interface derived from the common business object model and comprising a selection package; and processing, via the first message-based interface, a fourteenth message received from the second application in response to the second application's processing of the thirteenth message via the second message-based interface, where processing the thirteenth message by the second message-based interface includes unpacking the thirteenth message package based on the common business object model, and, wherein the fourteenth message comprises a response to the inquiry for purchase request items for account assignment information and includes a fourteenth message package structured by the second message-based interface derived from the common business object model and comprises a purchase request package.

* * * * *